(12) United States Patent
Kitchen et al.

(10) Patent No.: US 11,190,578 B2
(45) Date of Patent: Nov. 30, 2021

(54) INTEGRATED CLOUD SYSTEM WITH LIGHTWEIGHT GATEWAY FOR PREMISES AUTOMATION

(71) Applicant: ICONTROL NETWORKS, INC., Redwood City, CA (US)

(72) Inventors: Jim Kitchen, Redwood City, CA (US); Corey Gates, Redwood City, CA (US); Chris Decenzo, Redwood City, CA (US)

(73) Assignee: iControl Networks, Inc., Philadelphia, PA (US)

( * ) Notice: Subject to any disclaimer, the term of this patent is extended or adjusted under 35 U.S.C. 154(b) by 1003 days.

(21) Appl. No.: 15/198,531

(22) Filed: Jun. 30, 2016

(65) Prior Publication Data

US 2017/0063967 A1   Mar. 2, 2017

Related U.S. Application Data

(63) Continuation-in-part of application No. 15/196,646, filed on Jun. 29, 2016, now abandoned, and a
(Continued)

(51) Int. Cl.
*H04L 29/08* (2006.01)
*H04W 4/80* (2018.01)
(Continued)

(52) U.S. Cl.
CPC .......... *H04L 67/10* (2013.01); *H04L 65/1033* (2013.01); *H04L 67/02* (2013.01);
(Continued)

(58) Field of Classification Search
CPC ........ H04W 4/70; H04W 88/02; H04L 12/282
(Continued)

(56) References Cited

U.S. PATENT DOCUMENTS 686,838 A    11/1901  Appel
1,738,540 A   12/1929  Replogle et al.
(Continued)

FOREIGN PATENT DOCUMENTS

AU    2005223267 B2    12/2010
AU    2010297957 A1     5/2012
(Continued)

OTHER PUBLICATIONS

Wilkinson, S: "Logitech Harmony One Universal Remote" Ultimate AV magazine May 2008 (May 2008), XP002597782 Retrieved from the Internet : Original URL: http://www.ultimateavmag.com/remotecontrols/508logi) [retrieved on Aug. 23, 2010] the whole document; Updated URL: https://www.soundandvision.com/content/logitech-harmony-one-universal-remote, Retrieved from internet on Jan. 11, 2018.
(Continued)

*Primary Examiner* — Tauqir Hussain
(74) *Attorney, Agent, or Firm* — BakerHostetler

(57) ABSTRACT

Systems and methods include a cloud hub located in a premises, and the cloud hub comprises adapters configured for coupling to premises devices. The cloud hub is configured as a gateway for the premises devices. The system includes a virtual gateway located in a cloud server environment and coupled to the cloud hub. The virtual gateway is configured as a server-side abstraction of the cloud hub. The cloud hub and the virtual gateway are configured as an automation platform that maintains state data of the premises devices, controls interaction among the premises devices, and monitors and manages the premises devices.

77 Claims, 38 Drawing Sheets

Related U.S. Application Data continuation-in-part of application No. 12/189,780, filed on Aug. 11, 2008, now abandoned, and a continuation-in-part of application No. 13/531,757, filed on Jun. 25, 2012, now abandoned, and a continuation-in-part of application No. 12/197,958, filed on Aug. 25, 2008, now Pat. No. 10,721,087, and a continuation-in-part of application No. 13/334,998, filed on Dec. 22, 2011, now Pat. No. 9,531,593, and a continuation-in-part of application No. 12/539,537, filed on Aug. 11, 2009, now Pat. No. 10,156,959, and a continuation-in-part of application No. 14/645,808, filed on Mar. 12, 2015, now Pat. No. 10,127,801, and a continuation-in-part of application No. 13/104,932, filed on May 10, 2011, and a continuation-in-part of application No. 13/929,568, filed on Jun. 27, 2013, now Pat. No. 10,444,964, and a continuation-in-part of application No. 14/628,651, filed on Feb. 23, 2015, now Pat. No. 10,091,014, and a continuation-in-part of application No. 13/718,851, filed on Dec. 18, 2012, now Pat. No. 10,156,831, and a continuation-in-part of application No. 12/972,740, filed on Dec. 20, 2010, now Pat. No. 9,729,342, and a continuation-in-part of application No. 13/954,553, filed on Jul. 30, 2013, and a continuation-in-part of application No. 14/943,162, filed on Nov. 17, 2015, now Pat. No. 10,062,245, and a continuation-in-part of application No. 15/177,915, filed on Jun. 9, 2016.

(60) Provisional application No. 62/186,925, filed on Jun. 30, 2015, provisional application No. 62/186,974, filed on Jun. 30, 2015, provisional application No. 62/186,696, filed on Jun. 30, 2015, provisional application No. 62/186,825, filed on Jun. 30, 2015, provisional application No. 62/186,857, filed on Jun. 30, 2015.

(51) Int. Cl.
*H04L 29/06* (2006.01)
*H04L 12/26* (2006.01)
*H04W 84/04* (2009.01)
*H04W 84/12* (2009.01)
*H04L 12/931* (2013.01)

(52) U.S. Cl.
CPC .............. *H04W 4/80* (2018.02); *H04L 43/08* (2013.01); *H04L 49/70* (2013.01); *H04W 84/042* (2013.01); *H04W 84/12* (2013.01)

(58) Field of Classification Search
USPC ........................................................ 709/223
See application file for complete search history.

(56) References Cited

U.S. PATENT DOCUMENTS

| | | |
|---|---|---|
| 3,803,576 A | 4/1974 | Dobrzanski et al. |
| 3,852,541 A | 12/1974 | Altenberger |
| 4,006,460 A | 2/1977 | Hewitt et al. |
| 4,141,006 A | 2/1979 | Braxton |
| 4,206,449 A | 6/1980 | Apsell et al. |
| 4,257,038 A | 3/1981 | Rounds et al. |
| 4,286,331 A | 8/1981 | Anderson et al. |
| 4,304,970 A | 12/1981 | Fahey et al. |
| 4,351,023 A | 9/1982 | Richer |
| 4,363,031 A | 12/1982 | Reinowitz |
| 4,459,582 A | 7/1984 | Sheahan et al. |
| 4,520,503 A | 5/1985 | Kirst et al. |
| 4,559,526 A | 12/1985 | Tani et al. |
| 4,559,527 A | 12/1985 | Kirby |
| 4,567,557 A | 1/1986 | Burns |
| 4,574,305 A | 3/1986 | Campbell et al. |
| 4,581,606 A | 4/1986 | Mallory |
| 4,591,834 A | 5/1986 | Kyle |
| D284,084 S | 6/1986 | Ferrara, Jr. |
| 4,641,127 A | 2/1987 | Wright |
| 4,652,859 A | 3/1987 | Van Wienen |
| 4,670,739 A | 6/1987 | Kelly, Jr. |
| 4,683,460 A | 7/1987 | Nakatsugawa |
| 4,694,282 A | 9/1987 | Tamura et al. |
| 4,716,973 A | 1/1988 | Cobern |
| 4,730,184 A | 3/1988 | Bach |
| 4,754,261 A | 6/1988 | Marino |
| 4,755,792 A | 7/1988 | Pezzolo et al. |
| 4,779,007 A | 10/1988 | Schlanger et al. |
| 4,801,924 A | 1/1989 | Burgmann et al. |
| 4,812,820 A | 3/1989 | Chatwin |
| 4,818,970 A | 4/1989 | Natale et al. |
| 4,833,339 A | 5/1989 | Luchaco et al. |
| 4,833,449 A | 5/1989 | Gaffigan |
| 4,855,713 A | 8/1989 | Brunius |
| 4,860,185 A | 8/1989 | Brewer et al. |
| 4,887,064 A | 12/1989 | Drori et al. |
| 4,897,630 A | 1/1990 | Nykerk |
| 4,918,623 A | 4/1990 | Lockitt et al. |
| 4,918,717 A | 4/1990 | Bissonnette et al. |
| 4,951,029 A | 8/1990 | Severson |
| 4,959,713 A | 9/1990 | Morotomi et al. |
| 4,962,473 A | 10/1990 | Crain |
| 4,980,666 A | 12/1990 | Hwang |
| 4,993,059 A | 2/1991 | Smith et al. |
| 4,994,787 A | 2/1991 | Kratt |
| 4,996,646 A | 2/1991 | Farrington |
| 5,023,901 A | 6/1991 | Sloan et al. |
| 5,083,106 A | 1/1992 | Kostusiak et al. |
| 5,086,385 A | 2/1992 | Launey et al. |
| 5,091,780 A | 2/1992 | Pomerleau |
| 5,109,278 A | 4/1992 | Erickson et al. |
| 5,132,968 A | 7/1992 | Cephus |
| 5,134,644 A | 7/1992 | Garton et al. |
| 5,159,315 A | 10/1992 | Schultz et al. |
| 5,160,879 A | 11/1992 | Tortola et al. |
| 5,164,703 A | 11/1992 | Rickman |
| 5,164,979 A | 11/1992 | Choi |
| D337,569 S | 7/1993 | Kando |
| 5,227,776 A | 7/1993 | Starefoss |
| 5,237,305 A | 8/1993 | Ishikuro et al. |
| 5,245,694 A | 9/1993 | Zwern |
| 5,280,527 A | 1/1994 | Gullman et al. |
| 5,283,816 A | 2/1994 | Gomez Diaz |
| 5,299,971 A | 4/1994 | Hart |
| 5,319,394 A | 6/1994 | Dukek |
| 5,319,698 A | 6/1994 | Glidewell et al. |
| 5,334,974 A | 8/1994 | Moore, Jr. |
| 5,400,011 A | 3/1995 | Sutton |
| 5,400,246 A | 3/1995 | Wilson et al. |
| 5,406,260 A | 4/1995 | Cummings et al. |
| 5,410,343 A | 4/1995 | Coddington et al. |
| 5,412,708 A | 5/1995 | Katz |
| 5,414,409 A | 5/1995 | Voosen et al. |
| 5,414,833 A | 5/1995 | Hershey et al. |
| 5,428,293 A | 6/1995 | Sinclair et al. |
| 5,438,607 A | 8/1995 | Przygoda, Jr. et al. |
| 5,446,445 A | 8/1995 | Bloomfield et al. |
| 5,448,290 A | 9/1995 | Vanzeeland |
| 5,452,344 A | 9/1995 | Larson |
| 5,465,081 A | 11/1995 | Todd |
| 5,471,194 A | 11/1995 | Guscott |
| 5,481,312 A | 1/1996 | Cash et al. |
| 5,483,224 A | 1/1996 | Rankin et al. |
| 5,486,812 A | 1/1996 | Todd |
| 5,499,014 A | 3/1996 | Greenwaldt |
| 5,499,196 A | 3/1996 | Pacheco |
| 5,510,975 A | 4/1996 | Ziegler, Jr. |
| 5,519,878 A | 5/1996 | Dolin, Jr. |
| RE35,268 E | 6/1996 | Frolov et al. |
| 5,525,966 A | 6/1996 | Parish |
| 5,526,428 A | 6/1996 | Arnold |

(56) References Cited

U.S. PATENT DOCUMENTS

| | | |
|---|---|---|
| 5,534,845 A | 7/1996 | Issa et al. |
| 5,541,585 A | 7/1996 | Duhame et al. |
| 5,543,778 A | 8/1996 | Stouffer |
| 5,546,072 A | 8/1996 | Creuseremee et al. |
| 5,546,074 A | 8/1996 | Bernal et al. |
| 5,546,447 A | 8/1996 | Skarbo et al. |
| 5,548,646 A | 8/1996 | Aziz et al. |
| 5,550,984 A | 8/1996 | Gelb |
| 5,557,254 A | 9/1996 | Johnson et al. |
| 5,565,843 A | 10/1996 | Meyvis |
| 5,570,079 A | 10/1996 | Dockery |
| 5,572,438 A | 11/1996 | Ehlers et al. |
| 5,578,989 A | 11/1996 | Pedtke |
| 5,579,197 A | 11/1996 | Mengelt et al. |
| 5,579,221 A | 11/1996 | Mun |
| D377,034 S | 12/1996 | Matsushita |
| 5,586,254 A | 12/1996 | Kondo et al. |
| 5,587,705 A | 12/1996 | Morris |
| 5,598,086 A | 1/1997 | Somerville |
| 5,602,918 A | 2/1997 | Chen et al. |
| 5,604,493 A | 2/1997 | Behlke |
| 5,606,615 A | 2/1997 | Lapointe et al. |
| 5,621,662 A | 4/1997 | Humphries et al. |
| 5,623,601 A | 4/1997 | Vu |
| 5,625,338 A | 4/1997 | Pildner et al. |
| 5,625,410 A | 4/1997 | Washino et al. |
| 5,629,687 A | 5/1997 | Sutton et al. |
| 5,630,216 A | 5/1997 | McEwan |
| 5,631,630 A | 5/1997 | McSweeney |
| 5,638,046 A | 6/1997 | Malinowski |
| 5,650,773 A | 7/1997 | Chiarello |
| 5,651,070 A | 7/1997 | Blunt |
| 5,652,567 A | 7/1997 | Traxler |
| 5,654,694 A | 8/1997 | Newham |
| 5,675,321 A | 10/1997 | McBride |
| 5,680,131 A | 10/1997 | Utz |
| 5,682,133 A | 10/1997 | Johnson et al. |
| 5,686,885 A | 11/1997 | Bergman |
| 5,686,896 A | 11/1997 | Bergman |
| 5,689,235 A | 11/1997 | Sugimoto et al. |
| 5,689,708 A | 11/1997 | Regnier et al. |
| 5,691,697 A | 11/1997 | Carvalho et al. |
| 5,694,335 A | 12/1997 | Hollenberg |
| 5,694,595 A | 12/1997 | Jacobs et al. |
| 5,696,486 A | 12/1997 | Poliquin et al. |
| 5,696,898 A | 12/1997 | Baker et al. |
| D389,501 S | 1/1998 | Mascarenas, Sr. et al. |
| 5,706,191 A | 1/1998 | Bassett et al. |
| 5,712,679 A | 1/1998 | Coles |
| 5,714,933 A | 2/1998 | Le Van Suu |
| 5,715,394 A | 2/1998 | Jabs |
| 5,717,378 A | 2/1998 | Malvaso et al. |
| 5,717,379 A | 2/1998 | Peters |
| 5,717,578 A | 2/1998 | Afzal |
| 5,719,551 A | 2/1998 | Flick |
| 5,726,912 A | 3/1998 | Krall et al. |
| 5,731,756 A | 3/1998 | Roddy |
| 5,736,927 A | 4/1998 | Stebbins et al. |
| 5,737,391 A | 4/1998 | Dame et al. |
| 5,748,084 A | 5/1998 | Isikoff |
| 5,748,089 A | 5/1998 | Sizemore |
| 5,757,616 A | 5/1998 | May et al. |
| 5,761,206 A | 6/1998 | Kackman |
| 5,774,051 A | 6/1998 | Kostusiak |
| 5,777,551 A | 7/1998 | Hess |
| 5,777,837 A | 7/1998 | Eckel et al. |
| 5,784,461 A | 7/1998 | Shaffer et al. |
| 5,784,463 A | 7/1998 | Chen et al. |
| 5,793,028 A | 8/1998 | Wagener et al. |
| 5,793,763 A | 8/1998 | Mayes et al. |
| 5,794,128 A | 8/1998 | Brockel et al. |
| 5,796,401 A | 8/1998 | Winer |
| 5,798,701 A | 8/1998 | Bernal et al. |
| 5,801,618 A | 9/1998 | Jenkins |
| 5,805,056 A | 9/1998 | Mueller et al. |
| 5,805,064 A | 9/1998 | Yorkey |
| 5,809,013 A | 9/1998 | Kackman |
| 5,809,265 A | 9/1998 | Blair et al. |
| 5,812,054 A | 9/1998 | Cohen |
| 5,819,124 A | 10/1998 | Somner et al. |
| 5,821,937 A | 10/1998 | Tonelli |
| 5,844,599 A | 12/1998 | Hildin |
| 5,845,070 A | 12/1998 | Ikudome |
| 5,854,588 A | 12/1998 | Dockery |
| 5,859,966 A | 1/1999 | Hayman et al. |
| 5,861,804 A | 1/1999 | Fansa et al. |
| 5,864,614 A | 1/1999 | Farris et al. |
| 5,867,484 A | 2/1999 | Shaunfield |
| 5,867,495 A | 2/1999 | Elliott et al. |
| 5,874,952 A | 2/1999 | Morgan |
| 5,875,395 A | 2/1999 | Holmes |
| 5,877,696 A | 3/1999 | Powell |
| 5,877,957 A | 3/1999 | Bennett |
| 5,880,775 A | 3/1999 | Ross |
| 5,881,226 A | 3/1999 | Veneklase |
| 5,886,894 A | 3/1999 | Rakoff |
| 5,892,442 A | 4/1999 | Ozery |
| 5,898,831 A | 4/1999 | Hall et al. |
| 5,905,438 A | 5/1999 | Weiss et al. |
| 5,907,279 A | 5/1999 | Bruins et al. |
| 5,909,183 A | 6/1999 | Borgstahl et al. |
| 5,914,655 A | 6/1999 | Clifton et al. |
| 5,924,069 A | 7/1999 | Kowalkowski et al. |
| 5,926,209 A | 7/1999 | Glatt |
| 5,933,098 A | 8/1999 | Haxton |
| 5,940,387 A | 8/1999 | Humpleman |
| 5,943,394 A | 8/1999 | Ader et al. |
| 5,952,815 A | 9/1999 | Rouillard et al. |
| 5,955,946 A | 9/1999 | Beheshti et al. |
| 5,958,053 A | 9/1999 | Denker |
| 5,959,528 A | 9/1999 | Right et al. |
| 5,959,529 A | 9/1999 | Kail, IV |
| 5,963,916 A | 10/1999 | Kaplan |
| 5,967,975 A | 10/1999 | Ridgeway |
| 5,974,547 A | 10/1999 | Klimenko |
| D416,910 S | 11/1999 | Vasquez |
| 5,982,418 A | 11/1999 | Ely |
| 5,991,795 A | 11/1999 | Howard et al. |
| 5,995,838 A | 11/1999 | Oda et al. |
| 6,002,430 A | 12/1999 | McCall et al. |
| 6,009,320 A | 12/1999 | Dudley |
| 6,011,321 A | 1/2000 | Stancu et al. |
| 6,011,921 A | 1/2000 | Takahashi et al. |
| 6,032,036 A | 2/2000 | Maystre et al. |
| 6,037,991 A | 3/2000 | Thro et al. |
| 6,038,289 A | 3/2000 | Sands |
| 6,040,770 A | 3/2000 | Britton |
| 6,049,272 A | 4/2000 | Moore |
| 6,049,273 A | 4/2000 | Hess |
| 6,049,598 A | 4/2000 | Peters et al. |
| 6,052,052 A | 4/2000 | Delmonaco |
| 6,058,115 A | 5/2000 | Sawyer et al. |
| 6,060,994 A | 5/2000 | Chen |
| 6,067,346 A | 5/2000 | Akhteruzzaman et al. |
| 6,067,440 A | 5/2000 | Diefes |
| 6,069,655 A | 5/2000 | Seeley et al. |
| 6,078,253 A | 6/2000 | Fowler |
| 6,078,257 A | 6/2000 | Ferraro |
| 6,078,649 A | 6/2000 | Small et al. |
| 6,085,030 A | 7/2000 | Whitehead et al. |
| 6,091,771 A | 7/2000 | Seeley et al. |
| 6,094,134 A | 7/2000 | Cohen |
| 6,097,429 A | 8/2000 | Seeley et al. |
| 6,104,785 A | 8/2000 | Chen |
| 6,107,918 A | 8/2000 | Klein et al. |
| 6,107,930 A | 8/2000 | Behlke et al. |
| 6,108,034 A | 8/2000 | Kim |
| 6,112,015 A | 8/2000 | Planas et al. |
| 6,112,237 A | 8/2000 | Donaldson et al. |
| 6,117,182 A | 9/2000 | Alpert et al. |
| 6,124,882 A | 9/2000 | Voois et al. |
| 6,128,653 A | 10/2000 | Del et al. |
| 6,134,303 A | 10/2000 | Chen |
| 6,134,591 A | 10/2000 | Nickles |

(56) References Cited

U.S. PATENT DOCUMENTS

| | | |
|---|---|---|
| 6,138,249 A | 10/2000 | Nolet |
| 6,139,177 A | 10/2000 | Venkatraman et al. |
| 6,140,987 A | 10/2000 | Stein et al. |
| 6,144,993 A | 11/2000 | Fukunaga et al. |
| 6,154,133 A | 11/2000 | Ross et al. |
| 6,157,943 A | 12/2000 | Meyer |
| 6,161,182 A | 12/2000 | Nadooshan |
| 6,167,186 A | 12/2000 | Kawasaki et al. |
| 6,167,253 A | 12/2000 | Farris et al. |
| 6,181,341 B1 | 1/2001 | Shinagawa |
| 6,192,282 B1 | 2/2001 | Smith et al. |
| 6,192,418 B1 | 2/2001 | Hale et al. |
| 6,198,475 B1 | 3/2001 | Kunimatsu et al. |
| 6,198,479 B1 | 3/2001 | Humpleman et al. |
| 6,208,247 B1 | 3/2001 | Agre et al. |
| 6,208,952 B1 | 3/2001 | Goertzel et al. |
| 6,209,011 B1 | 3/2001 | Vong et al. |
| 6,211,783 B1 | 4/2001 | Wang |
| 6,215,404 B1 | 4/2001 | Morales |
| 6,218,938 B1 | 4/2001 | Lin |
| 6,219,677 B1 | 4/2001 | Howard |
| 6,226,031 B1 | 5/2001 | Barraclough et al. |
| 6,229,429 B1 | 5/2001 | Horon |
| 6,230,271 B1 | 5/2001 | Wadlow et al. |
| 6,239,892 B1 | 5/2001 | Davidson |
| 6,243,683 B1 | 6/2001 | Peters |
| 6,246,320 B1 | 6/2001 | Monroe |
| 6,252,883 B1 | 6/2001 | Schweickart et al. |
| 6,271,752 B1 | 8/2001 | Vaios |
| 6,275,227 B1 | 8/2001 | Destefano |
| 6,281,790 B1 | 8/2001 | Kimmel et al. |
| 6,282,569 B1 | 8/2001 | Wallis et al. |
| 6,286,038 B1 | 9/2001 | Reichmeyer et al. |
| 6,288,716 B1 | 9/2001 | Humpleman et al. |
| 6,289,382 B1 | 9/2001 | Bowman-Amuah |
| 6,292,766 B1 | 9/2001 | Mattos et al. |
| 6,292,827 B1 | 9/2001 | Raz |
| 6,295,346 B1 | 9/2001 | Markowitz et al. |
| 6,314,425 B1 | 11/2001 | Serbinis et al. |
| 6,320,506 B1 | 11/2001 | Ferraro |
| 6,323,897 B1 | 11/2001 | Kogane et al. |
| D451,529 S | 12/2001 | Vasquez |
| 6,327,044 B1 | 12/2001 | Shima |
| 6,331,122 B1 | 12/2001 | Wu |
| 6,332,193 B1 | 12/2001 | Glass et al. |
| 6,347,393 B1 | 2/2002 | Alpert et al. |
| 6,351,213 B1 | 2/2002 | Hirsch et al. |
| 6,351,271 B1 | 2/2002 | Mainwaring et al. |
| 6,351,595 B1 | 2/2002 | Kim |
| 6,351,829 B1 | 2/2002 | Dupont et al. |
| 6,353,853 B1 | 3/2002 | Gravlin |
| 6,353,891 B1 | 3/2002 | Borella et al. |
| 6,359,560 B1 | 3/2002 | Budge et al. |
| 6,363,417 B1 | 3/2002 | Howard et al. |
| 6,363,422 B1 | 3/2002 | Hunter et al. |
| 6,366,211 B1 | 4/2002 | Parker |
| 6,369,695 B1 | 4/2002 | Horon |
| 6,369,705 B1 | 4/2002 | Kennedy |
| 6,370,436 B1 | 4/2002 | Howard et al. |
| 6,374,079 B1 | 4/2002 | Hsu |
| 6,377,861 B1 | 4/2002 | York |
| 6,378,109 B1 | 4/2002 | Young et al. |
| 6,385,772 B1 | 5/2002 | Courtney |
| 6,392,538 B1 | 5/2002 | Shere |
| 6,400,265 B1 | 6/2002 | Saylor et al. |
| 6,405,348 B1 | 6/2002 | Fallah-Tehrani et al. |
| 6,411,802 B1 | 6/2002 | Cardina et al. |
| D460,472 S | 7/2002 | Wang |
| 6,418,037 B1 | 7/2002 | Zhang |
| 6,421,080 B1 | 7/2002 | Lambert |
| 6,430,629 B1 | 8/2002 | Smyers |
| 6,433,683 B1 | 8/2002 | Robinson |
| 6,434,604 B1 | 8/2002 | Harada et al. |
| 6,434,700 B1 | 8/2002 | Alonso et al. |
| 6,437,692 B1 | 8/2002 | Petite et al. |
| 6,441,723 B1 | 8/2002 | Mansfield et al. |
| 6,441,731 B1 | 8/2002 | Hess |
| 6,442,241 B1 | 8/2002 | Tsumpes |
| 6,445,291 B2 | 9/2002 | Addy et al. |
| 6,446,192 B1 | 9/2002 | Narasimhan et al. |
| 6,452,490 B1 | 9/2002 | Garland et al. |
| 6,452,923 B1 | 9/2002 | Gerszberg et al. |
| 6,453,687 B2 | 9/2002 | Sharood et al. |
| D464,328 S | 10/2002 | Vasquez et al. |
| D464,948 S | 10/2002 | Vasquez et al. |
| 6,462,507 B2 | 10/2002 | Fisher, Jr. |
| 6,462,663 B1 | 10/2002 | Wilson et al. |
| 6,467,084 B1 | 10/2002 | Howard et al. |
| 6,476,858 B1 | 11/2002 | Ramirez et al. |
| 6,480,901 B1 | 11/2002 | Weber et al. |
| 6,493,020 B1 | 12/2002 | Stevenson et al. |
| 6,496,927 B1 | 12/2002 | McGrane et al. |
| 6,499,131 B1 | 12/2002 | Savithri et al. |
| 6,504,479 B1 | 1/2003 | Lemons et al. |
| 6,507,589 B1 | 1/2003 | Ramasubramani et al. |
| 6,508,709 B1 | 1/2003 | Karmarkar |
| 6,515,968 B1 | 2/2003 | Combar et al. |
| 6,526,581 B1 | 2/2003 | Edson |
| 6,529,230 B1 | 3/2003 | Chong |
| 6,529,723 B1 | 3/2003 | Bentley |
| 6,535,110 B1 | 3/2003 | Arora et al. |
| 6,542,075 B2 | 4/2003 | Barker et al. |
| 6,542,992 B1 | 4/2003 | Peirce et al. |
| 6,549,130 B1 | 4/2003 | Joao |
| 6,552,647 B1 | 4/2003 | Thiessen et al. |
| 6,553,336 B1 | 4/2003 | Johnson et al. |
| 6,559,769 B2 | 5/2003 | Anthony et al. |
| 6,563,800 B1 | 5/2003 | Salo et al. |
| 6,563,910 B2 | 5/2003 | Menard et al. |
| 6,567,122 B1 | 5/2003 | Anderson et al. |
| 6,567,502 B2 | 5/2003 | Zellner et al. |
| 6,574,234 B1 | 6/2003 | Myer et al. |
| 6,580,424 B1 | 6/2003 | Krumm |
| 6,580,950 B1 | 6/2003 | Johnson et al. |
| 6,587,046 B2 | 7/2003 | Joao |
| 6,587,455 B1 | 7/2003 | Ray et al. |
| 6,587,736 B2 | 7/2003 | Howard et al. |
| 6,587,739 B1 | 7/2003 | Abrams et al. |
| 6,591,094 B1 | 7/2003 | Bentley |
| 6,593,856 B1 | 7/2003 | Madau |
| 6,597,703 B1 | 7/2003 | Li et al. |
| 6,601,086 B1 | 7/2003 | Howard et al. |
| 6,603,488 B2 | 8/2003 | Humpleman et al. |
| 6,609,127 B1 | 8/2003 | Lee et al. |
| 6,611,206 B2 | 8/2003 | Eshelman et al. |
| 6,615,088 B1 | 9/2003 | Myer et al. |
| 6,621,827 B1 | 9/2003 | Rezvani et al. |
| 6,624,750 B1 | 9/2003 | Marman et al. |
| 6,631,416 B2 | 10/2003 | Bendinelli et al. |
| 6,636,893 B1 | 10/2003 | Fong |
| 6,643,355 B1 | 11/2003 | Tsumpes |
| 6,643,652 B2 | 11/2003 | Helgeson et al. |
| 6,643,669 B1 | 11/2003 | Novak et al. |
| 6,643,795 B1 | 11/2003 | Sicola et al. |
| 6,648,682 B1 | 11/2003 | Wu |
| 6,658,091 B1 | 12/2003 | Naidoo et al. |
| 6,661,340 B1 | 12/2003 | Saylor et al. |
| 6,662,340 B2 | 12/2003 | Rawat et al. |
| 6,665,004 B1 | 12/2003 | Paff |
| 6,667,688 B1 | 12/2003 | Menard et al. |
| 6,674,767 B1 | 1/2004 | Kadyk et al. |
| 6,675,365 B2 | 1/2004 | Elzinga |
| 6,680,730 B1 | 1/2004 | Shields et al. |
| 6,686,838 B1 | 2/2004 | Rezvani et al. |
| 6,690,411 B2 | 2/2004 | Naidoo et al. |
| 6,690,719 B1 | 2/2004 | Raphaeli et al. |
| 6,693,530 B1 | 2/2004 | Dowens et al. |
| 6,693,545 B2 | 2/2004 | Brown et al. |
| 6,697,103 B1 | 2/2004 | Fernandez et al. |
| 6,704,786 B1 | 3/2004 | Gupta et al. |
| 6,720,990 B1 | 4/2004 | Walker et al. |
| 6,721,689 B2 | 4/2004 | Markle et al. |
| 6,721,740 B1 | 4/2004 | Skinner et al. |
| 6,721,747 B2 | 4/2004 | Lipkin |

(56) References Cited

U.S. PATENT DOCUMENTS

| | | |
|---|---|---|
| 6,721,802 B1 | 4/2004 | Wright et al. |
| 6,727,811 B1 | 4/2004 | Fendis |
| 6,728,233 B1 | 4/2004 | Park et al. |
| 6,728,688 B1 | 4/2004 | Hirsch et al. |
| 6,738,824 B1 | 5/2004 | Blair |
| 6,741,171 B2 | 5/2004 | Palka et al. |
| 6,741,977 B1 | 5/2004 | Nagaya et al. |
| 6,754,717 B1 | 6/2004 | Day, III et al. |
| 6,756,896 B2 | 6/2004 | Ford |
| 6,756,998 B1 | 6/2004 | Bilger |
| 6,759,956 B2 | 7/2004 | Menard et al. |
| 6,762,686 B1 | 7/2004 | Tabe |
| 6,771,181 B1 | 8/2004 | Hughen, Jr. |
| 6,778,085 B2 | 8/2004 | Faulkner et al. |
| 6,779,019 B1 | 8/2004 | Mousseau et al. |
| 6,781,509 B1 | 8/2004 | Oppedahl et al. |
| 6,785,542 B1 | 8/2004 | Blight et al. |
| 6,789,147 B1 | 9/2004 | Kessler et al. |
| 6,795,322 B2 | 9/2004 | Aihara et al. |
| 6,795,863 B1 | 9/2004 | Doty, Jr. |
| 6,798,344 B2 | 9/2004 | Faulkner et al. |
| 6,804,638 B2 | 10/2004 | Fiedler |
| 6,810,409 B1 | 10/2004 | Fry et al. |
| 6,823,223 B2 | 11/2004 | Gonzales et al. |
| 6,826,173 B1 | 11/2004 | Kung et al. |
| 6,826,233 B1 | 11/2004 | Oosawa |
| 6,829,478 B1 | 12/2004 | Layton et al. |
| 6,834,208 B2 | 12/2004 | Gonzales et al. |
| 6,836,214 B2 | 12/2004 | Choi |
| 6,850,252 B1 | 2/2005 | Hoffberg |
| 6,856,236 B2 | 2/2005 | Christensen et al. |
| 6,857,026 B1 | 2/2005 | Cain |
| 6,865,690 B2 | 3/2005 | Kocin |
| 6,871,193 B1 | 3/2005 | Campbell et al. |
| 6,873,256 B2 | 3/2005 | Lemelson et al. |
| 6,885,362 B2 | 4/2005 | Suomela |
| D504,889 S | 5/2005 | Andre et al. |
| 6,891,838 B1 | 5/2005 | Petite et al. |
| 6,912,429 B1 | 6/2005 | Bilger |
| 6,914,533 B2 | 7/2005 | Petite |
| 6,918,112 B2 | 7/2005 | Bourke-Dunphy et al. |
| 6,920,502 B2 | 7/2005 | Araujo et al. |
| 6,920,615 B1 | 7/2005 | Campbell et al. |
| 6,922,701 B1 | 7/2005 | Ananian et al. |
| 6,928,148 B2 | 8/2005 | Simon et al. |
| 6,930,598 B2 | 8/2005 | Weiss |
| 6,930,599 B2 | 8/2005 | Naidoo et al. |
| 6,930,730 B2 | 8/2005 | Maxon et al. |
| 6,931,445 B2 | 8/2005 | Davis |
| 6,941,258 B2 | 9/2005 | Van Heijningen et al. |
| 6,943,681 B2 | 9/2005 | Rezvani et al. |
| 6,956,477 B2 | 10/2005 | Chun |
| 6,957,186 B1 | 10/2005 | Guheen et al. |
| 6,957,275 B1 | 10/2005 | Sekiguchi |
| 6,959,341 B1 | 10/2005 | Leung |
| 6,959,393 B2 | 10/2005 | Hollis et al. |
| 6,963,908 B1 | 11/2005 | Lynch et al. |
| 6,963,981 B1 | 11/2005 | Bailey et al. |
| 6,965,294 B1 | 11/2005 | Elliott et al. |
| 6,965,313 B1 | 11/2005 | Saylor et al. |
| 6,970,183 B1 | 11/2005 | Monroe |
| 6,971,063 B1 | 11/2005 | Rappaport et al. |
| 6,971,076 B2 | 11/2005 | Chen |
| 6,972,676 B1 | 12/2005 | Kimmel et al. |
| 6,975,220 B1 | 12/2005 | Foodman et al. |
| 6,977,485 B1 | 12/2005 | Wei |
| 6,983,432 B2 | 1/2006 | Hayes |
| 6,990,591 B1 | 1/2006 | Pearson |
| 6,993,658 B1 | 1/2006 | Engberg et al. |
| 6,999,562 B2 | 2/2006 | Winick |
| 6,999,992 B1 | 2/2006 | Deen et al. |
| 7,015,806 B2 | 3/2006 | Naidoo et al. |
| 7,016,970 B2 | 3/2006 | Harumoto et al. |
| 7,019,639 B2 | 3/2006 | Stilp |
| 7,020,697 B1 | 3/2006 | Goodman et al. |
| 7,020,701 B1 | 3/2006 | Gelvin et al. |
| 7,023,913 B1 | 4/2006 | Monroe |
| 7,023,914 B2 | 4/2006 | Furukawa et al. |
| 7,023,975 B2 | 4/2006 | Mansfield et al. |
| 7,024,676 B1 | 4/2006 | Klopfenstein |
| 7,028,328 B2 | 4/2006 | Kogane et al. |
| 7,030,752 B2 | 4/2006 | Tyroler |
| 7,032,002 B1 | 4/2006 | Rezvani et al. |
| 7,034,681 B2 | 4/2006 | Yamamoto et al. |
| 7,035,907 B1 | 4/2006 | Decasper et al. |
| 7,039,391 B2 | 5/2006 | Rezvani et al. |
| 7,043,537 B1 | 5/2006 | Pratt |
| 7,047,088 B2 | 5/2006 | Nakamura et al. |
| 7,047,092 B2 | 5/2006 | Wimsatt |
| 7,047,180 B1 | 5/2006 | Mathews et al. |
| 7,050,388 B2 | 5/2006 | Kim et al. |
| 7,053,764 B2 | 5/2006 | Stilp |
| 7,053,765 B1 | 5/2006 | Clark |
| 7,068,164 B1 | 6/2006 | Duncan et al. |
| 7,072,934 B2 | 7/2006 | Helgeson et al. |
| 7,073,140 B1 | 7/2006 | Li et al. |
| 7,075,429 B2 | 7/2006 | Marshall |
| 7,079,020 B2 | 7/2006 | Stilp |
| 7,080,046 B1 | 7/2006 | Rezvani et al. |
| 7,081,813 B2 | 7/2006 | Winick et al. |
| 7,082,460 B2 | 7/2006 | Hansen et al. |
| 7,084,756 B2 | 8/2006 | Stilp |
| 7,085,814 B1 | 8/2006 | Gandhi et al. |
| 7,085,937 B1 | 8/2006 | Rezvani et al. |
| 7,086,018 B2 | 8/2006 | Ito |
| 7,099,944 B1 | 8/2006 | Anschutz et al. |
| 7,099,994 B2 | 8/2006 | Thayer et al. |
| 7,103,152 B2 | 9/2006 | Naidoo et al. |
| 7,106,176 B2 | 9/2006 | La et al. |
| 7,107,322 B1 | 9/2006 | Freeny, Jr. |
| 7,110,774 B1 | 9/2006 | Davis et al. |
| 7,113,090 B1 | 9/2006 | Saylor et al. |
| 7,113,099 B2 | 9/2006 | Tyroler et al. |
| 7,114,554 B2 | 10/2006 | Bergman et al. |
| 7,119,609 B2 | 10/2006 | Naidoo et al. |
| 7,119,674 B2 | 10/2006 | Sefton |
| 7,120,139 B1 | 10/2006 | Kung et al. |
| 7,120,232 B2 | 10/2006 | Naidoo et al. |
| 7,120,233 B2 | 10/2006 | Naidoo et al. |
| 7,126,473 B1 | 10/2006 | Powell |
| 7,130,383 B2 | 10/2006 | Naidoo et al. |
| 7,130,585 B1 | 10/2006 | Ollis et al. |
| 7,134,138 B2 | 11/2006 | Scherr |
| 7,136,711 B1 | 11/2006 | Duncan et al. |
| 7,142,503 B1 | 11/2006 | Grant et al. |
| 7,145,898 B1 | 12/2006 | Elliott |
| 7,147,147 B1 | 12/2006 | Enright et al. |
| 7,148,810 B2 | 12/2006 | Bhat |
| 7,149,798 B2 | 12/2006 | Rezvani et al. |
| 7,149,814 B2 | 12/2006 | Neufeld et al. |
| 7,158,026 B2 | 1/2007 | Feldkamp et al. |
| 7,158,776 B1 | 1/2007 | Estes et al. |
| 7,158,920 B2 | 1/2007 | Ishikawa |
| 7,164,883 B2 | 1/2007 | Rappaport et al. |
| 7,164,907 B2 | 1/2007 | Cochran et al. |
| 7,166,987 B2 | 1/2007 | Lee et al. |
| 7,171,466 B2 | 1/2007 | Van Der Meulen |
| 7,171,686 B1 | 1/2007 | Jansen et al. |
| 7,174,018 B1 | 2/2007 | Patil et al. |
| 7,174,564 B1 | 2/2007 | Weatherspoon et al. |
| 7,180,889 B1 | 2/2007 | Kung et al. |
| 7,181,207 B1 | 2/2007 | Chow et al. |
| 7,181,716 B1 | 2/2007 | Dahroug |
| 7,183,907 B2 | 2/2007 | Simon et al. |
| 7,184,848 B2 | 2/2007 | Krzyzanowski et al. |
| 7,187,279 B2 | 3/2007 | Chung |
| 7,187,986 B2 | 3/2007 | Johnson et al. |
| 7,194,003 B2 | 3/2007 | Danner et al. |
| 7,194,446 B1 | 3/2007 | Bromley et al. |
| 7,203,486 B2 | 4/2007 | Patel |
| 7,209,945 B2 | 4/2007 | Hicks, III et al. |
| 7,212,570 B2 | 5/2007 | Akiyama et al. |
| 7,213,061 B1 | 5/2007 | Hite et al. |
| 7,218,217 B2 | 5/2007 | Adonailo et al. |

(56) References Cited

U.S. PATENT DOCUMENTS

| | | |
|---|---|---|
| 7,222,359 B2 | 5/2007 | Freund et al. |
| 7,229,012 B1 | 6/2007 | Enright et al. |
| 7,237,267 B2 | 6/2007 | Rayes et al. |
| 7,240,327 B2 | 7/2007 | Singh et al. |
| 7,246,044 B2 | 7/2007 | Imamura et al. |
| 7,248,150 B2 | 7/2007 | Mackjust et al. |
| 7,248,161 B2 | 7/2007 | Spoltore et al. |
| 7,249,177 B1 | 7/2007 | Miller |
| 7,249,317 B1 | 7/2007 | Nakagawa et al. |
| 7,250,854 B2 | 7/2007 | Rezvani et al. |
| 7,250,859 B2 | 7/2007 | Martin et al. |
| 7,254,779 B1 | 8/2007 | Rezvani et al. |
| 7,262,690 B2 | 8/2007 | Heaton et al. |
| 7,277,010 B2 | 10/2007 | Joao |
| 7,292,142 B2 | 11/2007 | Simon et al. |
| 7,293,083 B1 | 11/2007 | Ranous et al. |
| 7,298,253 B1 | 11/2007 | Petricoin et al. |
| 7,305,461 B2 | 12/2007 | Ullman |
| 7,310,115 B2 | 12/2007 | Tanimoto |
| 7,313,102 B2 | 12/2007 | Stephenson et al. |
| 7,313,231 B2 | 12/2007 | Reid |
| D558,460 S | 1/2008 | Yu et al. |
| D558,756 S | 1/2008 | Andre et al. |
| 7,337,217 B2 | 2/2008 | Wang |
| 7,337,473 B2 | 2/2008 | Chang et al. |
| 7,340,314 B1 | 3/2008 | Duncan et al. |
| 7,343,619 B2 | 3/2008 | Ofek et al. |
| 7,345,580 B2 | 3/2008 | Akamatsu et al. |
| 7,346,338 B1 | 3/2008 | Calhoun et al. |
| 7,349,682 B1 | 3/2008 | Bennett, III et al. |
| 7,349,761 B1 | 3/2008 | Cruse |
| 7,349,967 B2 | 3/2008 | Wang |
| 7,356,372 B1 | 4/2008 | Duncan et al. |
| 7,359,843 B1 | 4/2008 | Keller et al. |
| 7,362,221 B2 | 4/2008 | Katz |
| 7,367,045 B2 | 4/2008 | Ofek et al. |
| 7,370,115 B2 | 5/2008 | Bae et al. |
| 7,383,339 B1 | 6/2008 | Meenan et al. |
| 7,383,522 B2 | 6/2008 | Murgai et al. |
| 7,391,298 B1 | 6/2008 | Campbell et al. |
| 7,403,838 B2 | 7/2008 | Deen et al. |
| 7,409,045 B2 | 8/2008 | Naidoo et al. |
| 7,409,451 B1 | 8/2008 | Meenan et al. |
| 7,412,447 B2 | 8/2008 | Hilbert et al. |
| 7,425,101 B2 | 9/2008 | Cheng |
| 7,428,585 B1 | 9/2008 | Owens, II et al. |
| 7,430,614 B2 | 9/2008 | Shen et al. |
| 7,437,753 B2 | 10/2008 | Nahum |
| 7,440,434 B2 | 10/2008 | Chaskar et al. |
| 7,440,767 B2 | 10/2008 | Ballay et al. |
| 7,447,775 B1 | 11/2008 | Zhu et al. |
| 7,454,731 B2 | 11/2008 | Oh et al. |
| 7,457,869 B2 | 11/2008 | Kernan |
| 7,466,223 B2 | 12/2008 | Sefton |
| 7,469,139 B2 | 12/2008 | van de Groenendaal |
| 7,469,294 B1 | 12/2008 | Luo et al. |
| 7,469,381 B2 | 12/2008 | Ording |
| 7,469,391 B2 | 12/2008 | Carrere et al. |
| D584,738 S | 1/2009 | Kim et al. |
| D585,399 S | 1/2009 | Hwang |
| 7,477,629 B2 | 1/2009 | Tsirtsis et al. |
| 7,479,949 B2 | 1/2009 | Jobs et al. |
| 7,480,713 B2 | 1/2009 | Ullman |
| 7,480,724 B2 | 1/2009 | Zimler et al. |
| 7,483,958 B1 | 1/2009 | Elabbady et al. |
| 7,493,651 B2 | 2/2009 | Vaenskae et al. |
| 7,498,695 B2 | 3/2009 | Gaudreau et al. |
| 7,502,672 B1 | 3/2009 | Kolls |
| 7,506,052 B2 | 3/2009 | Qian et al. |
| 7,509,687 B2 | 3/2009 | Ofek et al. |
| 7,511,614 B2 | 3/2009 | Stilp et al. |
| 7,512,965 B1 | 3/2009 | Amdur et al. |
| 7,526,539 B1 | 4/2009 | Hsu |
| 7,526,762 B1 | 4/2009 | Astala et al. |
| 7,528,723 B2 | 5/2009 | Fast et al. |
| 7,542,721 B1 | 6/2009 | Bonner et al. |
| 7,549,134 B1 | 6/2009 | Li et al. |
| 7,551,071 B2 | 6/2009 | Bennett, III et al. |
| 7,554,934 B2 | 6/2009 | Abraham et al. |
| 7,558,379 B2 | 7/2009 | Winick |
| 7,558,862 B1 | 7/2009 | Tyukasz et al. |
| 7,558,903 B2 | 7/2009 | Kinstler |
| 7,562,323 B1 | 7/2009 | Bai et al. |
| 7,564,855 B1 | 7/2009 | Georgiou |
| 7,568,018 B1 | 7/2009 | Hove et al. |
| 7,571,459 B2 | 8/2009 | Ganesh et al. |
| 7,577,420 B2 | 8/2009 | Srinivasan et al. |
| 7,583,191 B2 | 9/2009 | Zinser |
| 7,587,464 B2 | 9/2009 | Moorer et al. |
| 7,590,953 B2 | 9/2009 | Chang |
| 7,595,816 B1 | 9/2009 | Enright et al. |
| 7,596,622 B2 | 9/2009 | Owen et al. |
| D602,014 S | 10/2009 | Andre et al. |
| D602,015 S | 10/2009 | Andre et al. |
| D602,017 S | 10/2009 | Andre et al. |
| D602,486 S | 10/2009 | Andre et al. |
| D602,487 S | 10/2009 | Maskatia |
| 7,606,767 B1 | 10/2009 | Couper et al. |
| 7,610,555 B2 | 10/2009 | Klein et al. |
| 7,610,559 B1 | 10/2009 | Humpleman et al. |
| 7,619,512 B2 | 11/2009 | Trundle et al. |
| 7,620,427 B2 | 11/2009 | Shanahan |
| 7,627,665 B2 | 12/2009 | Barker et al. |
| 7,633,385 B2 | 12/2009 | Cohn et al. |
| 7,634,519 B2 | 12/2009 | Creamer et al. |
| 7,639,157 B1 | 12/2009 | Whitley et al. |
| 7,651,530 B2 | 1/2010 | Winick |
| 7,653,911 B2 | 1/2010 | Doshi et al. |
| 7,671,729 B2 | 3/2010 | Hershkovitz et al. |
| 7,679,503 B2 | 3/2010 | Mason et al. |
| 7,681,201 B2 | 3/2010 | Dale et al. |
| 7,684,418 B2 | 3/2010 | Scott et al. |
| 7,696,873 B2 | 4/2010 | Sharma et al. |
| 7,697,028 B1 | 4/2010 | Johnson |
| 7,701,970 B2 | 4/2010 | Krits et al. |
| 7,702,782 B1 | 4/2010 | Pai |
| D615,083 S | 5/2010 | Andre et al. |
| 7,711,796 B2 | 5/2010 | Gutt et al. |
| 7,720,654 B2 | 5/2010 | Hollis |
| 7,733,371 B1 | 6/2010 | Monroe |
| 7,734,020 B2 | 6/2010 | Elliot et al. |
| 7,734,286 B2 | 6/2010 | Almeda et al. |
| 7,734,906 B2 | 6/2010 | Orlando et al. |
| 7,739,596 B2 | 6/2010 | Clarke-Martin et al. |
| 7,747,975 B2 | 6/2010 | Dinter et al. |
| 7,751,409 B1 | 7/2010 | Carolan |
| 7,755,472 B2 | 7/2010 | Grossman |
| 7,755,506 B1 | 7/2010 | Clegg et al. |
| 7,761,275 B2 | 7/2010 | Chopra et al. |
| 7,787,863 B2 | 8/2010 | van de Groenendaal |
| 7,804,760 B2 | 9/2010 | Schmukler et al. |
| D624,896 S | 10/2010 | Park et al. |
| D626,437 S | 11/2010 | Lee et al. |
| 7,825,793 B1 | 11/2010 | Spillman et al. |
| 7,827,252 B2 | 11/2010 | Hopmann et al. |
| 7,844,699 B1 | 11/2010 | Horrocks et al. |
| 7,847,675 B1 | 12/2010 | Thyen et al. |
| 7,855,635 B2 | 12/2010 | Cohn et al. |
| 7,859,404 B2 | 12/2010 | Chul Lee et al. |
| 7,882,466 B2 | 2/2011 | Ishikawa |
| 7,882,537 B2 | 2/2011 | Okajo et al. |
| 7,884,855 B2 | 2/2011 | Ortiz |
| 7,890,612 B2 | 2/2011 | Todd et al. |
| 7,890,915 B2 | 2/2011 | Celik et al. |
| 7,899,732 B2 | 3/2011 | Van Beaumont et al. |
| 7,904,074 B2 | 3/2011 | Karaoguz et al. |
| 7,904,187 B2 | 3/2011 | Hoffberg et al. |
| 7,911,341 B2 | 3/2011 | Raji et al. |
| D636,769 S | 4/2011 | Wood et al. |
| 7,921,686 B2 | 4/2011 | Bagepalli et al. |
| 7,928,840 B2 | 4/2011 | Kim et al. |
| 7,930,365 B2 | 4/2011 | Dixit et al. |
| D637,596 S | 5/2011 | Akana et al. |
| 7,949,960 B2 | 5/2011 | Roessler et al. |

(56) References Cited

U.S. PATENT DOCUMENTS

| | | |
|---|---|---|
| D639,805 S | 6/2011 | Song et al. |
| D640,663 S | 6/2011 | Arnholt et al. |
| 7,956,736 B2 | 6/2011 | Cohn et al. |
| 7,957,326 B1 | 6/2011 | Christie, IV |
| 7,970,863 B1 | 6/2011 | Fontaine |
| D641,018 S | 7/2011 | Lee et al. |
| 7,974,235 B2 | 7/2011 | Ghozati et al. |
| D642,563 S | 8/2011 | Akana et al. |
| 8,001,219 B2 | 8/2011 | Moorer et al. |
| D645,015 S | 9/2011 | Lee et al. |
| D645,435 S | 9/2011 | Kim et al. |
| D645,833 S | 9/2011 | Seflic et al. |
| 8,022,833 B2 | 9/2011 | Cho |
| 8,028,041 B2 | 9/2011 | Olliphant et al. |
| 8,032,881 B2 | 10/2011 | Holmberg et al. |
| 8,042,049 B2 | 10/2011 | Killian et al. |
| 8,046,411 B2 | 10/2011 | Hayashi et al. |
| 8,069,194 B1 | 11/2011 | Manber et al. |
| D650,381 S | 12/2011 | Park et al. |
| 8,073,931 B2 | 12/2011 | Dawes et al. |
| 8,086,702 B2 | 12/2011 | Baum et al. |
| 8,086,703 B2 | 12/2011 | Baum et al. |
| D654,460 S | 2/2012 | Kim et al. |
| D654,497 S | 2/2012 | Lee |
| 8,122,131 B2 | 2/2012 | Baum et al. |
| 8,125,184 B2 | 2/2012 | Raji et al. |
| D656,137 S | 3/2012 | Chung et al. |
| 8,140,658 B1 | 3/2012 | Gelvin et al. |
| 8,144,836 B2 | 3/2012 | Naidoo et al. |
| 8,149,849 B2 | 4/2012 | Osborn et al. |
| 8,159,519 B2 | 4/2012 | Kurtz et al. |
| 8,159,945 B2 | 4/2012 | Muro et al. |
| 8,160,425 B2 | 4/2012 | Kisliakov |
| 8,196,064 B2 | 6/2012 | Krzyzanowski et al. |
| 8,200,827 B1 | 6/2012 | Hunyady et al. |
| 8,205,181 B1 | 6/2012 | Singla et al. |
| 8,209,400 B2 | 6/2012 | Baum et al. |
| D663,298 S | 7/2012 | Song et al. |
| D664,540 S | 7/2012 | Kim et al. |
| 8,214,494 B1 | 7/2012 | Slavin |
| 8,214,496 B2 | 7/2012 | Gutt et al. |
| 8,229,812 B2 | 7/2012 | Raleigh |
| D664,954 S | 8/2012 | Kim et al. |
| D666,198 S | 8/2012 | Van Den Nieuwenhuizen et al. |
| 8,239,477 B2 | 8/2012 | Sharma et al. |
| D667,395 S | 9/2012 | Lee |
| D667,396 S | 9/2012 | Koh |
| D667,397 S | 9/2012 | Koh |
| D667,398 S | 9/2012 | Koh |
| D667,399 S | 9/2012 | Koh |
| 8,269,376 B1 | 9/2012 | Elberbaum |
| 8,269,623 B2 | 9/2012 | Addy |
| 8,271,629 B1 | 9/2012 | Winters et al. |
| 8,271,881 B2 | 9/2012 | Moorer et al. |
| 8,272,053 B2 | 9/2012 | Markham et al. |
| 8,275,830 B2 | 9/2012 | Raleigh |
| D668,650 S | 10/2012 | Han |
| D668,651 S | 10/2012 | Kim et al. |
| D668,652 S | 10/2012 | Kim et al. |
| D669,469 S | 10/2012 | Kang |
| D670,692 S | 11/2012 | Akana et al. |
| D671,514 S | 11/2012 | Kim et al. |
| 8,311,526 B2 | 11/2012 | Forstall et al. |
| D671,938 S | 12/2012 | Hsu et al. |
| D672,344 S | 12/2012 | Li |
| D672,345 S | 12/2012 | Li |
| D672,739 S | 12/2012 | Sin |
| D672,768 S | 12/2012 | Huang et al. |
| 8,335,842 B2 | 12/2012 | Raji et al. |
| 8,335,854 B2 | 12/2012 | Eldering |
| 8,336,010 B1 | 12/2012 | Chang et al. |
| D673,561 S | 1/2013 | Kim |
| D673,948 S | 1/2013 | Zorkendorfer |
| D673,950 S | 1/2013 | Hsieh |
| D674,369 S | 1/2013 | Jaewoong |
| D675,203 S | 1/2013 | Yang |
| 8,350,694 B1 | 1/2013 | Slavin |
| D675,588 S | 2/2013 | Park |
| D675,612 S | 2/2013 | Zorkendorfer |
| D676,443 S | 2/2013 | Green |
| D676,819 S | 2/2013 | Choi |
| 8,373,313 B2 | 2/2013 | Maurer |
| D677,255 S | 3/2013 | McManigal et al. |
| D677,640 S | 3/2013 | Kim et al. |
| D677,659 S | 3/2013 | Akana et al. |
| D677,660 S | 3/2013 | Groene et al. |
| D678,271 S | 3/2013 | Chiu |
| D678,272 S | 3/2013 | Groene et al. |
| D678,877 S | 3/2013 | Groene et al. |
| 8,396,766 B1 | 3/2013 | Enright et al. |
| 8,400,767 B2 | 3/2013 | Yeom et al. |
| D679,706 S | 4/2013 | Tang et al. |
| D680,151 S | 4/2013 | Katori |
| D680,524 S | 4/2013 | Feng et al. |
| D681,032 S | 4/2013 | Akana et al. |
| 8,413,204 B2 | 4/2013 | White et al. |
| D681,583 S | 5/2013 | Park |
| D681,591 S | 5/2013 | Sung |
| D681,632 S | 5/2013 | Akana et al. |
| D682,239 S | 5/2013 | Yeh et al. |
| 8,451,986 B2 | 5/2013 | Cohn et al. |
| D684,553 S | 6/2013 | Kim et al. |
| D684,968 S | 6/2013 | Smith et al. |
| 8,456,293 B1 | 6/2013 | Trundle et al. |
| 8,473,619 B2 | 6/2013 | Baum et al. |
| D685,778 S | 7/2013 | Fahrendorff et al. |
| D685,783 S | 7/2013 | Bryan et al. |
| 8,478,450 B2 | 7/2013 | Lu et al. |
| 8,478,844 B2 | 7/2013 | Baum et al. |
| 8,478,871 B2 | 7/2013 | Gutt et al. |
| 8,483,853 B1 | 7/2013 | Lambourne |
| 8,493,202 B1 | 7/2013 | Trundle et al. |
| 8,499,038 B1 | 7/2013 | Vucurevich |
| 8,520,068 B2 | 8/2013 | Naidoo et al. |
| 8,520,072 B1 | 8/2013 | Slavin et al. |
| 8,525,664 B2 | 9/2013 | Hadizad et al. |
| 8,543,665 B2 | 9/2013 | Ansari et al. |
| D692,042 S | 10/2013 | Dawes et al. |
| 8,554,478 B2 | 10/2013 | Hartman |
| 8,560,041 B2 | 10/2013 | Flaherty et al. |
| 8,570,993 B2 | 10/2013 | Austin et al. |
| 8,584,199 B1 | 11/2013 | Chen et al. |
| 8,595,377 B1 | 11/2013 | Apgar et al. |
| D695,735 S | 12/2013 | Kitchen et al. |
| 8,599,018 B2 | 12/2013 | Kellen |
| 8,612,591 B2 | 12/2013 | Dawes et al. |
| 8,634,533 B2 | 1/2014 | Strasters |
| 8,635,350 B2 | 1/2014 | Gutt et al. |
| 8,635,499 B2 | 1/2014 | Cohn et al. |
| 8,638,211 B2 | 1/2014 | Cohn et al. |
| 8,649,386 B2 | 2/2014 | Ansari et al. |
| 8,666,560 B2 | 3/2014 | Lu et al. |
| 8,675,071 B1 | 3/2014 | Slavin et al. |
| 8,700,769 B2 | 4/2014 | Alexander et al. |
| 8,704,821 B2 | 4/2014 | Kulkarni et al. |
| 8,713,132 B2 | 4/2014 | Baum et al. |
| 8,723,671 B2 | 5/2014 | Foisy et al. |
| 8,730,834 B2 | 5/2014 | Marusca et al. |
| 8,738,765 B2 | 5/2014 | Wyatt et al. |
| 8,812,654 B2 | 8/2014 | Gelvin et al. |
| 8,817,809 B2 | 8/2014 | Gage |
| 8,819,178 B2 | 8/2014 | Baum et al. |
| 8,825,871 B2 | 9/2014 | Baum et al. |
| 8,836,467 B1 | 9/2014 | Cohn et al. |
| 8,885,552 B2 | 11/2014 | Bedingfield, Sr. et al. |
| 8,902,740 B2 | 12/2014 | Hicks, III |
| 8,914,526 B1 | 12/2014 | Lindquist et al. |
| 8,914,837 B2 | 12/2014 | Ahmed et al. |
| 8,935,236 B2 | 1/2015 | Morita et al. |
| 8,937,539 B2 | 1/2015 | Sharma et al. |
| 8,937,658 B2 | 1/2015 | Hicks et al. |
| 8,953,479 B2 | 2/2015 | Hall et al. |
| 8,953,749 B2 | 2/2015 | Naidoo et al. |
| 8,963,713 B2 | 2/2015 | Dawes et al. |

(56) References Cited

U.S. PATENT DOCUMENTS

| | | |
|---|---|---|
| 8,976,763 B2 | 3/2015 | Shrestha et al. |
| 8,988,217 B2 | 3/2015 | Piccolo, III |
| 8,988,221 B2 | 3/2015 | Raji et al. |
| 8,989,922 B2 | 3/2015 | Jones et al. |
| 8,996,665 B2 | 3/2015 | Baum et al. |
| 9,047,753 B2 | 6/2015 | Dawes et al. |
| 9,059,863 B2 | 6/2015 | Baum et al. |
| 9,064,394 B1 | 6/2015 | Trundle |
| 9,094,407 B1 | 7/2015 | Matthieu et al. |
| 9,100,446 B2 | 8/2015 | Cohn et al. |
| 9,141,276 B2 | 9/2015 | Dawes et al. |
| 9,144,143 B2 | 9/2015 | Raji et al. |
| 9,146,548 B2 | 9/2015 | Chambers et al. |
| 9,147,337 B2 | 9/2015 | Cohn et al. |
| 9,160,784 B2 | 10/2015 | Jeong et al. |
| 9,170,707 B1 | 10/2015 | Laska et al. |
| 9,172,532 B1 | 10/2015 | Fuller et al. |
| 9,172,553 B2 | 10/2015 | Dawes et al. |
| 9,172,605 B2 | 10/2015 | Hardy et al. |
| 9,189,934 B2 | 11/2015 | Jentoft et al. |
| 9,191,228 B2 | 11/2015 | Fulker et al. |
| 9,202,362 B2 | 12/2015 | Hyland et al. |
| 9,246,921 B1 | 1/2016 | Vlaminck et al. |
| 9,286,772 B2 | 3/2016 | Shapiro et al. |
| 9,287,727 B1 | 3/2016 | Egan et al. |
| 9,300,921 B2 | 3/2016 | Naidoo et al. |
| 9,306,809 B2 | 4/2016 | Dawes et al. |
| 9,310,864 B1 | 4/2016 | Klein et al. |
| 9,373,014 B1 | 6/2016 | Mehranfar |
| 9,412,248 B1 | 8/2016 | Cohn et al. |
| 9,426,720 B2 | 8/2016 | Cohn et al. |
| 9,450,776 B2 | 9/2016 | Baum et al. |
| 9,462,041 B1 | 10/2016 | Hagins et al. |
| 9,510,065 B2 | 11/2016 | Cohn et al. |
| 9,529,344 B1 | 12/2016 | Hagins et al. |
| 9,531,593 B2 | 12/2016 | Baum et al. |
| 9,553,738 B2 | 1/2017 | Meenan et al. |
| 9,600,945 B2 | 3/2017 | Naidoo et al. |
| 9,609,003 B1 | 3/2017 | Chmielewski et al. |
| 9,613,524 B1 | 4/2017 | Lamb et al. |
| 9,621,408 B2 | 4/2017 | Gutt et al. |
| 9,721,461 B2 | 8/2017 | Zeng et al. |
| 9,729,342 B2 | 8/2017 | Cohn et al. |
| 9,761,123 B2 | 9/2017 | Ramasubbu et al. |
| 9,779,595 B2 | 10/2017 | Thibault |
| 9,805,587 B2 | 10/2017 | Lamb |
| 9,824,234 B2 | 11/2017 | Cho et al. |
| 9,843,458 B2 | 12/2017 | Cronin |
| 9,876,651 B2 | 1/2018 | Cho et al. |
| 9,882,985 B1 | 1/2018 | Esam et al. |
| 9,978,238 B2 | 5/2018 | Fadell et al. |
| 9,979,625 B2 | 5/2018 | McLaughlin et al. |
| 10,002,507 B2 | 6/2018 | Wilson et al. |
| 10,025,473 B2 | 7/2018 | Sarao et al. |
| 10,051,078 B2 | 8/2018 | Burd et al. |
| 10,062,245 B2 | 8/2018 | Fulker et al. |
| 10,062,273 B2 | 8/2018 | Raji et al. |
| 10,078,958 B2 | 9/2018 | Cohn et al. |
| 10,079,839 B1 | 9/2018 | Bryan et al. |
| 10,120,354 B1 | 11/2018 | Rolston et al. |
| 10,127,801 B2 | 11/2018 | Raji et al. |
| 10,140,840 B2 | 11/2018 | Cohn et al. |
| 10,142,392 B2 | 11/2018 | Raji et al. |
| 10,142,394 B2 | 11/2018 | Chmielewski et al. |
| 10,156,831 B2 | 12/2018 | Raji et al. |
| 10,156,959 B2 | 12/2018 | Fulker et al. |
| 10,223,903 B2 | 3/2019 | Raji et al. |
| 10,225,314 B2 | 3/2019 | Raji et al. |
| 10,237,237 B2 | 3/2019 | Dawes et al. |
| 10,237,757 B2 | 3/2019 | Raleigh et al. |
| 10,237,806 B2 | 3/2019 | Cohn et al. |
| 10,257,474 B2 | 4/2019 | Nadathur et al. |
| 10,264,138 B2 | 4/2019 | Raleigh et al. |
| 10,275,999 B2 | 4/2019 | Cohn et al. |
| 10,313,303 B2 | 6/2019 | Baum et al. |
| 10,339,791 B2 | 7/2019 | Baum et al. |
| 10,348,575 B2 | 7/2019 | Sundermeyer et al. |
| 10,354,517 B1 | 7/2019 | King |
| 10,380,871 B2 | 8/2019 | Sundermeyer et al. |
| 10,380,873 B1 | 8/2019 | Halverson |
| 10,430,887 B1 | 10/2019 | Parker et al. |
| 10,530,839 B2 | 1/2020 | Kitchen et al. |
| 10,616,244 B2 | 4/2020 | Bryan et al. |
| 10,672,254 B2 | 6/2020 | Cohn et al. |
| 10,687,270 B2 | 6/2020 | Ishii |
| 10,691,295 B2 | 6/2020 | Fulker et al. |
| 10,692,356 B2 | 6/2020 | Sundermeyer et al. |
| 10,782,681 B1 | 9/2020 | Slavin |
| 2001/0016501 A1 | 8/2001 | King |
| 2001/0022836 A1 | 9/2001 | Bremer et al. |
| 2001/0025349 A1 | 9/2001 | Sharood et al. |
| 2001/0029585 A1 | 10/2001 | Simon et al. |
| 2001/0030597 A1 | 10/2001 | Inoue et al. |
| 2001/0034209 A1 | 10/2001 | Tong et al. |
| 2001/0034754 A1 | 10/2001 | Elwahab et al. |
| 2001/0034759 A1 | 10/2001 | Chiles et al. |
| 2001/0036192 A1 | 11/2001 | Chiles et al. |
| 2001/0042137 A1 | 11/2001 | Ota et al. |
| 2001/0044835 A1 | 11/2001 | Schober et al. |
| 2001/0046366 A1 | 11/2001 | Susskind |
| 2001/0047474 A1 | 11/2001 | Takagi et al. |
| 2001/0053207 A1 | 12/2001 | Jeon et al. |
| 2001/0054115 A1 | 12/2001 | Ferguson et al. |
| 2002/0000913 A1 | 1/2002 | Hamamoto et al. |
| 2002/0003575 A1 | 1/2002 | Marchese |
| 2002/0004828 A1 | 1/2002 | Davis et al. |
| 2002/0005894 A1 | 1/2002 | Foodman et al. |
| 2002/0016639 A1 | 2/2002 | Smith et al. |
| 2002/0018057 A1 | 2/2002 | Sano |
| 2002/0019751 A1 | 2/2002 | Rothschild et al. |
| 2002/0026476 A1 | 2/2002 | Miyazaki et al. |
| 2002/0026531 A1 | 2/2002 | Keane et al. |
| 2002/0027504 A1 | 3/2002 | Davis et al. |
| 2002/0028696 A1 | 3/2002 | Hirayama et al. |
| 2002/0029276 A1 | 3/2002 | Bendinelli et al. |
| 2002/0031120 A1 | 3/2002 | Rakib |
| 2002/0032853 A1 | 3/2002 | Preston et al. |
| 2002/0037004 A1 | 3/2002 | Bossemeyer et al. |
| 2002/0038380 A1 | 3/2002 | Brawn et al. |
| 2002/0046280 A1 | 4/2002 | Fujita |
| 2002/0052719 A1 | 5/2002 | Alexander et al. |
| 2002/0052913 A1 | 5/2002 | Yamada et al. |
| 2002/0055977 A1 | 5/2002 | Nishi |
| 2002/0059078 A1 | 5/2002 | Valdes et al. |
| 2002/0059148 A1 | 5/2002 | Rosenhaft et al. |
| 2002/0059637 A1 | 5/2002 | Rakib |
| 2002/0068558 A1 | 6/2002 | Janik |
| 2002/0068984 A1 | 6/2002 | Alexander et al. |
| 2002/0072868 A1 | 6/2002 | Bartone et al. |
| 2002/0075153 A1 | 6/2002 | Dahl |
| 2002/0077077 A1 | 6/2002 | Rezvani et al. |
| 2002/0083342 A1 | 6/2002 | Webb et al. |
| 2002/0085488 A1 | 7/2002 | Kobayashi |
| 2002/0091815 A1 | 7/2002 | Anderson et al. |
| 2002/0095490 A1 | 7/2002 | Barker et al. |
| 2002/0099809 A1 | 7/2002 | Lee |
| 2002/0099829 A1 | 7/2002 | Richards et al. |
| 2002/0099854 A1 | 7/2002 | Jorgensen |
| 2002/0103898 A1 | 8/2002 | Moyer et al. |
| 2002/0103927 A1 | 8/2002 | Parent |
| 2002/0107910 A1 | 8/2002 | Zhao |
| 2002/0109580 A1 | 8/2002 | Shreve et al. |
| 2002/0111698 A1 | 8/2002 | Graziano et al. |
| 2002/0112051 A1 | 8/2002 | Ullman |
| 2002/0112182 A1 | 8/2002 | Chang et al. |
| 2002/0114439 A1 | 8/2002 | Dunlap |
| 2002/0116117 A1 | 8/2002 | Martens et al. |
| 2002/0118107 A1 | 8/2002 | Yamamoto et al. |
| 2002/0118796 A1 | 8/2002 | Menard et al. |
| 2002/0120696 A1 | 8/2002 | Mousseau et al. |
| 2002/0120698 A1 | 8/2002 | Tamargo |
| 2002/0120790 A1 | 8/2002 | Schwalb |
| 2002/0126009 A1 | 9/2002 | Oyagi et al. |
| 2002/0128728 A1 | 9/2002 | Murakami et al. |

(56) References Cited

U.S. PATENT DOCUMENTS

| | | |
|---|---|---|
| 2002/0131404 A1 | 9/2002 | Mehta et al. |
| 2002/0133539 A1 | 9/2002 | Monday |
| 2002/0133578 A1 | 9/2002 | Wu |
| 2002/0143805 A1 | 10/2002 | Hayes et al. |
| 2002/0143923 A1 | 10/2002 | Alexander |
| 2002/0147982 A1 | 10/2002 | Naidoo et al. |
| 2002/0150086 A1 | 10/2002 | Bailey et al. |
| 2002/0152298 A1 | 10/2002 | Kikta et al. |
| 2002/0152432 A1 | 10/2002 | Fleming |
| 2002/0156564 A1 | 10/2002 | Preston et al. |
| 2002/0156899 A1 | 10/2002 | Sekiguchi |
| 2002/0161885 A1 | 10/2002 | Childers et al. |
| 2002/0163534 A1 | 11/2002 | Choi et al. |
| 2002/0163997 A1 | 11/2002 | Bergman et al. |
| 2002/0164997 A1 | 11/2002 | Parry |
| 2002/0165006 A1 | 11/2002 | Haller et al. |
| 2002/0166125 A1 | 11/2002 | Fulmer |
| 2002/0174367 A1 | 11/2002 | Kimmel et al. |
| 2002/0174434 A1 | 11/2002 | Lee et al. |
| 2002/0177428 A1 | 11/2002 | Menard et al. |
| 2002/0177482 A1 | 11/2002 | Cheong et al. |
| 2002/0178100 A1 | 11/2002 | Koveos |
| 2002/0178211 A1 | 11/2002 | Singhal et al. |
| 2002/0180579 A1 | 12/2002 | Nagaoka et al. |
| 2002/0184301 A1 | 12/2002 | Parent |
| 2002/0184527 A1 | 12/2002 | Chun et al. |
| 2002/0186683 A1 | 12/2002 | Buck et al. |
| 2002/0191636 A1 | 12/2002 | Hallenbeck |
| 2003/0001883 A1 | 1/2003 | Wang |
| 2003/0004088 A1 | 1/2003 | Ushio et al. |
| 2003/0005030 A1 | 1/2003 | Sutton et al. |
| 2003/0006879 A1 | 1/2003 | Kang et al. |
| 2003/0009552 A1 | 1/2003 | Benfield et al. |
| 2003/0009553 A1 | 1/2003 | Benfield et al. |
| 2003/0010243 A1 | 1/2003 | Roller |
| 2003/0023839 A1 | 1/2003 | Burkhardt et al. |
| 2003/0025599 A1 | 2/2003 | Monroe |
| 2003/0028294 A1 | 2/2003 | Yanagi |
| 2003/0028398 A1 | 2/2003 | Yamashita et al. |
| 2003/0030548 A1 | 2/2003 | Kovacs et al. |
| 2003/0031165 A1 | 2/2003 | O'Brien |
| 2003/0038730 A1 | 2/2003 | Imafuku et al. |
| 2003/0038849 A1 | 2/2003 | Craven et al. |
| 2003/0039242 A1 | 2/2003 | Moore |
| 2003/0041137 A1 | 2/2003 | Horie et al. |
| 2003/0041167 A1 | 2/2003 | French et al. |
| 2003/0050731 A1 | 3/2003 | Rosenblum |
| 2003/0050737 A1 | 3/2003 | Robert |
| 2003/0051009 A1 | 3/2003 | Shah et al. |
| 2003/0051026 A1 | 3/2003 | Carter et al. |
| 2003/0052905 A1 | 3/2003 | Gordon et al. |
| 2003/0052923 A1 | 3/2003 | Porter |
| 2003/0056012 A1 | 3/2003 | Modeste et al. |
| 2003/0056014 A1 | 3/2003 | Verberkt et al. |
| 2003/0060900 A1 | 3/2003 | Lo et al. |
| 2003/0061344 A1 | 3/2003 | Monroe |
| 2003/0061615 A1 | 3/2003 | Van Der Meulen |
| 2003/0061621 A1 | 3/2003 | Petty et al. |
| 2003/0062997 A1* | 4/2003 | Naidoo ............ G08B 13/19656 340/531 |
| 2003/0065407 A1 | 4/2003 | Johnson et al. |
| 2003/0065757 A1 | 4/2003 | Mentze et al. |
| 2003/0065784 A1 | 4/2003 | Herrod |
| 2003/0065791 A1 | 4/2003 | Garg et al. |
| 2003/0067923 A1 | 4/2003 | Ju et al. |
| 2003/0071724 A1 | 4/2003 | D'Amico |
| 2003/0071840 A1 | 4/2003 | Huang et al. |
| 2003/0073406 A1 | 4/2003 | Benjamin et al. |
| 2003/0074090 A1 | 4/2003 | Becka et al. |
| 2003/0081768 A1 | 5/2003 | Caminschi |
| 2003/0090473 A1 | 5/2003 | Joshi |
| 2003/0096590 A1 | 5/2003 | Satoh |
| 2003/0101243 A1 | 5/2003 | Donahue et al. |
| 2003/0101459 A1 | 5/2003 | Edson |
| 2003/0103088 A1 | 6/2003 | Dresti et al. |
| 2003/0110262 A1 | 6/2003 | Hasan et al. |
| 2003/0110302 A1 | 6/2003 | Hodges et al. |
| 2003/0112866 A1 | 6/2003 | Yu et al. |
| 2003/0113100 A1 | 6/2003 | Hecht et al. |
| 2003/0115345 A1 | 6/2003 | Chien et al. |
| 2003/0123419 A1 | 7/2003 | Rangnekar et al. |
| 2003/0123634 A1 | 7/2003 | Chee |
| 2003/0128114 A1 | 7/2003 | Quigley |
| 2003/0128115 A1 | 7/2003 | Giacopelli et al. |
| 2003/0132018 A1 | 7/2003 | Okita et al. |
| 2003/0134590 A1 | 7/2003 | Suda et al. |
| 2003/0137426 A1 | 7/2003 | Anthony et al. |
| 2003/0137991 A1 | 7/2003 | Doshi et al. |
| 2003/0147534 A1 | 8/2003 | Ablay et al. |
| 2003/0149671 A1 | 8/2003 | Yamamoto et al. |
| 2003/0153325 A1 | 8/2003 | Veerepalli et al. |
| 2003/0155757 A1 | 8/2003 | Larsen et al. |
| 2003/0158609 A1 | 8/2003 | Chiu |
| 2003/0158635 A1 | 8/2003 | Pillar et al. |
| 2003/0159135 A1 | 8/2003 | Hiller et al. |
| 2003/0169728 A1 | 9/2003 | Choi |
| 2003/0172145 A1 | 9/2003 | Nguyen |
| 2003/0174154 A1 | 9/2003 | Yukie et al. |
| 2003/0174648 A1 | 9/2003 | Wang et al. |
| 2003/0174717 A1 | 9/2003 | Zabarski et al. |
| 2003/0177236 A1 | 9/2003 | Goto et al. |
| 2003/0182396 A1 | 9/2003 | Reich et al. |
| 2003/0182640 A1 | 9/2003 | Alani et al. |
| 2003/0184436 A1 | 10/2003 | Seales et al. |
| 2003/0187920 A1 | 10/2003 | Redkar |
| 2003/0187938 A1 | 10/2003 | Mousseau et al. |
| 2003/0189509 A1 | 10/2003 | Hayes et al. |
| 2003/0196115 A1 | 10/2003 | Karp |
| 2003/0197847 A1 | 10/2003 | Shinoda |
| 2003/0200285 A1 | 10/2003 | Hansen et al. |
| 2003/0200325 A1 | 10/2003 | Krishnaswamy et al. |
| 2003/0201889 A1 | 10/2003 | Zulkowski |
| 2003/0208610 A1 | 11/2003 | Rochetti et al. |
| 2003/0210126 A1 | 11/2003 | Kanazawa |
| 2003/0214775 A1 | 11/2003 | Fukuta et al. |
| 2003/0216143 A1 | 11/2003 | Roese et al. |
| 2003/0217110 A1 | 11/2003 | Weiss |
| 2003/0217136 A1 | 11/2003 | Cho et al. |
| 2003/0225883 A1 | 12/2003 | Greaves et al. |
| 2003/0227382 A1 | 12/2003 | Breed |
| 2003/0227439 A1 | 12/2003 | Lee et al. |
| 2003/0229779 A1 | 12/2003 | Morais et al. |
| 2003/0230934 A1 | 12/2003 | Cordelli et al. |
| 2003/0233155 A1 | 12/2003 | Slemmer et al. |
| 2003/0233332 A1 | 12/2003 | Keeler et al. |
| 2003/0233594 A1 | 12/2003 | Earl |
| 2003/0234725 A1 | 12/2003 | Lemelson et al. |
| 2003/0236841 A1 | 12/2003 | Epshteyn |
| 2004/0003051 A1 | 1/2004 | Krzyzanowski et al. |
| 2004/0003241 A1 | 1/2004 | Sengodan et al. |
| 2004/0008724 A1 | 1/2004 | Devine et al. |
| 2004/0015572 A1 | 1/2004 | Kang |
| 2004/0024851 A1 | 2/2004 | Naidoo et al. |
| 2004/0034697 A1 | 2/2004 | Fairhurst et al. |
| 2004/0034798 A1 | 2/2004 | Yamada et al. |
| 2004/0036615 A1 | 2/2004 | Candela |
| 2004/0037295 A1 | 2/2004 | Tanaka et al. |
| 2004/0039459 A1 | 2/2004 | Daugherty et al. |
| 2004/0041910 A1 | 3/2004 | Naidoo et al. |
| 2004/0054789 A1 | 3/2004 | Breh et al. |
| 2004/0056665 A1 | 3/2004 | Iwanaga et al. |
| 2004/0064351 A1 | 4/2004 | Mikurak |
| 2004/0068657 A1 | 4/2004 | Alexander et al. |
| 2004/0083015 A1 | 4/2004 | Patwari |
| 2004/0086088 A1 | 5/2004 | Naidoo et al. |
| 2004/0086090 A1 | 5/2004 | Naidoo et al. |
| 2004/0086093 A1 | 5/2004 | Schranz |
| 2004/0093492 A1 | 5/2004 | Daude et al. |
| 2004/0095943 A1 | 5/2004 | Korotin |
| 2004/0102859 A1 | 5/2004 | Bennett |
| 2004/0103308 A1 | 5/2004 | Paller |
| 2004/0107027 A1 | 6/2004 | Boudrieau |
| 2004/0107299 A1 | 6/2004 | Lee et al. |
| 2004/0113770 A1 | 6/2004 | Falk et al. |

(56) References Cited

U.S. PATENT DOCUMENTS

| | | |
|---|---|---|
| 2004/0113778 A1 | 6/2004 | Script et al. |
| 2004/0113937 A1 | 6/2004 | Sawdey et al. |
| 2004/0117068 A1 | 6/2004 | Lee |
| 2004/0117330 A1 | 6/2004 | Ehlers et al. |
| 2004/0117462 A1 | 6/2004 | Bodin et al. |
| 2004/0117465 A1 | 6/2004 | Bodin et al. |
| 2004/0123149 A1 | 6/2004 | Tyroler |
| 2004/0125146 A1 | 7/2004 | Gerlach et al. |
| 2004/0125782 A1 | 7/2004 | Chang |
| 2004/0133689 A1 | 7/2004 | Vasisht |
| 2004/0136386 A1 | 7/2004 | Miller et al. |
| 2004/0137915 A1 | 7/2004 | Diener et al. |
| 2004/0139227 A1 | 7/2004 | Takeda |
| 2004/0143749 A1 | 7/2004 | Tajalli et al. |
| 2004/0153171 A1 | 8/2004 | Brandt et al. |
| 2004/0155757 A1 | 8/2004 | Litwin et al. |
| 2004/0160309 A1 | 8/2004 | Stilp |
| 2004/0162902 A1 | 8/2004 | Davis |
| 2004/0163073 A1 | 8/2004 | Krzyzanowski et al. |
| 2004/0163118 A1 | 8/2004 | Mottur |
| 2004/0163705 A1 | 8/2004 | Uhler |
| 2004/0169288 A1 | 9/2004 | Hsieh et al. |
| 2004/0170120 A1 | 9/2004 | Reunamaki et al. |
| 2004/0170155 A1 | 9/2004 | Omar et al. |
| 2004/0172396 A1 | 9/2004 | Vanska et al. |
| 2004/0177163 A1 | 9/2004 | Casey et al. |
| 2004/0181693 A1 | 9/2004 | Milliot et al. |
| 2004/0183756 A1 | 9/2004 | Freitas et al. |
| 2004/0189460 A1 | 9/2004 | Heaton et al. |
| 2004/0189471 A1 | 9/2004 | Ciarcia et al. |
| 2004/0189871 A1 | 9/2004 | Kurosawa et al. |
| 2004/0196844 A1 | 10/2004 | Hagino |
| 2004/0198386 A1 | 10/2004 | Dupray |
| 2004/0199645 A1 | 10/2004 | Rouhi |
| 2004/0201472 A1 | 10/2004 | McGunn et al. |
| 2004/0202351 A1 | 10/2004 | Park et al. |
| 2004/0212494 A1 | 10/2004 | Stilp |
| 2004/0212497 A1 | 10/2004 | Stilp |
| 2004/0212500 A1 | 10/2004 | Stilp |
| 2004/0212503 A1 | 10/2004 | Stilp |
| 2004/0212687 A1 | 10/2004 | Patwari |
| 2004/0213150 A1 | 10/2004 | Krause et al. |
| 2004/0215694 A1 | 10/2004 | Podolsky |
| 2004/0215700 A1 | 10/2004 | Shenfield et al. |
| 2004/0215750 A1 | 10/2004 | Stilp |
| 2004/0215955 A1 | 10/2004 | Tamai et al. |
| 2004/0218591 A1 | 11/2004 | Ogawa et al. |
| 2004/0220830 A1 | 11/2004 | Moreton et al. |
| 2004/0223605 A1 | 11/2004 | Donnelly |
| 2004/0225516 A1 | 11/2004 | Bruskotter et al. |
| 2004/0225719 A1 | 11/2004 | Kisley et al. |
| 2004/0229569 A1 | 11/2004 | Franz |
| 2004/0243714 A1 | 12/2004 | Wynn et al. |
| 2004/0243835 A1 | 12/2004 | Terzis et al. |
| 2004/0243996 A1 | 12/2004 | Sheehy et al. |
| 2004/0246339 A1 | 12/2004 | Ooshima et al. |
| 2004/0249613 A1 | 12/2004 | Sprogis et al. |
| 2004/0249922 A1 | 12/2004 | Hackman et al. |
| 2004/0257433 A1 | 12/2004 | Lia et al. |
| 2004/0260407 A1 | 12/2004 | Wimsatt |
| 2004/0260427 A1 | 12/2004 | Wimsatt |
| 2004/0260527 A1 | 12/2004 | Stanculescu |
| 2004/0263314 A1 | 12/2004 | Dorai et al. |
| 2004/0266493 A1 | 12/2004 | Bahl et al. |
| 2004/0267385 A1 | 12/2004 | Lingemann |
| 2004/0267937 A1 | 12/2004 | Klemets |
| 2005/0002335 A1 | 1/2005 | Adamczyk et al. |
| 2005/0002417 A1 | 1/2005 | Kelly et al. |
| 2005/0007967 A1 | 1/2005 | Keskar et al. |
| 2005/0010866 A1 | 1/2005 | Humpleman et al. |
| 2005/0015805 A1 | 1/2005 | Iwamura |
| 2005/0021309 A1 | 1/2005 | Alexander et al. |
| 2005/0021626 A1 | 1/2005 | Prajapat et al. |
| 2005/0022210 A1 | 1/2005 | Zintel et al. |
| 2005/0023858 A1 | 2/2005 | Bingle et al. |
| 2005/0024203 A1 | 2/2005 | Wolfe |
| 2005/0030928 A1 | 2/2005 | Virtanen et al. |
| 2005/0033513 A1 | 2/2005 | Gasbarro |
| 2005/0038325 A1 | 2/2005 | Moll |
| 2005/0038326 A1 | 2/2005 | Mathur |
| 2005/0044061 A1 | 2/2005 | Klemow |
| 2005/0048957 A1 | 3/2005 | Casey et al. |
| 2005/0049746 A1 | 3/2005 | Rosenblum |
| 2005/0052831 A1 | 3/2005 | Chen |
| 2005/0055575 A1 | 3/2005 | Evans et al. |
| 2005/0055716 A1 | 3/2005 | Louie et al. |
| 2005/0057361 A1 | 3/2005 | Giraldo et al. |
| 2005/0060163 A1 | 3/2005 | Barsness et al. |
| 2005/0060411 A1 | 3/2005 | Coulombe et al. |
| 2005/0066045 A1 | 3/2005 | Johnson et al. |
| 2005/0066912 A1 | 3/2005 | Korbitz et al. |
| 2005/0069098 A1 | 3/2005 | Kalervo et al. |
| 2005/0071483 A1 | 3/2005 | Motoyama |
| 2005/0075764 A1 | 4/2005 | Horst et al. |
| 2005/0079855 A1 | 4/2005 | Jethi et al. |
| 2005/0081161 A1 | 4/2005 | MacInnes et al. |
| 2005/0086093 A1 | 4/2005 | Hammad et al. |
| 2005/0086126 A1 | 4/2005 | Patterson |
| 2005/0086211 A1 | 4/2005 | Mayer |
| 2005/0086366 A1 | 4/2005 | Luebke et al. |
| 2005/0088983 A1 | 4/2005 | Wesslen et al. |
| 2005/0089023 A1 | 4/2005 | Barkley et al. |
| 2005/0090915 A1 | 4/2005 | Geiwitz |
| 2005/0091435 A1 | 4/2005 | Han et al. |
| 2005/0091696 A1 | 4/2005 | Wolfe et al. |
| 2005/0096753 A1 | 5/2005 | Arling et al. |
| 2005/0097478 A1 | 5/2005 | Killian et al. |
| 2005/0101314 A1 | 5/2005 | Levi |
| 2005/0102152 A1 | 5/2005 | Hodges |
| 2005/0102497 A1 | 5/2005 | Buer |
| 2005/0105530 A1 | 5/2005 | Kono |
| 2005/0108091 A1 | 5/2005 | Sotak et al. |
| 2005/0108369 A1 | 5/2005 | Sather et al. |
| 2005/0114432 A1 | 5/2005 | Hodges et al. |
| 2005/0114528 A1 | 5/2005 | Suito |
| 2005/0114900 A1 | 5/2005 | Ladd et al. |
| 2005/0119913 A1 | 6/2005 | Hornreich et al. |
| 2005/0120082 A1 | 6/2005 | Hesselink et al. |
| 2005/0125083 A1 | 6/2005 | Kiko |
| 2005/0128068 A1 | 6/2005 | Winick et al. |
| 2005/0128083 A1 | 6/2005 | Puzio et al. |
| 2005/0128093 A1 | 6/2005 | Genova et al. |
| 2005/0128314 A1 | 6/2005 | Ishino |
| 2005/0144312 A1 | 6/2005 | Kadyk et al. |
| 2005/0148356 A1 | 7/2005 | Ferguson et al. |
| 2005/0149639 A1 | 7/2005 | Vrielink et al. |
| 2005/0149746 A1 | 7/2005 | Lu et al. |
| 2005/0154494 A1 | 7/2005 | Ahmed |
| 2005/0154774 A1 | 7/2005 | Giaffreda et al. |
| 2005/0155757 A1 | 7/2005 | Paton |
| 2005/0156568 A1 | 7/2005 | Yueh |
| 2005/0156737 A1 | 7/2005 | Al-Khateeb |
| 2005/0159823 A1 | 7/2005 | Hayes et al. |
| 2005/0159911 A1 | 7/2005 | Funk et al. |
| 2005/0169288 A1 | 8/2005 | Kamiwada et al. |
| 2005/0174229 A1 | 8/2005 | Feldkamp et al. |
| 2005/0179531 A1 | 8/2005 | Tabe |
| 2005/0182681 A1 | 8/2005 | Bruskotter et al. |
| 2005/0184865 A1 | 8/2005 | Han |
| 2005/0188315 A1 | 8/2005 | Campbell et al. |
| 2005/0197847 A1 | 9/2005 | Smith |
| 2005/0200474 A1 | 9/2005 | Behnke |
| 2005/0204076 A1 | 9/2005 | Cumpson et al. |
| 2005/0207429 A1 | 9/2005 | Akita et al. |
| 2005/0210532 A1 | 9/2005 | Winick |
| 2005/0216302 A1 | 9/2005 | Raji et al. |
| 2005/0216580 A1 | 9/2005 | Raji et al. |
| 2005/0220123 A1 | 10/2005 | Wybenga et al. |
| 2005/0222820 A1 | 10/2005 | Chung |
| 2005/0222933 A1 | 10/2005 | Wesby |
| 2005/0229016 A1 | 10/2005 | Addy |
| 2005/0231349 A1 | 10/2005 | Bhat |
| 2005/0232242 A1 | 10/2005 | Karaoguz et al. |
| 2005/0232284 A1 | 10/2005 | Karaoguz et al. |

(56) References Cited

U.S. PATENT DOCUMENTS

| | | |
|---|---|---|
| 2005/0234568 A1 | 10/2005 | Chung et al. |
| 2005/0237182 A1 | 10/2005 | Wang |
| 2005/0246119 A1 | 11/2005 | Koodali |
| 2005/0249199 A1 | 11/2005 | Albert et al. |
| 2005/0253706 A1 | 11/2005 | Spoltore et al. |
| 2005/0253709 A1 | 11/2005 | Baker |
| 2005/0256608 A1 | 11/2005 | King et al. |
| 2005/0257013 A1 | 11/2005 | Ma |
| 2005/0257260 A1 | 11/2005 | Lenoir et al. |
| 2005/0259673 A1 | 11/2005 | Lu et al. |
| 2005/0260973 A1 | 11/2005 | Van De Groenendaal |
| 2005/0262241 A1 | 11/2005 | Gubbi et al. |
| 2005/0267605 A1 | 12/2005 | Lee et al. |
| 2005/0270151 A1 | 12/2005 | Winick |
| 2005/0273831 A1 | 12/2005 | Slomovich et al. |
| 2005/0276389 A1 | 12/2005 | Hinkson et al. |
| 2005/0280964 A1 | 12/2005 | Richmond et al. |
| 2005/0281196 A1 | 12/2005 | Tornetta et al. |
| 2005/0282557 A1 | 12/2005 | Mikko et al. |
| 2005/0283823 A1 | 12/2005 | Okajo et al. |
| 2005/0285934 A1 | 12/2005 | Carter |
| 2005/0285941 A1 | 12/2005 | Haigh et al. |
| 2006/0009863 A1 | 1/2006 | Lingemann |
| 2006/0010078 A1 | 1/2006 | Rezvani et al. |
| 2006/0015943 A1 | 1/2006 | Mahieu |
| 2006/0018328 A1 | 1/2006 | Mody et al. |
| 2006/0018479 A1 | 1/2006 | Chen |
| 2006/0022816 A1 | 2/2006 | Yukawa |
| 2006/0023847 A1 | 2/2006 | Tyroler et al. |
| 2006/0025132 A1 | 2/2006 | Karaoguz et al. |
| 2006/0026301 A1 | 2/2006 | Maeda et al. |
| 2006/0031852 A1 | 2/2006 | Chu et al. |
| 2006/0036750 A1 | 2/2006 | Ladd et al. |
| 2006/0041655 A1 | 2/2006 | Holloway et al. |
| 2006/0045074 A1 | 3/2006 | Lee |
| 2006/0050692 A1 | 3/2006 | Petrescu et al. |
| 2006/0050862 A1 | 3/2006 | Shen et al. |
| 2006/0051122 A1 | 3/2006 | Kawazu et al. |
| 2006/0052884 A1 | 3/2006 | Staples et al. |
| 2006/0053447 A1 | 3/2006 | Krzyzanowski et al. |
| 2006/0053459 A1 | 3/2006 | Simerly et al. |
| 2006/0053491 A1 | 3/2006 | Khuti et al. |
| 2006/0058923 A1 | 3/2006 | Kruk et al. |
| 2006/0063534 A1 | 3/2006 | Kokkonen et al. |
| 2006/0064305 A1 | 3/2006 | Alonso |
| 2006/0064478 A1 | 3/2006 | Sirkin |
| 2006/0067344 A1 | 3/2006 | Sakurai |
| 2006/0067356 A1 | 3/2006 | Kim et al. |
| 2006/0067484 A1 | 3/2006 | Elliot et al. |
| 2006/0075235 A1 | 4/2006 | Renkis |
| 2006/0077254 A1 | 4/2006 | Shu et al. |
| 2006/0078344 A1 | 4/2006 | Kawazu et al. |
| 2006/0080465 A1 | 4/2006 | Conzola et al. |
| 2006/0088092 A1 | 4/2006 | Chen et al. |
| 2006/0092010 A1 | 5/2006 | Simon et al. |
| 2006/0092011 A1 | 5/2006 | Simon et al. |
| 2006/0093365 A1 | 5/2006 | Dybsetter et al. |
| 2006/0094400 A1 | 5/2006 | Beachem et al. |
| 2006/0101062 A1 | 5/2006 | Godman et al. |
| 2006/0103510 A1 | 5/2006 | Chen et al. |
| 2006/0103520 A1 | 5/2006 | Clark |
| 2006/0104312 A1 | 5/2006 | Friar |
| 2006/0105713 A1 | 5/2006 | Zheng et al. |
| 2006/0106933 A1 | 5/2006 | Huang et al. |
| 2006/0109113 A1 | 5/2006 | Reyes et al. |
| 2006/0109860 A1 | 5/2006 | Matsunaga et al. |
| 2006/0111095 A1 | 5/2006 | Weigand |
| 2006/0114842 A1 | 6/2006 | Miyamoto et al. |
| 2006/0121924 A1 | 6/2006 | Rengaraju et al. |
| 2006/0123212 A1 | 6/2006 | Yagawa |
| 2006/0129837 A1 | 6/2006 | Im et al. |
| 2006/0132302 A1 | 6/2006 | Stilp |
| 2006/0136558 A1 | 6/2006 | Sheehan et al. |
| 2006/0142880 A1 | 6/2006 | Deen et al. |
| 2006/0142968 A1 | 6/2006 | Han et al. |
| 2006/0142978 A1 | 6/2006 | Suenbuel et al. |
| 2006/0143268 A1 | 6/2006 | Chatani |
| 2006/0145842 A1 | 7/2006 | Stilp |
| 2006/0154642 A1 | 7/2006 | Scannell, Jr. |
| 2006/0155851 A1 | 7/2006 | Ma et al. |
| 2006/0159032 A1 | 7/2006 | Ukrainetz et al. |
| 2006/0161270 A1 | 7/2006 | Luskin et al. |
| 2006/0161662 A1 | 7/2006 | Ng et al. |
| 2006/0161960 A1 | 7/2006 | Benoit |
| 2006/0167784 A1 | 7/2006 | Hoffberg |
| 2006/0167919 A1 | 7/2006 | Hsieh |
| 2006/0168013 A1 | 7/2006 | Wilson et al. |
| 2006/0168178 A1 | 7/2006 | Hwang et al. |
| 2006/0168190 A1 | 7/2006 | Johan et al. |
| 2006/0176146 A1 | 8/2006 | Krishan et al. |
| 2006/0176167 A1 | 8/2006 | Dohrmann |
| 2006/0181406 A1 | 8/2006 | Petite et al. |
| 2006/0182100 A1 | 8/2006 | Li et al. |
| 2006/0183460 A1 | 8/2006 | Srinivasan et al. |
| 2006/0187900 A1 | 8/2006 | Akbar |
| 2006/0189311 A1 | 8/2006 | Cromer et al. |
| 2006/0190458 A1 | 8/2006 | Mishina et al. |
| 2006/0190529 A1 | 8/2006 | Morozumi et al. |
| 2006/0197660 A1 | 9/2006 | Luebke et al. |
| 2006/0200845 A1 | 9/2006 | Foster et al. |
| 2006/0206220 A1 | 9/2006 | Amundson |
| 2006/0208872 A1 | 9/2006 | Yu et al. |
| 2006/0208880 A1 | 9/2006 | Funk et al. |
| 2006/0209857 A1 | 9/2006 | Hicks, III |
| 2006/0215650 A1 | 9/2006 | Wollmershauser et al. |
| 2006/0217115 A1 | 9/2006 | Cassett et al. |
| 2006/0218244 A1 | 9/2006 | Rasmussen et al. |
| 2006/0218593 A1 | 9/2006 | Afshary et al. |
| 2006/0220830 A1 | 10/2006 | Bennett et al. |
| 2006/0221184 A1 | 10/2006 | Vallone et al. |
| 2006/0222153 A1 | 10/2006 | Tarkoff et al. |
| 2006/0226972 A1 | 10/2006 | Smith |
| 2006/0229746 A1 | 10/2006 | Ollis et al. |
| 2006/0230270 A1 | 10/2006 | Goffin |
| 2006/0233372 A1 | 10/2006 | Shaheen et al. |
| 2006/0235963 A1 | 10/2006 | Wetherly et al. |
| 2006/0236050 A1 | 10/2006 | Sugimoto et al. |
| 2006/0238372 A1 | 10/2006 | Jung et al. |
| 2006/0238617 A1 | 10/2006 | Tamir |
| 2006/0242395 A1 | 10/2006 | Fausak |
| 2006/0244589 A1 | 11/2006 | Schranz |
| 2006/0245369 A1 | 11/2006 | Schimmelpfeng et al. |
| 2006/0246886 A1 | 11/2006 | Benco et al. |
| 2006/0246919 A1 | 11/2006 | Park et al. |
| 2006/0250235 A1 | 11/2006 | Astrin |
| 2006/0251255 A1 | 11/2006 | Batta |
| 2006/0258342 A1 | 11/2006 | Fok et al. |
| 2006/0265489 A1 | 11/2006 | Moore |
| 2006/0271695 A1 | 11/2006 | Lavian |
| 2006/0274764 A1 | 12/2006 | Mah et al. |
| 2006/0281435 A1 | 12/2006 | Shearer et al. |
| 2006/0282886 A1 | 12/2006 | Gaug |
| 2006/0288288 A1 | 12/2006 | Girgensohn et al. |
| 2006/0291507 A1 | 12/2006 | Sarosi et al. |
| 2006/0294565 A1 | 12/2006 | Walter |
| 2007/0001818 A1 | 1/2007 | Small et al. |
| 2007/0002833 A1 | 1/2007 | Bajic |
| 2007/0005736 A1 | 1/2007 | Hansen et al. |
| 2007/0005957 A1 | 1/2007 | Sahita et al. |
| 2007/0006177 A1 | 1/2007 | Aiber et al. |
| 2007/0008099 A1 | 1/2007 | Kimmel et al. |
| 2007/0014248 A1 | 1/2007 | Fowlow |
| 2007/0043478 A1 | 2/2007 | Ehlers et al. |
| 2007/0043954 A1 | 2/2007 | Fox |
| 2007/0046462 A1 | 3/2007 | Fancella |
| 2007/0047585 A1 | 3/2007 | Gillespie et al. |
| 2007/0052675 A1 | 3/2007 | Chang |
| 2007/0055770 A1 | 3/2007 | Karmakar et al. |
| 2007/0058627 A1 | 3/2007 | Smith et al. |
| 2007/0061018 A1 | 3/2007 | Callaghan et al. |
| 2007/0061020 A1 | 3/2007 | Bovee et al. |
| 2007/0061266 A1 | 3/2007 | Moore et al. |
| 2007/0061430 A1 | 3/2007 | Kim |
| 2007/0061878 A1 | 3/2007 | Hagiu et al. |

(56) References Cited

U.S. PATENT DOCUMENTS

| | | |
|---|---|---|
| 2007/0063836 A1 | 3/2007 | Hayden et al. |
| 2007/0063866 A1 | 3/2007 | Webb |
| 2007/0064714 A1 | 3/2007 | Bi et al. |
| 2007/0079151 A1 | 4/2007 | Connor et al. |
| 2007/0079385 A1 | 4/2007 | Williams et al. |
| 2007/0083668 A1 | 4/2007 | Kelsey et al. |
| 2007/0090944 A1 | 4/2007 | Du Breuil |
| 2007/0094716 A1 | 4/2007 | Faring et al. |
| 2007/0096981 A1 | 5/2007 | Abraham |
| 2007/0101345 A1 | 5/2007 | Takagi |
| 2007/0103433 A1 | 5/2007 | Katz |
| 2007/0105072 A1 | 5/2007 | Koljonen |
| 2007/0106124 A1 | 5/2007 | Kuriyama et al. |
| 2007/0106536 A1 | 5/2007 | Moore |
| 2007/0106547 A1 | 5/2007 | Agrawal |
| 2007/0109975 A1 | 5/2007 | Reckamp et al. |
| 2007/0116020 A1 | 5/2007 | Cheever et al. |
| 2007/0117464 A1 | 5/2007 | Freeman |
| 2007/0118609 A1 | 5/2007 | Mullan et al. |
| 2007/0127510 A1 | 6/2007 | Bossemeyer et al. |
| 2007/0130286 A1 | 6/2007 | Hopmann et al. |
| 2007/0132576 A1 | 6/2007 | Kolavennu et al. |
| 2007/0140267 A1 | 6/2007 | Yang |
| 2007/0142022 A1 | 6/2007 | Madonna et al. |
| 2007/0142044 A1 | 6/2007 | Fitzgerald et al. |
| 2007/0143440 A1 | 6/2007 | Reckamp et al. |
| 2007/0146127 A1 | 6/2007 | Stilp et al. |
| 2007/0146484 A1 | 6/2007 | Horton et al. |
| 2007/0147419 A1 | 6/2007 | Tsujimoto et al. |
| 2007/0150616 A1 | 6/2007 | Baek et al. |
| 2007/0154010 A1 | 7/2007 | Wong |
| 2007/0155325 A1 | 7/2007 | Bambic et al. |
| 2007/0155423 A1 | 7/2007 | Carmody et al. |
| 2007/0156689 A1 | 7/2007 | Meek et al. |
| 2007/0160017 A1 | 7/2007 | Meier et al. |
| 2007/0161372 A1 | 7/2007 | Rogalski et al. |
| 2007/0162228 A1 | 7/2007 | Mitchell |
| 2007/0162680 A1 | 7/2007 | Mitchell |
| 2007/0164779 A1 | 7/2007 | Weston et al. |
| 2007/0168860 A1 | 7/2007 | Takayama et al. |
| 2007/0176766 A1 | 8/2007 | Cheng |
| 2007/0182543 A1 | 8/2007 | Luo |
| 2007/0182819 A1 | 8/2007 | Monroe |
| 2007/0183345 A1 | 8/2007 | Fahim et al. |
| 2007/0185989 A1 | 8/2007 | Corbett et al. |
| 2007/0192486 A1 | 8/2007 | Wilson et al. |
| 2007/0197236 A1 | 8/2007 | Ahn et al. |
| 2007/0198698 A1 | 8/2007 | Boyd et al. |
| 2007/0200658 A1 | 8/2007 | Yang |
| 2007/0208521 A1 | 9/2007 | Petite et al. |
| 2007/0214262 A1 | 9/2007 | Buchbinder et al. |
| 2007/0214264 A1 | 9/2007 | Koister |
| 2007/0216764 A1 | 9/2007 | Kwak |
| 2007/0216783 A1 | 9/2007 | Ortiz et al. |
| 2007/0218895 A1 | 9/2007 | Saito et al. |
| 2007/0223465 A1 | 9/2007 | Wang et al. |
| 2007/0223500 A1 | 9/2007 | Lee et al. |
| 2007/0226182 A1 | 9/2007 | Sobotka et al. |
| 2007/0230415 A1 | 10/2007 | Malik |
| 2007/0230744 A1 | 10/2007 | Dronge |
| 2007/0245223 A1 | 10/2007 | Siedzik et al. |
| 2007/0253361 A1 | 11/2007 | Pristas et al. |
| 2007/0255856 A1 | 11/2007 | Reckamp et al. |
| 2007/0256105 A1 | 11/2007 | Tabe |
| 2007/0257986 A1 | 11/2007 | Ivanov et al. |
| 2007/0260713 A1 | 11/2007 | Moorer et al. |
| 2007/0262857 A1 | 11/2007 | Jackson |
| 2007/0263782 A1 | 11/2007 | Stock et al. |
| 2007/0265866 A1 | 11/2007 | Fehling et al. |
| 2007/0271398 A1 | 11/2007 | Manchester et al. |
| 2007/0275703 A1 | 11/2007 | Lim et al. |
| 2007/0277111 A1 | 11/2007 | Bennett et al. |
| 2007/0282665 A1 | 12/2007 | Buehler et al. |
| 2007/0283001 A1 | 12/2007 | Spiess et al. |
| 2007/0283004 A1 | 12/2007 | Buehler |
| 2007/0286210 A1 | 12/2007 | Gutt et al. |
| 2007/0286369 A1 | 12/2007 | Gutt et al. |
| 2007/0287405 A1 | 12/2007 | Radtke |
| 2007/0288849 A1 | 12/2007 | Moorer et al. |
| 2007/0288858 A1 | 12/2007 | Pereira |
| 2007/0290830 A1 | 12/2007 | Gurley |
| 2007/0291118 A1 | 12/2007 | Shu et al. |
| 2007/0296814 A1 | 12/2007 | Cooper et al. |
| 2007/0298772 A1 | 12/2007 | Owens et al. |
| 2008/0001734 A1 | 1/2008 | Stilp et al. |
| 2008/0013531 A1 | 1/2008 | Elliott et al. |
| 2008/0013957 A1 | 1/2008 | Akers et al. |
| 2008/0025487 A1 | 1/2008 | Johan et al. |
| 2008/0027587 A1 | 1/2008 | Nickerson et al. |
| 2008/0042826 A1 | 2/2008 | Hevia et al. |
| 2008/0043107 A1 | 2/2008 | Coogan et al. |
| 2008/0046593 A1 | 2/2008 | Ando et al. |
| 2008/0048861 A1 | 2/2008 | Naidoo et al. |
| 2008/0048975 A1 | 2/2008 | Leibow |
| 2008/0052348 A1 | 2/2008 | Adler et al. |
| 2008/0056261 A1 | 3/2008 | Osborn et al. |
| 2008/0059533 A1 | 3/2008 | Krikorian |
| 2008/0059622 A1 | 3/2008 | Hite et al. |
| 2008/0065681 A1 | 3/2008 | Fontijn et al. |
| 2008/0065685 A1 | 3/2008 | Frank |
| 2008/0072244 A1 | 3/2008 | Eker et al. |
| 2008/0074258 A1 | 3/2008 | Bennett et al. |
| 2008/0074993 A1 | 3/2008 | Vainola |
| 2008/0082186 A1 | 4/2008 | Hood et al. |
| 2008/0084294 A1 | 4/2008 | Zhiying et al. |
| 2008/0084296 A1 | 4/2008 | Kutzik et al. |
| 2008/0086564 A1 | 4/2008 | Putman et al. |
| 2008/0091793 A1 | 4/2008 | Diroo et al. |
| 2008/0095339 A1 | 4/2008 | Elliott et al. |
| 2008/0102845 A1 | 5/2008 | Zhao |
| 2008/0103608 A1 | 5/2008 | Gough et al. |
| 2008/0104215 A1 | 5/2008 | Excoffier et al. |
| 2008/0104516 A1 | 5/2008 | Lee |
| 2008/0109302 A1 | 5/2008 | Salokannel et al. |
| 2008/0109650 A1 | 5/2008 | Shim et al. |
| 2008/0112340 A1 | 5/2008 | Luebke |
| 2008/0112405 A1 | 5/2008 | Cholas et al. |
| 2008/0117029 A1 | 5/2008 | Dohrmann et al. |
| 2008/0117201 A1 | 5/2008 | Martinez et al. |
| 2008/0117922 A1 | 5/2008 | Cockrell et al. |
| 2008/0120405 A1 | 5/2008 | Son et al. |
| 2008/0122575 A1 | 5/2008 | Lavian et al. |
| 2008/0126535 A1 | 5/2008 | Zhu et al. |
| 2008/0128444 A1 | 6/2008 | Schininger et al. |
| 2008/0129484 A1 | 6/2008 | Dahl et al. |
| 2008/0129821 A1 | 6/2008 | Howarter et al. |
| 2008/0130949 A1 | 6/2008 | Ivanov et al. |
| 2008/0133725 A1 | 6/2008 | Shaouy |
| 2008/0134343 A1 | 6/2008 | Pennington et al. |
| 2008/0137572 A1 | 6/2008 | Park et al. |
| 2008/0140868 A1 | 6/2008 | Kalayjian et al. |
| 2008/0141303 A1 | 6/2008 | Walker et al. |
| 2008/0141341 A1 | 6/2008 | Vinogradov et al. |
| 2008/0144884 A1 | 6/2008 | Habibi |
| 2008/0147834 A1 | 6/2008 | Quinn et al. |
| 2008/0155080 A1 | 6/2008 | Marlow et al. |
| 2008/0155470 A1 | 6/2008 | Khedouri et al. |
| 2008/0162637 A1 | 7/2008 | Adamczyk et al. |
| 2008/0163355 A1 | 7/2008 | Chu |
| 2008/0168404 A1 | 7/2008 | Ording |
| 2008/0170511 A1 | 7/2008 | Shorty et al. |
| 2008/0180240 A1 | 7/2008 | Raji et al. |
| 2008/0181239 A1 | 7/2008 | Wood et al. |
| 2008/0183483 A1 | 7/2008 | Hart |
| 2008/0183842 A1 | 7/2008 | Raji et al. |
| 2008/0189609 A1 | 8/2008 | Larson et al. |
| 2008/0201468 A1 | 8/2008 | Titus |
| 2008/0204190 A1 | 8/2008 | Cohn et al. |
| 2008/0204219 A1 | 8/2008 | Cohn et al. |
| 2008/0208399 A1 | 8/2008 | Pham |
| 2008/0209505 A1 | 8/2008 | Ghai et al. |
| 2008/0209506 A1 | 8/2008 | Ghai et al. |
| 2008/0215450 A1 | 9/2008 | Gates et al. |
| 2008/0215613 A1 | 9/2008 | Grasso |

(56) References Cited

U.S. PATENT DOCUMENTS

| | | |
|---|---|---|
| 2008/0219239 A1 | 9/2008 | Bell et al. |
| 2008/0221715 A1 | 9/2008 | Krzyzanowski et al. |
| 2008/0227460 A1 | 9/2008 | David et al. |
| 2008/0235326 A1 | 9/2008 | Parsi et al. |
| 2008/0235600 A1 | 9/2008 | Harper et al. |
| 2008/0239075 A1 | 10/2008 | Mehrotra et al. |
| 2008/0240372 A1 | 10/2008 | Frenette |
| 2008/0240696 A1 | 10/2008 | Kucharyson |
| 2008/0253391 A1 | 10/2008 | Krits et al. |
| 2008/0259818 A1 | 10/2008 | Balassanian |
| 2008/0261540 A1 | 10/2008 | Rohani et al. |
| 2008/0263150 A1 | 10/2008 | Childers et al. |
| 2008/0266080 A1 | 10/2008 | Leung et al. |
| 2008/0266257 A1 | 10/2008 | Chiang |
| 2008/0271150 A1 | 10/2008 | Boerger et al. |
| 2008/0284580 A1 | 11/2008 | Babich et al. |
| 2008/0284587 A1 | 11/2008 | Saigh et al. |
| 2008/0284592 A1 | 11/2008 | Collins et al. |
| 2008/0288639 A1 | 11/2008 | Ruppert et al. |
| 2008/0294588 A1 | 11/2008 | Morris et al. |
| 2008/0297599 A1 | 12/2008 | Donovan et al. |
| 2008/0303903 A1 | 12/2008 | Bentley et al. |
| 2008/0313316 A1 | 12/2008 | Hite et al. |
| 2008/0316024 A1 | 12/2008 | Chantelou et al. |
| 2009/0003252 A1 | 1/2009 | Salomone et al. |
| 2009/0003820 A1 | 1/2009 | Law et al. |
| 2009/0007596 A1 | 1/2009 | Goldstein et al. |
| 2009/0013210 A1 | 1/2009 | McIntosh et al. |
| 2009/0019141 A1 | 1/2009 | Bush et al. |
| 2009/0036142 A1 | 2/2009 | Yan |
| 2009/0041467 A1 | 2/2009 | Carleton et al. |
| 2009/0042649 A1 | 2/2009 | Hsieh et al. |
| 2009/0046664 A1 | 2/2009 | Aso |
| 2009/0049094 A1 | 2/2009 | Howell et al. |
| 2009/0049488 A1 | 2/2009 | Stransky |
| 2009/0051769 A1 | 2/2009 | Kuo et al. |
| 2009/0055760 A1 | 2/2009 | Whatcott et al. |
| 2009/0057427 A1 | 3/2009 | Geadelmann et al. |
| 2009/0063582 A1 | 3/2009 | Anna et al. |
| 2009/0066534 A1 | 3/2009 | Sivakkolundhu |
| 2009/0066788 A1 | 3/2009 | Baum et al. |
| 2009/0066789 A1 | 3/2009 | Baum et al. |
| 2009/0067395 A1 | 3/2009 | Curtis et al. |
| 2009/0067441 A1 | 3/2009 | Ansari et al. |
| 2009/0070436 A1 | 3/2009 | Dawes et al. |
| 2009/0070473 A1 | 3/2009 | Baum et al. |
| 2009/0070477 A1 | 3/2009 | Baum et al. |
| 2009/0070681 A1 | 3/2009 | Dawes et al. |
| 2009/0070682 A1 | 3/2009 | Dawes et al. |
| 2009/0070692 A1 | 3/2009 | Dawes et al. |
| 2009/0072988 A1 | 3/2009 | Haywood |
| 2009/0074184 A1 | 3/2009 | Baum et al. |
| 2009/0076211 A1 | 3/2009 | Yang |
| 2009/0076879 A1 | 3/2009 | Sparks et al. |
| 2009/0077167 A1 | 3/2009 | Baum et al. |
| 2009/0077622 A1 | 3/2009 | Baum et al. |
| 2009/0077623 A1 | 3/2009 | Baum et al. |
| 2009/0077624 A1 | 3/2009 | Baum et al. |
| 2009/0079547 A1 | 3/2009 | Oksanen et al. |
| 2009/0086660 A1 | 4/2009 | Sood et al. |
| 2009/0092283 A1 | 4/2009 | Whillock et al. |
| 2009/0100329 A1 | 4/2009 | Espinoza |
| 2009/0100492 A1 | 4/2009 | Hicks et al. |
| 2009/0113344 A1 | 4/2009 | Nesse et al. |
| 2009/0119397 A1 | 5/2009 | Neerdaels |
| 2009/0125708 A1 | 5/2009 | Woodring et al. |
| 2009/0128365 A1 | 5/2009 | Laskin |
| 2009/0134998 A1 | 5/2009 | Baum et al. |
| 2009/0138600 A1 | 5/2009 | Baum et al. |
| 2009/0138958 A1 | 5/2009 | Baum et al. |
| 2009/0146846 A1 | 6/2009 | Grossman |
| 2009/0158189 A1 | 6/2009 | Itani |
| 2009/0158292 A1 | 6/2009 | Rattner et al. |
| 2009/0161609 A1 | 6/2009 | Bergstrom |
| 2009/0165114 A1 | 6/2009 | Baum et al. |
| 2009/0172443 A1 | 7/2009 | Rothman et al. |
| 2009/0177298 A1 | 7/2009 | McFarland et al. |
| 2009/0177906 A1 | 7/2009 | Paniagua et al. |
| 2009/0187297 A1 | 7/2009 | Kish et al. |
| 2009/0193373 A1 | 7/2009 | Abbaspour et al. |
| 2009/0197539 A1 | 8/2009 | Shiba |
| 2009/0202250 A1 | 8/2009 | Dizechi et al. |
| 2009/0204693 A1 | 8/2009 | Andreev et al. |
| 2009/0221368 A1 | 9/2009 | Yen et al. |
| 2009/0224875 A1 | 9/2009 | Rabinowitz et al. |
| 2009/0228445 A1 | 9/2009 | Gangal |
| 2009/0240353 A1 | 9/2009 | Songkakul et al. |
| 2009/0240730 A1 | 9/2009 | Wood |
| 2009/0240787 A1 | 9/2009 | Denny |
| 2009/0240814 A1 | 9/2009 | Brubacher et al. |
| 2009/0240946 A1 | 9/2009 | Yeap et al. |
| 2009/0254960 A1 | 10/2009 | Yarom et al. |
| 2009/0256708 A1 | 10/2009 | Hsiao et al. |
| 2009/0259515 A1 | 10/2009 | Belimpasakis et al. |
| 2009/0260052 A1 | 10/2009 | Bathula et al. |
| 2009/0260430 A1 | 10/2009 | Zamfes |
| 2009/0265042 A1 | 10/2009 | Mollenkopf et al. |
| 2009/0265193 A1 | 10/2009 | Collins et al. |
| 2009/0270090 A1 | 10/2009 | Kawamura |
| 2009/0271042 A1 | 10/2009 | Voysey |
| 2009/0289787 A1 | 11/2009 | Dawson et al. |
| 2009/0289788 A1 | 11/2009 | Leblond |
| 2009/0303100 A1 | 12/2009 | Zemany |
| 2009/0307255 A1 | 12/2009 | Park |
| 2009/0307307 A1 | 12/2009 | Igarashi |
| 2009/0313693 A1 | 12/2009 | Rogers |
| 2009/0316671 A1 | 12/2009 | Rolf et al. |
| 2009/0322510 A1 | 12/2009 | Berger et al. |
| 2009/0324010 A1 | 12/2009 | Hou |
| 2009/0327483 A1 | 12/2009 | Thompson et al. |
| 2009/0327510 A1 | 12/2009 | Edelman et al. |
| 2010/0000791 A1 | 1/2010 | Alberty |
| 2010/0001812 A1 | 1/2010 | Kausch |
| 2010/0004949 A1 | 1/2010 | O'Brien |
| 2010/0008274 A1 | 1/2010 | Kneckt et al. |
| 2010/0013917 A1 | 1/2010 | Hanna et al. |
| 2010/0023865 A1 | 1/2010 | Fulker et al. |
| 2010/0026481 A1 | 2/2010 | Oh et al. |
| 2010/0026487 A1 | 2/2010 | Hershkovitz |
| 2010/0030578 A1 | 2/2010 | Siddique et al. |
| 2010/0030810 A1 | 2/2010 | Marr |
| 2010/0039958 A1 | 2/2010 | Ge et al. |
| 2010/0041380 A1 | 2/2010 | Hewes et al. |
| 2010/0052612 A1 | 3/2010 | Raji et al. |
| 2010/0066530 A1 | 3/2010 | Cohn et al. |
| 2010/0067371 A1 | 3/2010 | Gogic et al. |
| 2010/0070618 A1 | 3/2010 | Kim et al. |
| 2010/0074112 A1 | 3/2010 | Derr et al. |
| 2010/0077111 A1 | 3/2010 | Holmes et al. |
| 2010/0077347 A1 | 3/2010 | Kirtane et al. |
| 2010/0082744 A1 | 4/2010 | Raji et al. |
| 2010/0095111 A1 | 4/2010 | Gutt et al. |
| 2010/0095369 A1 | 4/2010 | Gutt et al. |
| 2010/0100269 A1 | 4/2010 | Ekhaguere et al. |
| 2010/0102951 A1 | 4/2010 | Rutledge |
| 2010/0121521 A1 | 5/2010 | Kiribayashi |
| 2010/0122091 A1 | 5/2010 | Huang et al. |
| 2010/0138758 A1 | 6/2010 | Mizumori et al. |
| 2010/0138764 A1 | 6/2010 | Hatambeiki et al. |
| 2010/0141762 A1 | 6/2010 | Siann et al. |
| 2010/0145485 A1 | 6/2010 | Duchene et al. |
| 2010/0150170 A1 | 6/2010 | Lee et al. |
| 2010/0153853 A1 | 6/2010 | Dawes et al. |
| 2010/0159898 A1 | 6/2010 | Krzyzanowski et al. |
| 2010/0159967 A1 | 6/2010 | Pounds et al. |
| 2010/0164736 A1 | 7/2010 | Byers et al. |
| 2010/0165897 A1 | 7/2010 | Sood |
| 2010/0174643 A1 | 7/2010 | Schaefer et al. |
| 2010/0177749 A1 | 7/2010 | Essinger et al. |
| 2010/0177750 A1 | 7/2010 | Essinger et al. |
| 2010/0185857 A1 | 7/2010 | Neitzel et al. |
| 2010/0197219 A1 | 8/2010 | Issa et al. |
| 2010/0204839 A1 | 8/2010 | Behm et al. |
| 2010/0210240 A1 | 8/2010 | Mahaffey et al. |

(56) References Cited

U.S. PATENT DOCUMENTS

| | | |
|---|---|---|
| 2010/0212012 A1 | 8/2010 | Touboul et al. |
| 2010/0218104 A1 | 8/2010 | Lewis |
| 2010/0222069 A1 | 9/2010 | Abraham et al. |
| 2010/0238286 A1 | 9/2010 | Boghossian et al. |
| 2010/0241711 A1 | 9/2010 | Ansari et al. |
| 2010/0241748 A1 | 9/2010 | Ansari et al. |
| 2010/0245107 A1 | 9/2010 | Fulker et al. |
| 2010/0248681 A1 | 9/2010 | Phills |
| 2010/0267390 A1 | 10/2010 | Lin et al. |
| 2010/0274366 A1 | 10/2010 | Fata et al. |
| 2010/0277300 A1 | 11/2010 | Cohn et al. |
| 2010/0277302 A1 | 11/2010 | Cohn et al. |
| 2010/0277315 A1 | 11/2010 | Cohn et al. |
| 2010/0279649 A1 | 11/2010 | Thomas |
| 2010/0280635 A1 | 11/2010 | Cohn et al. |
| 2010/0280637 A1 | 11/2010 | Cohn et al. |
| 2010/0281135 A1 | 11/2010 | Cohn et al. |
| 2010/0281161 A1 | 11/2010 | Cohn et al. |
| 2010/0281312 A1 | 11/2010 | Cohn et al. |
| 2010/0298024 A1 | 11/2010 | Choi |
| 2010/0308990 A1 | 12/2010 | Simon et al. |
| 2010/0321151 A1 | 12/2010 | Matsuura et al. |
| 2010/0325107 A1 | 12/2010 | Kenton et al. |
| 2010/0332164 A1 | 12/2010 | Aisa et al. |
| 2011/0000521 A1 | 1/2011 | Tachibana |
| 2011/0026568 A1 | 2/2011 | Hadizad et al. |
| 2011/0029875 A1 | 2/2011 | Milch |
| 2011/0030056 A1 | 2/2011 | Tokunaga |
| 2011/0037593 A1 | 2/2011 | Foisy et al. |
| 2011/0040415 A1 | 2/2011 | Nickerson et al. |
| 2011/0040877 A1 | 2/2011 | Foisy |
| 2011/0046792 A1 | 2/2011 | Imes et al. |
| 2011/0051638 A1 | 3/2011 | Jeon et al. |
| 2011/0068921 A1 | 3/2011 | Shafer |
| 2011/0080267 A1 | 4/2011 | Clare et al. |
| 2011/0087988 A1 | 4/2011 | Ray et al. |
| 2011/0093799 A1 | 4/2011 | Hatambeiki et al. |
| 2011/0096678 A1 | 4/2011 | Ketonen |
| 2011/0102588 A1 | 5/2011 | Trundle et al. |
| 2011/0107436 A1 | 5/2011 | Cholas et al. |
| 2011/0125333 A1 | 5/2011 | Gray |
| 2011/0125846 A1 | 5/2011 | Ham et al. |
| 2011/0128378 A1 | 6/2011 | Raji |
| 2011/0156914 A1 | 6/2011 | Sheharri et al. |
| 2011/0169637 A1 | 7/2011 | Siegler et al. |
| 2011/0197327 A1 | 8/2011 | McElroy et al. |
| 2011/0200052 A1 | 8/2011 | Mungo et al. |
| 2011/0208359 A1 | 8/2011 | Duchene et al. |
| 2011/0212706 A1 | 9/2011 | Uusilehto |
| 2011/0218777 A1 | 9/2011 | Chen et al. |
| 2011/0230160 A1 | 9/2011 | Felgate |
| 2011/0234392 A1 | 9/2011 | Cohn et al. |
| 2011/0257953 A1 | 10/2011 | Li et al. |
| 2011/0261195 A1 | 10/2011 | Martin et al. |
| 2011/0276699 A1 | 11/2011 | Pedersen |
| 2011/0283006 A1 | 11/2011 | Ramamurthy |
| 2011/0286437 A1 | 11/2011 | Austin et al. |
| 2011/0289517 A1 | 11/2011 | Sather et al. |
| 2011/0302497 A1 | 12/2011 | Garrett et al. |
| 2011/0309929 A1 | 12/2011 | Myers |
| 2011/0314515 A1 | 12/2011 | Hernoud et al. |
| 2012/0001436 A1 | 1/2012 | Sami et al. |
| 2012/0014363 A1 | 1/2012 | Hassan et al. |
| 2012/0016607 A1 | 1/2012 | Zolkiewski |
| 2012/0017268 A9 | 1/2012 | Dispensa |
| 2012/0020060 A1 | 1/2012 | Myer et al. |
| 2012/0023151 A1 | 1/2012 | Lund |
| 2012/0030130 A1 | 2/2012 | Smith et al. |
| 2012/0062026 A1 | 3/2012 | Dawes |
| 2012/0062370 A1 | 3/2012 | Feldstein et al. |
| 2012/0066608 A1 | 3/2012 | Fulker |
| 2012/0066632 A1 | 3/2012 | Fulker |
| 2012/0081842 A1 | 4/2012 | Ewing et al. |
| 2012/0084184 A1 | 4/2012 | Raleigh et al. |
| 2012/0143383 A1 | 6/2012 | Cooperrider et al. |
| 2012/0154126 A1 | 6/2012 | Kitchen |
| 2012/0154138 A1 | 6/2012 | Quain |
| 2012/0158161 A1 | 6/2012 | Cohn et al. |
| 2012/0172027 A1 | 7/2012 | Partheesh et al. |
| 2012/0182245 A1 | 7/2012 | Hutton |
| 2012/0188072 A1 | 7/2012 | Dawes et al. |
| 2012/0209951 A1* | 8/2012 | Enns ................ H04L 29/08729 709/217 |
| 2012/0214502 A1 | 8/2012 | Qiang |
| 2012/0232788 A1 | 9/2012 | Diao |
| 2012/0242788 A1 | 9/2012 | Chuang et al. |
| 2012/0257061 A1 | 10/2012 | Edwards et al. |
| 2012/0259722 A1 | 10/2012 | Mikurak |
| 2012/0260184 A1 | 10/2012 | Wales |
| 2012/0265892 A1 | 10/2012 | Ma et al. |
| 2012/0269199 A1 | 10/2012 | Chan et al. |
| 2012/0278877 A1 | 11/2012 | Wood |
| 2012/0280790 A1 | 11/2012 | Gerhardt et al. |
| 2012/0296486 A1 | 11/2012 | Marriam et al. |
| 2012/0307646 A1 | 12/2012 | Xia et al. |
| 2012/0309354 A1 | 12/2012 | Du |
| 2012/0314901 A1 | 12/2012 | Hanson et al. |
| 2012/0315848 A1 | 12/2012 | Smith et al. |
| 2012/0324566 A1 | 12/2012 | Wood |
| 2012/0327242 A1 | 12/2012 | Roach |
| 2012/0331109 A1 | 12/2012 | Wood |
| 2013/0007871 A1 | 1/2013 | Meenan et al. |
| 2013/0038730 A1 | 2/2013 | Peterson et al. |
| 2013/0038800 A1 | 2/2013 | Yoo |
| 2013/0062951 A1 | 3/2013 | Dawes |
| 2013/0073746 A1 | 3/2013 | Singh et al. |
| 2013/0082835 A1 | 4/2013 | Shapiro et al. |
| 2013/0082836 A1 | 4/2013 | Watts |
| 2013/0085615 A1 | 4/2013 | Barker |
| 2013/0085620 A1 | 4/2013 | Lu et al. |
| 2013/0086618 A1 | 4/2013 | Klein et al. |
| 2013/0103207 A1 | 4/2013 | Ruff et al. |
| 2013/0115972 A1 | 5/2013 | Ziskind et al. |
| 2013/0120134 A1 | 5/2013 | Hicks, III |
| 2013/0125157 A1 | 5/2013 | Sharif-Ahmadi et al. |
| 2013/0136102 A1 | 5/2013 | Macwan et al. |
| 2013/0147799 A1 | 6/2013 | Hoguet |
| 2013/0154822 A1 | 6/2013 | Kumar et al. |
| 2013/0155229 A1 | 6/2013 | Thornton et al. |
| 2013/0163491 A1 | 6/2013 | Singh et al. |
| 2013/0174239 A1 | 7/2013 | Kim et al. |
| 2013/0183924 A1 | 7/2013 | Saigh |
| 2013/0184874 A1 | 7/2013 | Frader-Thompson et al. |
| 2013/0191755 A1* | 7/2013 | Balog ................ H04L 41/0806 715/735 |
| 2013/0218959 A1 | 8/2013 | Kodama |
| 2013/0222133 A1 | 8/2013 | Schultz et al. |
| 2013/0223279 A1 | 8/2013 | Tinnakornsrisuphap et al. |
| 2013/0245837 A1 | 9/2013 | Grohman |
| 2013/0257611 A1 | 10/2013 | Lamb et al. |
| 2013/0258119 A1 | 10/2013 | Kim et al. |
| 2013/0261821 A1 | 10/2013 | Lu et al. |
| 2013/0266193 A1 | 10/2013 | Tiwari et al. |
| 2013/0311146 A1 | 11/2013 | Miller et al. |
| 2013/0314542 A1 | 11/2013 | Jackson |
| 2013/0318231 A1 | 11/2013 | Gutt |
| 2013/0318443 A1 | 11/2013 | Bachman et al. |
| 2013/0331109 A1 | 12/2013 | Dhillon et al. |
| 2013/0344875 A1 | 12/2013 | Chowdhury |
| 2014/0024361 A1 | 1/2014 | Poon et al. |
| 2014/0032034 A1 | 1/2014 | Raptopoulos et al. |
| 2014/0035726 A1 | 2/2014 | Schoner et al. |
| 2014/0053246 A1 | 2/2014 | Huang et al. |
| 2014/0068486 A1 | 3/2014 | Sellers et al. |
| 2014/0075464 A1 | 3/2014 | McCrea |
| 2014/0098247 A1 | 4/2014 | Rao et al. |
| 2014/0112405 A1 | 4/2014 | Jafarian et al. |
| 2014/0126425 A1 | 5/2014 | Dawes |
| 2014/0136242 A1 | 5/2014 | Weekes et al. |
| 2014/0136847 A1 | 5/2014 | Huang |
| 2014/0136936 A1 | 5/2014 | Patel et al. |
| 2014/0140575 A1 | 5/2014 | Wolf |
| 2014/0143695 A1 | 5/2014 | Fulker |
| 2014/0143851 A1 | 5/2014 | Dawes |

(56) References Cited

U.S. PATENT DOCUMENTS

| | | |
|---|---|---|
| 2014/0143854 A1 | 5/2014 | Lopez et al. |
| 2014/0146171 A1 | 5/2014 | Brady et al. |
| 2014/0153695 A1 | 6/2014 | Yanagisawa et al. |
| 2014/0167928 A1 | 6/2014 | Burd et al. |
| 2014/0172957 A1 | 6/2014 | Dawes |
| 2014/0176797 A1 | 6/2014 | Silva et al. |
| 2014/0180968 A1 | 6/2014 | Song et al. |
| 2014/0188290 A1 | 7/2014 | Steinberg et al. |
| 2014/0201291 A1 | 7/2014 | Russell |
| 2014/0218517 A1 | 8/2014 | Kim et al. |
| 2014/0232861 A1 | 8/2014 | Naidoo et al. |
| 2014/0233951 A1 | 8/2014 | Cook |
| 2014/0236325 A1 | 8/2014 | Sasaki et al. |
| 2014/0245160 A1 | 8/2014 | Bauer et al. |
| 2014/0254896 A1 | 9/2014 | Zhou et al. |
| 2014/0266678 A1 | 9/2014 | Shapiro et al. |
| 2014/0266736 A1 | 9/2014 | Cretu-Petra |
| 2014/0277854 A1 | 9/2014 | Jones et al. |
| 2014/0278281 A1 | 9/2014 | Vaynriber et al. |
| 2014/0282048 A1 | 9/2014 | Shapiro et al. |
| 2014/0282934 A1 | 9/2014 | Miasnik et al. |
| 2014/0289384 A1 | 9/2014 | Kao et al. |
| 2014/0289388 A1 | 9/2014 | Ghosh et al. |
| 2014/0293046 A1 | 10/2014 | Ni |
| 2014/0316616 A1 | 10/2014 | Kugelmass |
| 2014/0317660 A1 | 10/2014 | Cheung et al. |
| 2014/0319232 A1 | 10/2014 | Gourlay et al. |
| 2014/0328161 A1 | 11/2014 | Haddad et al. |
| 2014/0340216 A1 | 11/2014 | Puskarich |
| 2014/0355588 A1 | 12/2014 | Cho et al. |
| 2014/0359101 A1 | 12/2014 | Wales |
| 2014/0359524 A1 | 12/2014 | Sasaki et al. |
| 2014/0368331 A1 | 12/2014 | Quain |
| 2014/0369584 A1 | 12/2014 | Fan et al. |
| 2014/0372599 A1 | 12/2014 | Gutt et al. |
| 2014/0372811 A1* | 12/2014 | Cohn et al. |
| 2015/0009325 A1 | 1/2015 | Kardashov |
| 2015/0019714 A1 | 1/2015 | Shaashua et al. |
| 2015/0022666 A1 | 1/2015 | Kay et al. |
| 2015/0054947 A1 | 2/2015 | Dawes |
| 2015/0074206 A1 | 3/2015 | Baldwin |
| 2015/0074259 A1 | 3/2015 | Ansari et al. |
| 2015/0077553 A1 | 3/2015 | Dawes |
| 2015/0082414 A1 | 3/2015 | Dawes |
| 2015/0088982 A1 | 3/2015 | Johnson et al. |
| 2015/0097680 A1 | 4/2015 | Fadell et al. |
| 2015/0097949 A1 | 4/2015 | Ure et al. |
| 2015/0097961 A1 | 4/2015 | Ure et al. |
| 2015/0106721 A1 | 4/2015 | Cha et al. |
| 2015/0116108 A1 | 4/2015 | Fadell et al. |
| 2015/0142991 A1 | 5/2015 | Zaloom |
| 2015/0161875 A1 | 6/2015 | Cohn et al. |
| 2015/0205465 A1 | 7/2015 | Robison et al. |
| 2015/0222517 A1 | 8/2015 | McLaughlin et al. |
| 2015/0222601 A1 | 8/2015 | Metz et al. |
| 2015/0256355 A1 | 9/2015 | Pera et al. |
| 2015/0261427 A1 | 9/2015 | Sasaki |
| 2015/0266577 A1 | 9/2015 | Jones et al. |
| 2015/0287310 A1 | 10/2015 | Deiiuliis et al. |
| 2015/0319006 A1 | 11/2015 | Plummer et al. |
| 2015/0319046 A1 | 11/2015 | Plummer et al. |
| 2015/0325106 A1 | 11/2015 | Dawes et al. |
| 2015/0331662 A1 | 11/2015 | Lambourne |
| 2015/0334087 A1 | 11/2015 | Dawes |
| 2015/0348554 A1 | 12/2015 | Orr et al. |
| 2015/0350031 A1 | 12/2015 | Burks et al. |
| 2015/0358359 A1 | 12/2015 | Ghai et al. |
| 2015/0365217 A1* | 12/2015 | Scholten .............. H04L 5/0053 370/315 |
| 2015/0373149 A1 | 12/2015 | Lyons |
| 2015/0379355 A1 | 12/2015 | Kanga et al. |
| 2016/0012715 A1 | 1/2016 | Hazbun |
| 2016/0019763 A1 | 1/2016 | Hazbun |
| 2016/0019778 A1 | 1/2016 | Raji et al. |
| 2016/0023475 A1 | 1/2016 | Bevier et al. |
| 2016/0027295 A1 | 1/2016 | Raji et al. |
| 2016/0036944 A1 | 2/2016 | Kitchen et al. |
| 2016/0042637 A1 | 2/2016 | Cahill |
| 2016/0055573 A1 | 2/2016 | Chen et al. |
| 2016/0062624 A1 | 3/2016 | Sundermeyer et al. |
| 2016/0065413 A1 | 3/2016 | Sundermeyer et al. |
| 2016/0065414 A1 | 3/2016 | Sundermeyer et al. |
| 2016/0068264 A1 | 3/2016 | Ganesh et al. |
| 2016/0077935 A1 | 3/2016 | Zheng et al. |
| 2016/0087933 A1 | 3/2016 | Johnson et al. |
| 2016/0100348 A1 | 4/2016 | Cohn et al. |
| 2016/0107749 A1 | 4/2016 | Mucci |
| 2016/0116914 A1 | 4/2016 | Mucci |
| 2016/0127641 A1 | 5/2016 | Gove |
| 2016/0147919 A1 | 5/2016 | Yabe et al. |
| 2016/0161277 A1 | 6/2016 | Park et al. |
| 2016/0163185 A1 | 6/2016 | Ramasubbu et al. |
| 2016/0164923 A1 | 6/2016 | Dawes |
| 2016/0171853 A1 | 6/2016 | Naidoo et al. |
| 2016/0180719 A1 | 6/2016 | Wouhaybi et al. |
| 2016/0183073 A1 | 6/2016 | Saito et al. |
| 2016/0189509 A1 | 6/2016 | Malhotra et al. |
| 2016/0189524 A1 | 6/2016 | Poder et al. |
| 2016/0189527 A1 | 6/2016 | Peterson et al. |
| 2016/0189549 A1 | 6/2016 | Marcus |
| 2016/0191265 A1 | 6/2016 | Cohn et al. |
| 2016/0191621 A1 | 6/2016 | Oh et al. |
| 2016/0192461 A1 | 6/2016 | Minsky |
| 2016/0202695 A1 | 7/2016 | Deroos et al. |
| 2016/0209072 A1 | 7/2016 | Golden et al. |
| 2016/0225240 A1 | 8/2016 | Voddhi et al. |
| 2016/0226732 A1 | 8/2016 | Kim et al. |
| 2016/0231916 A1 | 8/2016 | Dawes |
| 2016/0232780 A1 | 8/2016 | Cohn et al. |
| 2016/0234075 A1 | 8/2016 | Sirpal et al. |
| 2016/0241633 A1 | 8/2016 | Overby et al. |
| 2016/0260135 A1 | 9/2016 | Zomet et al. |
| 2016/0261932 A1 | 9/2016 | Fadell et al. |
| 2016/0266579 A1 | 9/2016 | Chen et al. |
| 2016/0267751 A1 | 9/2016 | Fulker et al. |
| 2016/0269191 A1 | 9/2016 | Cronin |
| 2016/0274759 A1 | 9/2016 | Dawes |
| 2016/0363337 A1 | 12/2016 | Steinberg et al. |
| 2016/0364089 A1 | 12/2016 | Blackman et al. |
| 2016/0371961 A1 | 12/2016 | Narang et al. |
| 2016/0373453 A1 | 12/2016 | Ruffner et al. |
| 2016/0378109 A1 | 12/2016 | Raffa et al. |
| 2017/0004714 A1 | 1/2017 | Rhee |
| 2017/0005818 A1 | 1/2017 | Gould |
| 2017/0006107 A1 | 1/2017 | Dawes et al. |
| 2017/0019644 A1 | 1/2017 | K V et al. |
| 2017/0026440 A1 | 1/2017 | Cockrell et al. |
| 2017/0039413 A1 | 2/2017 | Nadler |
| 2017/0052513 A1 | 2/2017 | Raji et al. |
| 2017/0054571 A1 | 2/2017 | Kitchen et al. |
| 2017/0054594 A1 | 2/2017 | Dawes |
| 2017/0063968 A1 | 3/2017 | Kitchen et al. |
| 2017/0068419 A1 | 3/2017 | Sundermeyer et al. |
| 2017/0070361 A1 | 3/2017 | Sundermeyer et al. |
| 2017/0070563 A1 | 3/2017 | Sundermeyer et al. |
| 2017/0078298 A1 | 3/2017 | Vlaminck et al. |
| 2017/0092138 A1 | 3/2017 | Trundle et al. |
| 2017/0103646 A1 | 4/2017 | Naidoo et al. |
| 2017/0109999 A1 | 4/2017 | Cohn et al. |
| 2017/0118037 A1 | 4/2017 | Kitchen et al. |
| 2017/0127124 A9 | 5/2017 | Wilson et al. |
| 2017/0154507 A1 | 6/2017 | Dawes et al. |
| 2017/0155545 A1 | 6/2017 | Baum et al. |
| 2017/0180198 A1 | 6/2017 | Dawes |
| 2017/0180306 A1 | 6/2017 | Gutt et al. |
| 2017/0185277 A1 | 6/2017 | Sundermeyer et al. |
| 2017/0185278 A1 | 6/2017 | Sundermeyer et al. |
| 2017/0192402 A1 | 7/2017 | Karp et al. |
| 2017/0227965 A1 | 8/2017 | Decenzo et al. |
| 2017/0244573 A1 | 8/2017 | Baum et al. |
| 2017/0255452 A1 | 9/2017 | Barnes et al. |
| 2017/0257257 A1 | 9/2017 | Dawes |
| 2017/0278407 A1 | 9/2017 | Lemmey et al. |
| 2017/0279629 A1 | 9/2017 | Raji |

(56) References Cited

U.S. PATENT DOCUMENTS

| | | |
|---|---|---|
| 2017/0289360 A1 | 10/2017 | Baum et al. |
| 2017/0301216 A1 | 10/2017 | Cohn et al. |
| 2017/0302469 A1 | 10/2017 | Cohn et al. |
| 2017/0303257 A1 | 10/2017 | Yamada et al. |
| 2017/0310500 A1 | 10/2017 | Dawes |
| 2017/0331781 A1 | 11/2017 | Gutt et al. |
| 2017/0337806 A1 | 11/2017 | Cohn et al. |
| 2017/0353324 A1 | 12/2017 | Baum et al. |
| 2018/0004377 A1 | 1/2018 | Kitchen et al. |
| 2018/0012460 A1 | 1/2018 | Heitz, III et al. |
| 2018/0019890 A1 | 1/2018 | Dawes |
| 2018/0054774 A1 | 2/2018 | Cohn et al. |
| 2018/0063248 A1 | 3/2018 | Dawes et al. |
| 2018/0063259 A1 | 3/2018 | Connelly et al. |
| 2018/0069932 A1 | 3/2018 | Tiwari et al. |
| 2018/0083831 A1 | 3/2018 | Baum et al. |
| 2018/0092046 A1 | 3/2018 | Egan et al. |
| 2018/0096568 A1 | 4/2018 | Cohn et al. |
| 2018/0191720 A1 | 7/2018 | Dawes |
| 2018/0191740 A1 | 7/2018 | Decenzo et al. |
| 2018/0191741 A1 | 7/2018 | Dawes et al. |
| 2018/0191742 A1 | 7/2018 | Dawes |
| 2018/0191807 A1 | 7/2018 | Dawes |
| 2018/0197387 A1 | 7/2018 | Dawes |
| 2018/0198688 A1 | 7/2018 | Dawes |
| 2018/0198755 A1 | 7/2018 | Domangue et al. |
| 2018/0198756 A1 | 7/2018 | Dawes |
| 2018/0198788 A1 | 7/2018 | Helen et al. |
| 2018/0198802 A1 | 7/2018 | Dawes |
| 2018/0198841 A1 | 7/2018 | Chmielewski et al. |
| 2018/0278701 A1 | 9/2018 | Diem |
| 2018/0307223 A1 | 10/2018 | Peeters et al. |
| 2019/0014413 A1 | 1/2019 | Kallai et al. |
| 2019/0041547 A1 | 2/2019 | Rolf et al. |
| 2019/0058720 A1 | 2/2019 | Lindquist et al. |
| 2019/0073193 A1 | 3/2019 | Krispin |
| 2019/0073534 A1 | 3/2019 | Dvir et al. |
| 2019/0103030 A1 | 4/2019 | Banga et al. |
| 2019/0239008 A1 | 8/2019 | Lambourne |
| 2019/0347924 A1 | 11/2019 | Trundle et al. |
| 2019/0386892 A1 | 12/2019 | Sundermeyer et al. |
| 2019/0391545 A1 | 12/2019 | Trundle et al. |
| 2020/0029339 A1 | 1/2020 | Suzuki |
| 2020/0094963 A1 | 3/2020 | Myslinski |
| 2020/0127891 A9 | 4/2020 | Johnson et al. |
| 2020/0142574 A1 | 5/2020 | Sundermeyer et al. |
| 2020/0159399 A1 | 5/2020 | Sundermeyer et al. |
| 2020/0257721 A1 | 8/2020 | McKinnon et al. |
| 2020/0273277 A1 | 8/2020 | Kerning et al. |
| 2020/0279626 A1 | 9/2020 | Ansari et al. |
| 2020/0333780 A1 | 10/2020 | Kerzner |
| 2020/0342742 A1 | 10/2020 | Sundermeyer et al. |
| 2020/0380851 A1 | 12/2020 | Farrand et al. |
| 2021/0099753 A1 | 4/2021 | Connelly et al. |
| 2021/0250726 A1 | 8/2021 | Jones |

FOREIGN PATENT DOCUMENTS

| | | |
|---|---|---|
| AU | 2011250886 A1 | 1/2013 |
| AU | 2013284428 A1 | 2/2015 |
| AU | 2011305163 B2 | 12/2016 |
| AU | 2017201365 A1 | 3/2017 |
| AU | 2017201585 A1 | 3/2017 |
| BE | 1008939 A6 | 10/1996 |
| CA | 2203813 A1 | 6/1996 |
| CA | 2174482 A1 | 10/1997 |
| CA | 2346638 A1 | 4/2000 |
| CA | 2389958 A1 | 3/2003 |
| CA | 2878117 A1 | 1/2014 |
| CA | 2559842 C | 5/2014 |
| CA | 2992429 A1 | 12/2016 |
| CA | 2976682 A1 | 2/2018 |
| CA | 2976802 A1 | 2/2018 |
| CN | 102834818 A | 12/2012 |
| CN | 102985915 A | 3/2013 |
| EP | 0295146 A2 | 12/1988 |
| EP | 0308046 A2 | 3/1989 |
| EP | 0591585 A1 | 4/1994 |
| EP | 1117214 A2 | 7/2001 |
| EP | 1119837 A1 | 8/2001 |
| EP | 0978111 | 11/2001 |
| EP | 1738540 A2 | 1/2007 |
| EP | 1881716 A1 | 1/2008 |
| EP | 2112784 A1 | 10/2009 |
| EP | 2188794 A1 | 5/2010 |
| EP | 2191351 A1 | 6/2010 |
| EP | 2327063 A1 | 6/2011 |
| EP | 2483788 A1 | 8/2012 |
| EP | 2569712 A1 | 3/2013 |
| EP | 2619686 A1 | 7/2013 |
| EP | 2868039 A2 | 5/2015 |
| EP | 3031206 A2 | 6/2016 |
| EP | 3285238 A2 | 2/2018 |
| EP | 3308222 A1 | 4/2018 |
| FR | 2584217 A1 | 1/1987 |
| FR | 2661023 A1 | 10/1991 |
| FR | 2793334 A1 | 11/2000 |
| GB | 2222288 A | 2/1990 |
| GB | 2273593 A | 6/1994 |
| GB | 2286423 A | 8/1995 |
| GB | 2291554 A | 1/1996 |
| GB | 2319373 A | 5/1998 |
| GB | 2320644 A | 6/1998 |
| GB | 2324630 A | 10/1998 |
| GB | 2325548 A | 11/1998 |
| GB | 2335523 A | 9/1999 |
| GB | 2349293 A | 10/2000 |
| GB | 2370400 A | 6/2002 |
| GB | 2442628 A | 4/2008 |
| GB | 2442633 A | 4/2008 |
| GB | 2442640 A | 4/2008 |
| GB | 2428821 B | 6/2008 |
| IN | 45/2015 | 11/2015 |
| IN | 04/2016 | 1/2016 |
| JP | 63-033088 A | 2/1988 |
| JP | 05-167712 A | 7/1993 |
| JP | 06-339183 A | 12/1993 |
| JP | 08-227491 A | 9/1996 |
| JP | 10-004451 A | 1/1998 |
| JP | 2000-006343 A | 1/2000 |
| JP | 2000-023146 A | 1/2000 |
| JP | 2000-278671 A | 10/2000 |
| JP | 2001-006088 A | 1/2001 |
| JP | 2001-006343 A | 1/2001 |
| JP | 2001-069209 A | 3/2001 |
| JP | 2002-055895 A | 2/2002 |
| JP | 2002-185629 | 6/2002 |
| JP | 2003-085258 A | 3/2003 |
| JP | 2003-141659 A | 5/2003 |
| JP | 2003-281647 A | 10/2003 |
| JP | 2004-192659 A | 7/2004 |
| JP | 2006-094394 A | 4/2006 |
| JP | 2007-529826 A | 10/2007 |
| JP | 2010-140091 A | 6/2010 |
| KR | 10-2006-0021605 A | 3/2006 |
| KR | 10-0771941 B1 | 10/2007 |
| TW | 340934 B | 9/1998 |
| TW | I239176 B | 9/2005 |
| TW | I340934 B | 4/2011 |
| TW | I480839 B | 4/2015 |
| TW | I480840 B | 4/2015 |
| TW | I509579 B | 11/2015 |
| TW | I517106 B | 1/2016 |
| WO | 89/07855 A1 | 8/1989 |
| WO | 89/11187 A1 | 11/1989 |
| WO | 94/03881 A1 | 2/1994 |
| WO | 95/13944 A1 | 5/1995 |
| WO | 96/36301 A1 | 11/1996 |
| WO | 97/13230 A2 | 4/1997 |
| WO | 98/25243 A1 | 6/1998 |
| WO | 98/49663 A1 | 11/1998 |
| WO | 98/52343 A1 | 11/1998 |
| WO | 98/59256 A2 | 12/1998 |
| WO | 99/34339 A2 | 7/1999 |

(56) References Cited

FOREIGN PATENT DOCUMENTS

| | | |
|---|---|---|
| WO | 00/21053 A1 | 4/2000 |
| WO | 00/36812 | 6/2000 |
| WO | 00/72598 A1 | 11/2000 |
| WO | 01/11586 A1 | 2/2001 |
| WO | 01/52478 A2 | 7/2001 |
| WO | 01/71489 A1 | 9/2001 |
| WO | 01/99078 A2 | 12/2001 |
| WO | 02/11444 A1 | 2/2002 |
| WO | 02/21300 A1 | 3/2002 |
| WO | 02/97584 A2 | 12/2002 |
| WO | 2002/100083 | 12/2002 |
| WO | 2003/026305 A1 | 3/2003 |
| WO | 03/40839 A1 | 5/2003 |
| WO | 2004/004222 A1 | 1/2004 |
| WO | 2004/098127 A1 | 11/2004 |
| WO | 2004/107710 A1 | 12/2004 |
| WO | 2005/091218 A2 | 9/2005 |
| WO | 2007/038872 A1 | 4/2007 |
| WO | 2007/124453 A2 | 11/2007 |
| WO | 2008/056320 A1 | 5/2008 |
| WO | 2009/006670 A1 | 1/2009 |
| WO | 2009/023647 A1 | 2/2009 |
| WO | 2009/029590 A1 | 3/2009 |
| WO | 2009/029597 A1 | 3/2009 |
| WO | 2009/064795 A1 | 5/2009 |
| WO | 2009/145747 A1 | 12/2009 |
| WO | 2010/019624 A1 | 2/2010 |
| WO | 2010/025468 A1 | 3/2010 |
| WO | 2010/127009 A1 | 11/2010 |
| WO | 2010/127194 A2 | 11/2010 |
| WO | 2010/127200 A1 | 11/2010 |
| WO | 2010/127203 A1 | 11/2010 |
| WO | 2011/038409 A1 | 3/2011 |
| WO | 2011/063354 A1 | 5/2011 |
| WO | 2011/143273 A1 | 11/2011 |
| WO | 2012/040653 A1 | 3/2012 |
| WO | 2014/004911 A2 | 1/2014 |
| WO | 2015/021469 A2 | 2/2015 |
| WO | 2015/134520 A1 | 9/2015 |
| WO | 2016/201033 A1 | 12/2016 |
| ZA | 201302668 | 6/2014 |

OTHER PUBLICATIONS

Visitalk, Communication with Vision, http://www.visitalk.jimbo.com; website accessed Jan. 10, 2018.
GrayElectronics, http://www.grayelectronics.com; webpage accessed on Jan. 10, 2018.
Genex Technologies, Genex OmniEye, www.av-iq.com/avcat/images/documents/pdfs/omnieye%20nightwatch_brochure.pdf; webpage accessed Jan. 10, 2018.
Foreign communication from a related counterpart application—International Search Report, App No. PCT/US02/14450, dated Dec. 17, 2002, 6 pgs.
Foreign communication from a related counterpart application—International Preliminary Examination Report, App No. PCT/US02/14450, dated Mar. 2, 2004, 4 pgs.
Yanni Zhai et al., Design of Smart Home Remote Monitoring System Based on Embedded System, 2011 IEEE 2nd International Conference on Computing, Control and Industrial Engineering, vol. 2, pp. 41-44.
visitalk.com-communication with vision, http://www.visitalk.com.
US Patent Application filed Nov. 30, 2017, entitled "Controller and Interface for Home Security, Monitoring and Automation Having Customizable Audio Alerts for SMA Events", U.S. Appl. No. 15/828,030.
US Patent Application filed Nov. 28, 2017, entitled "Forming a Security Network Including Integrated Security System Components", U.S. Appl. No. 15/824,503.
US Patent Application filed Oct. 27, 2017, entitled "Security System With Networked Touchscreen", U.S. Appl. No. 15/796,421.
US Patent Application filed Oct. 13, 2017, entitled "Notification of Event Subsequent to Communication Failure With Security System", U.S. Appl. No. 15/783,858.
US Patent Application filed Aug. 9, 2016, entitled "Controller and Interface for Home Security, Monitoring and Automation Having Customizable Audio Alerts for SMA Events", U.S. Appl. No. 15/232,135.
US Patent Application filed Aug. 8, 2016, entitled "Security, Monitoring and Automation Controller Access and Use of Legacy Security Control Panel Information", U.S. Appl. No. 15/231,273.
US Patent Application filed Jul. 28, 2016, entitled "Method and System for Automatically Providing Alternate Network Access for Telecommunications", U.S. Appl. No. 15/222,416.
US Patent Application filed Mar. 10, 2014, entitled "Communication Protocols Over Internet Protocol (IP) Networks", U.S. Appl. No. 14/202,579.
US Patent Application filed Mar. 10, 2014, entitled "Communication Protocols Over Internet Protocol (IP) Networks", U.S. Appl. No. 14/202,505.
US Patent Application filed Mar. 10, 2014, entitled "Communication Protocols in Integrated Systems", U.S. Appl. No. 14/203,219.
US Patent Application filed Mar. 10, 2014, entitled "Communication Protocols in Integrated Systems", U.S. Appl. No. 14/203,141.
US Patent Application filed Mar. 10, 2014, entitled "Communication Protocols in Integrated Systems", U.S. Appl. No. 14/203,128.
US Patent Application filed Mar. 10, 2014, entitled "Communication Protocols in Integrated Systems", U.S. Appl. No. 14/203,084.
US Patent Application filed Mar. 10, 2014, entitled "Communication Protocols in Integrated Systems", U.S. Appl. No. 14/203,077.
US Patent Application filed Mar. 10, 2014, entitled "Communication Protocols in Integrated Systems", U.S. Appl. No. 14/202,685.
US Patent Application filed Mar. 10, 2014, entitled "Communication Protocols in Integrated Systems", U.S. Appl. No. 14/202,627.
US Patent Application filed Mar. 10, 2014, entitled "Communication Protocols in Integrated Systems", U.S. Appl. No. 14/202,592.
US Patent Application filed Mar. 10, 2014, entitled "Communication Protocols in Integrated Systems", U.S. Appl. No. 14/202,573.
US Patent Application filed Mar. 7, 2014, entitled "Security System Integrated With Social Media Platform", U.S. Appl. No. 14/201,133.
US Patent Application filed Mar. 7, 2014, entitled "Integrated Security and Control System With Geofencing", U.S. Appl. No. 14/201,189.
US Patent Application filed Mar. 7, 2014, entitled "Device Integration Framework", U.S. Appl. No. 14/201,227.
US Patent Application filed Mar. 7, 2014, entitled "Communication Protocols in Integrated Systems", U.S. Appl. No. 14/200,921.
US Patent Application filed Mar. 7, 2014, entitled "Activation of Gateway Device", U.S. Appl. No. 14/201,162.
US Patent Application filed Mar. 2, 2017, entitled "Generating Risk Profile Using Data of Home Monitoring and Security System", U.S. Appl. No. 15/447,982.
Shang, Wei-lai, Study on Application of Embedded Intelligent Area System, Journal of Anyang Institute of Technology, vol. 9, No. 6, pp. 56-57 and 65.
PCT Application filed on Nov. 17, 2016, entitled "Mobile Premises Automation Platform", PCT/US2016/062519.
PCT Application filed on Oct. 13, 2016, entitled "Coordinated Control of Connected Devices in a Premise", PCT/US2016/056842.
PCT Application filed on Aug. 17, 2016, entitled "Automation System User Interface", PCT/US2016/047262.
PCT Application filed on Aug. 16, 2016, entitled "Automation System User Interface", PCT/US2016/047172.
PCT Application filed on Jul. 7, 2016, entitled "Automation System User Interface with Three-Dimensional Display", PCT/US2016/041353.
PCT Application filed on Jun. 30, 2016, entitled "Integrated Cloud System with Lightweight Gateway for Premises Automation", PCT/US2016/040451.
PCT Application filed on Jun. 29, 2016, entitled "Integrated Cloud System for Premises Automation", PCT/US2016/040046.
PCT Application filed on Jun. 9, 2016, entitled "Virtual Device Systems and Methods", PCT/US2016/036674.
Indian Patent App. No. 10698/DELNP/2012, corresponds to WO2011/143273.

(56) References Cited

OTHER PUBLICATIONS

GTI Genex Technologies, Inc. OmniEye.(Trademark). Product Brochure, Sep. 14, 1999 (5 pages).
GrayElectronics, http://www.grayelectronics.com/default.htm.
GrayElectronics, "Digitizing TV cameras on TCP/IP Computer Networks," http://www.grayelectronics.com/default.htm, printed on Oct. 12, 1999 (2 pages).
Genex OmniEye, http://www.genextech.com/prod01.htm.
EP application filed on Aug. 16, 2017, entitled, "Automation System User Interface", 17186497.8.
EP application filed on Jun. 9, 2016, entitled, "Data Model for Home Automation", 16808247.7.
Elwahab et al.; Device, System and . . . Customer Premises Gateways; Sep. 27, 2001; WO 01/71489.
CA application filed on Aug. 16, 2017, entitled "Automation System User Interface", 2976802.
CA application filed on Aug. 15, 2017, entitled "Automation System User Interface", 2976682.
AU application filed on Mar. 8, 2017, entitled "Integrated Security Network with Security Alarm Signaling System", 2017201585.
AU application filed on Feb. 28, 2017, entitled "Control System User Interface", 2017201365.
Non-Final Office Action dated Feb. 7, 2012 for U.S. Appl. No. 12/637,671, filed Dec. 14, 2009.
Non-Final Office Action dated May 5, 2010 for U.S. Appl. No. 12/189,785, filed Aug. 11, 2008.
Non-Final Office Action dated May 5, 2010 for U.S. Appl. No. 12/189,780, filed Aug. 11, 2008.
Non-Final Office Action dated Mar. 4, 2013 for U.S. Appl. No. 13/400,477, filed Feb. 20, 2012.
Non-Final Office Action dated Apr. 4, 2013 for U.S. Appl. No. 12/197,931, filed Aug. 25, 2008.
Network Working Group, Request for Comments H.Schulzrinne Apr. 1998.
Lagotek Wireless Home Automation System, May 2006 [retrieved on Aug. 22, 2012].
J. David Eisenberg, SVG Essentials: Producing Scalable Vector Graphics with XML. O'Reilly & Associates, Inc., Sebastopol, CA 2002.
International Search Report for Application No. PCT/US2014/050548, dated Mar. 18, 2015, 4 pages.
International Search Report for Application No. PCT/US13/48324, dated Jan. 14, 2014, 2 pages.
Indian Patent App. No. 3687/DELNP/2012, corresponds to WO2011/038409.
Indian Patent App. No. 10698/DELNP/2012, corresponds to WO2011/143273.
Gutierrez J.A., "On the Use of IEEE 802.15A to Enable Wireless Sensor Networks in Building Automation," Personal, Indoor and Mobile Radio Communications (PIMRC), 15th IEEE International Symposium, 2004, vol. 3, pp. 1865-1869.
Gong, Li, A Software architecture for open service gateways, Internet Computing, IEEE 5.1, Jan.-Feb. 2001, 64-70.
Gateway Registry Methods and Systems, U.S. Appl. No. 13/486,276.
Form PCT/ISA/237, "PCT Written Opinion ofthe International Searching Authority of the Application No. PCT/US08/83254," dated Jan. 14, 2009, 7 pages.
Form PCT/ISA/237, "PCT Written Opinion of the International Searching Authority for the Application No. PCT/US11/53136," dated Jan. 5, 2012.
Form PCT/ISA/237, "PCT Written Opinion of the International Searching Authority for the Application No. PCT/US11/35994," dated Sep. 28, 2011, 11 pages.
Form PCT/ISA/237, "PCT Written Opinion of the International Searching Authority for the Application No. PCT/US11/34858," dated Oct. 3, 2011, 8 pages.
Form PCT/ISA/237, "PCT Written Opinion of the International Searching Authority for the Application No. PCT/US10/57674," dated Mar. 2, 2011, 6 pages.
Form PCT/ISA/237, "PCT Written Opinion of the International Searching Authority for the Application No. PCT/US10/50585," dated Dec. 30, 2010, 7 pages.
Form PCT/ISA/237, "PCT Written Opinion of the International Searching Authority for the Application No. PCT/US09/55559," dated Nov. 12, 2009, 6 pages.
Form PCT/ISA/237, "PCT Written Opinion of the International Searching Authority for the Application No. PCT/US09/53485," dated Oct. 22, 2009, 8 pages.
Form PCT/ISA/237, "PCT Written Opinion of the International Searching Authority for the Application No. PCT/US08/74260," dated Nov. 13, 2008, 6 pages.
Form PCT/ISA/237, "PCT Written Opinion of the International Searching Authority for the Application No. PCT/US08/74246," dated Nov. 14, 2008, 6 pages.
Form PCT/ISA/237, "PCT Written Opinion of the International Searching Authority for the Application No. PCT/US08/72831," dated Nov. 4, 2008, 6 pages.
Form PCT/ISA/237, "PCT Written Opinion ofthe International Searching Authority for the Application No. PCT/US0S/08766," dated May 23, 2006, 5 pages.
Form PCT/ISA/220, PCT Notification of Transmittal of the International Search Report and the Written Opinion of the International Searching Authority, or the Declaration for the Application No. PCT/US05/08766, dated May 23, 2006, 1 page.
Form PCT/ISA/220, "PCT Notification of Transmittal of the International Search Report and the Written Opinion of the International Searching Authority, or the Declaration for the Application No. PCT/US11/35994," dated Sep. 28, 2011, 1 page.
Form PCT/ISA/220, "PCT Notification of Transmittal of the International Search Report and the Written Opinion of the International Searching Authority, or the Declaration for the Application No. PCT/US10/57674," dated Mar. 2, 2011, 1 page.
Form PCT/ISA/220, "PCT Notification of Transmittal of the International Search Report and the Written Opinion of the International Searching Authority, or the Declaration for the Application No. PCT/US10/50585," dated Dec. 30, 2010, 1 page.
Form PCT/ISA/220, "PCT Notification of Transmittal of the International Search Report and the Written Opinion of the International Searching Authority, or the Declaration for the Application No. PCT/US09/55559," dated Nov. 12, 2009, 1 page.
Form PCT/ISA/220, "PCT Notification of Transmittal of the International Search Report and the Written Opinion of the International Searching Authority, or the Declaration for the Application No. PCT/US09/53485," dated Oct. 22, 2009, 1 page.
Form PCT/ISA/220, "PCT Notification of Transmittal of the International Search Report and the Written Opinion of the International Searching Authority, or the Declaration for the Application No. PCT/US08/83254," dated Jan. 14, 2009, 1 page.
Form PCT/ISA/220, "PCT Notification of Transmittal of the International Search Report and the Written Opinion of the International Searching Authority, or the Declaration for the Application No. PCT/US08/74246" dated Nov. 14, 2008, 1 page.
Form PCT/ISA/220, "PCT Notification of Transmittal of the International Search Report and the Written Opinion of the International Searching Authority, or the Declaration for the Application No. PCT/US08/72831," dated Nov. 4, 2008, 1 page.
Form PCT/ISA/220, "PCT Notification of Transmittal of the International Search Report and the Written Opinion fo the International Searching Authority, or the Declaration for the Application No. PCT/US08/74260," dated Nov. 13, 2008, 1 page.
Form PCT/ISA/210, "PCT International Search Report for the Application No. PCT/US11/53136," dated Jan. 5, 2012, 2 pages.
Form PCT/ISA/210, "PCT International Search Report for the Application No. PCT/US11/35994," dated Sep. 28, 2011, 2 pages.
Form PCT/ISA/210, "PCT International Search Report for the Application No. PCT/US11/34858)," dated Oct. 3, 2011, 2 pages.
Form PCT/ISA/210, "PCT International Search Report for the Application No. PCT/US10/57674," dated Mar. 2, 2011, 2 pages.
Form PCT/ISA/210, "PCT International Search Report for the Application No. PCT/US10/50585," dated Dec. 30, 2010, 2 pages.
Form PCT/ISA/210, "PCT International Search Report for the Application No. PCT/US09/55559," dated Nov. 12, 2009, 2 pages.

(56) References Cited

OTHER PUBLICATIONS

Form PCT/ISA/210, "PCT International Search Report for the Application No. PCT/US09/53485," dated Oct. 22, 2009, 2 pages.
Form PCT/ISA/210, "PCT International Search Report for the Application No. PCT/US08/83254," dated Jan. 14, 2009, 2 pages.
Form PCT/ISA/210, "PCT International Search Report for the Application No. PCT/US08/74260," dated Nov. 13, 2008, 2 pages.
Form PCT/ISA/210, "PCT International Search Report for the Application No. PCT/US08/74246," dated Nov. 14, 2008, 2 pages.
Form PCT/ISA/210, "PCT International Search Report for the Application No. PCT/US08/72831," dated Nov. 4, 2008, 2 pages.
Form PCT/ISA/210, "PCT International Search Report for the Application No. PCT/US05/08766," dated May 23, 2006, 2 pages.
Final Office Action dated Sep. 14, 2011 for U.S. Appl. No. 12/197,931, filed Aug. 25, 2008.
US Patent Application filed May 23, 2018, entitled "Networked Touchscreen With Integrated Interfaces", U.S. Appl. No. 15/987,638.
US patent application filed May 2, 2018, entitled "Automation System With Mobile Interface", U.S. Appl. No. 15/969,514.
X10—ActiveHome, Home Automation Made Easy [retrieved on Nov. 4, 2003], 3 pages.
WLS906 Photoelectric Smoke Alarm, Data Sheet, DSC Security Products, Ontario, Canada, Jan. 1998.
Wireless, Battery-Powered Smoke Detectors, Brochure, SafeNight Technology, Inc. Roanoke, VA, 1995.
Valtchev, D., and I. Frankov. "Service gateway architecture for a smart home." Communications Magazine, IEEE 40.4 (2002): 126-132.
Topalis E., et al., "A Generic Network Management Architecture Targeted to Support Home Automation Networks and Home Internet Connectivity, Consumer Electronics, IEEE Transactions," 2000, vol. 46 (1), pp. 44-51.
Supplementary Non-Final Office Action dated Oct. 28, 2010 for U.S. Appl. No. 12/630,092, filed Dec. 3, 2009.
Supplementary European Search Report for Application No. EP2191351, dated Jun. 23, 2014, 2 pages.
Supplementary Partial European Search Report for Application No. EP09807196, dated Nov. 17, 2014, 5 pages.
Supplementary European Search Report for Application No. EP11827671, dated Mar. 10, 2015, 2 pages.
Supplementary European Search Report for Application No. EP10819658, dated Mar. 10, 2015, 2 pages.
Supplemental European Search Report for Application No. EP05725743.8 dated Sep. 14, 2010, 2 pages.
South African Patent App. No. 2013/02668, corresponds to WO2012/040653.
Security for the Future, Introducing 5804B0—Advanced two-way wireless remote technology, Advertisement, ADEMCO Group, Syosset, NY, circa 1997.
Requirement for Restriction/Election dated Oct. 24, 2012 for U.S. Appl. No. 12/750,470, filed Mar. 30, 2010.
Requirement for Restriction/Election dated Jan. 22, 2013 for U.S. Appl. No. 13/104,936, filed May 10, 2011.
Requirement for Restriction/Election dated Jan. 22, 2013 for U.S. Appl. No. 13/104,932, filed May 10, 2011.
Notice of Allowance dated Oct. 25, 2012 for U.S. Appl. No. 11/084,232, filed Mar. 16, 2005.
Notice of Allowance dated May 14, 2013 for U.S. Appl. No. 12/637,671, filed Dec. 14, 2009.
Non-Final Office Action dated May 23, 2013 for U.S. Appl. No. 13/104,936, filed May 10, 2011.
Non-Final Office Action dated May 23, 2013 for U.S. Appl. No. 13/104,932, filed May 10, 2011.
Non-Final Office Action dated Jan. 5, 2010 for U.S. Appl. No. 12/019,554, filed Jan. 24, 2008.
Non-Final Office Action dated Feb. 21, 2013 for U.S. Appl. No. 12/771,372, filed Apr. 30, 2010.
Non-Final Office Action dated Apr. 13, 2010 for U.S. Appl. No. 11/761,745, filed Jun. 12, 2007.
Non-Final Office Action dated May 30, 2008 for U.S. Appl. No. 11/084,232, filed Mar. 16, 2005.
Non-Final Office Action dated Dec. 30, 2009 for U.S. Appl. No. 11/084,232, filed Mar. 16, 2005.
Non-Final Office Action dated Jun. 27, 2013 for U.S. Appl. No. 12/019,568, filed Jan. 24, 2008.
Non-Final Office Action dated Nov. 26, 2010 for U.S. Appl. No. 12/197,958, filed Aug. 25, 2008.
Non-Final Office Action dated Jan. 26, 2012 for U.S. Appl. No. 12/019,568, filed Jan. 24, 2008.
Non-Final Office Action dated Jul. 22, 2013 for U.S. Appl. No. 12/630,092, filed Dec. 3, 2009.
Non-Final Office Action dated Dec. 22, 2010 for U.S. Appl. No. 12/197,931, filed Aug. 25, 2008.
Non-Final Office Action dated Jul. 21, 2010 for U.S. Appl. No. 12/630,092, filed Dec. 3, 2009.
Non-Final Office Action dated Jan. 18, 2012 for U.S. Appl. No. 12/771,071, filed Apr. 30, 2010.
Non-Final Office Action dated Feb. 18, 2011 for U.S. Appl. No. 12/630,092, filed Dec. 3, 2009.
Non-Final Office Action dated Aug. 18, 2011 for U.S. Appl. No. 12/197,958, filed Aug. 25, 2008.
Non-Final Office Action dated Sep. 17, 2012 for U.S. Appl. No. 12/189,780, filed Aug. 11, 2008.
Non-Final Office Action dated Sep. 16, 2011 for U.S. Appl. No. 12/539,537, filed Aug. 11, 2009.
Non-Final Office Action dated Sep. 14, 2010 for U.S. Appl. No. 11/084,232, filed Mar. 16, 2005.
Non-Final Office Action dated Nov. 14, 2012 for U.S. Appl. No. 13/531,757, filed Jun. 25, 2012.
Non-Final Office Action dated Jul. 13, 2010 for U.S. Appl. No. 12/019,568, filed Jan. 24, 2008.
Non-Final Office Action dated Sep. 12, 2012 for U.S. Appl. No. 12/952,080, filed Nov. 22, 2010.
Non-Final Office Action dated Oct. 12, 2012 for U.S. Appl. No. 12/630,092, filed Dec. 3, 2009.
Non-Final Office Action dated Jul. 12, 2012 for U.S. Appl. No. 12/691,992, filed Jan. 22, 2010.
Non-Final Office Action dated Apr. 12, 2012 for U.S. Appl. No. 12/770,365, filed Apr. 29, 2010.
Non-Final Office Action dated Oct. 11, 2012 for U.S. Appl. No. 12/019,568, filed Jan. 24, 2008.
Non-Final Office Action dated Aug. 10, 2012 for U.S. Appl. No. 12/771,471, filed Apr. 30, 2010.
Non-Final Office Action dated Dec. 9, 2008 for U.S. Appl. No. 11/084,232, filed Mar. 16, 2005.
Non-Final Office Action dated Apr. 9, 2012 for U.S. Appl. No. 12/771,624, filed Apr. 30, 2010.
Non-Final Office Action dated Feb. 8, 2012 for U.S. Appl. No. 12/630,092, filed Dec. 3, 2009.
Non-Final Office Action dated Feb. 7, 2013 for U.S. Appl. No. 12/970,313, filed Dec. 16, 2010.
Final Office Action dated Jul. 12, 2010 for U.S. Appl. No. 12/019,554, filed Jan. 24, 2008.
Final Office Action dated Feb. 16, 2011 for U.S. Appl. No. 12/019,568, filed Jan. 24, 2008.
Final Office Action dated Oct. 31, 2012 for U.S. Appl. No. 12/771,624, filed Apr. 30, 2010.
Final Office Action dated Dec. 31, 2012 for U.S. Appl. No. 12/770,365, filed Apr. 29, 2010.
Final Office Action dated Jun. 29, 2012 for U.S. Appl. No. 12/539,537, filed Aug. 11, 2009.
Final Office Action dated Feb. 26, 2013 for U.S. Appl. No. 12/771,471, filed Apr. 30, 2010.
Final Office Action dated Jul. 23, 2013 for U.S. Appl. No. 13/531,757, filed Jun. 25, 2012.
Final Office Action dated Mar. 21, 2013 for U.S. Appl. No. 12/691,992, filed Jan. 22, 2010.
Final Office Action dated Sep. 17, 2012 for U.S. Appl. No. 12/197,958, filed Aug. 25, 2008.
Final Office Action dated Oct. 17, 2012 for U.S. Appl. No. 12/637,671, filed Dec. 14, 2009.

(56) References Cited

OTHER PUBLICATIONS

Final Office Action dated Jan. 13, 2011 for U.S. Appl. No. 12/189,780, filed Aug. 11, 2008.
Final Office Action dated Jun. 10, 2011 for U.S. Appl. No. 11/084,232, filed Mar. 16, 2005.
Final Office Action dated Jan. 10, 2011 for U.S. Appl. No. 12/189,785, filed Aug. 11, 2008.
Final Office Action dated May 9, 2013 for U.S. Appl. No. 12/952,080, filed Nov. 22, 2010.
Final Office Action dated May 9, 2013 for U.S. Appl. No. 12/189,780, filed Aug. 11, 2008.
Final Office Action dated Jun. 5, 2012 for U.S. Appl. No. 12/771,071, filed Apr. 30, 2010.
Final Office Action dated Jun. 1, 2009 for U.S. Appl. No. 11/084,232, filed Mar. 16, 2005.
Final Office Action dated Aug. 1, 2011 for U.S. Appl. No. 12/630,092, filed Dec. 3, 2009.
Faultline, "AT&T Targets video home security as next broadband market"; Nov. 2, 2006; The Register; 2 Pages.
Examination Report under Section 18(3) re for UK Patent Application No. GB0724760.4, dated Jan. 30, 2008.
Examination Report under Section 18(3) re for UK Patent Application No. GB0724248.0, dated Jan. 30, 2008.
Examination Report under Section 18(3) re for UK Patent Application No. GB0724248.0, dated Jun. 4, 2008.
Examination Report under Section 18(3) re for UK Patent Application No. GB0620362.4, dated Aug. 13, 2007.
EP examination report issued in EP08797646.0, dated May 17, 2017, 11 pages.
Diaz, Redondo R P et al., Enhancing Residential Gateways: OSGI Service Composition, IEEE Transactions on Consumer Electronics, IEEE Service Center, New York, NY, US, vol. 53, No. 1, Feb. 1, 2007 (Feb. 1, 2007), pp. 87-95, XP011381790.
CorAccess Systems, Companion 6 User Guide, Jun. 17, 2002.
Control Panel Standard—Features for False Alarm Reduction, The Security Industry Association, SIA 2009, pp. 1-48.
Condry M et al., Open Service Gateway architecture overview, Industrial Electronics Society, 1999, IECON '99 Proceedings, The 25th Annual Conference of the IEEE, San Jose, CA, USA, Nov. 29-Dec. 3, 1999, Piscataway, NJ, USA, IEEE, US, vol. 2, Nov. 29, 1999 (Nov. 29, 1999), pp. 735-742, XP010366642.
Alarm.com—Interactive Security Systems, Product Advantages [retrieved on Nov. 4, 2003], 3 pages.
Alarm.com—Interactive Security Systems, Overview [retrieved on Nov. 4, 2003], 2 pages.
Alarm.com—Interactive Security Systems, Frequently Asked Questions [retrieved on Nov. 4, 2003], 3 pages.
Alarm.com—Interactive Security Systems, Elders [retrieved on Nov. 4, 2003], 1 page.
6270 Touch Screen Keypad Notes, Honeywell, Sep. 2006.
"Modular programming", The Authoritative Dictionary of IEEE Standard Terms. 7th ed. 2000.
"Application" The Authoritative Dictionary of IEEE Standard Terms. 7th ed. 2000.
US Patent Application filed Aug. 21, 2018, entitled "Premises System Management Using Status Signal", U.S. Appl. No. 16/107,568.
US Patent Application filed Aug. 23, 2019, entitled "Premises System Management Using Status Signal", U.S. Appl. No. 16/549,837.
US Patent Application filed Aug. 26, 2020, entitled "Automation System User Interface With Three-Dimensional Display", U.S. Appl. No. 17/003,550.
US Patent Application filed Sep. 6, 2018, entitled "Takeover of Security Network", U.S. Appl. No. 16/123,695.
US Patent Application filed Sep. 10, 2020, entitled "Security System With Networked Touchscreen", U.S. Appl. No. 17/017,519.
US Patent Application filed Sep. 11, 2020, entitled "Management Of Applications For A Device Located At A Premises", U.S. Appl. No. 17/018,901.
US Patent Application filed Sep. 17, 2018, entitled "Integrated Security System With Parallel Processing Architecture", U.S. Appl. No. 16/133,135.
US Patent Application filed Sep. 27, 2019, entitled "Control System User Interface", U.S. Appl. No. 16/585,481.
US Patent Application filed Sep. 28, 2018, entitled "Control System User Interface", U.S. Appl. No. 16/146,715.
US Patent Application filed Sep. 28, 2018, entitled "Forming a Security Network Including Integrated Security System Components and Network Devices", U.S. Appl. No. 16/147,044.
US Patent Application filed Sep. 11, 18, entitled "Premises Management Networking", U.S. Appl. No. 16/128,089.
US Patent Application filed Oct. 1, 2018, entitled "Integrated Security System With Parallel Processing Architecture", U.S. Appl. No. 16/148,387.
US Patent Application filed Oct. 1, 2018, entitled "Integrated Security System with Parallel Processing Architecture", U.S. Appl. No. 16/148,411.
US Patent Application filed Oct. 1, 2018, entitled "User Interface In A Premises Network", U.S. Appl. No. 16/148,572.
US Patent Application filed Oct. 3, 2018, entitled "Activation of a Home Automation Controller", U.S. Appl. No. 16/150,973.
US Patent Application filed Oct. 8, 2020, entitled "Communication Protocols in Integrated Systems", U.S. Appl. No. 17/065,841.
US Patent Application filed Oct. 10, 2018, entitled "Method and System for Providing Alternate Network Access", U.S. Appl. No. 16/156,448.
US Patent Application filed Oct. 12, 2020, entitled "Integrated Security System With Parallel Processing Architecture", U.S. Appl. No. 17/068,584.
US Patent Application filed Oct. 18, 2018, entitled "Generating Risk Profile Using Data Of Home Monitoring And Security System", U.S. Appl. No. 16/164,114.
US Patent Application filed Oct. 18, 2019, entitled "Wifi-to-Serial Encapsulation in Systems", U.S. Appl. No. 16/656,874.
US Patent Application filed Nov. 10, 2020, entitled "Integrated Cloud System for Premises Automation", U.S. Appl. No. 17/094,120.
US Patent Application filed Nov. 19, 2019, entitled "Integrated Cloud System With Lightweight Gateway for Premises Automation", U.S. Appl. No. 16/688,717.
US Patent Application filed Nov. 25, 2020, entitled "Premises Management Networking", U.S. Appl. No. 17/105,235.
US Patent Application filed Nov. 26, 2019, entitled "Communication Protocols Over Internet Protocol (IP) Networks", U.S. Appl. No. 16/696,657.
US Patent Application filed Nov. 29, 2018, entitled "Premise Management Systems And Methods", U.S. Appl. No. 16/204,442.
US Patent Application filed Dec. 9, 2020, entitled "Integrated Security System With Parallel Processing Architecture", U.S. Appl. No. 17/115,936.
US Patent Application filed Dec. 14, 2018, entitled "Communication Protocols Over Internet Protocol (IP) Networks", U.S. Appl. No. 16/221,299.
US Patent Application filed Dec. 27, 2018, entitled "Communication Protocols in Integrated Systems", U.S. Appl. No. 16/233,913.
US Patent Application filed Dec. 27, 2019, entitled "Premises Management Systems", U.S. Appl. No. 16/728,608.
Visitalk.com-communication with vision, http://www.visitalk.com (date unknown).
Wang et al., "A Large Scale Video Surveillance System with Heterogeneous Information Fusion and Visualization for Wide Area Monitoring," 2012 Eighth International Conference on Intelligent Information Hiding and Multimedia Signal Processing, Piraeus, 2012, pp. 178-181.
Windows Telecom Dictionary, Mar. 2005, pp. 937-938.
Windows, Newton's Telecom Dictionary, 21st Edition, Mar. 2005, 937-938.
"Associate". Merriaim-Webster.com Dictionary, Merriam-Webster, https://web.archive.org/web/20061209213742/https://www.merriam-webster.com/dictionary/associate. Dec. 9, 2006.
"dragging" The Authoritative Dictionary of IEEE Standard Terms. 7th ed. 2000, p. 337.

(56) References Cited

OTHER PUBLICATIONS

"File", The Authoritative Dictionary of IEEE Standard Terms. 7th ed. 2000, p. 432.
"Indicate". Merriam-Webster.com Dictionary, Merriam-Webster, https://web.archive.org/web/20061209080613/https://www.merriam-webster.com/dictionary/indicate. Dec. 9, 2006.
"icon", Newton's Telecom Dictionary, 21st ed., Mar. 2005.
3rd Generation Partnership Project! Technical Specification Group Services and System Aspects! Architecture enhancements to facilitate communications with packet data networks and application, Mar. 2015, 3GPP TS 23.682 V12.3.0, pp. 8-10. (Year: 2015).
6270 Touch Screen Keypad Notes, Floneywell, Sep. 2006.
Chapter 6, Securing TCP/IP, pp. 135-164, Oct. 12, 2004.
Gateway Registry Methods and Systems, U.S. Appl. No. 13/486,276, filed Jun. 1, 2012.
K. Lee, D. Murray, D. Hughes and W. Joosen, "Extending sensor networks into the Cloud using Amazon Web Services," 2010 IEEE International Conference on Networked Embedded Systems for Enterprise Applications, 2010.
Oxford Dictionary, Definition of "application", 2021, 2 pages (Year: 2021).
US Patent Application filed Jan. 3, 2019, entitled "Methods and Systems for Data Communication", U.S. Appl. No. 16/239,114.
US Patent Application filed Jan. 11, 2021, entitled "Premise Management Systems and Methods", U.S. Appl. No. 17/145,773.
US Patent Application filed Jan. 22, 2019, entitled "Data Model for Home Automation", U.S. Appl. No. 16/254,535.
US Patent Application filed Jan. 22, 2019, entitled "Premises System Automation", U.S. Appl. No. 16/254,480.
US Patent Application filed Jan. 23, 2020, entitled "Forming a Security Network Including Integrated Security System Components and Network Dev", U.S. Appl. No. 16/750,976.
US Patent Application filed Jan. 25, 2019, entitled "Communication Protocols in Integrated Systems, U.S. Appl. No. 16/257,706.
US Patent Application filed Jan. 28, 2019, entitled "Automation System User Interface With Three-Dimensional Display", U.S. Appl. No. 16/258,858.
US Patent Application filed Feb. 6, 2020, entitled "Activation Of Gateway Device", U.S. Appl. No. 16/784,159.
US Patent Application filed Feb. 9, 2021, entitled "Premises Management Networking", U.S. Appl. No. 17/171,398.
US Patent Application filed Mar. 2, 2020, entitled "Communication Protocols in Integrated Systems", U.S. Appl. No. 16/807,100.
US Patent Application filed Mar. 2, 2020, entitled "Coordinated Control of Connected Devices in a Premise", U.S. Appl. No. 16/807,028.
US Patent Application filed Mar. 11, 2020, entitled "Management of a Security System at a Premises", U.S. Appl. No. 16/816,134.
US Patent Application filed Mar. 15, 2021, entitled "Automation System User Interface", U.S. Appl. No. 17/202,279.
US Patent Application filed Mar. 17, 2021, entitled "Communication Protocols Over Internet Protocol (IP) Networks", U.S. Appl. No. 17/204,068.
US Patent Application filed Mar. 18, 2019, entitled "Server-Based Notification of Alarm Event Subsequent To Communication Failure With Armed Security System", U.S. Appl. No. 16/356,742.
US Patent Application filed Mar. 20, 2020, entitled "Security, Monitoring and Automation Controller Access and Use of Legacy Security Control Panel Information", U.S. Appl. No. 16/825,099.
US Patent Application filed Mar. 22, 2021, entitled "Premises Management Configuration and Control", U.S. Appl. No. 17/208,866.
US Patent Application filed Apr. 8, 2021, entitled "System For Data Routing In Networks", U.S. Appl. No. 17/301,605.
US Patent Application filed Apr. 17, 2020, entitled "Method and System for Providing Alternate Network Access", U.S. Appl. No. 16/852,072.
US Patent Application filed Apr. 17, 2020, entitled "Networked Touchscreen With Integrated Interfaces", U.S. Appl. No. 16/852,058.
US Patent Application filed Apr. 23, 2019, entitled "Control System User Interface", U.S. Appl. No. 16/391,625.
US Patent Application filed Apr. 26, 2019, entitled "Custom Content for Premises Management", U.S. Appl. No. 16/396,368.
US Patent Application filed May 10, 2021, entitled "Management of a Security System at a Premises", U.S. Appl. No. 17/316,402.
US Patent Application filed May 11, 2020, entitled "Control System User Interface", U.S. Appl. No. 16/871,151.
US Patent Application filed May 12, 2020, entitled "IP Device Discovery Systems and Methods", U.S. Appl. No. 15/930,029.
US Patent Application filed May 19, 2020, entitled "User Interface in a Premises Network", U.S. Appl. No. 16/878,099.
US Patent Application filed May 26, 2020, entitled "Premises Management Configuration and Control", U.S. Appl. No. 16/882,876.
US Patent Application filed Jun. 9, 2021, entitled "Premises Management Configuration and Control", U.S. Appl. No. 17/343,315.
US Patent Application filed Jun. 10, 2020, entitled "Method and System for Communicating With and Controlling an Alarm System From a Remote Server", U.S. Appl. No. 16/898,146.
US Patent Application filed Jun. 18, 2021, entitled "Controlling Data Routing Among Networks", U.S. Appl. No. 17/304,342.
US Patent Application filed Jun. 24, 2020, entitled "Method and System for Processing Security Event Data", U.S. Appl. No. 16/910,967.
US Patent Application filed Jun. 27, 2018, entitled "Activation Of Gateway Device", U.S. Appl. No. 16/020,499.
US Patent Application filed Jul. 2, 2019, entitled "Communication Protocols in Integrated Systems", U.S. Appl. No. 16/460,712.
US Patent Application filed Jul. 3, 2018, entitled "WIFI-To-Serial Encapsulation In Systems", U.S. Appl. No. 16/026,703.
US Patent Application filed Jul. 9, 2020, entitled "Automation System With Mobile Interface", U.S. Appl. No. 16/925,026.
US Patent Application filed Jul. 12, 2018, entitled "Integrated Security System with Parallel Processing Architecture", U.S. Appl. No. 16/034,132.
US Patent Application filed Jul. 20, 2018, entitled "Cross-Client Sensor User Interface in an Integrated Security Network", U.S. Appl. No. 16/041,291.
US Patent Application filed Jul. 26, 2019, entitled "Device Integration Framework", U.S. Appl. No. 16/522,949.
US Patent Application filed Aug. 9, 2018, entitled "Method and System for Processing Security Event Data", U.S. Appl. No. 16/059,833.
US Patent Application filed Jul. 26, 2021, entitled "Notification of Event Subsequent To Communication Failure With Security System", U.S. Appl. No. 17/443,427.
US Patent Application filed Jul. 30, 2021, entitled "Gateway Integrated With Premises Security System", U.S. Appl. No. 17/390,222.
US Patent Application filed Aug. 10, 2021, entitled "Media Content Management", U.S. Appl. No. 17/398,939.

\* cited by examiner

❶ When My

❷ Becomes

INTEGRATED CLOUD SYSTEM WITH LIGHTWEIGHT GATEWAY FOR PREMISES AUTOMATION

RELATED APPLICATIONS

This application claims the benefit of U.S. Patent Application No. 62/186,925, filed Jun. 30, 2015.

This application claims the benefit of U.S. Patent Application No. 62/186,974, filed Jun. 30, 2015.

This application claims the benefit of U.S. Patent Application No. 62/186,696, filed Jun. 30, 2015.

This application claims the benefit of U.S. Patent Application No. 62/186,825, filed Jun. 30, 2015.

This application claims the benefit of U.S. Patent Application No. 62/186,857, filed Jun. 30, 2015.

This application is a continuation in part application of U.S. patent application Ser. No. 15/196,646, filed Jun. 29, 2016, now abandoned.

This application is a continuation in part application of U.S. patent application Ser. No. 12/189,780, filed Aug. 11, 2008, now abandoned.

This application is a continuation in part application of U.S. patent application Ser. No. 13/531,757, filed Jun. 25, 2012, now abandoned.

This application is a continuation in part application of U.S. patent application Ser. No. 12/197,958, filed Aug. 25, 2008, now U.S. Pat. No. 10,721,087.

This application is a continuation in part application of U.S. patent application Ser. No. 13/334,998, filed Dec. 22, 2011, now U.S. Pat. No. 9,531,593.

This application is a continuation in part application of U.S. patent application Ser. No. 12/539,537, filed Aug. 11, 2009, now U.S. Pat. No. 10,156,959.

This application is a continuation in part application of U.S. patent application Ser. No. 14/645,808, filed Mar. 12, 2015, now U.S. Pat. No. 10,127,801.

This application is a continuation in part application of U.S. patent application Ser. No. 13/104,932, filed May 10, 2011, now abandoned.

This application is a continuation in part application of U.S. patent application Ser. No. 13/929,568, filed Jun. 27, 2013, now U.S. Pat. No. 10,444,964.

This application is a continuation in part application of U.S. patent application Ser. No. 14/628,651, filed Feb. 23, 2015, now U.S. Pat. No. 10,091,014.

This application is a continuation in part application of U.S. patent application Ser. No. 13/718,851, filed Dec. 18, 2012, now U.S. Pat. No. 10,156,831.

This application is a continuation in part application of U.S. patent application Ser. No. 12/972,740, filed Dec. 20, 2010, now U.S. Pat. No. 9,729,342.

This application is a continuation in part application of U.S. patent application Ser. No. 13/954,553, filed Jul. 30, 2013.

This application is a continuation in part application of U.S. patent application Ser. No. 14/943,162, filed Nov. 17, 2015, now U.S. Pat. No. 10,062,245.

This application is a continuation in part application of U.S. patent application Ser. No. 15/177,915, filed Jun. 9, 2016.

TECHNICAL FIELD

The embodiments described herein relate generally to networking and, more particularly, to premises automation systems and methods.

BACKGROUND

There is a need for systems and methods that integrate cloud services and internet-connected devices with a user interface and other components and functions of a service provider system. This integration would enable third party and/or other connected devices (e.g., smart door bells, door locks, garage door operators, cameras, thermostats, lighting systems, lighting devices, etc.), and third party services to control or trigger automations in the service provider system using components and functions of the service provider system. This would enable end-users to integrate and use their previously-standalone Internet-connected devices with each other as well as with their service provider-based service.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Embodiments include a cloud hub located in a premises, and the cloud hub comprises adapters configured for coupling to premises devices. The cloud hub is configured as a gateway for the premises devices. The system includes a virtual gateway located in a cloud server environment and coupled to the cloud hub. The virtual gateway is configured as a server-side abstraction of the cloud hub. The cloud hub and the virtual gateway are configured as an automation platform that maintains state data of the premises devices, controls interaction among the premises devices, and monitors and manages the premises devices.

Embodiments include a system comprising a cloud hub located in a premises. The cloud hub comprises adapters coupled to premises devices, and the cloud hub is configured as a gateway for the premises devices. A virtual gateway is located in a cloud server environment and coupled to the cloud hub. The virtual gateway is configured as a server-side abstraction of the cloud hub. The cloud hub and the virtual gateway are configured as an automation platform that maintains state data of the premises devices, controls interaction among the premises devices, and monitors and manages the premises devices. A security system coupled to the virtual gateway. The security system includes security system components.

Figure 1:
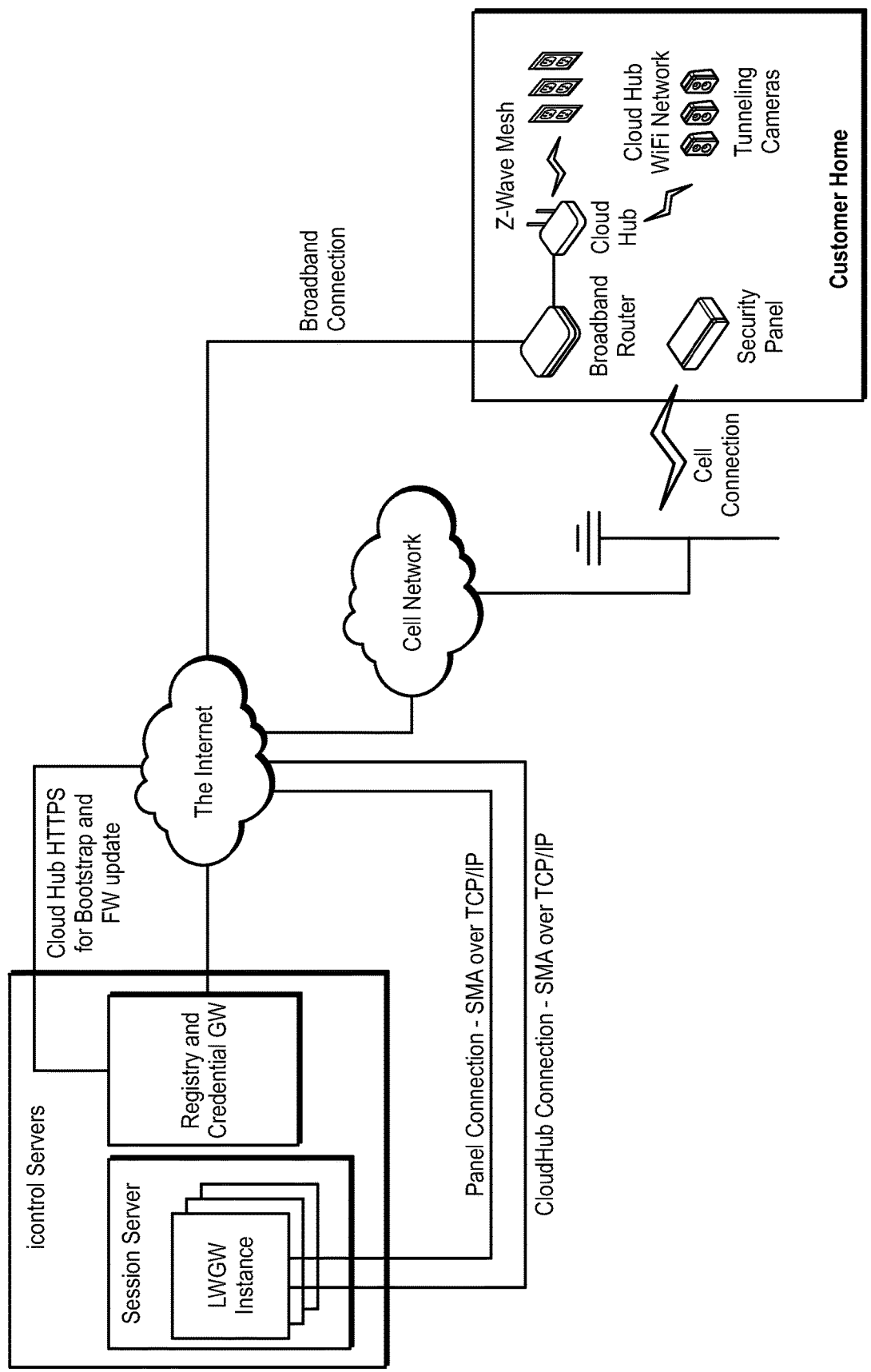
FIG. 1 is a block diagram of a system including a Cloud Hub (FlexCore) and Virtual Gateway, also referred to herein as the Lightweight Gateway (LWG), under an embodiment.

FIG. 1 is a block diagram of a system including a Cloud Hub and Virtual Gateway, also referred to herein as the Lightweight Gateway (LWG) or FlexCore, under an embodiment. The "Cloud Hub" is a dual purpose Z-Wave and Wi-Fi Access Point configured to enable full premises automation (e.g., Tier-1 sites). The Cloud Hub device couples or connects to the premises broadband connection and operates as a gateway for Z-Wave and camera traffic. Cloud Hub enables Z-Wave for premises and customer premises equipment (CPE) that do not currently support it, and provides a Wi-Fi sandbox for Direct Cameras. An example of a hardware platform configured as a Cloud Hub is the Sercomm NA301v2 device, but the embodiment is not so limited as numerous other devices can serve as the Cloud Hub. The detailed description herein includes aspects of the software and firmware of the Cloud Hub along with server and client application software.

Figure 2:
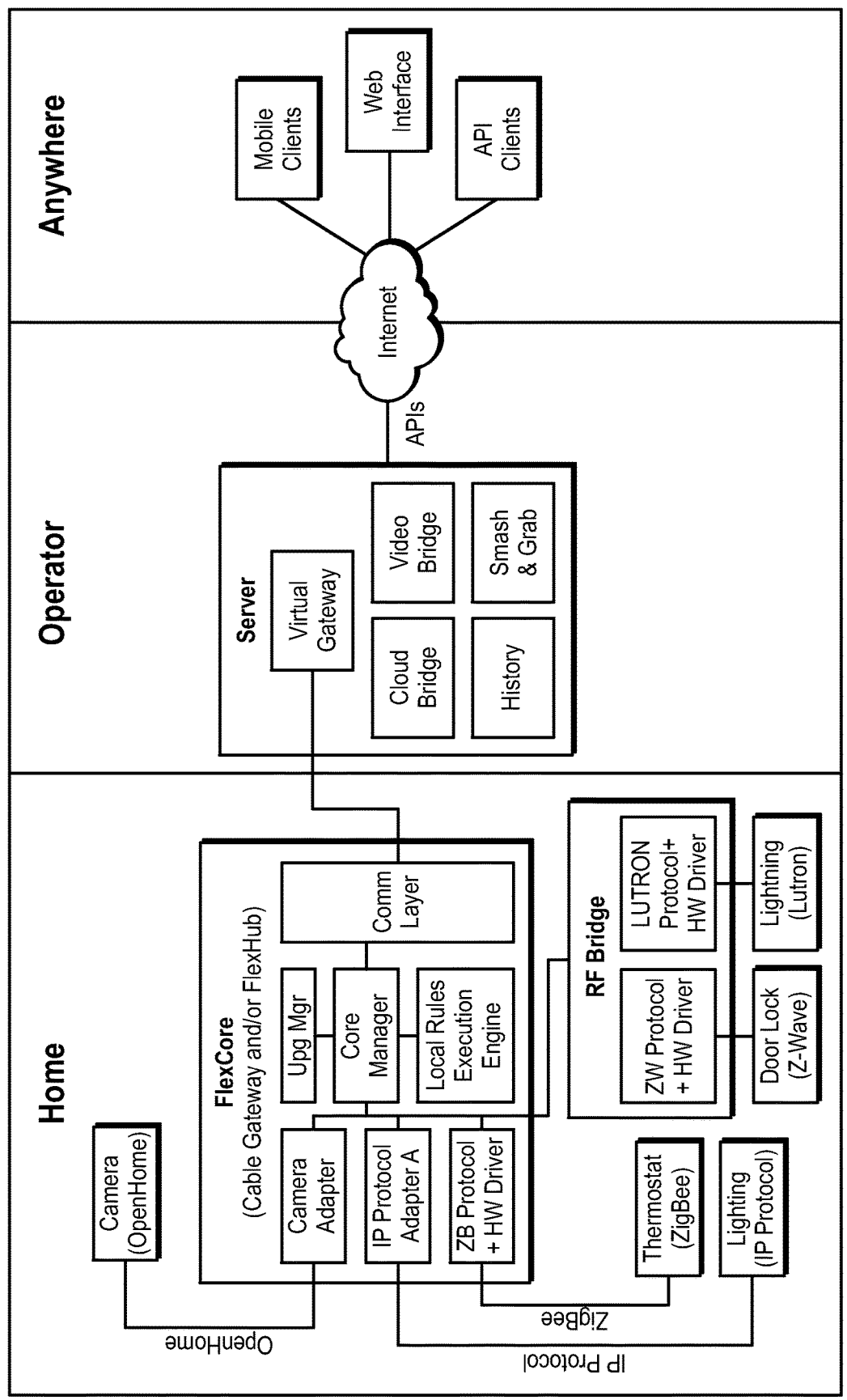
FIG. 2 is a block diagram of a system including a Cloud Hub and Virtual Gateway showing the premises, service provider, and mobile environments, under an embodiment.

FIG. 2 is a block diagram of a system including a Cloud Hub and Virtual Gateway showing the premises, service provider, and mobile environments, under an embodiment. The system of an embodiment includes the gateway (FlexCore) in the premises (e.g., home, office, etc.), and the gateway is coupled to a LWG in the operator (server/cloud) domain. The gateway includes one or more of a camera adapter to integrate premises cameras, an IP adapter to integrate premises IP devices, and a ZigBee protocol and hardware driver to integrate premises ZigBee devices. Components of the gateway of an embodiment are coupled to a radio frequency (RF) bridge as appropriate to a configuration of devices in the premises, and the RF bridge integrates additional premises devices (e.g., Z-Wave devices, proprietary devices, etc.) into the system.

The LWG and cloud-based infrastructure of an embodiment uses an existing service provider infrastructure, security, performance, and APIs, along with system components that are separated into modules executed on distributed in-premises systems. The LWG and cloud-based infrastructure includes a pluggable architecture that enables new device protocols and RF technologies to be added without the need to overhaul the core infrastructure. Use of a relatively small memory footprint on the CPE enables the infrastructure to execute on many devices, and this refactoring of local versus cloud services provides a virtual device (e.g., Internet of Things (IOT), etc.) gateway service that pushes as much as possible to the cloud while maintaining local performance and offline capabilities.

An embodiment includes a Lightweight Gateway (LWG) that is configured as the server-side abstraction for the Cloud Hub. The LWG is subordinate to the gateway object, and interacts with the server and the Cloud Hub device in much the same way that a RISSecurityPanel class does. As such, an embodiment re-factors the common code out of RISSecurityPanel into a class that both RISSecurityPanel and the Cloud Hub device can use. A new device definition is created for this type of device, and various changes to the StandardGateway class to control and manage the additional communication channel with the new device.

The Session Server configuration uses a gateway registry service to route incoming UDP packets from the CPE to the proper lightweight gateway instance via a one-to-one mapping of CPE-unique IDs to site IDs. With the addition of the Cloud Hub, a second CPE-unique ID is mapped to the same LWG instance as the primary security, monitoring and automation (SMA) client's CPE-unique ID. This is accomplished by leveraging the Device Registry, which maintains a mapping of CPE ID and device type to site ID. Further, the session server is modified to use this Device Registry to properly route income packets.

Regarding client application software or applications, the clients include UX additions to present the new Cloud Hub device. When the Cloud Hub is present, UX flow will potentially be different. For example, on a Cloud Hub system, Z-Wave devices are not added until the Cloud Hub is added. Also, deleting the Cloud Hub includes deleting the associated Z-Wave devices, and this uses special UX messaging. The activation app and the installer app will also need new flows for installing and managing these devices.

The Cloud Hub firmware of an example embodiment includes but is not limited to the following components: SMA Client: an always-on (i.e., always-TCP-connected) SMA client, supporting AES-256 encryption; ezwLib: port of the Icontrol embedded Z-Wave stack; Bootstrap Client for secure bootstrap of the master key, and then secure provisioning of the SMA Server connection information and initialization information; LED Driver to drive CPE LED that displays Server connectivity and Z-Wave status (CPE-dependent); Firmware Update Logic for fault-tolerant updates of the full CPE image (CPE-dependent); detailed/tunable error logging; Reset To Factory Default Logic for factory-default Z-Wave (erase node cache and security keys), WiFi (disable sandbox, reset SSID/PSK; CPE-dependent), and de-provision (erase SMA Server info).

In an example configuration, server-CPE communication is over SMAv1 protocol, except for bootstrapping and provisioning which uses the OpenHome "Off-Premise Bootstrap Procedure." On the CPE, the OS and network layer (Wi-Fi sandbox, WPS, routing, etc.) are provided and managed by the CPE OEM (e.g., Sercomm). Wi-Fi provisioning and traffic is handled by the CPE OEM (e.g., Sercomm) without Cloud Hub intervention/signaling, except with respect to enabling/disabling and resetting to defaults.

The Cloud Hub device installation and bootstrap mechanism performs one or more of the following: associate the device with an existing site; securely deliver the SMA communication configuration, including master key, SMA server address, and network ports. An embodiment includes an off-premise bootstrapping procedure, also used for bootstrapping tunneling cameras, that includes a three-step process.

Figure 3:
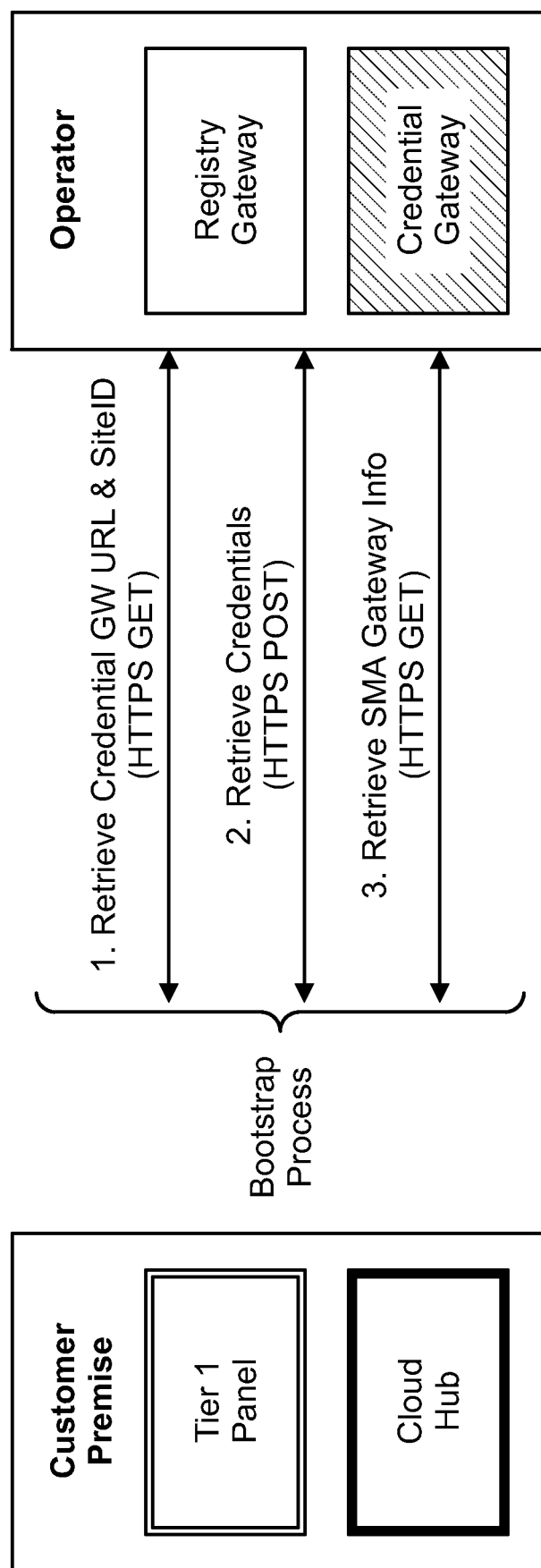
FIG. 3 is a flow diagram for Cloud Hub device installation, under an embodiment.

FIG. 3 is a flow diagram for Cloud Hub device installation, under an embodiment. During a first step, the Cloud Hub couples or connects to the Registry Gateway (e.g., via the pre-configured Registry Gateway URL) and retrieves its assigned siteID and the Credential Gateway URL. A second step includes the Cloud Hub retrieving its master key from the Credential Gateway using its siteID and Activation Key. A third step includes the Cloud Hub retrieving Session Gateway Information from the Credential Gateway. At the end of the Bootstrap phase, the Cloud Hub. of an embodiment has obtained its master key and its Session Gateway address from the iControl Gateway. Each of these steps is described in detail below.

During normal operation, the CPE performs the first and third processes on every start-up/restart. The second process is followed only if there is no previously stored master key. Hence, security credentials can be re-bootstrapped by invalidating the existing master key.

The Cloud Hub uses the first step process or procedure at least to retrieve its SiteID and Credential Gateway URL.

| | |
|---|---|
| Purpose | Retrieve Credential Gateway URL and siteID using Cloud Hub Serial Number as input |
| Message Format | HTTPS GET /<Registry Gateway URL>/<Serial Number> HTTP/1.1 |
| Authentication | None |
| Mandatory Request Headers | Host |
| 200 OK response | <registryEntry serial="<Serial Number>" href="/<Registry Gateway URL>/<Serial Number>"> <functions>...</functions > <siteId><siteID></siteId> <gatewayUrl><Credential Gateway URL></gatewayUrl> </registryEntry> |
| Error responses | Standard HTTP response codes (e.g., 404) |
| Example Request | https://adminsirius3.icontrol.com/rest/icontrol/registry/serial/00603504026c |
| Example 200 OK Response | <registryEntry serial="00:60:35:04:02:6c" href="/rest/icontrol/registry/serial/00603504026c"> <functions count="1"> <function name="delete" action="/rest/icontrol/registry/serial/00603504026c" method="DELETE"/> </functions> <siteId>00603504026c</siteId> <gatewayUrl>http://gsess-sirius3.icontrol.com/gw</gatewayUrl> </registryEntry> |

| Variable Name | Format | Description/Notes |
|---|---|---|
| Registry Gateway URL | URL | Pre-configured in Cloud Hub firmware |
| Serial Number | 12 byte hex string | Pre-configured in Cloud Hub firmware |
| siteID | 12-20 digit alpha numeric string | |
| gatewayUrl otherwise known as CredentialGatewayURL | URL prefix protocol:host[:port]/path | Prefix to use for Pending Master Key and Connect Info requests. |

The Cloud Hub uses the second step process or procedure at least to retrieve its Pending Master Key. If the Master Key is already established from a previous successful Retrieve Credital procedure, this step is optional.

| | |
|---|---|
| Purpose | Retrieve device-specific Master Key using its siteID, serial number and Activation Key as inputs |
| Message Format | HTTPS POST/<CredentialGatewayURL>/GatewayService/<siteID>/PendingDeviceKey HTTP/1.1 |
| Authentication | None |
| Mandatory Request Headers | Host, Content-Length, Content-Type (application/x-www-form-urlencoded) |
| POST body | serial=<Serial Number>&activationkey=<ActivationKey> |
| 200 OK response with pending master key | <pendingPaidKey method="server" expires="<pending master key expiration epoch millisecs>" ts="<current epoch millisecs>" key="<master key>" partner="icontrol"/> |
| 200 OK response with retry | Gateway responds with a method="retry" if the Cloud Hub is not yet activated within the system. Response includes timeout for retry.<br><PendingPaidKey method="retry" expires="<retry epoch millisecs>" ts="<current epoch millisecs>" partner="icontrol"/> |
| Other HTTP responses | Standard HTTP error response codes for example 5xx indicate a temporary server issue and Cloud Hub devices should perform an automatic retry in randomized 10 minute backoff. |
| Example POST body | serial=555500000010&activationkey=AABB12345678 |
| Example 200 OK with pending key Response | <pendingPaidKey method="server" expires="1308892493528" ts="1308849293540" key="398341159498190458" partner="icontrol"/> |
| Example 200 OK response with retry | <pendingPaidKey method="retry" expires="1308849242148" ts="1308849122148" partner="icontrol"/> |

| Variable Name | Format | Description/Notes |
|---|---|---|
| CredentialGatewayURL | Hostname[:port] | Retrieved via Step 1 - Retrieve Gateway URL and SiteID |
| siteID | 12 byte hexadecimal string | Retrieved via Step 1 - Retrieve Gateway URL and SiteID |
| ActivationKey | 10+ digit alpha numeric string | Pre-configured in Cloud Hub, generated by manufacturer and printed on device |
| 'method' (in 200 OK body) | String | "server" or "retry" |
| 'key' (in 200 OK body) | Alphanumeric string | Pending key returned by Gateway in 200 OK body |
| 'ts' (in 200 OK body) | Numeric string | Gateway's timestamp in UTC time |
| 'expires' (in 200 OK body) | Numeric string | UTC time when the current pending key expires |
| Pending Key | Alphanumeric string | Initial key retrieved from Gateway that is not yet confirmed with the Gateway. |
| SharedSecret or master key | Alphanumeric string | Pending key becomes <SharedSecret> after successful connection to Gateway (see below) |

During Cloud Hub activation, the Gateway responds to a Cloud Hub's request for Credential with 200 OK containing the PendingPaidKey XML body (with method="server") with a pending key field. The pending key field becomes active once the Cloud Hub connects to the Gateway over the SMA channel and is authenticated by using the pending key to encrypt the initial SMA exchange. Once authenticated (via a successful SMA session with the Gateway), the key is no longer pending and instead becomes active, or otherwise known as the Cloud Hub's<SharedSecret> or master key. The active master key ("<SharedSecret>") will not automatically expire; however, the Gateway may update a Cloud Hub's<SharedSecret>. Once a pending key becomes active, subsequent requests for the PendingDeviceKey will receive method="retry" responses unless a new activation process is initiated (this can be done by administrators and installers via the iControl admin and portal applications).

If the Cloud Hub does not connect to the server over the SMA channel and get authenticated using the key by the "expires" time specified in the PendingPaidKey XML body, then the pending key will expire and no longer be valid.

While Cloud Hub activation is underway, each request for the PendingPaidKey will receive a different key in the response, causing the previous pending key to be replaced with the new one. Upon a factory reset, the device will forget its key and return to the bootstrap process of polling for a PendingDeviceKey.

The Cloud Hub uses the third step process or procedure at least to retrieve Session Gateway Info, which includes SMA Gateway address.

| | |
|---|---|
| Purpose | Retrieve SMA Gateway hostname and port from Credential Gateway |
| Message Format | HTTPS GET /<gatewayUrl>/GatewayService/<siteID>/connectInfo HTTP/1.1 |
| Authentication | None |

| | |
|---|---|
| Mandatory Request Headers | Host |
| 200 OK response | <connectInfo><br>  <session host=<Session Gateway host> port=[port] /><ris eventPort1='[port]' eventPort2='[port]' controlPort1='[port]' controlPort2='[port]"/><br>  <xmpp host=<XMPP Gateway host> port=[port] /> (ignored)<br></connectInfo> |
| Error responses | Standard HTTP response codes (e.g., 404) |
| Example 200 OK Response | <connectInfo><br>  <session host='gsess-aristotleqap.icontrol.com' port='443'/><ris eventPort1='11083' eventPort2='11083' controlPort1='11084' controlPort2='11084'/><br>  <xmpp host='gsess-aristotleqap.icontrol.com' port='5222'/><media url='https://media-aristotleqap.icontrol.com/gw/GatewayService'></connectInfo> |

| Variable Name | Format | Description/Notes |
|---|---|---|
| gatewayUrl | https://hostname[:port]/path | Retrieved Via Step 1 - Retrieve Gateway URL and SiteID |
| siteID | 12-20 char alpha numeric string | Retrieved Via Step 1 - Retrieve Gateway URL and SiteID |
| XMPP Gateway host:port | Hostname and port IPAddress and port | These variables should be ignored by the Cloud Hub. |
| Session Gateway host | Hostname | Host and command port to use for SMA communication with the Gateway. |
| session:port | port | This port variable should be ignored by the Cloud Hub. |
| ris:eventPort1/2 | port | ports on Session Gateway host to which SMA async events should be sent |
| ris:controlPort1/2 | port | ports on Session Gateway host for establishing the SMA control channel |

The Cloud Hub of an embodiment is a broadband-connected device, and it attempts to maintain an always-on TCP/IP connection with the server. Therefore, there is no need for a shoulder-tap mechanism, as is provided via SMS on typical tier-1 systems. No "wake-up" message is used as the Cloud Hub is effectively always awake. With conventional Tier-1 systems, the server tears down the TCP connection after several minutes of inactivity; for Cloud Hub, the TCP connection should stay up for as long as possible, with periodic server-originated SMA heartbeat messages (SMA Request Type 0), so that the CPE can supervise the connection as being truly active.

Incoming messages (e.g., UDP) to the session server and the Device Registry from the CPE are routed to the LWG instance associated with a given site ID. In a conventional current pre-CloudHub configuration, the session server uses the Gateway Registry, which is a one to one mapping of CPE-unique IDs to site IDs for this purpose. With the addition of the Cloud Hub, a second CPE-unique ID is introduced that is mapped to the same site ID (LWG instance) as the primary SMA client's CPE-unique ID. This is accomplished by leveraging the Device Registry service, which maintains a mapping of CPE ID and device type to site ID. The session server of an embodiment, upon receipt of a UDP packet, looks up or identifies the received packet's CPE-unique ID in the Gateway Registry and, if a corresponding site ID is found, routes the packet to the associated LWG instance. If a corresponding site ID is not found, the session server looks up the received CPE-unique ID with a general Cloud Hub device type ID and, if a corresponding site ID is found, routes the packet to the associated LWG instance.

The LGW includes use of message tunneling over REST. The Cloud Hub, UDP and TCP messages coming from the CPE and received by the session server are sent to the correct LWG via two REST endpoints. This enables the receiving LWGW instance to run on a session server other than the one at which the message was received.

In an embodiment, when a UDP SMA message arrives at a session server, if the LWG corresponding to the CPE-unique ID message is not already running on the given session server, then the session server starts a new LWG instance there, and if the corresponding LWGW is currently running on another session server, it will be gracefully shut down. In this way, the LWG is configured to move from one session server to another.

In alternative embodiments, the security panel messages continue to use the mechanism described herein (LWG migration), however, the Cloud Hub network traffic employs a mechanism similar to that used by Tunneling Cameras. More specifically:

1) Incoming UDP message to session server #1: session server #1 checks if LWG is running on session server #1.
    If so, using a LocalRestClient, pass UDP message through to the LWG via a rest endpoint that calls through to the handleAsyncMessage method of the RIS device.
    If not, check an LWG routing cache to see which session server is hosting the LWG.
    If a routing entry is found, use AMQPRestClient to pass the UDP message through to the specific session server hosting the LWG via the same rest endpoint that calls through to the handleAsyncMessage method of the RIS device.
    If no routing entry is found, or the session server returns 404 (e.g., stale routing entry), then the session server sends out a broadcast request using the AMQPRestClient to ask all session servers "who has this LWG".

If a session server responds to the broadcast request, send the async event to that session server as described herein.

If no session server responds to the broadcast request, start the LWG on this session server (session server #1).

2) Incoming TCP message to session server #1: session server #1 checks if LWG is running on session server #1.

Use process described in 1 above to determine which session server is hosting the LWG and pass the TCP message through accordingly, but using a different rest endpoint than UDP message handling. In the rest endpoint call, the name of the session server with the TCP connection is sent along with the request.

When the LWG receives TCP messages through the rest endpoint, it keeps track of the name of the session server with the TCP connection. The tunnel camera does this using a variable on the camera device and the cloud hub device could do the same.

3) Sending a command from LWG over TCP connection.

When the LWG sends a command over the TCP connection, it sends a command via the AMQPRestClient to the session server hosting the TCP connection. It has this name saved from when it received the first TCP message for the given connection.

If the TCP session server hostname is not known, or responds with a 404 (e.g., TCP connection no longer there), then the LWG sends out a broadcast request using the AMQPRestClient to ask all session servers "who has this TCP connection".

If a session server responds to the broadcast request, send the command to that session server as described herein.

If no session server responds to the broadcast request, then the LWG queues the command for a short time period (e.g., existing RIS device functionality).

The CloudHub firmware update of an embodiment is accomplished over an HTTPS connection from the CloudHub to a secure server, to download an entire bundled CPE image. This single image includes the CloudHub updatable firmware, including: OS image and drivers; SMA Client, which includes code for bootstrapping, AES-256 encryption, LED driver, firmware update logic, etc.; ezwLib Z-Wave stack.

A firmware update is initiated on the server by sending SMAv1 System Command (command type 31) with Sub-Command "Upgrade Client Firmware" (system command type 3). This command simply provides a URL pointing to the new firmware image. This will be an HTTPS URL for secure transfer of the image. When the Cloud Hub receives this command, it downloads the image from a secure server via HTTPS, verifies a digest checksum, and flashes the new image.

Progress of the image download is communicated by the CloudHub by sending async event "Firmware upgrade % completed" (CPE Report Type 12); flashing progress is communicated by the CloudHub setting/clearing system status "Firmware Update Start" (Miscellaneous System Status 15).

Flashing a new firmware image does not factory-default the device, and existing configuration, provisioning information, and encryption keys are retained. CloudHub of an embodiment is configured to use either a dual-image scheme or re-flashing bootloader, so that a power-cycle during image flashing will not brick CloudHub.

The SMA Client is configured to flash the Z-Wave chip firmware, when directed to do so via SMAv1 System Command (command type 31) with Sub-Command "Upgrade Client Firmware" (system command type 3), specifying a Z-Wave-specific filename.

SMAv1 security for tier-1 panel communication is enhanced by the out-of-band SMS channel from the server to the CPE. The cellular network is a more restricted private network relative to a broadband network, and this is advantageous for re-keying the master key, when needed. Since CloudHub of an embodiment is configured as an always-on TCP/IP connected device, another process is used in which a REST endpoint is created that uses an SMA set config command to "clear" the current master key and restart. Upon restart, when the CPE discovers it has no master key, it performs the bootstrap as described herein to obtain a new master key.

The Lightweight Gateway (LWG) is a general term for the gateway state machine that runs on the server, as described herein. There is also a gateway state machine that runs in the home and this is commonly referred to as the iHub, although that code can run on other CPE hardware. The gateway state machine is configured to maintain track of the state of CPE devices such as security panels and cameras. The gateway monitors and manages these devices, and also runs the rules engine and exports the gateway core API which includes all endpoints that begin with the prefix "/rest/[partner]/nw/[siteId]".

The Lightweight Gateway is used for example when there is no conventional gateway in the home. In this configuration, devices like the security panel and cameras talk directly to the server either using the cellular network or using the premises broadband network.

The Lightweight Gateway of an embodiment communicates with a variety of security panels and protocols. The security panels include the Honeywell QC3/Lynx and QC5/Touch, which use a proprietary RIS/ECP protocol (Honeywell). The security panels also include DSC SCW and PowerSeries, which use the iControl SMA V1 protocol. The LWG also communicates or integrates with the 2 Gig Telular panel, which uses the iControl SMA V1 protocol and supports ZWave devices like switches, dimmers, thermostats and locks. In this configuration, the 2 Gig panel performs the role of the zwave device manager.

The LWG also communicates or integrates with the Honeywell TSS panel, which uses the iControl SMA V2 protocol and allows for complete remote panel programming via SMA. The security panels to which the LWG communicates also include 3GUC panels, which use SMA V1 protocol and can connect to SimonXT and other panels.

The LGW of an embodiment supports an XMPP Tunnel Camera (e.g., OpenHome). This camera couples or connects to the server via broadband using the corresponding protocol tunneled over XMPP.

Figure 4:
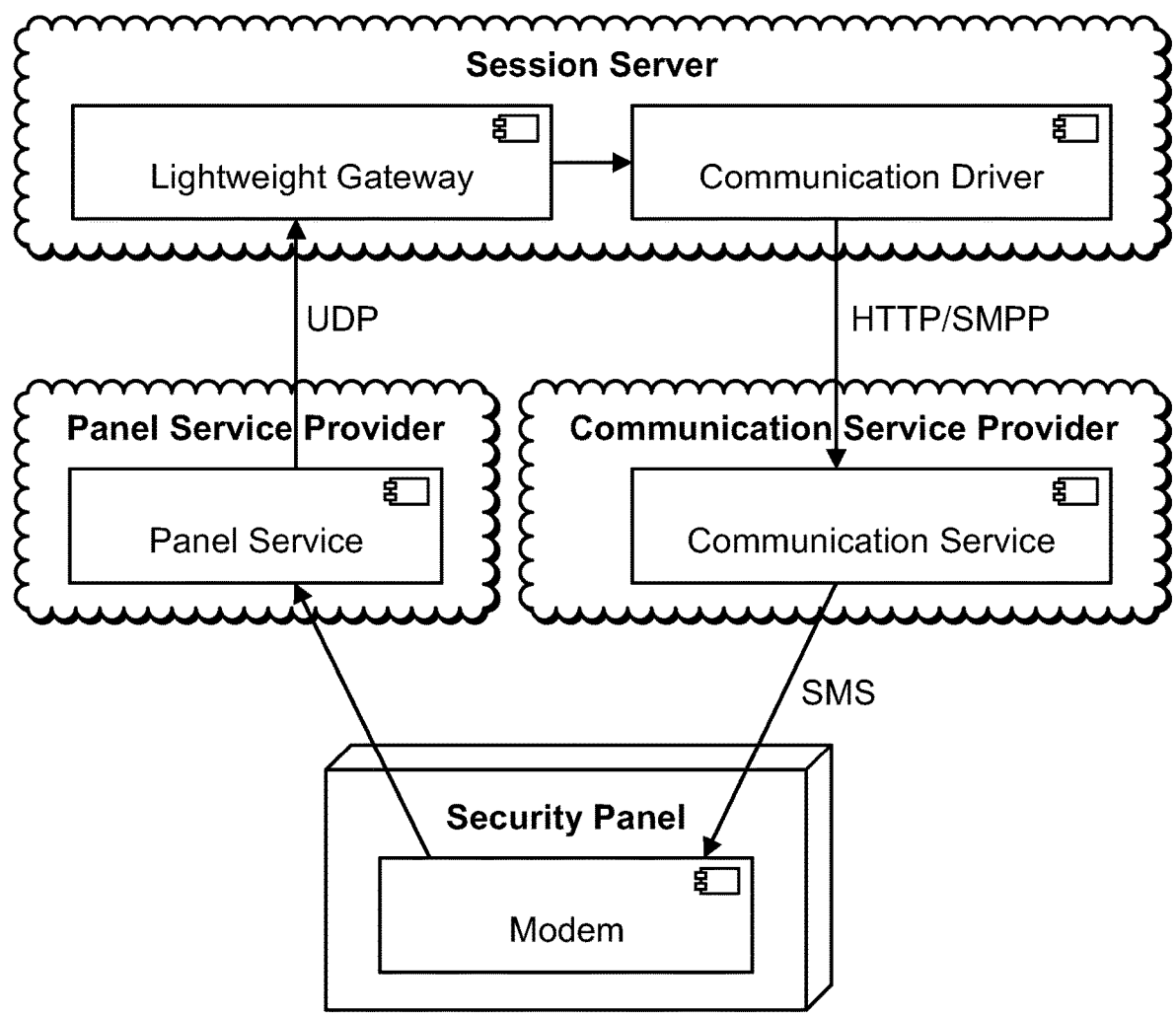
FIG. 4 is a block diagram showing communications of the LGW, under an embodiment.
Figure 5:
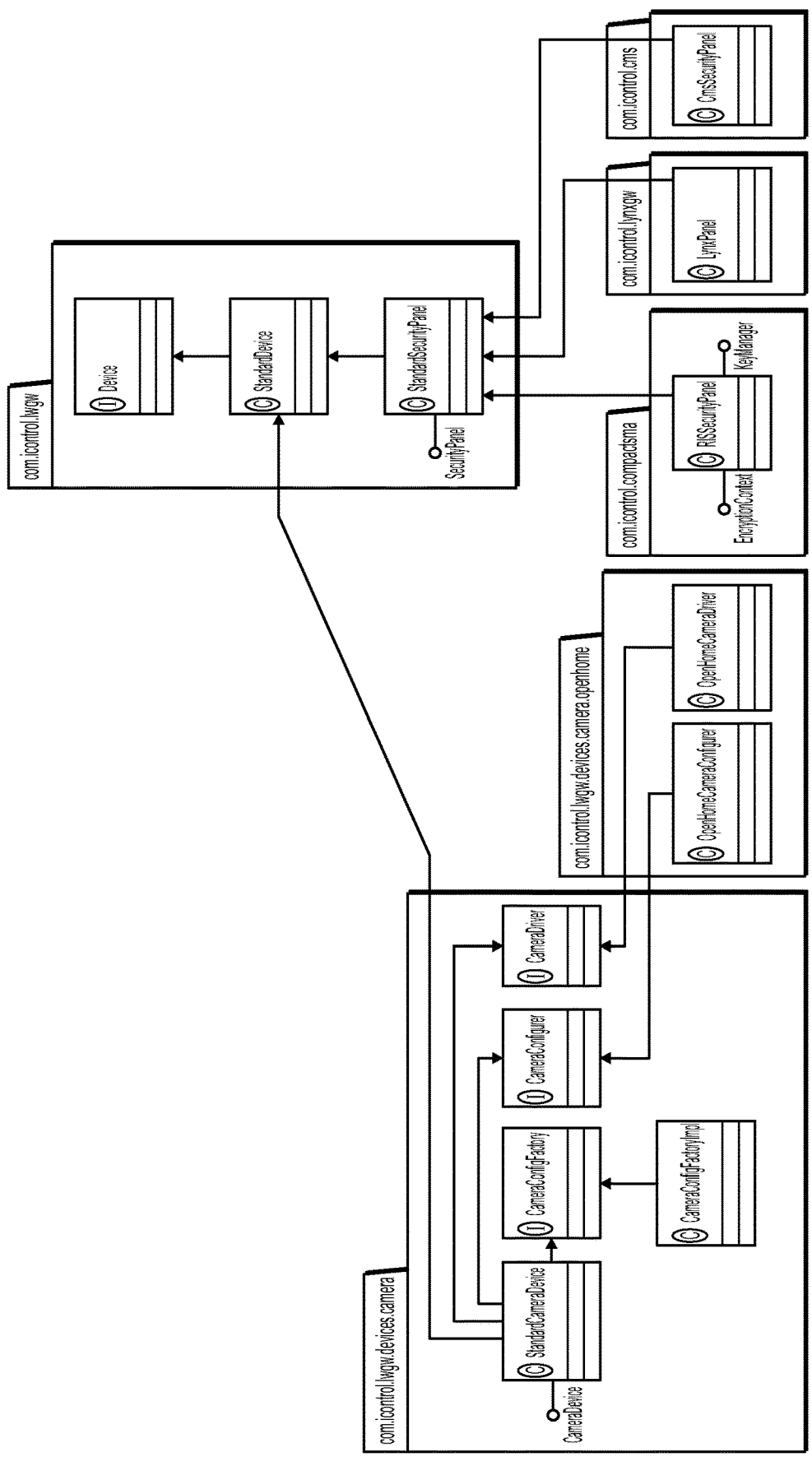
FIG. 5 is a block diagram showing an object model of the LGW, under an embodiment.

FIG. 4 is a block diagram showing communications of the LGW, under an embodiment. FIG. 5 is a block diagram showing an object model of the LGW, under an embodiment.

Regarding the system architecture, the LWG runs on a Session Server, as described herein. The session server sits on the Web Tier, at the edge of the data center. Other servers on the web tier include Apache servers and the Video Relay server, but are not so limited.

The LGW objects are hosted on the Session Server. They receive inbound communications from their corresponding security panel via the Panel Service Provider (i.e. Honeywell). The inbound communication of an embodiment is UDP packets from a dedicated TCP/IP port. The outbound communications are packaged into binary SMS messages and delivered to the security panel through third-party communication services, but are not so limited.

The App Tier includes servers like the web portal and the gateway app server. App tier servers have access to the persistence tier where the Database and NFS filesystem can be found.

The Web Tier of an embodiment does not have direct access to the persistence tier, but is not so limited. As a result, for NFS and Database access, the LWG invokes APIs on the gateway app server. The LWG uses the REST API on the gateway app server as well as the legacy GwSession-Service (gwsess.war). Most of these requests are made using http, however, REST API requests can also be invoked using the AMQP transport layer (AMQPRestClient) in which case these requests are routed through a work queue on the RabbitMQ Broker.

Regarding asynchronous architecture, a production session server of an embodiment includes 26 GB of memory, 2 CPUs, and is sized for 200K LWGs, but is not so limited. Each LWG uses approximately 100 KB of memory but is not so limited.

The LWGs running on a session server share the same virtual machine (e.g., Java), so the LWG code is configured to be high asynchronous so as to avoid blocking shared resources or using too many threads. An embodiment includes shared network thread pools. These thread pools dispatch tasks for handling incoming network activity (e.g., UDP and TCP message processing, API Requests, etc).

Embodiments include GlobalScheduler thread pools. In this configuration there is a thread pool for non-blocking activity (tick pool), for external blocking requests (sync pool), and for camera operations (camera pool).

Because a large number of LWGs share the same memory, use is made of the StringCache when an object has a String member variable and that String is not likely to be unique. The StringCache is a shared lookup table of commonly used strings. When a code uses the StringCache then it has an int memory variable rather than a String, and this saves the LWG large amounts of memory.

The Session server keeps track of all the LWGs it is running using the /data/ic/logs/session serialized files. Every time a new LWG is started or stopped on the Session Server, these serialized files are updated accordingly. When the Session Server starts up after stopping (both gracefully and ungracefully), these serialized files tell it which LWGs to start.

An LWG can move from one Session Server to another. The LWG of an embodiment is assigned to primary/secondary Session Server combination, but is not so limited. This is determined by the LWG group in which the site resides. Each LWG group corresponds to a single primary Session Server and a single secondary Session Server. The LWG group also corresponds to a dedicated port on the load balancer. This dedicated port is configured to send all traffic to the primary Session Server when it is up, and to the secondary Session Server if it is down (active/standby configuration). If traffic destined for a given LWG comes in to a Session Server (either primary or secondary), the Session Server will check if the LWG is already running on that server. If it is not, then the Session Server will start the LWG and then pass to it the traffic.

When a LWG starts up on a Session Server, it first sends a GatewayConnect request for the given LWG site to the Gateway App server. The same GatewayConnect request is also used when an iHub connects to a Session Server. The GatewayConnect request includes the hostname of the Session Server. The Gateway App server writes the Session Server hostname to the database so that it knows to which Session Server a given Gateway is connected. This is used for routing REST API passthrough requests, for example. When the Gateway app processes the GatewayConnect request, it checks which Session Server the given site was last connected to and, if its different from the new session server, then the Gateway App server sends a disconnect request to the last session server.

When a Session server receives a disconnect request for a given site, if the site is an iHub then the Session server will disconnect that iHub if its still connected (it should not be). If the site is a LWG then the session server will shut down that LWG gracefully, allowing the LWG to perform a final sync (sending any recent events to the database for persistence) before removing the LWG from memory.

So, when a LWG starts up on a Session Server, the GatewayConnect request ensures that the LWG is no longer running on another Session Server. If the load balancer decides that the primary Session Server for a given port is down, it sends requests to the secondary Session Server. If the LWG is not already running on the secondary Session Server, the secondary Session Server starts the LWG, ensuring that it is not running anywhere else.

After the GatewayConnect request is completed, the LWG state machine is started up and it performs a "boot" Gateway sync. The "boot" Gateway Sync is a request made to the Gateway app server for a complete configuration and state snapshot of the given site. The Gateway app server reads the configuration and state from the DB and returns it to the LWG. The LWG is then able to start up and resume the state and configuration that it had when last run.

Alternatively to the "boot" Gateway Sync, there is a startup optimization that the LWG supports in which the contents of the "boot" Gateway Sync are written by the LWG to the NFS file system (using the Gateway app server's GetResourceFile, PutResourceFile, DeleteResourceFile apis) when the LWG is shut down gracefully. When the LWG starts up, it will first check for this file before performing the "boot" Gateway Sync. If the file is found then the "boot" Gateway Sync is skipped.

An embodiment performs traffic routing via broker. The Session Server includes an instance of the REST Server Framework, which includes the AMQP work and broadcast queue support. The tunnel camera feature makes extensive use of AMQP Rest Client and Rest Server messaging for announcing incoming camera connections, finding the Session Server with a given camera connected to it, sending camera requests and responses across different session servers (for example, when the Camera is connected to a different session server from its LWG). The Rest API endpoints are able to route requests to the LWG.

Figure 6:
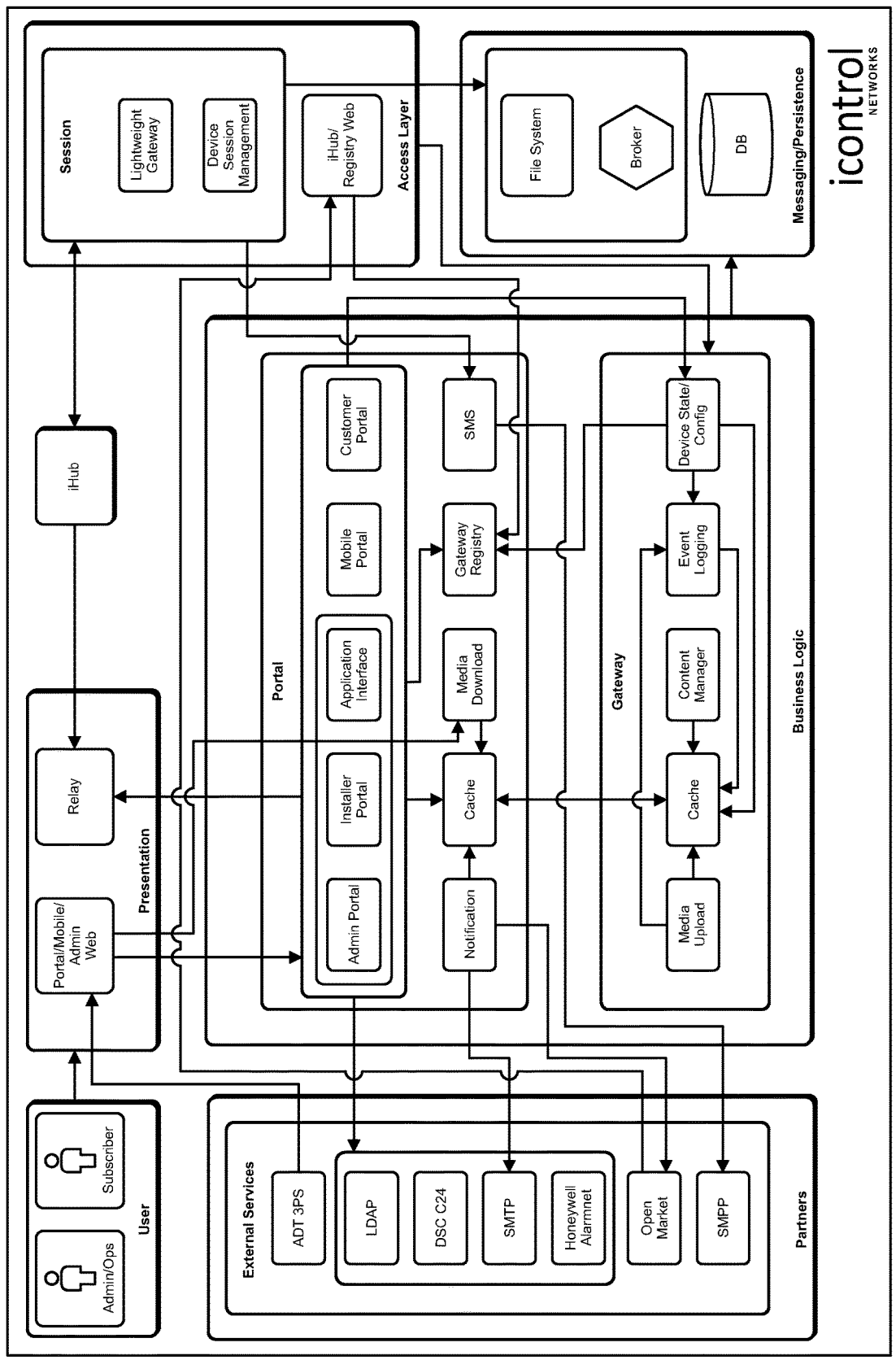
FIG. 6 is a block diagram of the application architecture, under an embodiment.

FIG. 6 is a block diagram of the application architecture, under an embodiment. Following are detailed descriptions of use case flows teaching the interaction of elements of the application architecture.

Figure 7:
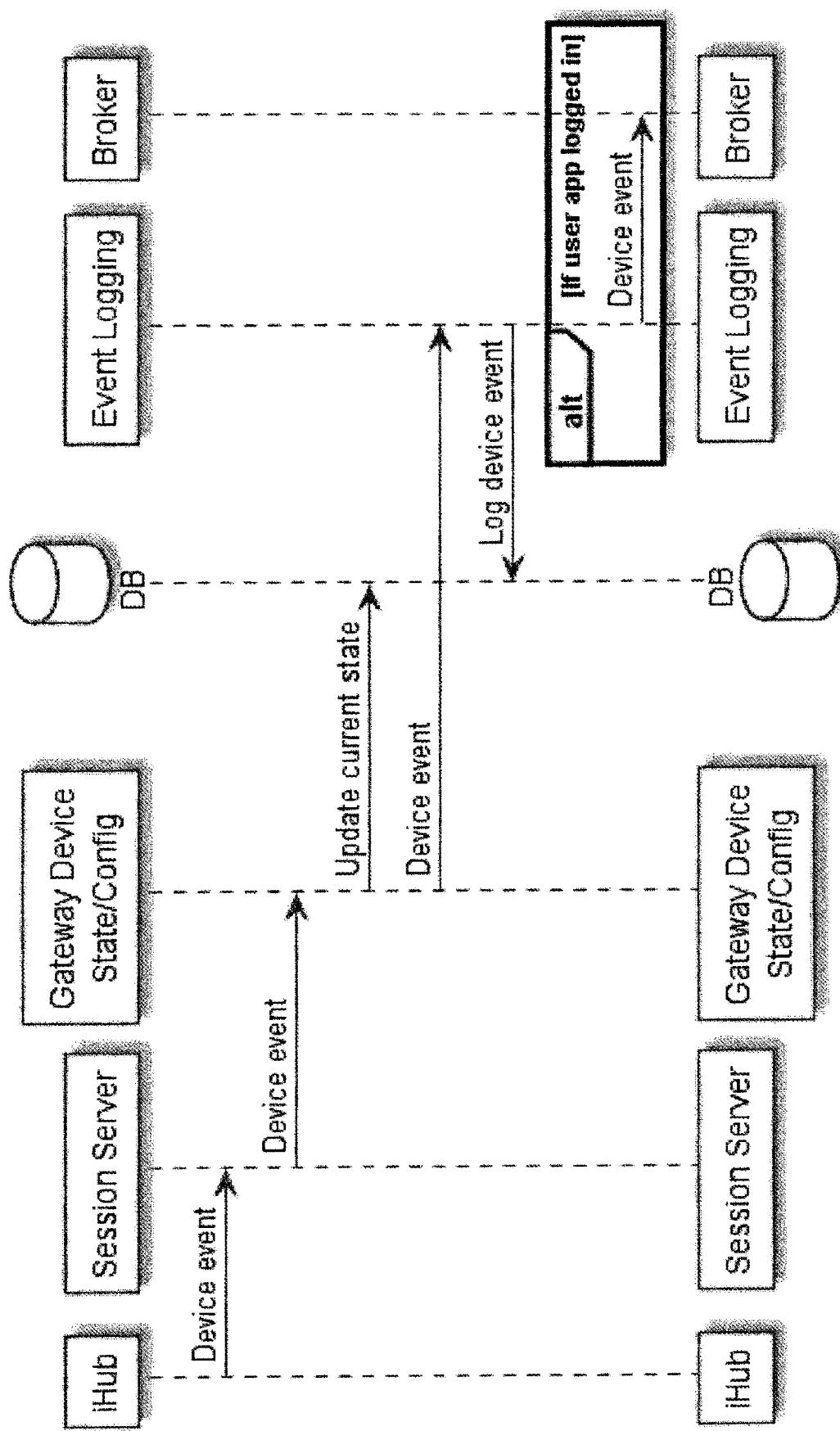
FIG. 7 is a flow diagram for device state change, under an embodiment.

FIG. 7 is a flow diagram for device state change, under an embodiment. This flow shows the signal and data flow that results when a device state changes.

1. iHub→Session Server
2. Session Server→Gateway Device State/Config
3. Gateway Device State/Config→DB
4. Gateway Device State/Config→Event Logging
5. Event Logging→DB
6. Event Logging→Broker (if user app is logged in to this site)

Figure 8:
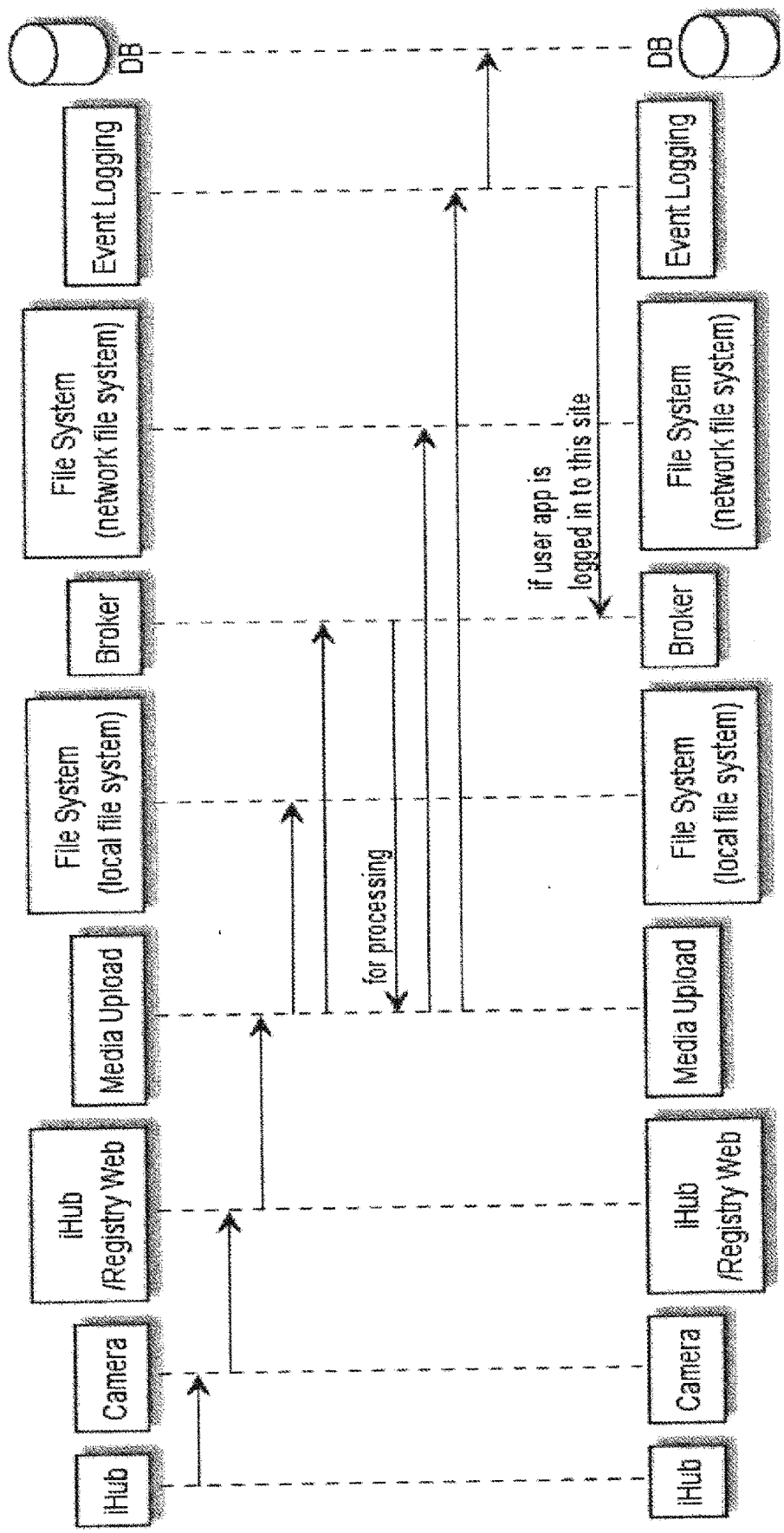
FIG. 8 is a flow diagram for media upload, under an embodiment.

FIG. 8 is a flow diagram for media upload, under an embodiment. This flow shows the signal and data flow that results when media is uploaded to the server.
1. iHub→Camera
2. Camera→iHub/Registry Web
3. iHub/Registry Web→Media Upload
4. Media Upload→File System (local file system)
5. Media Upload→Broker
6. Broker→Media Upload (for processing)
7. Media Upload→File System (network file system)
8. Media Upload→Event Logging
9. Event Logging→DB
10. Event Logging→Broker (if user app is logged in to this site)

Figure 9:
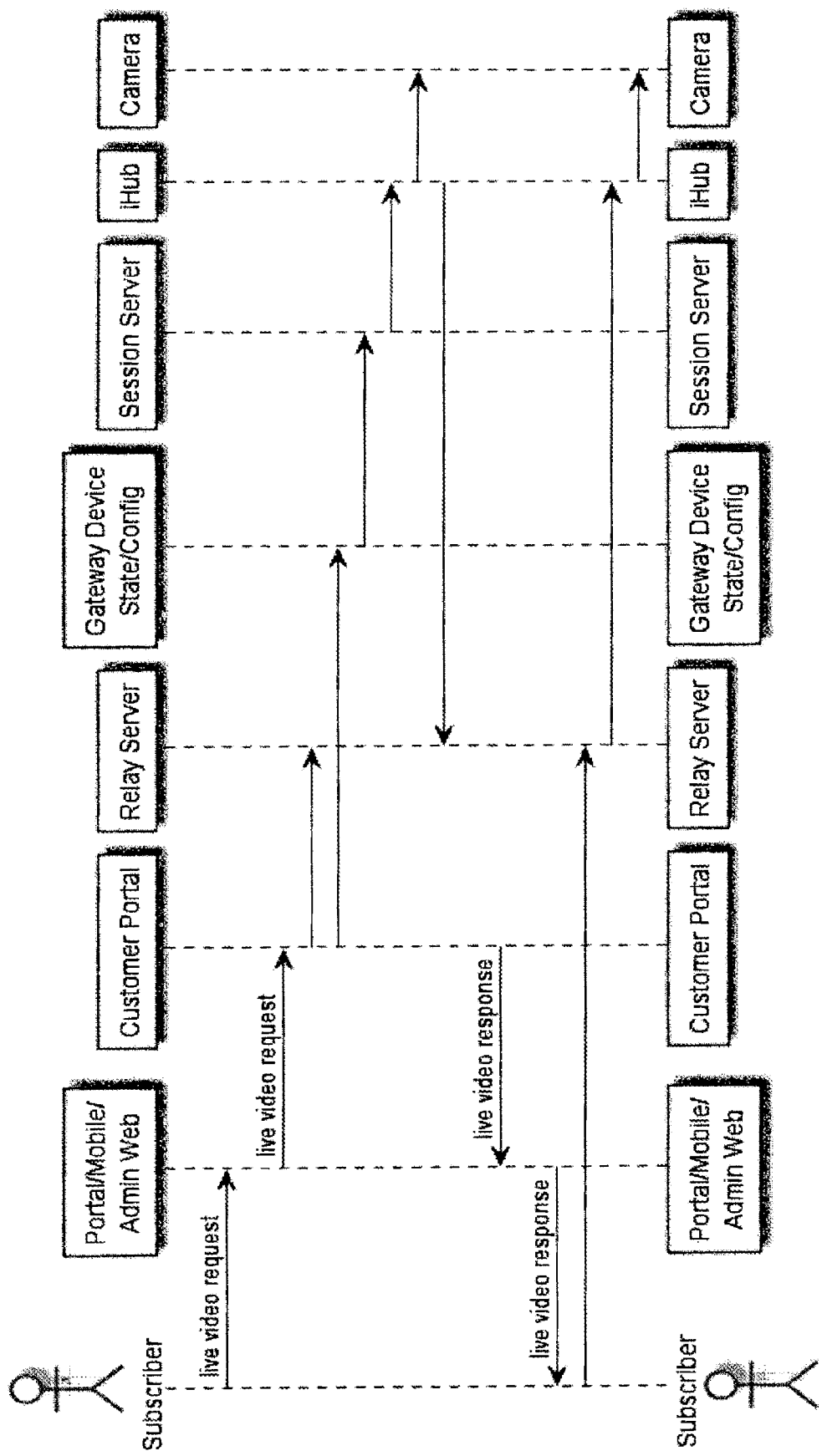
FIG. 9 is a flow diagram for live video, under an embodiment.
Figure 10:
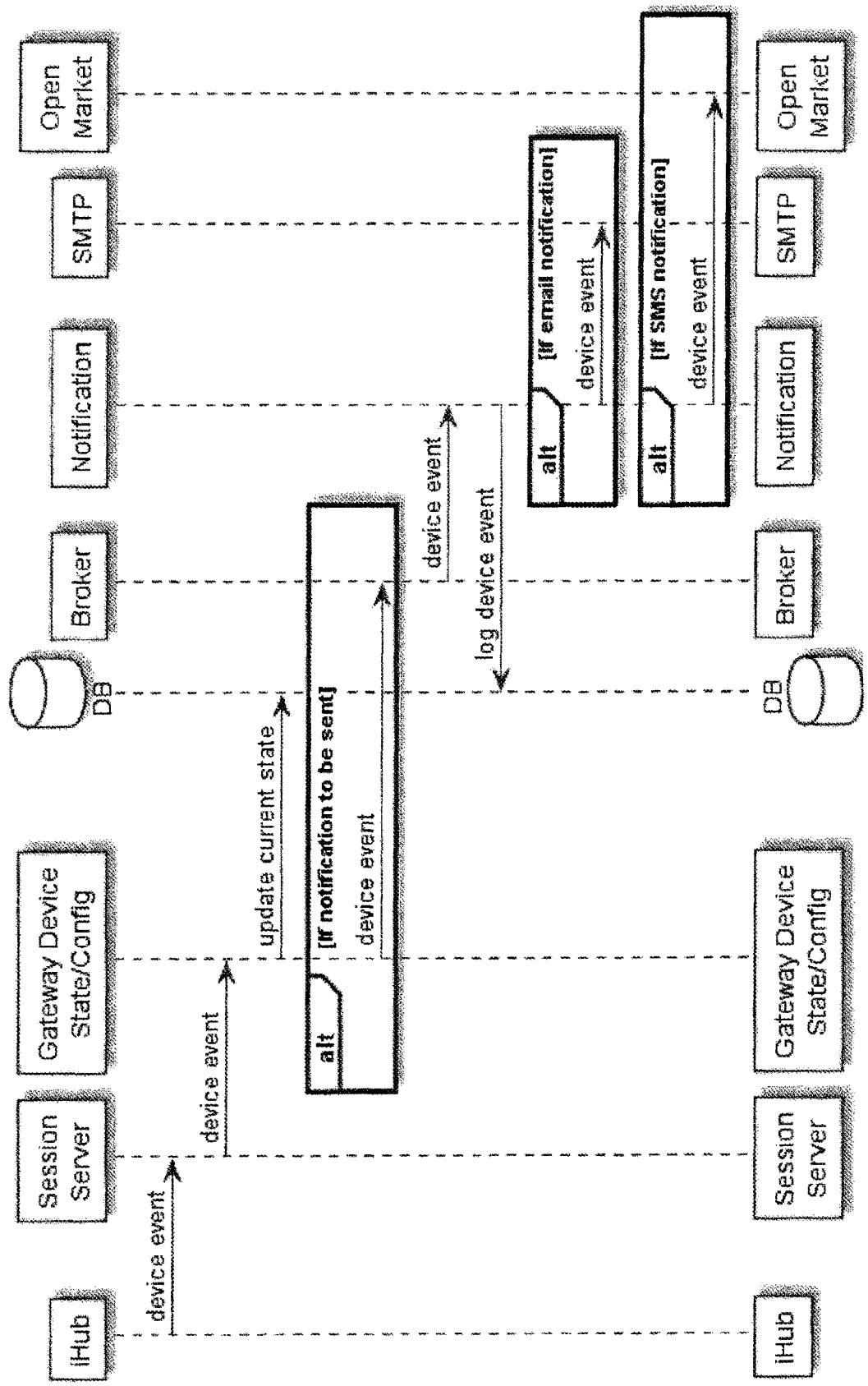
FIG. 10 is a flow diagram for event trigger notification, under an embodiment.

FIG. 9 is a flow diagram for live video, under an embodiment. This flow shows the signal and data flow that results when a client application session accesses live video using the Relay Server.
1. Subscriber→Portal/Mobile/Admin Web (live video request)
2. Portal/Mobile/Admin Web→Customer Portal (live video request)
3. Customer Portal→Relay Server
4. Customer Portal→Gateway Device State/Config
5. Gateway Device State/Config→Session Server
6. Session Server→iHub
7. iHub→Camera
8. iHub→Relay Server
9. Customer Portal→Portal/Mobile/Admin Web (live video response)
10. Portal/Mobile/Admin Web→Subscriber (live video response)
11. Subscriber→Relay
12. Relay→iHub
13. iHub→Camera FIG. 10 is a flow diagram for event trigger notification, under an embodiment. This flow shows the signal and data flow that results when a device event triggers a notification to be sent to the customer.
1. iHub→Session Server
2. Session Server→Gateway Device State/Config
3. Gateway Device State/Config→DB
4. Gateway Device State/Config→Broker (if notification to be sent)
5. Broker→Notification
6. Notification→DB
7. Notification→SMTP (if email notification)
8. Notification→Open Market (if SMS notification)

Figure 11:
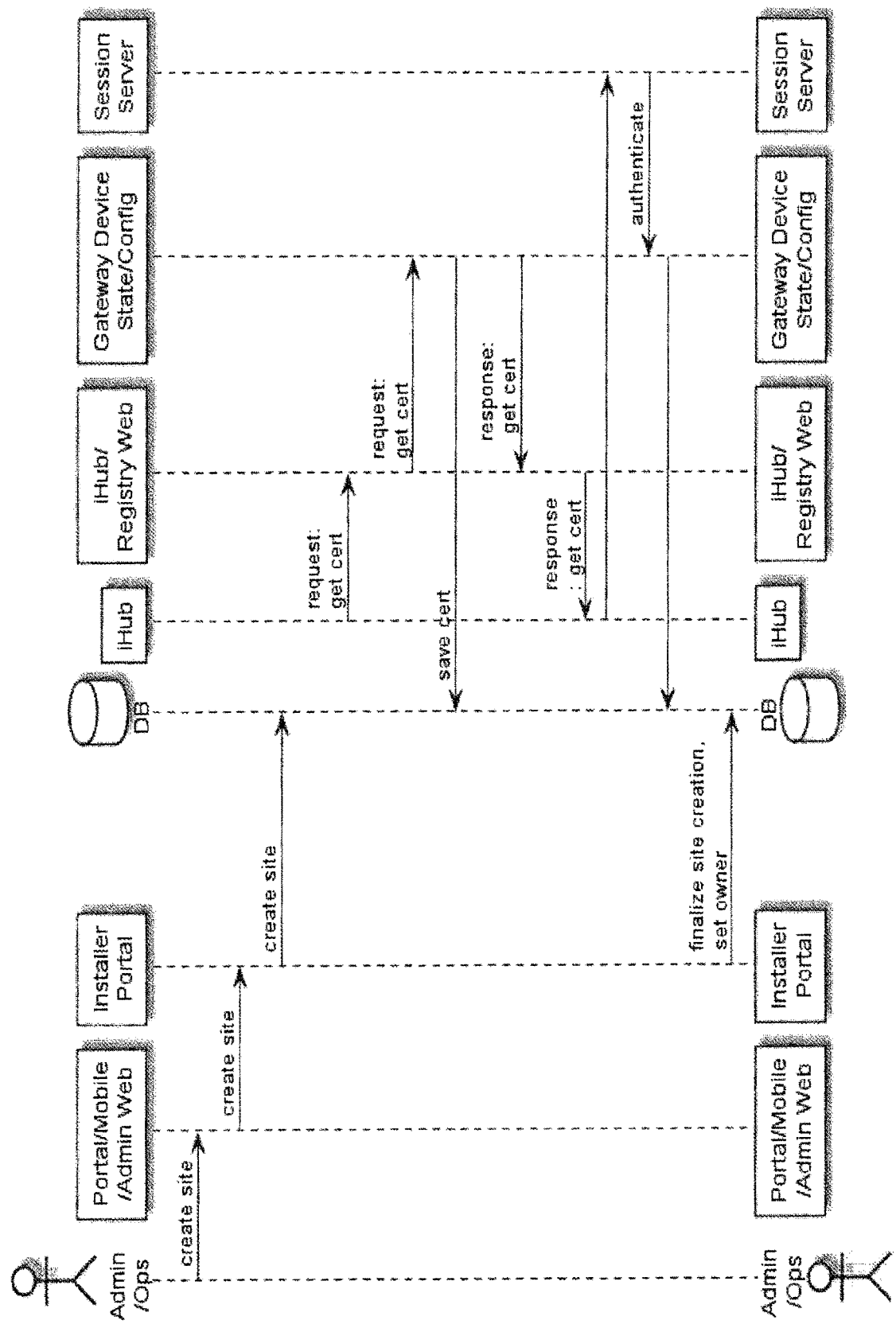
FIG. 11 is a flow diagram for activation iHub, under an embodiment.

FIG. 11 is a flow diagram for activation iHub, under an embodiment. This flow shows the signal and data flow that results when an iHub or ngHub is activated.
1. Admin/Ops→Portal/Mobile/Admin Web (create site)
2. Portal/Mobile/Admin Web→Installer Portal (create site)
3. Installer Portal→DB (create site)
4. iHub→iHub/Registry Web (request: get cert)
5. iHub/Registry Web→Gateway Device State/Config (request: get cert)
6. Gateway Device State/Config→DB (save cert)
7. Gateway Device State/Config→iHub/Registry Web (response: get cert)
8. iHub/Registry Web→iHub (response: get cert)
9. iHub→Session Server
10. Session Server→Gateway Device State/Config (authenticate)
11. Gateway Device State/Config→DB
12. Installer Portal→DB (finalize site creation, set owner)

Figure 12:
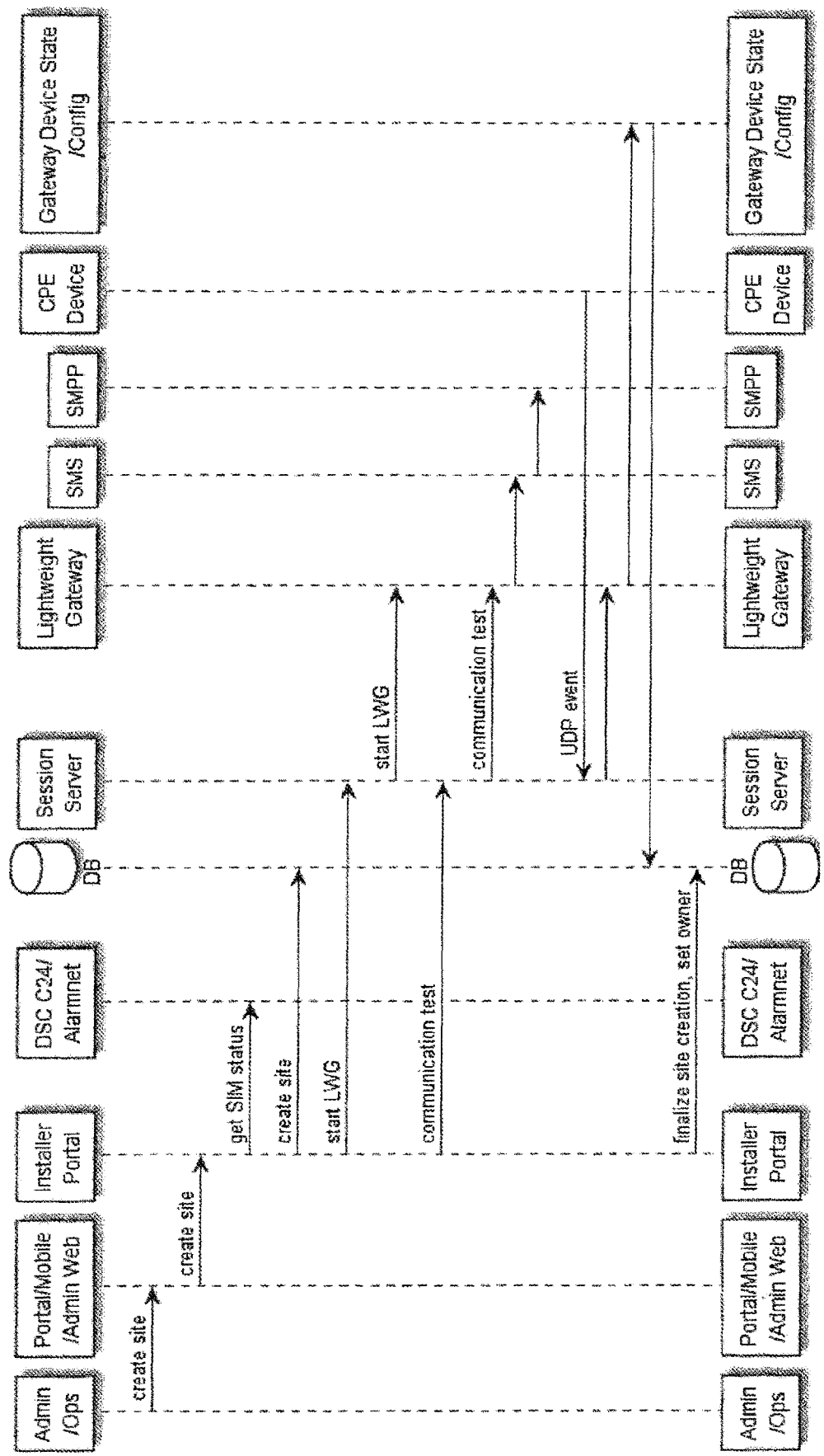
FIG. 12 is a flow diagram for activation LWG, under an embodiment.

FIG. 12 is a flow diagram for activation LWG, under an embodiment. This flow shows the signal and data flow that results when a cellular-only security panel is activated.
1. Admin/Ops→Portal/Mobile/Admin Web (create site)
2. Portal/Mobile/Admin Web→Installer Portal (create site)
3. Installer Portal→DSC C24/Alarmnet (get SIM status)
4. Installer Portal→DB (create site)
5. Installer Portal→Session Server (start LWG)
6. Session Server→Lightweight Gateway (start LWG)
7. Installer Portal→Session Server (communication test)
8. Session Server→Lightweight Gateway (communication test)
9. Lightweight Gateway→SMS
10. SMS→SMPP
11. CPE Device→Session Server (UDP event)
12. Session Server→Lightweight Gateway
13. Lightweight Gateway→Gateway Device State/Config
14. Gateway Device State/Config→DB
15. Installer Portal→DB (finalize site creation, set owner)

Figure 13:
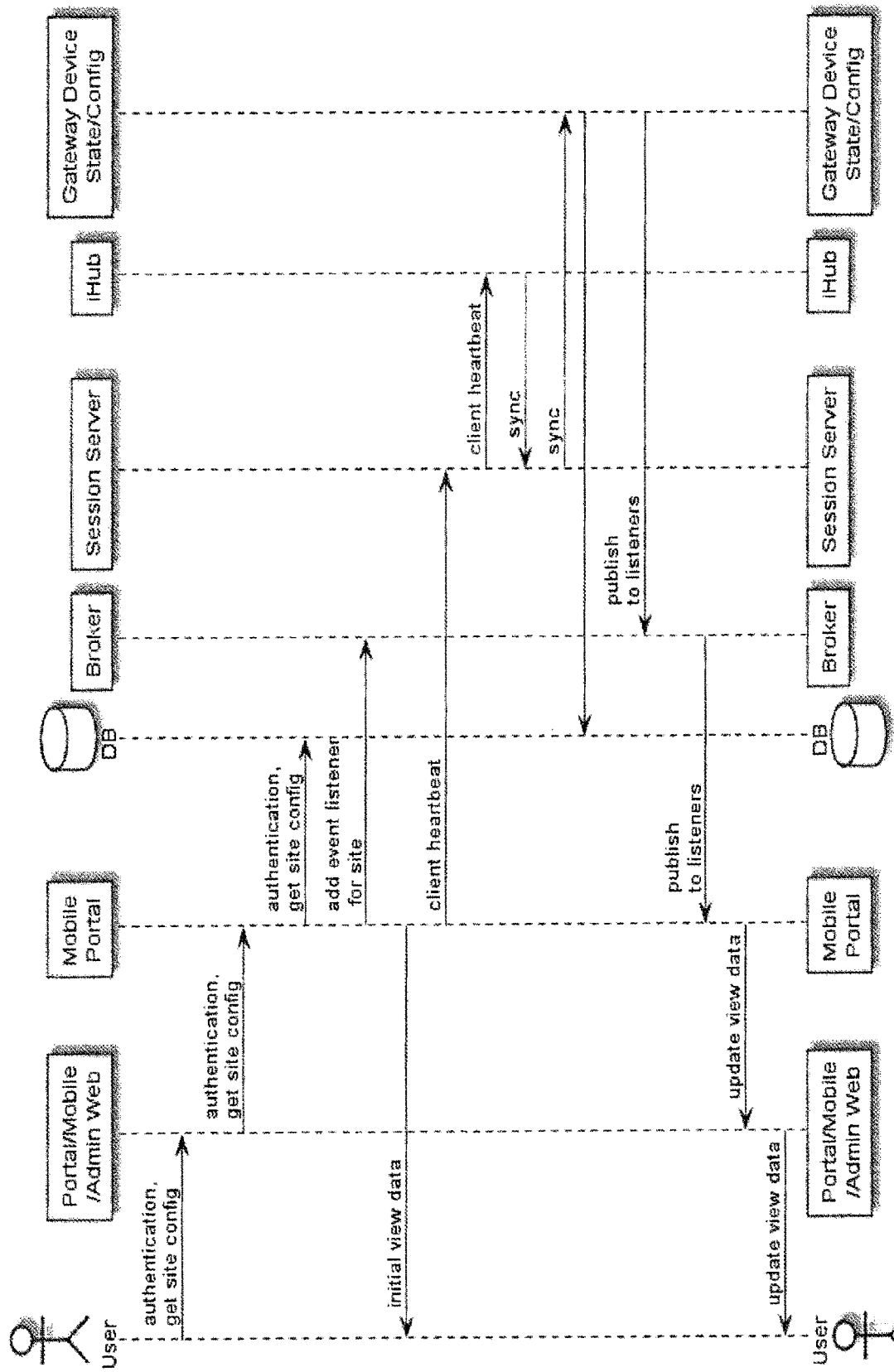
FIG. 13 is a flow diagram for app sign-in (Web/Android app) iHub, under an embodiment.

FIG. 13 is a flow diagram for app sign-in (Web/Android app) iHub, under an embodiment. This flow shows the signal and data flow that results when a customer (subscriber) with an iHub or ngHub signs in to the Android Application. The flow is largely the same for the Web Portal.
1. User→Portal/Mobile/Admin Web (authentication, get site config)
2. Portal/Mobile/Admin Web→Mobile Portal (authentication, get site config)
3. Mobile Portal→DB (authentication, get site config)
4. Mobile Portal→Broker (add event listener for site)
5. Mobile Portal→User (initial view data)
6. Mobile Portal→Session Server (client heartbeat)
7. Session Server→iHub (client heartbeat)
8. iHub→Session Server (sync)
9. Session Server→Gateway Device State/Config (sync)
10. Gateway Device State/Config→DB
11. Gateway Device State/Config→Broker (publish to listeners)
12. Broker→Mobile Portal (publish to listeners)
13. Mobile Portal→Portal/Mobile/Admin Web (update view data)
14. Portal/Mobile/Admin Web→User (update view data)

Figure 14:
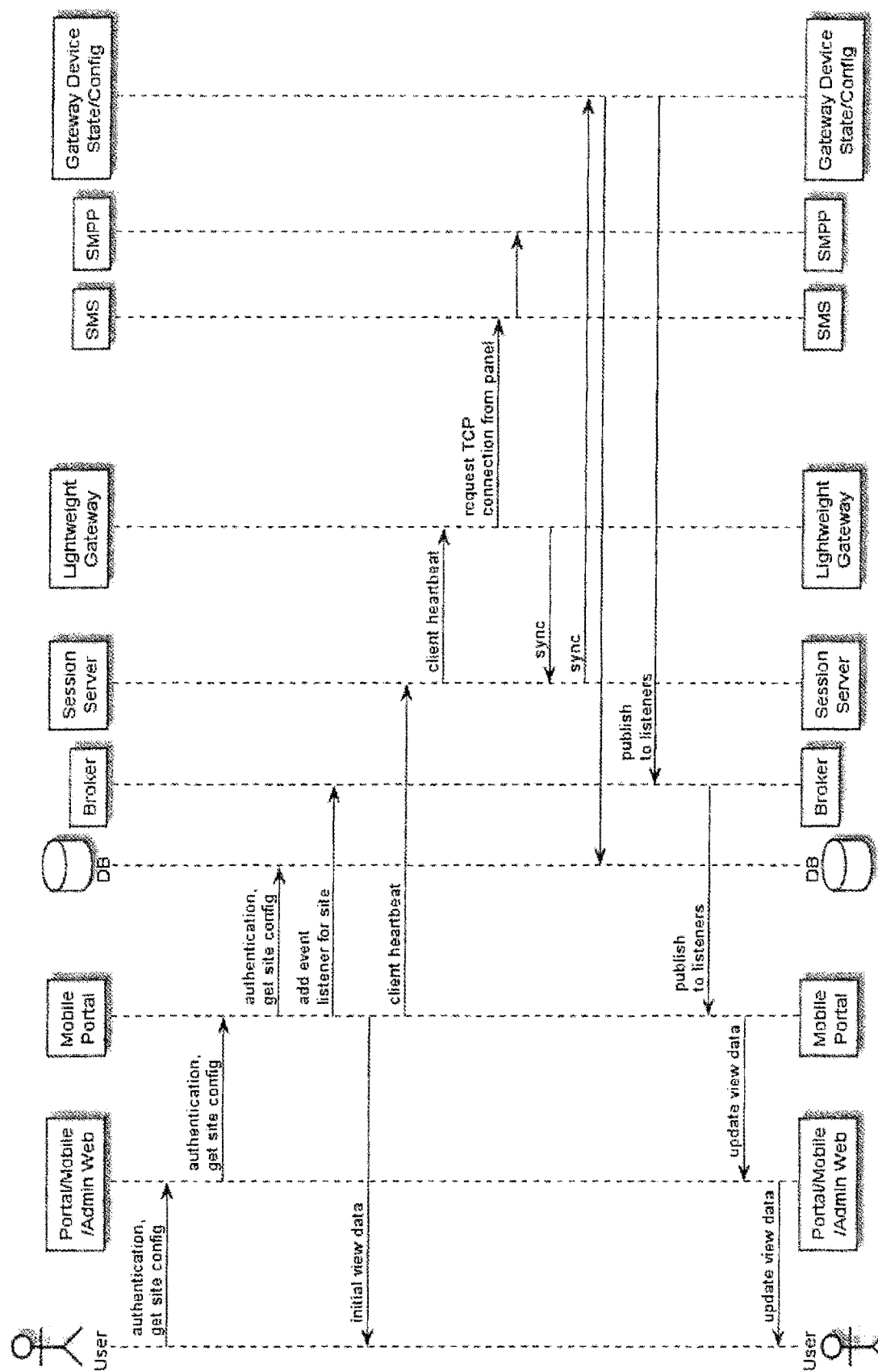
FIG. 14 is a flow diagram for app sign-in (Web/Android app) LWG, under an embodiment.

FIG. 14 is a flow diagram for app sign-in (Web/Android app) LWG, under an embodiment. This flow shows the signal and data flow that results when a customer with a cellular-only panel (LWG) signs in to the Android Application. The flow is largely the same for the Web Portal.
1. User→Portal/Mobile/Admin Web (authentication, get site config)
2. Portal/Mobile/Admin Web→Mobile Portal (authentication, get site config)
3. Mobile Portal→DB (authentication, get site config)
4. Mobile Portal→Broker (add event listener for site)
5. Mobile Portal→User (initial view data)
6. Mobile Portal→Session Server (client heartbeat)
7. Session Server→Lightweight Gateway (client heartbeat)
8. Lightweight Gateway→SMS (request TCP connection from panel)
9. SMS→SMPP
10. Lightweight Gateway→Session Server (sync)
11. Session Server→Gateway Device State/Config (sync)
12. Gateway Device State/Config→DB
13. Gateway Device State/Config→Broker (publish to listeners)
14. Broker→Mobile Portal (publish to listeners)

15. Mobile Portal→Portal/Mobile/Admin Web (update view data)

16. Portal/Mobile/Admin Web→User (update view data)

Figure 15:
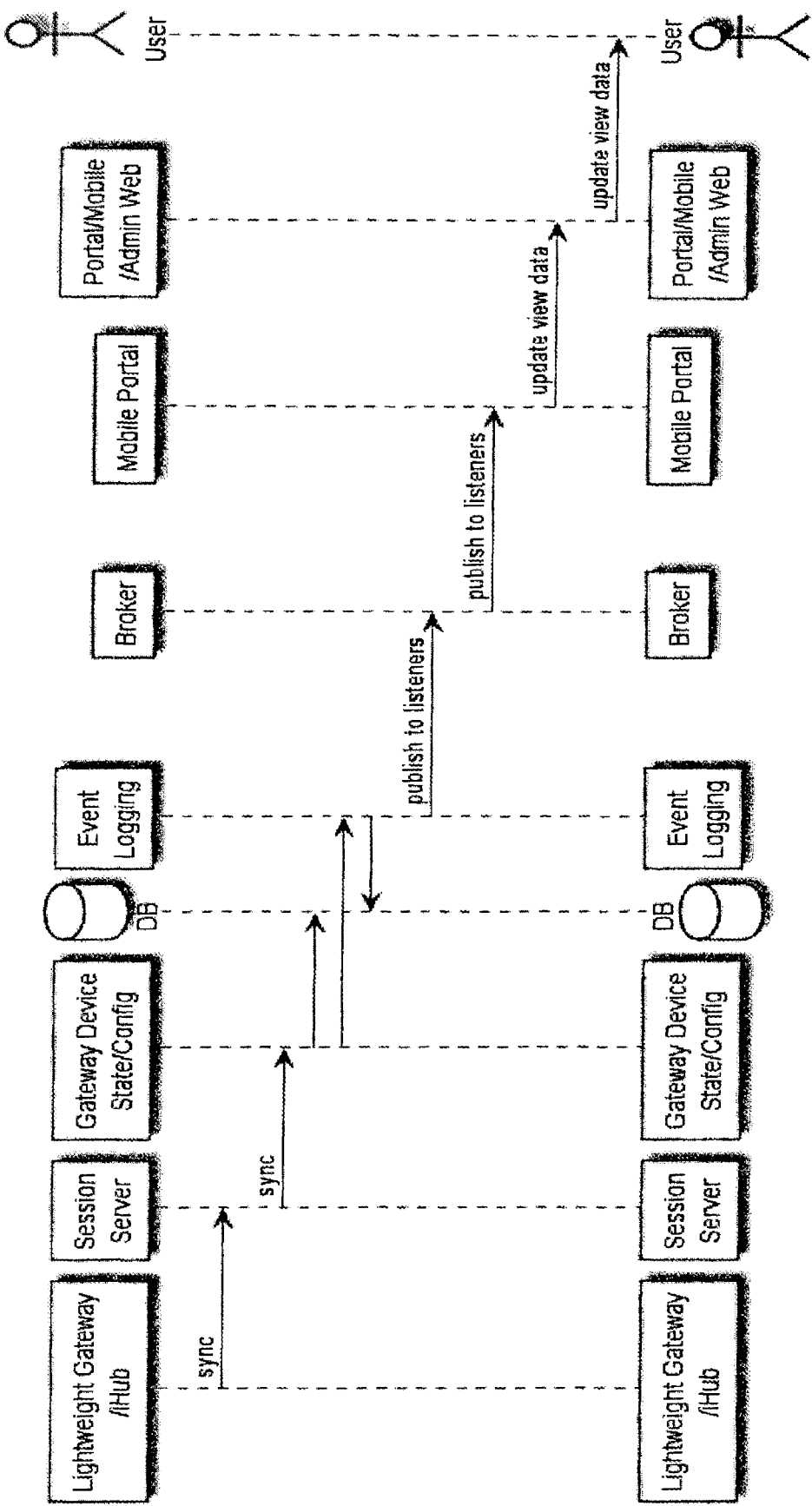
FIG. 15 is a flow diagram for app session, device event (Web/Android app), under an embodiment.

FIG. 15 is a flow diagram for app session, device event (Web/Android app), under an embodiment. This flow shows the signal and data flow that results when a customer is already signed in to the Android Application and a device event occurs. The flow is largely the same for the Web Portal.

1. Lightweight Gateway/iHub→Session Server (sync)
2. Session Server→Gateway Device State/Config (sync)
3. Gateway Device State/Config→DB
4. Gateway Device State/Config→Event Logging
5. Event Logging→DB
6. Event Logging→Broker (publish to listeners)
7. Broker→Mobile Portal (publish to listeners)
8. Mobile Portal→Portal/Mobile/Admin Web (update view data)
9. Portal/Mobile/Admin Web→User (update view data)

Figure 16:
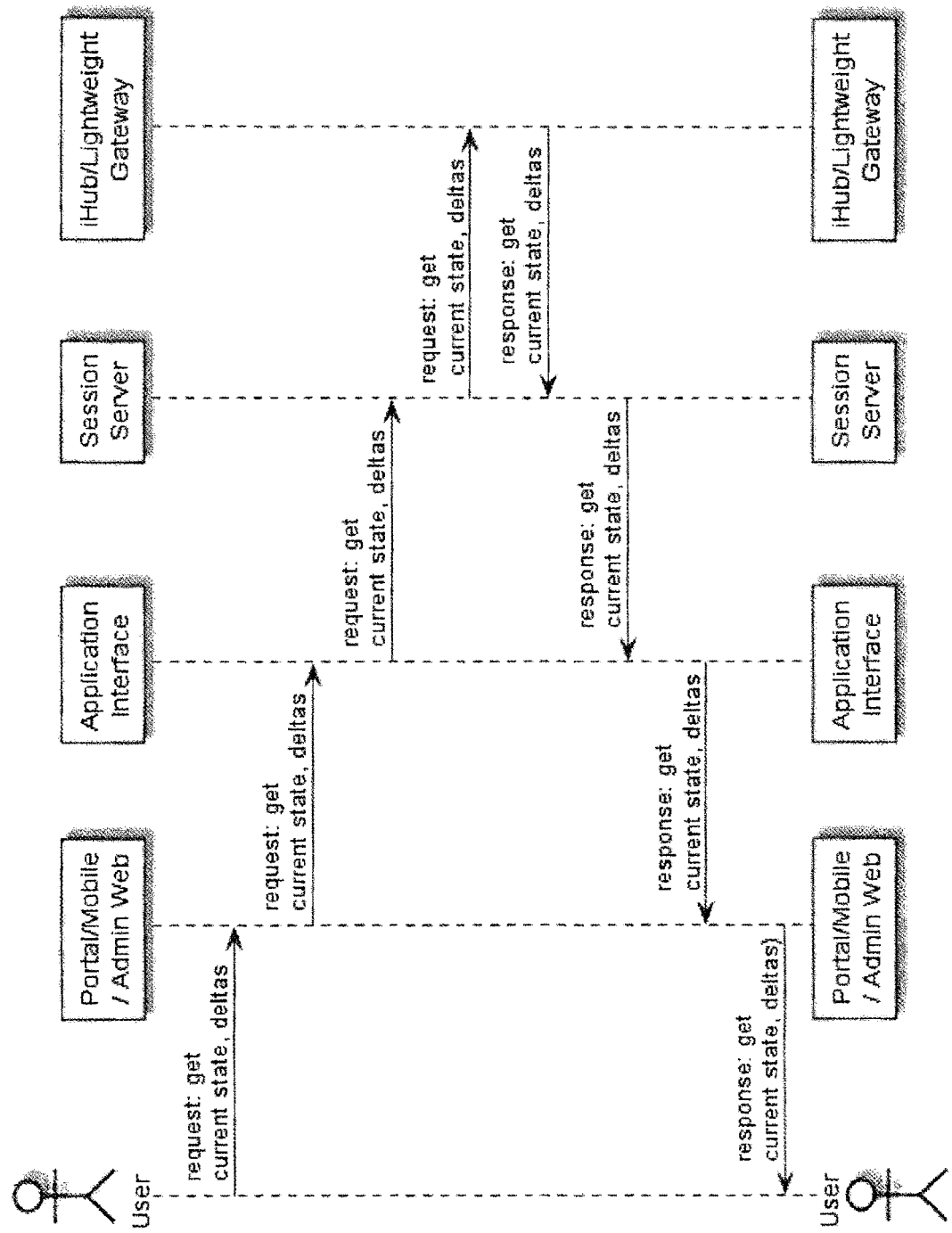
FIG. 16 is a flow diagram for app sign-in (iOS) iHub, under an embodiment.

FIG. 16 is a flow diagram for app sign-in (iOS) iHub, under an embodiment. This flow shows the signal and data flow that results when a customer with an iHub or ngHub signs in to the iOS Application.

1. User→Portal/Mobile/Admin Web (authentication, get site config)
2. Portal/Mobile/Admin Web→Application Interface (authentication, get site config)
3. Application Interface→DB (authentication, get site config)
4. Application Interface→Session Server (client heartbeat)
5. Session Server→iHub (client heartbeat)
6. User→Portal/Mobile/Admin Web (request: get current state, deltas)
7. Portal/Mobile/Admin Web→Application Interface (request: get current state, deltas)
8. Application Interface→Session Server (request: get current state, deltas)
9. Session Server→iHub (request: get current state, deltas)
10. iHub→Session Server (response: get current state, deltas)
11. Session Server→Application Interface (response: get current state, deltas)
12. Application Interface→Portal/Mobile/Admin Web (response: get current state, deltas)
13. Portal/Mobile/Admin Web→User (response: get current state, deltas)

Figure 17:
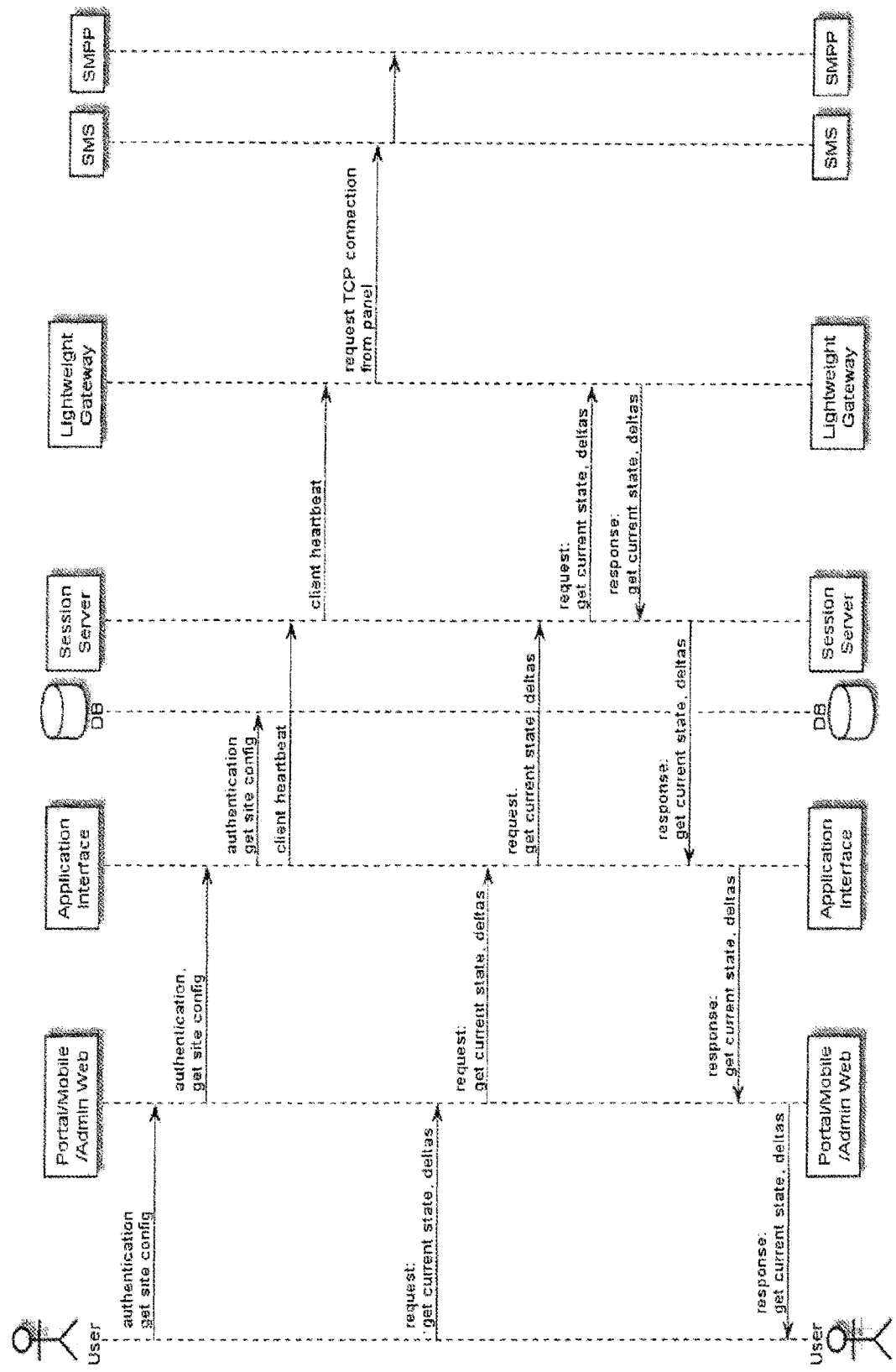
FIG. 17 is a flow diagram for app sign-in (iOS) LWG, under an embodiment.

FIG. 17 is a flow diagram for app sign-in (iOS) LWG, under an embodiment. This flow shows the signal and data flow that results when a customer with a cellular-only panel (LWG) signs in to the iOS Application.

1. User→Portal/Mobile/Admin Web (authentication, get site config)
2. Portal/Mobile/Admin Web→Application Interface (authentication, get site config)
3. Application Interface→DB (authentication, get site config)
4. Application Interface→Session Server (client heartbeat)
5. Session Server→Lightweight Gateway (client heartbeat)
6. Lightweight Gateway→SMS (request TCP connection from panel)
7. SMS→SMPP
8. User→Portal/Mobile/Admin Web (request: get current state, deltas)
9. Portal/Mobile/Admin Web→Application Interface (request: get current state, deltas)
10. Application Interface→Session Server (request: get current state, deltas)
11. Session Server→Lightweight Gateway (request: get current state, deltas)
12. Lightweight Gateway→Session Server (response: get current state, deltas)
13. Session Server→Application Interface (response: get current state, deltas)
14. Application Interface→Portal/Mobile/Admin Web (response: get current state, deltas)
15. Portal/Mobile/Admin Web→User (response: get current state, deltas)

Figure 18:
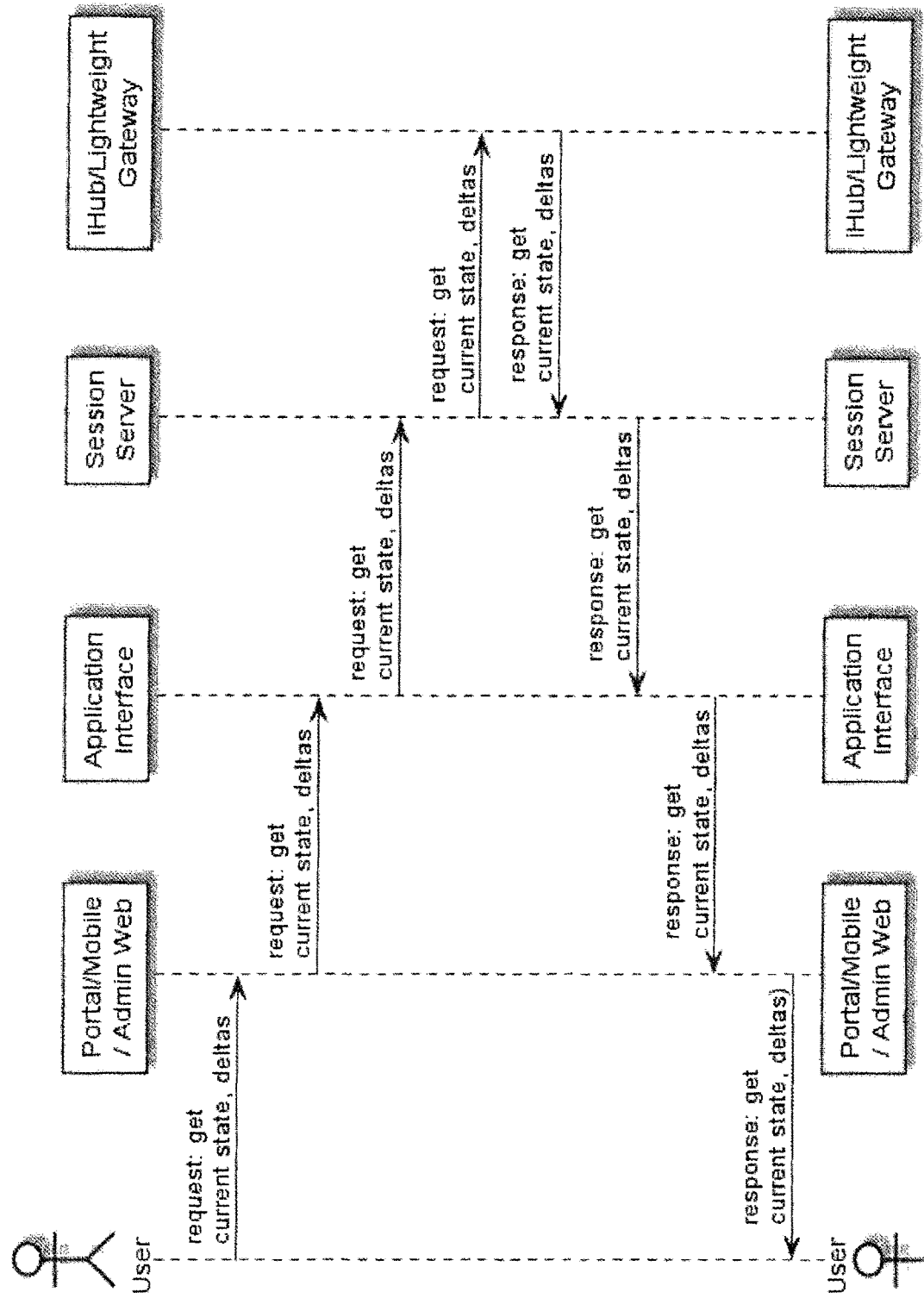
FIG. 18 is a flow diagram for app session, device event (iOS app), under an embodiment.

FIG. 18 is a flow diagram for app session, device event (iOS app), under an embodiment. This flow shows the signal and data flow that results when a customer is already signed in to the iOS Application and a device event occurs.

1. User→Portal/Mobile/Admin Web (request: get current state, deltas)
2. Portal/Mobile/Admin Web→Application Interface (request: get current state, deltas)
3. Application Interface→Session Server (request: get current state, deltas)
4. Session Server→iHub/Lightweight Gateway (request: get current state, deltas)
5. iHub/Lightweight Gateway→Session Server (response: get current state, deltas)
6. Session Server→Application Interface (response: get current state, deltas)
7. Application Interface→Portal/Mobile/Admin Web (response: get current state, deltas)
8. Portal/Mobile/Admin Web→User (response: get current state, deltas)

Figure 19:
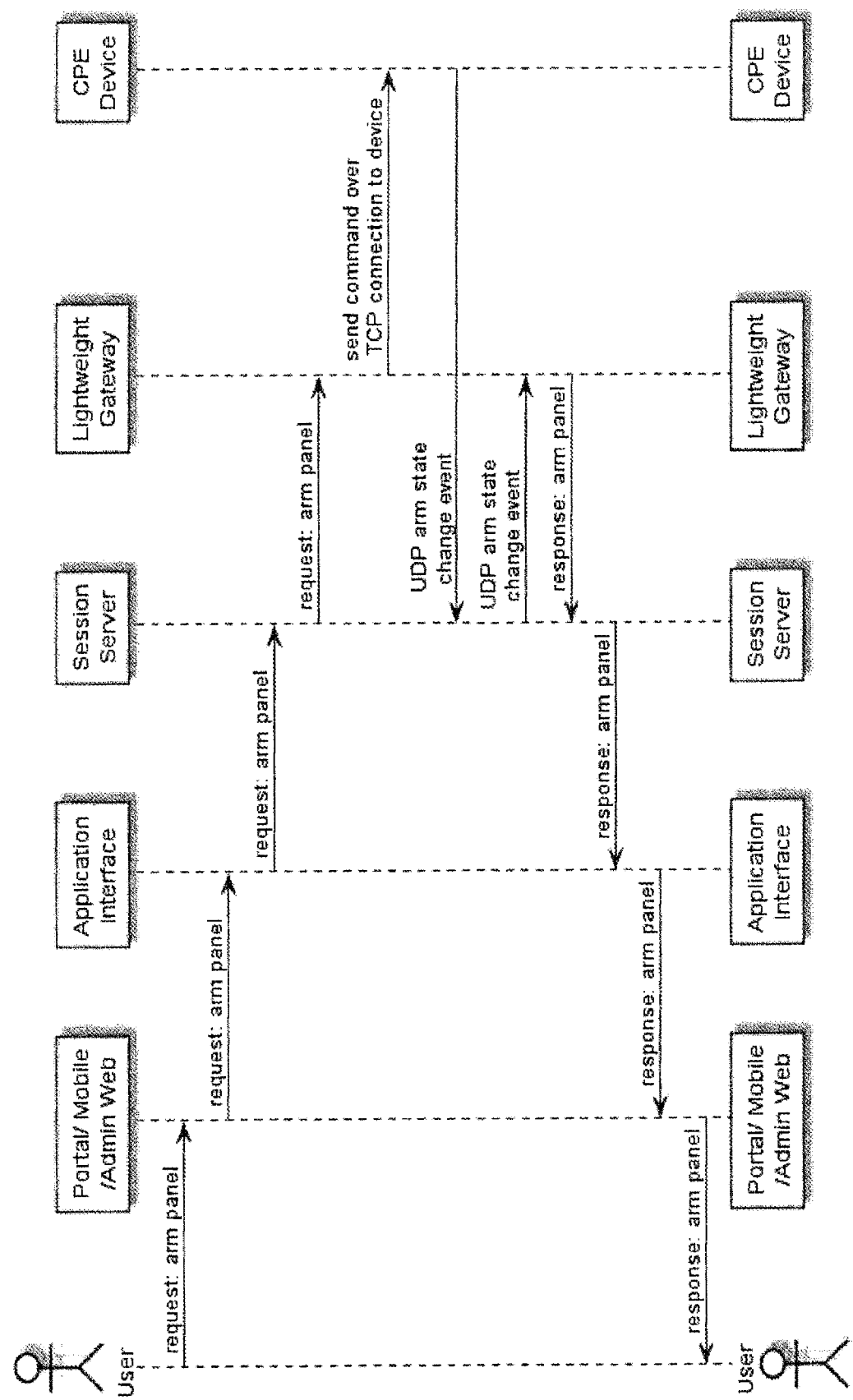
FIG. 19 is a flow diagram for LWG remote arm, under an embodiment.

FIG. 19 is a flow diagram for LWG remote arm, under an embodiment. This flow shows the signal and data flow that results when a LWG remotely arms a cellular-only panel.

1. User→Portal/Mobile/Admin Web (request: arm panel)
2. Portal/Mobile/Admin Web→Application Interface (request: arm panel)
3. Application Interface→Session Server (request: arm panel)
4. Session Server→Lightweight Gateway (request: arm panel)
5. Lightweight Gateway→CPE Device (send command over TCP connection to device)
6. CPE Device→Session Server (UDP arm state change event)
7. Session Server→Lightweight Gateway (UDP arm state change event)
8. Lightweight Gateway→Session Server (response: arm panel)
9. Session Server→Application Interface (response: arm panel)
10. Application Interface→Portal/Mobile/Admin Web (response: arm panel)
11. Portal/Mobile/Admin Web→User (response: arm panel)

Figure 20:
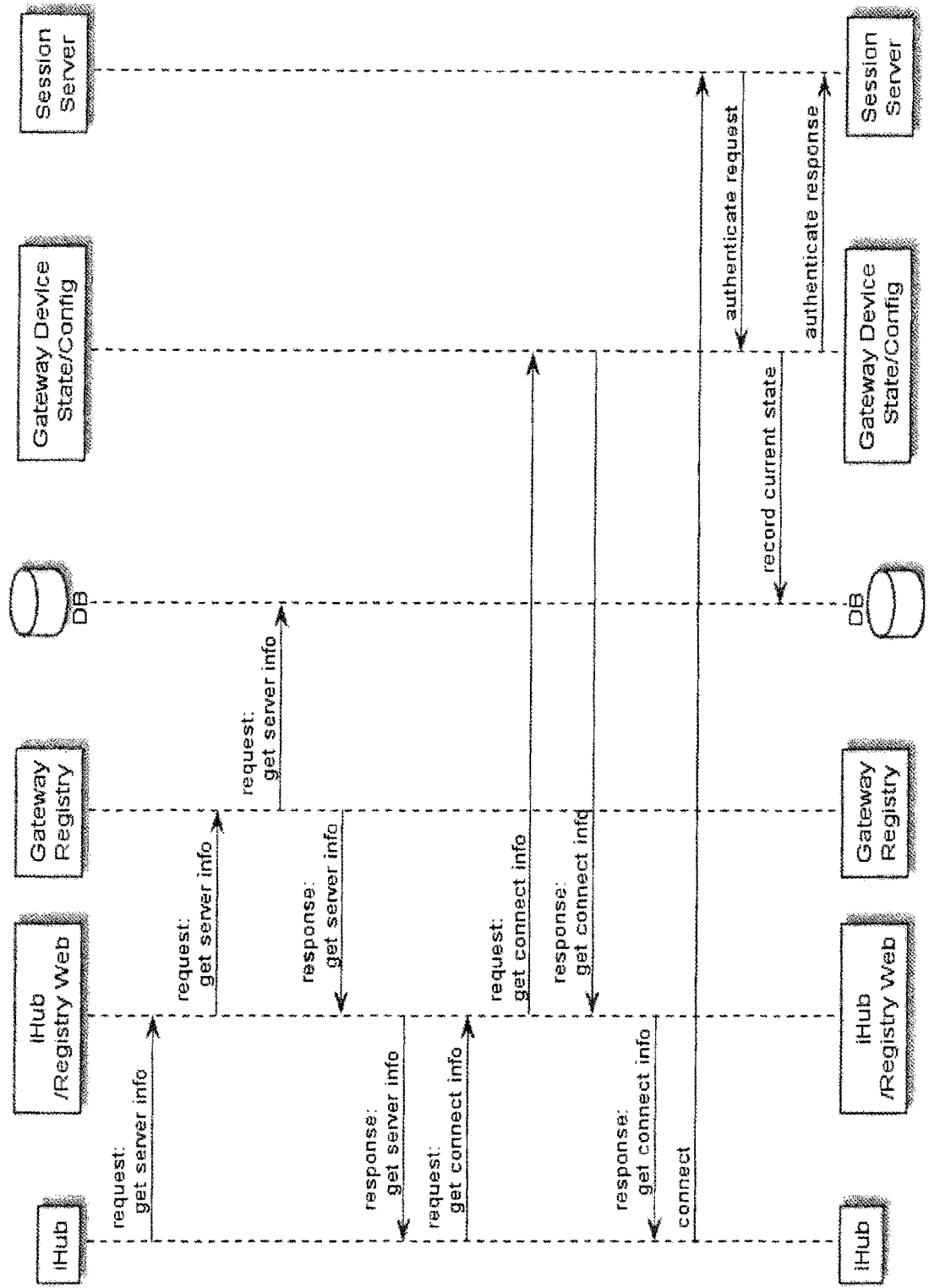
FIG. 20 is a flow diagram for iHub reboot, under an embodiment.

FIG. 20 is a flow diagram for iHub reboot, under an embodiment. This flow shows the signal and data flow that results when an iHub or ngHub reboots (includes references to the above flows).

1. iHub→iHub/Registry Web (request: get server info)
2. iHub/Registry Web→Gateway Registry (request: get server info)
3. Registry→DB (request: get server info)

4. Registry→iHub/Registry Web (response: get server info)
5. iHub/Registry Web→iHub (response: get server info)
6. iHub→iHub/Registry Web (request: get connect info)
7. iHub/Registry Web→Gateway Device State/Config (request: get connect info)
8. Gateway Device State/Config→iHub/Registry Web (response: get connect info)
9. iHub/Registry Web→iHub (response: get connect info)
10. iHub→Session Server
11. Session Server→Gateway Device State/Config (authenticate request)
12. Gateway Device State/Config→DB
13. Gateway Device State/Config→Session Server (authenticate response)

Figure 21:
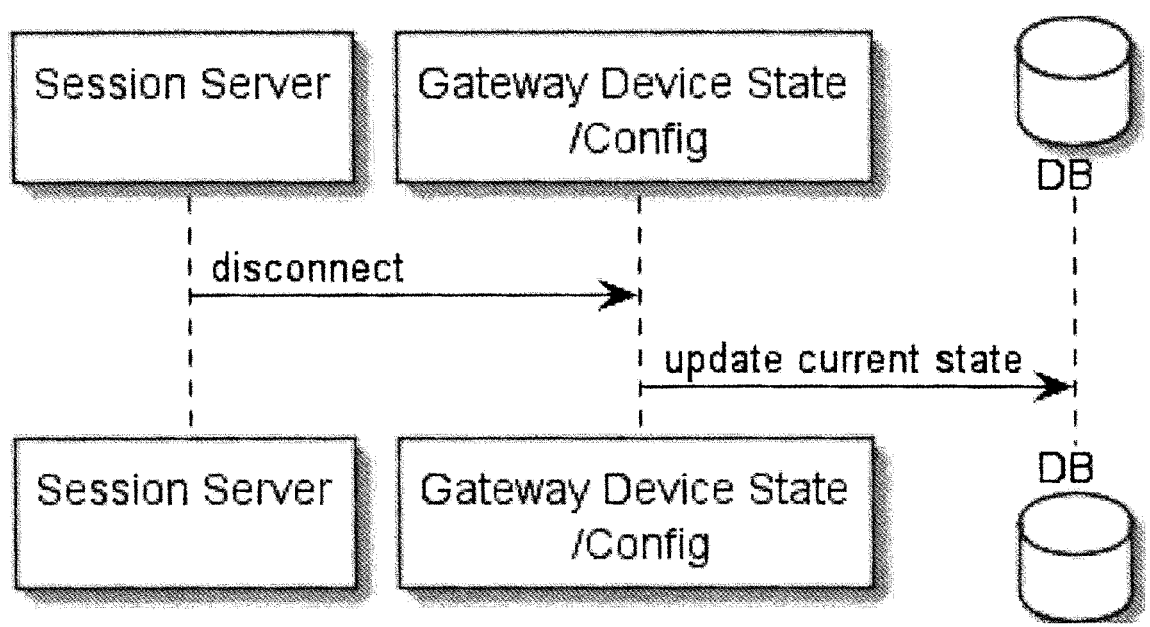
FIG. 21 is a flow diagram for iHub disconnect, under an embodiment.

FIG. 21 is a flow diagram for iHub disconnect, under an embodiment. This flow shows the signal and data flow that results when an iHub or ngHub disconnects from the server (includes references to the above flows).

1. Session Server→Gateway Device State/Config (disconnect)
2. Gateway Device State/Config→DB The system of embodiments including the Cloud Hub and Virtual Gateway as described in detail herein includes one or more components of the "integrated security system" described in detail herein and in the Related Applications, which are incorporated by reference herein. An example of the "integrated security system" is available as one or more of the numerous systems or platforms available from iControl Networks, Inc., Redwood City, Calif. The system of an embodiment described herein incorporates one or more components of the "integrated security system". The system of an embodiment described herein is coupled to one or more components of the "integrated security system". The system of an embodiment described herein integrates with one or more components of the "integrated security system".

More particularly, the methods and processes of the integrated security system, and hence the full functionality, can be implemented in the system described herein including the Cloud Hub and Virtual Gateway. Therefore, embodiments of the systems described herein integrate broadband and mobile access and control with conventional security systems and premise devices to provide a tri-mode security network (broadband, cellular/GSM, POTS access) that enables users to remotely stay connected to their premises. The integrated security system, while delivering remote premise monitoring and control functionality to conventional monitored premise protection, complements existing premise protection equipment. The integrated security system integrates into the premise network and couples wirelessly with the conventional security panel, enabling broadband access to premise security systems. Automation devices (cameras, lamp modules, thermostats, etc.) can be added, enabling users to remotely see live video and/or pictures and control home devices via their personal web portal or webpage, mobile phone, and/or other remote client device. Users can also receive notifications via email or text message when happenings occur, or do not occur, in their home.

In accordance with the embodiments described herein, a wireless system (e.g., radio frequency (RF)) is provided that enables a security provider or consumer to extend the capabilities of an existing RF-capable security system or a non-RF-capable security system that has been upgraded to support RF capabilities. The system includes an RF-capable Gateway device (physically located within RF range of the RF-capable security system) and associated software operating on the Gateway device. The system also includes a web server, application server, and remote database providing a persistent store for information related to the system.

The security systems of an embodiment, referred to herein as the iControl security system or integrated security system, extend the value of traditional home security by adding broadband access and the advantages of remote home monitoring and home control through the formation of a security network including components of the integrated security system integrated with a conventional premise security system and a premise local area network (LAN). With the integrated security system, conventional home security sensors, cameras, touchscreen keypads, lighting controls, and/or Internet Protocol (IP) devices in the home (or business) become connected devices that are accessible anywhere in the world from a web browser, mobile phone or through content-enabled touchscreens. The integrated security system experience allows security operators to both extend the value proposition of their monitored security systems and reach new consumers that include broadband users interested in staying connected to their family, home and property when they are away from home.

The integrated security system of an embodiment includes security servers (also referred to herein as iConnect servers or security network servers) and an iHub gateway (also referred to herein as the gateway, the iHub, or the iHub client) that couples or integrates into a home network (e.g., LAN) and communicates directly with the home security panel, in both wired and wireless installations. The security system of an embodiment automatically discovers the security system components (e.g., sensors, etc.) belonging to the security system and connected to a control panel of the security system and provides consumers with full two-way access via web and mobile portals. The gateway supports various wireless protocols and can interconnect with a wide range of control panels offered by security system providers. Service providers and users can then extend the system's capabilities with the additional IP cameras, lighting modules or security devices such as interactive touchscreen keypads. The integrated security system adds an enhanced value to these security systems by enabling consumers to stay connected through email and SMS alerts, photo push, event-based video capture and rule-based monitoring and notifications. This solution extends the reach of home security to households with broadband access.

The integrated security system builds upon the foundation afforded by traditional security systems by layering broadband and mobile access, IP cameras, interactive touchscreens, and an open approach to home automation on top of traditional security system configurations. The integrated security system is easily installed and managed by the security operator, and simplifies the traditional security installation process, as described below.

The integrated security system provides an open systems solution to the home security market. As such, the foundation of the integrated security system customer premises equipment (CPE) approach has been to abstract devices, and allows applications to manipulate and manage multiple devices from any vendor. The integrated security system DeviceConnect technology that enables this capability supports protocols, devices, and panels from GE Security and Honeywell, as well as consumer devices using Z-Wave, IP cameras (e.g., Ethernet, wifi, and Homeplug), and IP touchscreens. The DeviceConnect is a device abstraction layer that enables any device or protocol layer to interoperate with integrated security system components. This architecture enables the addition of new devices supporting any of these interfaces, as well as add entirely new protocols.

The benefit of DeviceConnect is that it provides supplier flexibility. The same consistent touchscreen, web, and mobile user experience operate unchanged on whatever security equipment selected by a security system provider, with the system provider's choice of IP cameras, backend data center and central station software.

The integrated security system provides a complete system that integrates or layers on top of a conventional host security system available from a security system provider. The security system provider therefore can select different components or configurations to offer (e.g., CDMA, GPRS, no cellular, etc.) as well as have iControl modify the integrated security system configuration for the system provider's specific needs (e.g., change the functionality of the web or mobile portal, add a GE or Honeywell-compatible TouchScreen, etc.).

The integrated security system integrates with the security system provider infrastructure for central station reporting directly via Broadband and GPRS alarm transmissions. Traditional dial-up reporting is supported via the standard panel connectivity. Additionally, the integrated security system provides interfaces for advanced functionality to the CMS, including enhanced alarm events, system installation optimizations, system test verification, video verification, 2-way voice over IP and GSM.

The integrated security system is an IP centric system that includes broadband connectivity so that the gateway augments the existing security system with broadband and GPRS connectivity. If broadband is down or unavailable GPRS may be used, for example. The integrated security system supports GPRS connectivity using an optional wireless package that includes a GPRS modem in the gateway. The integrated security system treats the GPRS connection as a higher cost though flexible option for data transfers. In an embodiment the GPRS connection is only used to route alarm events (e.g., for cost), however the gateway can be configured (e.g., through the iConnect server interface) to act as a primary channel and pass any or all events over GPRS. Consequently, the integrated security system does not interfere with the current plain old telephone service (POTS) security panel interface. Alarm events can still be routed through POTS; however the gateway also allows such events to be routed through a broadband or GPRS connection as well. The integrated security system provides a web application interface to the CSR tool suite as well as XML web services interfaces for programmatic integration between the security system provider's existing call center products. The integrated security system includes, for example, APIs that allow the security system provider to integrate components of the integrated security system into a custom call center interface. The APIs include XML web service APIs for integration of existing security system provider call center applications with the integrated security system service. All functionality available in the CSR Web application is provided with these API sets. The Java and XML-based APIs of the integrated security system support provisioning, billing, system administration, CSR, central station, portal user interfaces, and content management functions, to name a few. The integrated security system can provide a customized interface to the security system provider's billing system, or alternatively can provide security system developers with APIs and support in the integration effort.

The integrated security system provides or includes business component interfaces for provisioning, administration, and customer care to name a few. Standard templates and examples are provided with a defined customer professional services engagement to help integrate OSS/BSS systems of a Service Provider with the integrated security system.

The integrated security system components support and allow for the integration of customer account creation and deletion with a security system. The iConnect APIs provides access to the provisioning and account management system in iConnect and provide full support for account creation, provisioning, and deletion. Depending on the requirements of the security system provider, the iConnect APIs can be used to completely customize any aspect of the integrated security system backend operational system.

The integrated security system includes a gateway that supports the following standards-based interfaces, to name a few: Ethernet IP communications via Ethernet ports on the gateway, and standard XML/TCP/IP protocols and ports are employed over secured SSL sessions; USB 2.0 via ports on the gateway; 802.11b/g/n IP communications; GSM/GPRS RF WAN communications; CDMA 1×RTT RF WAN communications (optional, can also support EVDO and 3G technologies).

The gateway supports the following proprietary interfaces, to name a few: interfaces including Dialog RF network (319.5 MHz) and RS485 Superbus 2000 wired interface; RF mesh network (908 MHz); and interfaces including RF network (345 MHz) and RS485/RS232bus wired interfaces.

Regarding security for the IP communications (e.g., authentication, authorization, encryption, anti-spoofing, etc), the integrated security system uses SSL to encrypt all IP traffic, using server and client-certificates for authentication, as well as authentication in the data sent over the SSL-encrypted channel. For encryption, integrated security system issues public/private key pairs at the time/place of manufacture, and certificates are not stored in any online storage in an embodiment.

The integrated security system does not need any special rules at the customer premise and/or at the security system provider central station because the integrated security system makes outgoing connections using TCP over the standard HTTP and HTTPS ports. Provided outbound TCP connections are allowed then no special requirements on the firewalls are necessary.

Figure 22:
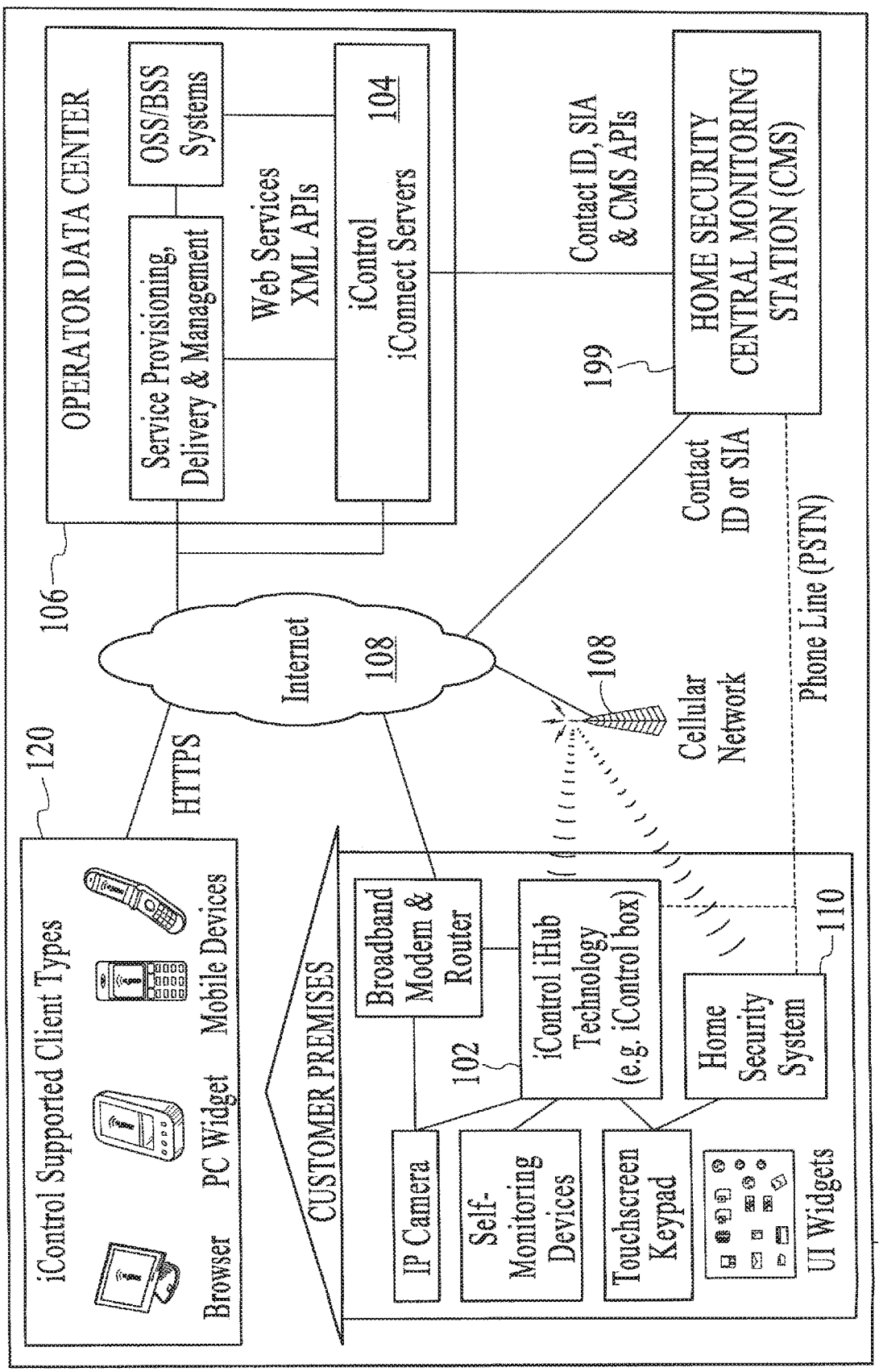
FIG. 22 is a block diagram of the integrated security system, under an embodiment.

FIG. 22 is a block diagram of the integrated security system 100, under an embodiment. The integrated security system 100 of an embodiment includes the gateway 102 and the security servers 104 coupled to the conventional home security system 110. At a customer's home or business, the gateway 102 connects and manages the diverse variety of home security and self-monitoring devices. The gateway 102 communicates with the iConnect Servers 104 located in the service provider's data center 106 (or hosted in integrated security system data center), with the communication taking place via a communication network 108 or other network (e.g., cellular network, internet, etc.). These servers 104 manage the system integrations necessary to deliver the integrated system service described herein. The combination of the gateway 102 and the iConnect servers 104 enable a wide variety of remote client devices 120 (e.g., PCs, mobile phones and PDAs) allowing users to remotely stay in touch with their home, business and family. In addition, the technology allows home security and self-monitoring information, as well as relevant third party content such as traffic and weather, to be presented in intuitive ways within the home, such as on advanced touchscreen keypads.

The integrated security system service (also referred to as iControl service) can be managed by a service provider via browser-based Maintenance and Service Management applications that are provided with the iConnect Servers. Or, if desired, the service can be more tightly integrated with existing OSS/BSS and service delivery systems via the iConnect web services-based XML APIs.

The integrated security system service can also coordinate the sending of alarms to the home security Central Monitoring Station (CMS) 199. Alarms are passed to the CMS 199 using standard protocols such as Contact ID or SIA and can be generated from the home security panel location as well as by iConnect server 104 conditions (such as lack of communications with the integrated security system). In addition, the link between the security servers 104 and CMS 199 provides tighter integration between home security and self-monitoring devices and the gateway 102. Such integration enables advanced security capabilities such as the ability for CMS personnel to view photos taken at the time a burglary alarm was triggered. For maximum security, the gateway 102 and iConnect servers 104 support the use of a mobile network (both GPRS and CDMA options are available) as a backup to the primary broadband connection.

Figure 23:
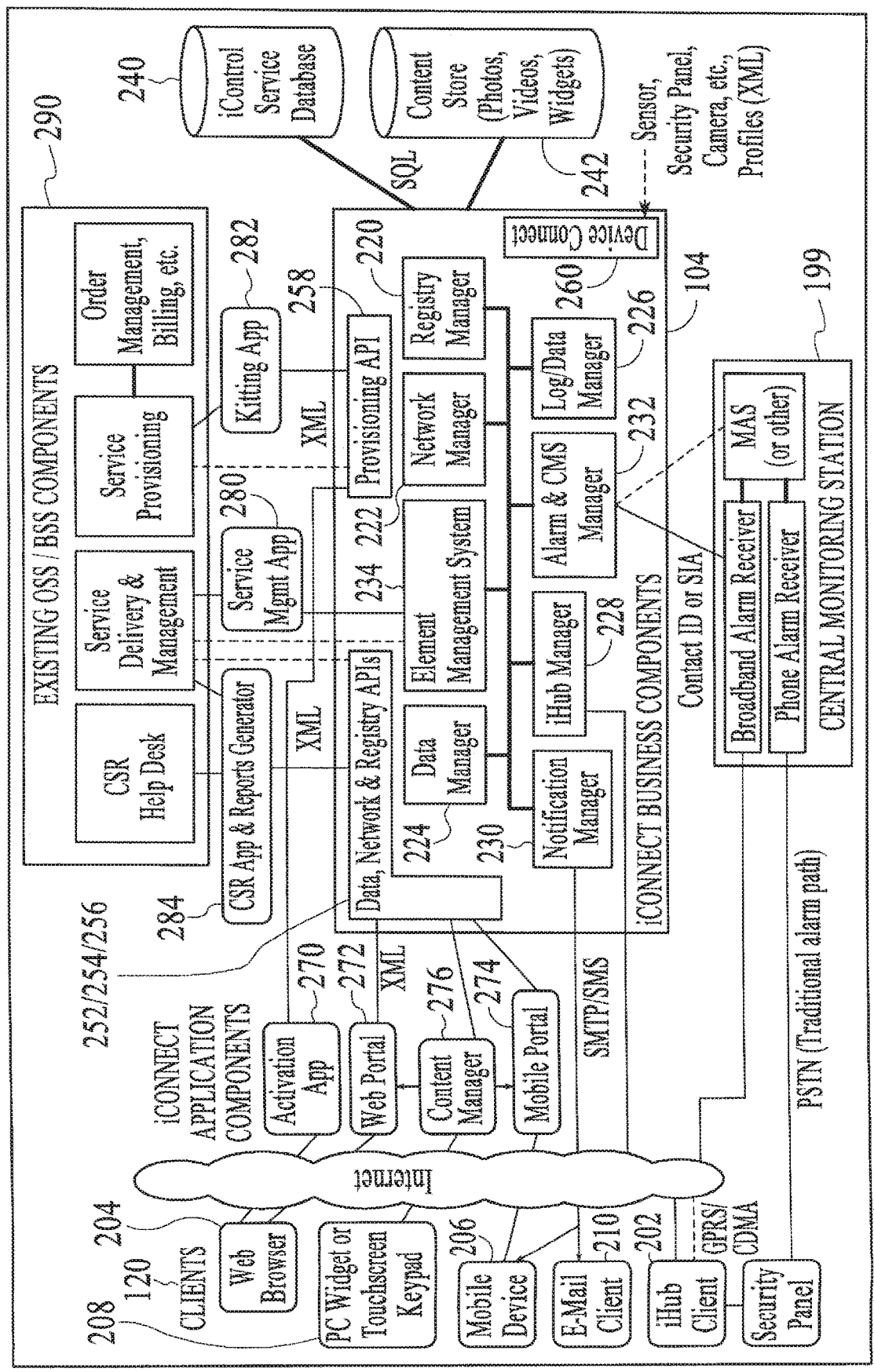
FIG. 23 is a block diagram of components of the integrated security system, under an embodiment.

The integrated security system service is delivered by hosted servers running software components that communicate with a variety of client types while interacting with other systems. FIG. 23 is a block diagram of components of the integrated security system 100, under an embodiment. Following is a more detailed description of the components.

The iConnect servers 104 support a diverse collection of clients 120 ranging from mobile devices, to PCs, to in-home security devices, to a service provider's internal systems. Most clients 120 are used by end-users, but there are also a number of clients 120 that are used to operate the service.

Clients 120 used by end-users of the integrated security system 100 include, but are not limited to, the following: Clients based on gateway client applications 202 (e.g., a processor-based device running the gateway technology that manages home security and automation devices).
  A web browser 204 accessing a Web Portal application, performing end-user configuration and customization of the integrated security system service as well as monitoring of in-home device status, viewing photos and video, etc. Device and user management can also be performed by this portal application.
  A mobile device 206 (e.g., PDA, mobile phone, etc.) accessing the integrated security system Mobile Portal. This type of client 206 is used by end-users to view system status and perform operations on devices (e.g., turning on a lamp, arming a security panel, etc.) rather than for system configuration tasks such as adding a new device or user.
  PC or browser-based "widget" containers 208 that present integrated security system service content, as well as other third-party content, in simple, targeted ways (e.g. a widget that resides on a PC desktop and shows live video from a single in-home camera). "Widget" as used herein means applications or programs in the system.
  Touchscreen home security keypads 208 and advanced in-home devices that present a variety of content widgets via an intuitive touchscreen user interface.
  Notification recipients 210 (e.g., cell phones that receive SMS-based notifications when certain events occur (or don't occur), email clients that receive an email message with similar information, etc.).
  Custom-built clients (not shown) that access the iConnect web services XML API to interact with users' home security and self-monitoring information in new and unique ways. Such clients could include new types of mobile devices, or complex applications where integrated security system content is integrated into a broader set of application features.

In addition to the end-user clients, the iConnect servers 104 support PC browser-based Service Management clients that manage the ongoing operation of the overall service. These clients run applications that handle tasks such as provisioning, service monitoring, customer support and reporting.

There are numerous types of server components of the iConnect servers 104 of an embodiment including, but not limited to, the following: Business Components which manage information about all of the home security and self-monitoring devices; End-User Application Components which display that information for users and access the Business Components via published XML APIs; and Service Management Application Components which enable operators to administer the service (these components also access the Business Components via the XML APIs, and also via published SNMP MIBs).

The server components provide access to, and management of, the objects associated with an integrated security system installation. The top-level object is the "network." It is a location where a gateway 102 is located, and is also commonly referred to as a site or premises; the premises can include any type of structure (e.g., home, office, warehouse, etc.) at which a gateway 102 is located. Users can only access the networks to which they have been granted permission. Within a network, every object monitored by the gateway 102 is called a device. Devices include the sensors, cameras, home security panels and automation devices, as well as the controller or processor-based device running the gateway applications.

Various types of interactions are possible between the objects in a system. Automations define actions that occur as a result of a change in state of a device. For example, take a picture with the front entry camera when the front door sensor changes to "open". Notifications are messages sent to users to indicate that something has occurred, such as the front door going to "open" state, or has not occurred (referred to as an iWatch notification). Schedules define changes in device states that are to take place at predefined days and times. For example, set the security panel to "Armed" mode every weeknight at 11:00 pm.

The iConnect Business Components are responsible for orchestrating all of the low-level service management activities for the integrated security system service. They define all of the users and devices associated with a network (site), analyze how the devices interact, and trigger associated actions (such as sending notifications to users). All changes in device states are monitored and logged. The Business Components also manage all interactions with external systems as required, including sending alarms and other related self-monitoring data to the home security Central Monitoring System (CMS) 199. The Business Components are implemented as portable Java J2EE Servlets, but are not so limited.

The following iConnect Business Components manage the main elements of the integrated security system service, but the embodiment is not so limited:
  A Registry Manager 220 defines and manages users and networks. This component is responsible for the creation, modification and termination of users and networks. It is also where a user's access to networks is defined.

A Network Manager 222 defines and manages security and self-monitoring devices that are deployed on a network (site). This component handles the creation, modification, deletion and configuration of the devices, as well as the creation of automations, schedules and notification rules associated with those devices.

A Data Manager 224 manages access to current and logged state data for an existing network and its devices. This component specifically does not provide any access to network management capabilities, such as adding new devices to a network, which are handled exclusively by the Network Manager 222.

To achieve optimal performance for all types of queries, data for current device states is stored separately from historical state data (a.k.a. "logs") in the database. A Log Data Manager 226 performs ongoing transfers of current device state data to the historical data log tables.

Additional iConnect Business Components handle direct communications with certain clients and other systems, for example:

An iHub Manager 228 directly manages all communications with gateway clients, including receiving information about device state changes, changing the configuration of devices, and pushing new versions of the gateway client to the hardware it is running on.

A Notification Manager 230 is responsible for sending all notifications to clients via SMS (mobile phone messages), email (via a relay server like an SMTP email server), etc.

An Alarm and CMS Manager 232 sends critical server-generated alarm events to the home security Central Monitoring Station (CMS) and manages all other communications of integrated security system service data to and from the CMS.

The Element Management System (EMS) 234 is an iControl Business Component that manages all activities associated with service installation, scaling and monitoring, and filters and packages service operations data for use by service management applications. The SNMP MIBs published by the EMS can also be incorporated into any third party monitoring system if desired.

The iConnect Business Components store information about the objects that they manage in the iControl Service Database 240 and in the iControl Content Store 242. The iControl Content Store is used to store media objects like video, photos and widget content, while the Service Database stores information about users, networks, and devices. Database interaction is performed via a JDBC interface. For security purposes, the Business Components manage all data storage and retrieval.

The iControl Business Components provide web services-based APIs that application components use to access the Business Components' capabilities. Functions of application components include presenting integrated security system service data to end-users, performing administrative duties, and integrating with external systems and back-office applications.

The primary published APIs for the iConnect Business Components include, but are not limited to, the following:

A Registry Manager API 252 provides access to the Registry Manager Business Component's functionality, allowing management of networks and users.

A Network Manager API 254 provides access to the Network Manager Business Component's functionality, allowing management of devices on a network.

A Data Manager API 256 provides access to the Data Manager Business Component's functionality, such as setting and retrieving (current and historical) data about device states.

A Provisioning API 258 provides a simple way to create new networks and configure initial default properties.

Each API of an embodiment includes two modes of access: Java API or XML API. The XML APIs are published as web services so that they can be easily accessed by applications or servers over a network. The Java APIs are a programmer-friendly wrapper for the XML APIs. Application components and integrations written in Java should generally use the Java APIs rather than the XML APIs directly.

The iConnect Business Components also have an XML-based interface 260 for quickly adding support for new devices to the integrated security system. This interface 260, referred to as DeviceConnect 260, is a flexible, standards-based mechanism for defining the properties of new devices and how they can be managed. Although the format is flexible enough to allow the addition of any type of future device, pre-defined XML profiles are currently available for adding common types of devices such as sensors (Sensor-Connect), home security panels (PanelConnect) and IP cameras (CameraConnect).

The iConnect End-User Application Components deliver the user interfaces that run on the different types of clients supported by the integrated security system service. The components are written in portable Java J2EE technology (e.g., as Java Servlets, as JavaServer Pages (JSPs), etc.) and they all interact with the iControl Business Components via the published APIs.

The following End-User Application Components generate CSS-based HTML/JavaScript that is displayed on the target client. These applications can be dynamically branded with partner-specific logos and URL links (such as Customer Support, etc.). The End-User Application Components of an embodiment include, but are not limited to, the following:

An iControl Activation Application 270 that delivers the first application that a user sees when they set up the integrated security system service. This wizard-based web browser application securely associates a new user with a purchased gateway and the other devices included with it as a kit (if any). It primarily uses functionality published by the Provisioning API.

An iControl Web Portal Application 272 runs on PC browsers and delivers the web-based interface to the integrated security system service. This application allows users to manage their networks (e.g. add devices and create automations) as well as to view/change device states, and manage pictures and videos. Because of the wide scope of capabilities of this application, it uses three different Business Component APIs that include the Registry Manager API, Network Manager API, and Data Manager API, but the embodiment is not so limited.

An iControl Mobile Portal 274 is a small-footprint web-based interface that runs on mobile phones and PDAs. This interface is optimized for remote viewing of device states and pictures/videos rather than network management. As such, its interaction with the Business Components is primarily via the Data Manager API.

Custom portals and targeted client applications can be provided that leverage the same Business Component APIs used by the above applications.

A Content Manager Application Component 276 delivers content to a variety of clients. It sends multimedia-rich user interface components to widget container clients (both PC and browser-based), as well as to advanced touchscreen keypad clients. In addition to providing content directly to end-user devices, the Content Manager 276 provides widget-based user interface components to satisfy requests from other Application Components such as the iControl Web 272 and Mobile 274 portals.

A number of Application Components are responsible for overall management of the service. These pre-defined applications, referred to as Service Management Application Components, are configured to offer off-the-shelf solutions for production management of the integrated security system service including provisioning, overall service monitoring, customer support, and reporting, for example. The Service Management Application Components of an embodiment include, but are not limited to, the following:

A Service Management Application 280 allows service administrators to perform activities associated with service installation, scaling and monitoring/alerting. This application interacts heavily with the Element Management System (EMS) Business Component to execute its functionality, and also retrieves its monitoring data from that component via protocols such as SNMP MIBs.

A Kitting Application 282 is used by employees performing service provisioning tasks. This application allows home security and self-monitoring devices to be associated with gateways during the warehouse kitting process.

A CSR Application and Report Generator 284 is used by personnel supporting the integrated security system service, such as CSRs resolving end-user issues and employees enquiring about overall service usage. Pushes of new gateway firmware to deployed gateways is also managed by this application.

The iConnect servers 104 also support custom-built integrations with a service provider's existing OSS/BSS, CSR and service delivery systems 290. Such systems can access the iConnect web services XML API to transfer data to and from the iConnect servers 104. These types of integrations can compliment or replace the PC browser-based Service Management applications, depending on service provider needs.

As described above, the integrated security system of an embodiment includes a gateway, or iHub. The gateway of an embodiment includes a device that is deployed in the home or business and couples or connects the various third-party cameras, home security panels, sensors and devices to the iConnect server over a WAN connection as described in detail herein. The gateway couples to the home network and communicates directly with the home security panel in both wired and wireless sensor installations. The gateway is configured to be low-cost, reliable and thin so that it complements the integrated security system network-based architecture.

The gateway supports various wireless protocols and can interconnect with a wide range of home security control panels. Service providers and users can then extend the system's capabilities by adding IP cameras, lighting modules and additional security devices. The gateway is configurable to be integrated into many consumer appliances, including set-top boxes, routers and security panels. The small and efficient footprint of the gateway enables this portability and versatility, thereby simplifying and reducing the overall cost of the deployment.

Figure 24:
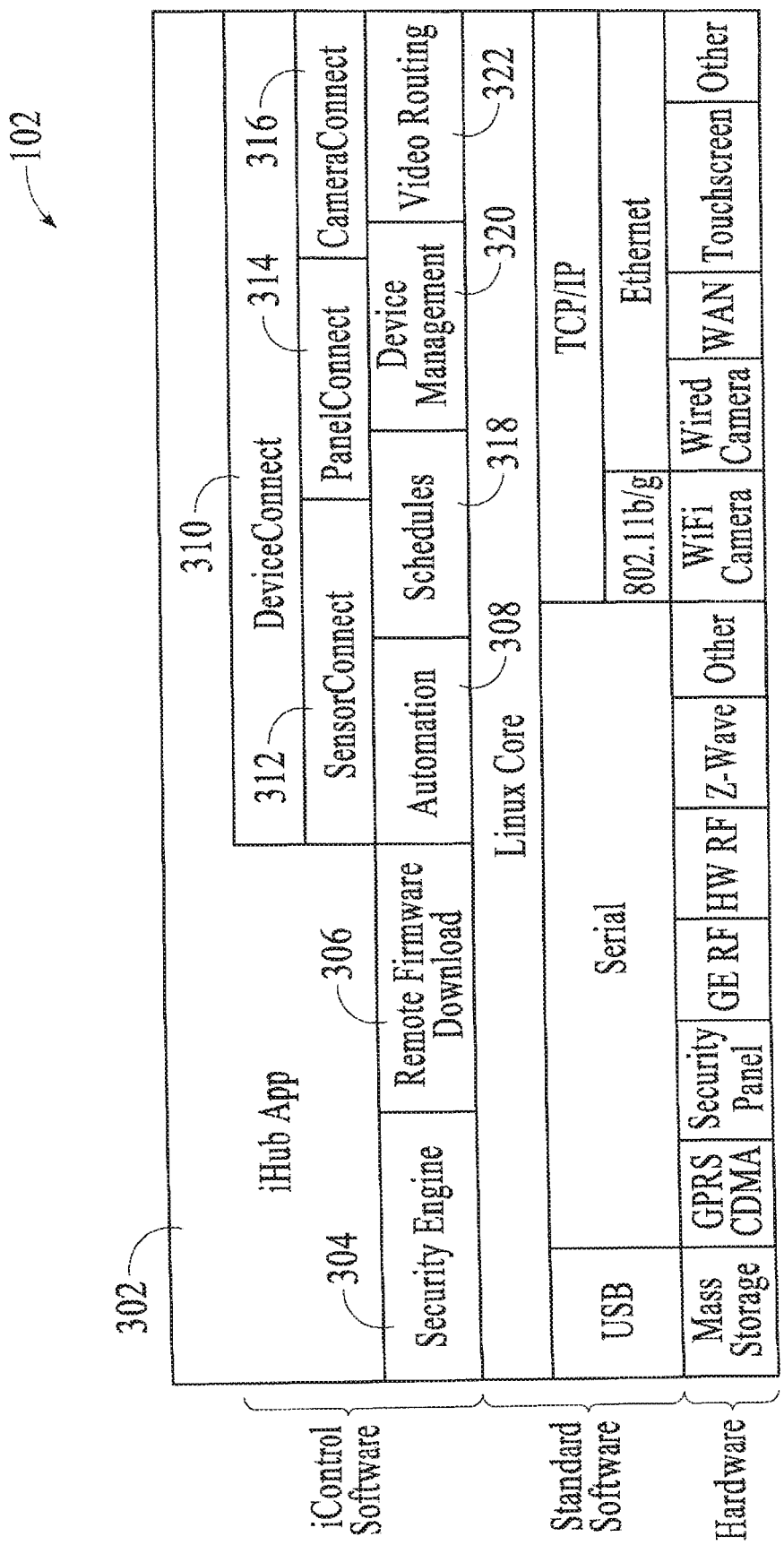
FIG. 24 is a block diagram of the gateway including gateway software or applications, under an embodiment.

FIG. 24 is a block diagram of the gateway 102 including gateway software or applications, under an embodiment. The gateway software architecture is relatively thin and efficient, thereby simplifying its integration into other consumer appliances such as set-top boxes, routers, touch screens and security panels. The software architecture also provides a high degree of security against unauthorized access. This section describes the various key components of the gateway software architecture.

The gateway application layer 302 is the main program that orchestrates the operations performed by the gateway. The Security Engine 304 provides robust protection against intentional and unintentional intrusion into the integrated security system network from the outside world (both from inside the premises as well as from the WAN). The Security Engine 304 of an embodiment comprises one or more sub-modules or components that perform functions including, but not limited to, the following:

Encryption including 128-bit SSL encryption for gateway and iConnect server communication to protect user data privacy and provide secure communication.

Bi-directional authentication between the gateway and iConnect server in order to prevent unauthorized spoofing and attacks. Data sent from the iConnect server to the gateway application (or vice versa) is digitally signed as an additional layer of security. Digital signing provides both authentication and validation that the data has not been altered in transit.

Camera SSL encapsulation because picture and video traffic offered by off-the-shelf networked IP cameras is not secure when traveling over the Internet. The gateway provides for 128-bit SSL encapsulation of the user picture and video data sent over the internet for complete user security and privacy.

802.11b/g/n with WPA-2 security to ensure that wireless camera communications always takes place using the strongest available protection.

A gateway-enabled device is assigned a unique activation key for activation with an iConnect server. This ensures that only valid gateway-enabled devices can be activated for use with the specific instance of iConnect server in use. Attempts to activate gateway-enabled devices by brute force are detected by the Security Engine. Partners deploying gateway-enabled devices have the knowledge that only a gateway with the correct serial number and activation key can be activated for use with an iConnect server. Stolen devices, devices attempting to masquerade as gateway-enabled devices, and malicious outsiders (or insiders as knowledgeable but nefarious customers) cannot effect other customers' gateway-enabled devices.

As standards evolve, and new encryption and authentication methods are proven to be useful, and older mechanisms proven to be breakable, the security manager can be upgraded "over the air" to provide new and better security for communications between the iConnect server and the gateway application, and locally at the premises to remove any risk of eavesdropping on camera communications.

A Remote Firmware Download module 306 allows for seamless and secure updates to the gateway firmware through the iControl Maintenance Application on the server 104, providing a transparent, hassle-free mechanism for the service provider to deploy new features and bug fixes to the installed user base. The firmware download mechanism is tolerant of connection loss, power interruption and user interventions (both intentional and unintentional). Such robustness reduces down time and customer support issues.

Gateway firmware can be remotely download either for one gateway at a time, a group of gateways, or in batches.

The Automations engine 308 manages the user-defined rules of interaction between the different devices (e.g. when door opens turn on the light). Though the automation rules are programmed and reside at the portal/server level, they are cached at the gateway level in order to provide short latency between device triggers and actions.

DeviceConnect 310 includes definitions of all supported devices (e.g., cameras, security panels, sensors, etc.) using a standardized plug-in architecture. The DeviceConnect module 310 offers an interface that can be used to quickly add support for any new device as well as enabling interoperability between devices that use different technologies/ protocols. For common device types, pre-defined sub-modules have been defined, making supporting new devices of these types even easier. SensorConnect 312 is provided for adding new sensors, CameraConnect 316 for adding IP cameras, and PanelConnect 314 for adding home security panels.

The Schedules engine 318 is responsible for executing the user defined schedules (e.g., take a picture every five minutes; every day at 8 am set temperature to 65 degrees Fahrenheit, etc.). Though the schedules are programmed and reside at the iConnect server level they are sent to the scheduler within the gateway application. The Schedules Engine 318 then interfaces with SensorConnect 312 to ensure that scheduled events occur at precisely the desired time.

The Device Management module 320 is in charge of all discovery, installation and configuration of both wired and wireless IP devices (e.g., cameras, etc.) coupled or connected to the system. Networked IP devices, such as those used in the integrated security system, require user configuration of many IP and security parameters—to simplify the user experience and reduce the customer support burden, the device management module of an embodiment handles the details of this configuration. The device management module also manages the video routing module described below.

The video routing engine 322 is responsible for delivering seamless video streams to the user with zero-configuration. Through a multi-step, staged approach the video routing engine uses a combination of UPnP port-forwarding, relay server routing and STUN/TURN peer-to-peer routing.

Figure 25:
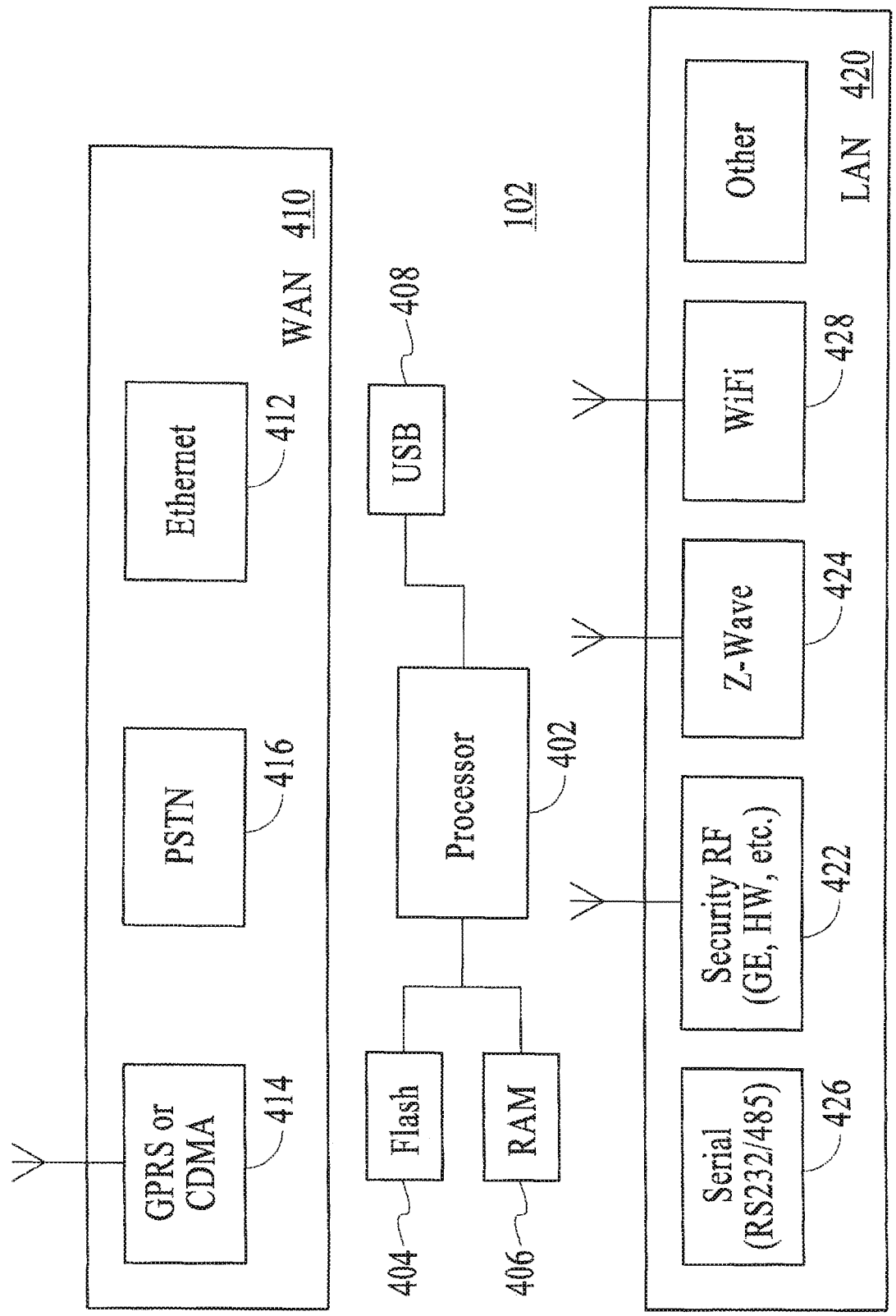
FIG. 25 is a block diagram of components of the gateway, under an embodiment.

FIG. 25 is a block diagram of components of the gateway 102, under an embodiment. Depending on the specific set of functionality desired by the service provider deploying the integrated security system service, the gateway 102 can use any of a number of processors 402, due to the small footprint of the gateway application firmware. In an embodiment, the gateway could include the Broadcom BCM5354 as the processor for example. In addition, the gateway 102 includes memory (e.g., FLASH 404, RAM 406, etc.) and any number of input/output (I/O) ports 408.

Referring to the WAN portion 410 of the gateway 102, the gateway 102 of an embodiment can communicate with the iConnect server using a number of communication types and/or protocols, for example Broadband 412, GPRS 414 and/or Public Switched Telephone Network (PTSN) 416 to name a few. In general, broadband communication 412 is the primary means of connection between the gateway 102 and the iConnect server 104 and the GPRS/CDMA 414 and/or PSTN 416 interfaces acts as backup for fault tolerance in case the user's broadband connection fails for whatever reason, but the embodiment is not so limited.

Referring to the LAN portion 420 of the gateway 102, various protocols and physical transceivers can be used to communicate to off-the-shelf sensors and cameras. The gateway 102 is protocol-agnostic and technology-agnostic and as such can easily support almost any device networking protocol. The gateway 102 can, for example, support GE and Honeywell security RF protocols 422, Z-Wave 424, serial (RS232 and RS485) 426 for direct connection to security panels as well as WiFi 428 (802.11b/g) for communication to WiFi cameras.

The integrated security system includes couplings or connections among a variety of IP devices or components, and the device management module is in charge of the discovery, installation and configuration of the IP devices coupled or connected to the system, as described above. The integrated security system of an embodiment uses a "sandbox" network to discover and manage all IP devices coupled or connected as components of the system. The IP devices of an embodiment include wired devices, wireless devices, cameras, interactive touchscreens, and security panels to name a few. These devices can be wired via ethernet cable or Wifi devices, all of which are secured within the sandbox network, as described below. The "sandbox" network is described in detail below.

Figure 26:
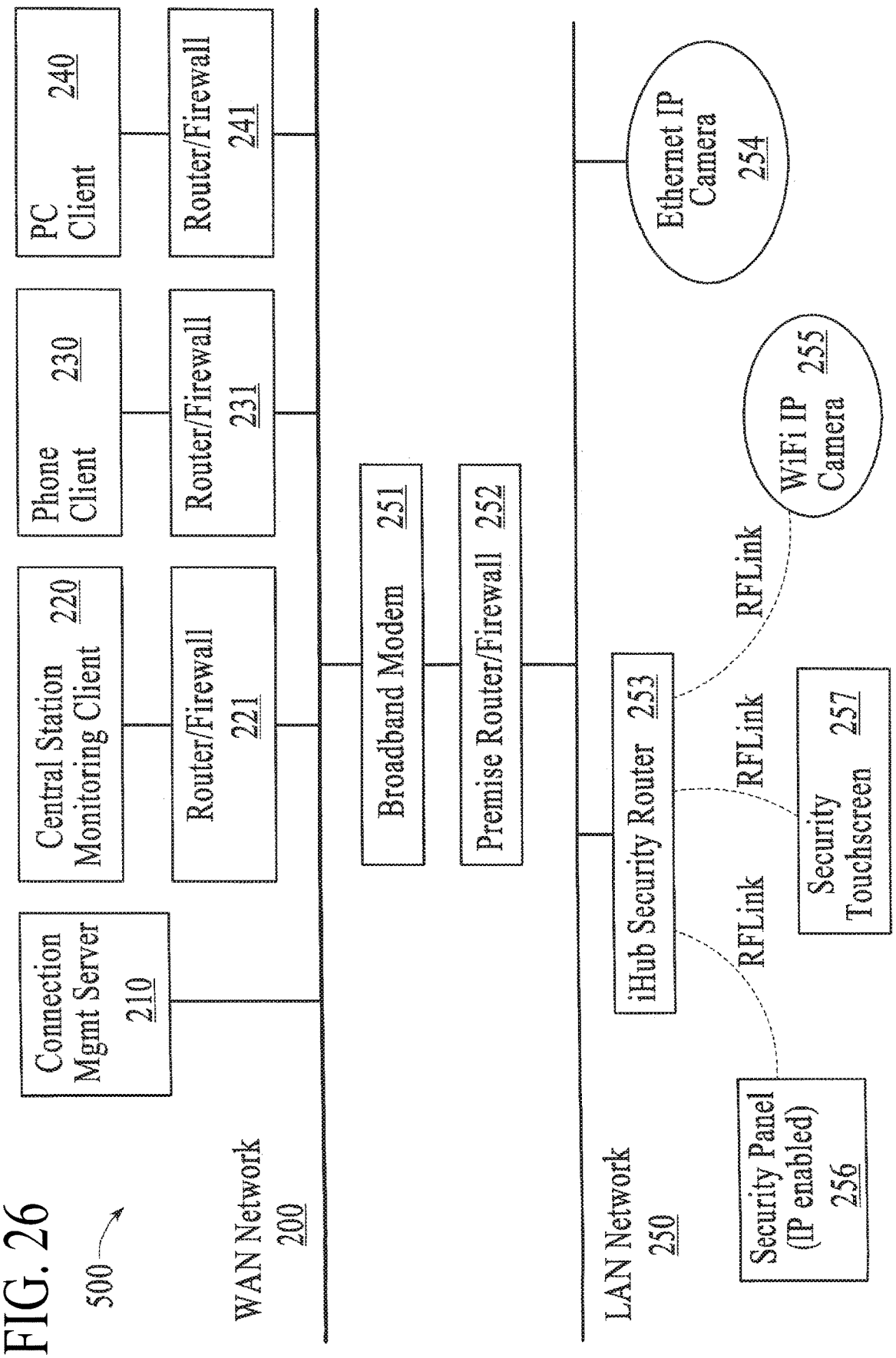
FIG. 26 is a block diagram of IP device integration with a premise network, under an embodiment.

FIG. 26 is a block diagram 500 of network or premise device integration with a premise network 250, under an embodiment. In an embodiment, network devices 255-257 are coupled to the gateway 102 using a secure network coupling or connection such as SSL over an encrypted 802.11 link (utilizing for example WPA-2 security for the wireless encryption). The network coupling or connection between the gateway 102 and the network devices 255-257 is a private coupling or connection in that it is segregated from any other network couplings or connections. The gateway 102 is coupled to the premise router/firewall 252 via a coupling with a premise LAN 250. The premise router/firewall 252 is coupled to a broadband modem 251, and the broadband modem 251 is coupled to a WAN 200 or other network outside the premise. The gateway 102 thus enables or forms a separate wireless network, or sub-network, that includes some number of devices and is coupled or connected to the LAN 250 of the host premises. The gateway sub-network can include, but is not limited to, any number of other devices like WiFi IP cameras, security panels (e.g., IP-enabled), and security touchscreens, to name a few. The gateway 102 manages or controls the sub-network separately from the LAN 250 and transfers data and information between components of the sub-network and the LAN 250/WAN 200, but is not so limited. Additionally, other network devices 254 can be coupled to the LAN 250 without being coupled to the gateway 102.

Figure 27:
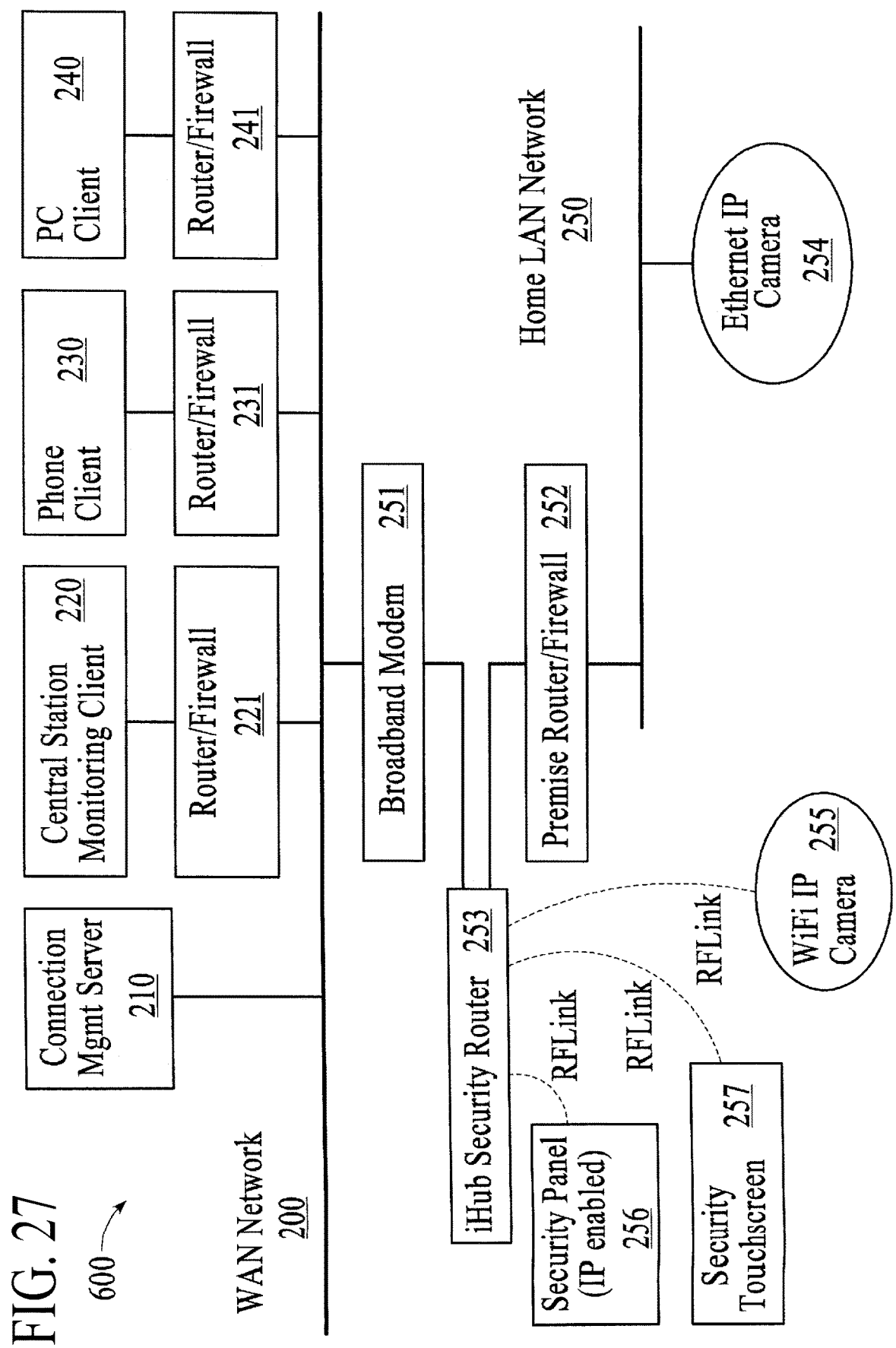
FIG. 27 is a block diagram of IP device integration with a premise network, under an alternative embodiment.

FIG. 27 is a block diagram 600 of network or premise device integration with a premise network 250, under an alternative embodiment. The network or premise devices 255-257 are coupled to the gateway 102. The network coupling or connection between the gateway 102 and the network devices 255-257 is a private coupling or connection in that it is segregated from any other network couplings or connections. The gateway 102 is coupled or connected between the premise router/firewall 252 and the broadband modem 251. The broadband modem 251 is coupled to a WAN 200 or other network outside the premise, while the premise router/firewall 252 is coupled to a premise LAN 250. As a result of its location between the broadband modem 251 and the premise router/firewall 252, the gateway 102 can be configured or function as the premise router routing specified data between the outside network (e.g., WAN 200) and the premise router/firewall 252 of the LAN 250. As described above, the gateway 102 in this configuration enables or forms a separate wireless network, or sub-network, that includes the network or premise devices 255-257 and is coupled or connected between the LAN 250 of the host premises and the WAN 200. The gateway sub-network can include, but is not limited to, any number of network or premise devices 255-257 like WiFi IP cameras, security panels (e.g., IP-enabled), and security touchscreens, to name a few. The gateway 102 manages or controls the sub-network separately from the LAN 250 and transfers data and information between components of the sub-network and the LAN 250/WAN 200, but is not so limited. Additionally, other network devices 254 can be coupled to the LAN 250 without being coupled to the gateway 102.

The examples described above with reference to FIGS. 5 and 6 are presented only as examples of IP device integration. The integrated security system is not limited to the type, number and/or combination of IP devices shown and described in these examples, and any type, number and/or combination of IP devices is contemplated within the scope of this disclosure as capable of being integrated with the premise network.

The integrated security system of an embodiment includes a touchscreen (also referred to as the iControl touchscreen or integrated security system touchscreen), as described above, which provides core security keypad functionality, content management and presentation, and embedded systems design. The networked security touchscreen system of an embodiment enables a consumer or security provider to easily and automatically install, configure and manage the security system and touchscreen located at a customer premise. Using this system the customer may access and control the local security system, local IP devices such as cameras, local sensors and control devices (such as lighting controls or pipe freeze sensors), as well as the local security system panel and associated security sensors (such as door/window, motion, and smoke detectors). The customer premise may be a home, business, and/or other location equipped with a wired or wireless broadband IP connection.

The system of an embodiment includes a touchscreen with a configurable software user interface and/or a gateway device (e.g., iHub) that couples or connects to a premise security panel through a wired or wireless connection, and a remote server that provides access to content and information from the premises devices to a user when they are remote from the home. The touchscreen supports broadband and/or WAN wireless connectivity. In this embodiment, the touchscreen incorporates an IP broadband connection (e.g., Wifi radio, Ethernet port, etc.), and/or a cellular radio (e.g., GPRS/GSM, CDMA, WiMax, etc.). The touchscreen described herein can be used as one or more of a security system interface panel and a network user interface (UI) that provides an interface to interact with a network (e.g., LAN, WAN, Internet, etc.).

The touchscreen of an embodiment provides an integrated touchscreen and security panel as an all-in-one device. Once integrated using the touchscreen, the touchscreen and a security panel of a premise security system become physically co-located in one device, and the functionality of both may even be co-resident on the same CPU and memory (though this is not required).

The touchscreen of an embodiment also provides an integrated IP video and touchscreen UI. As such, the touchscreen supports one or more standard video CODECs/players (e.g., H.264, Flash Video, MOV, MPEG4, M-JPEG, etc.). The touchscreen UI then provides a mechanism (such as a camera or video widget) to play video. In an embodiment the video is streamed live from an IP video camera. In other embodiments the video comprises video clips or photos sent from an IP camera or from a remote location.

The touchscreen of an embodiment provides a configurable user interface system that includes a configuration supporting use as a security touchscreen. In this embodiment, the touchscreen utilizes a modular user interface that allows components to be modified easily by a service provider, an installer, or even the end user. Examples of such a modular approach include using Flash widgets, HTML-based widgets, or other downloadable code modules such that the user interface of the touchscreen can be updated and modified while the application is running. In an embodiment the touchscreen user interface modules can be downloaded over the internet. For example, a new security configuration widget can be downloaded from a standard web server, and the touchscreen then loads such configuration app into memory, and inserts it in place of the old security configuration widget. The touchscreen of an embodiment is configured to provide a self-install user interface.

Embodiments of the networked security touchscreen system described herein include a touchscreen device with a user interface that includes a security toolbar providing one or more functions including arm, disarm, panic, medic, and alert. The touchscreen therefore includes at least one screen having a separate region of the screen dedicated to a security toolbar. The security toolbar of an embodiment is present in the dedicated region at all times that the screen is active.

The touchscreen of an embodiment includes a home screen having a separate region of the screen allocated to managing home-based functions. The home-based functions of an embodiment include managing, viewing, and/or controlling IP video cameras. In this embodiment, regions of the home screen are allocated in the form of widget icons; these widget icons (e.g. for cameras, thermostats, lighting, etc) provide functionality for managing home systems. So, for example, a displayed camera icon, when selected, launches a Camera Widget, and the Camera widget in turn provides access to video from one or more cameras, as well as providing the user with relevant camera controls (take a picture, focus the camera, etc.)

The touchscreen of an embodiment includes a home screen having a separate region of the screen allocated to managing, viewing, and/or controlling internet-based content or applications. For example, the Widget Manager UI presents a region of the home screen (up to and including the entire home screen) where internet widgets icons such as weather, sports, etc. may be accessed). Each of these icons may be selected to launch their respective content services.

The touchscreen of an embodiment is integrated into a premise network using the gateway, as described above. The gateway as described herein functions to enable a separate wireless network, or sub-network, that is coupled, connected, or integrated with another network (e.g., WAN, LAN of the host premises, etc.). The sub-network enabled by the gateway optimizes the installation process for IP devices, like the touchscreen, that couple or connect to the sub-network by segregating these IP devices from other such devices on the network. This segregation of the IP devices of the sub-network further enables separate security and privacy policies to be implemented for these IP devices so that, where the IP devices are dedicated to specific functions (e.g., security), the security and privacy policies can be tailored specifically for the specific functions. Furthermore, the gateway and the sub-network it forms enables the segregation of data traffic, resulting in faster and more efficient data flow between components of the host network, components of the sub-network, and between components of the sub-network and components of the network.

The touchscreen of an embodiment includes a core functional embedded system that includes an embedded operating system, required hardware drivers, and an open system interface to name a few. The core functional embedded system can be provided by or as a component of a conventional security system (e.g., security system available from GE Security). These core functional units are used with components of the integrated security system as described herein. Note that portions of the touchscreen description below may include reference to a host premise security system (e.g., GE security system), but these references are included only as an example and do not limit the touchscreen to integration with any particular security system.

As an example, regarding the core functional embedded system, a reduced memory footprint version of embedded Linux forms the core operating system in an embodiment, and provides basic TCP/IP stack and memory management functions, along with a basic set of low-level graphics primitives. A set of device drivers is also provided or included that offer low-level hardware and network interfaces. In addition to the standard drivers, an interface to the RS 485 bus is included that couples or connects to the security system panel (e.g., GE Concord panel). The interface may, for example, implement the Superbus 2000 protocol, which can then be utilized by the more comprehensive transaction-level security functions implemented in Panel-Connect technology (e.g SetAlarmLevel (int level, int partition, char *accessCode)). Power control drivers are also provided.

Figure 28:
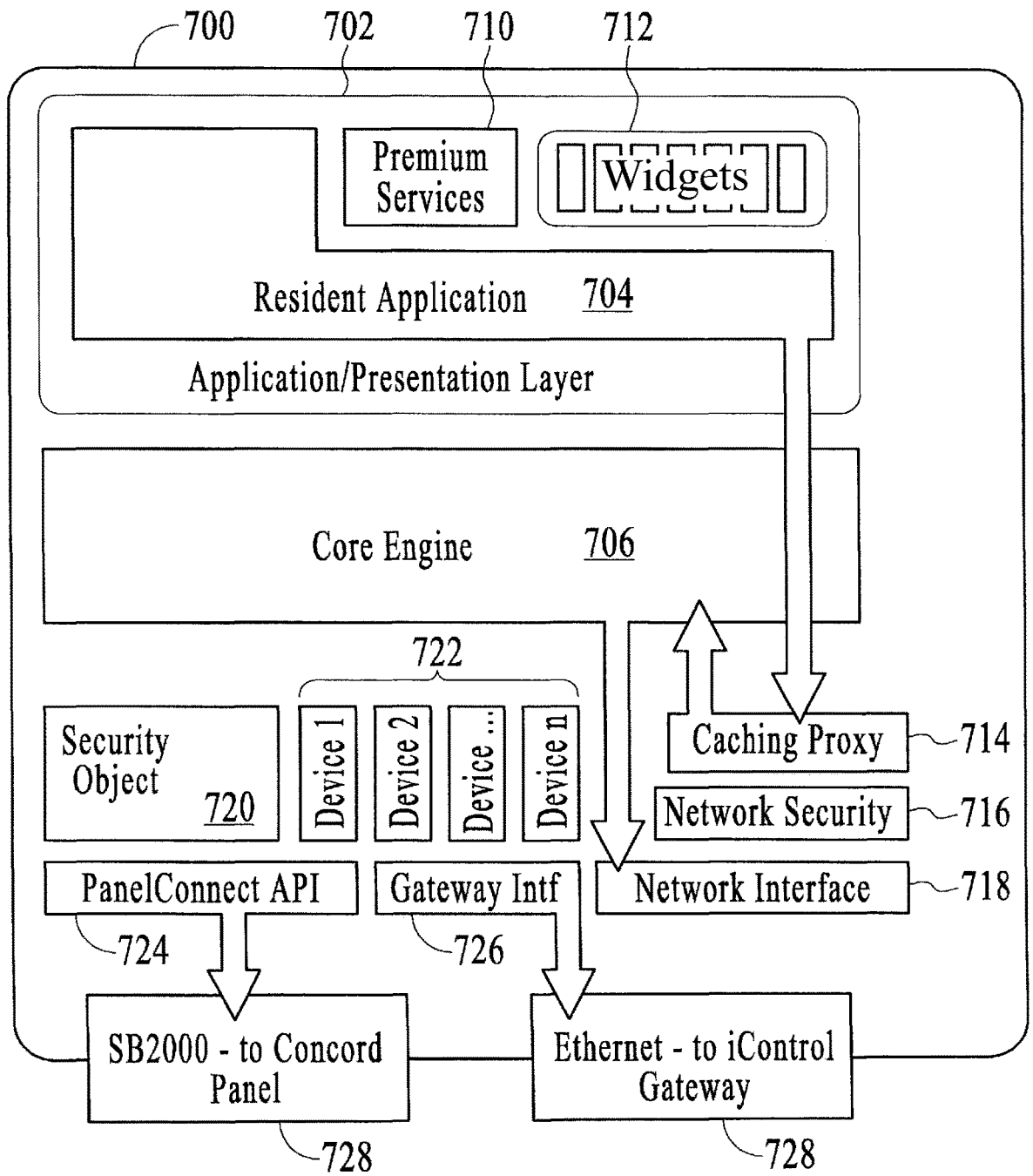
FIG. 28 is a block diagram of a touchscreen, under an embodiment.

FIG. 28 is a block diagram of a touchscreen 700 of the integrated security system, under an embodiment. The touchscreen 700 generally includes an application/presentation layer 702 with a resident application 704, and a core engine 706. The touchscreen 700 also includes one or more of the following, but is not so limited: applications of premium services 710, widgets 712, a caching proxy 714, network security 716, network interface 718, security object 720, applications supporting devices 722, PanelConnect API 724, a gateway interface 726, and one or more ports 728.

More specifically, the touchscreen, when configured as a home security device, includes but is not limited to the following application or software modules: RS 485 and/or RS-232 bus security protocols to conventional home security system panel (e.g., GE Concord panel); functional home security classes and interfaces (e.g. Panel ARM state, Sensor status, etc.); Application/Presentation layer or engine; Resident Application; Consumer Home Security Application; installer home security application; core engine; and System bootloader/Software Updater. The core Application engine and system bootloader can also be used to support other advanced content and applications. This provides a seamless interaction between the premise security application and other optional services such as weather widgets or IP cameras.

An alternative configuration of the touchscreen includes a first Application engine for premise security and a second Application engine for all other applications. The integrated security system application engine supports content standards such as HTML, XML, Flash, etc. and enables a rich consumer experience for all 'widgets', whether security-based or not. The touchscreen thus provides service providers the ability to use web content creation and management tools to build and download any 'widgets' regardless of their functionality.

As discussed above, although the Security Applications have specific low-level functional requirements in order to interface with the premise security system, these applications make use of the same fundamental application facilities as any other 'widget', application facilities that include graphical layout, interactivity, application handoff, screen management, and network interfaces, to name a few.

Content management in the touchscreen provides the ability to leverage conventional web development tools, performance optimized for an embedded system, service provider control of accessible content, content reliability in a consumer device, and consistency between 'widgets' and seamless widget operational environment. In an embodiment of the integrated security system, widgets are created by web developers and hosted on the integrated security system Content Manager (and stored in the Content Store database). In this embodiment the server component caches the widgets and offers them to consumers through the web-based integrated security system provisioning system. The servers interact with the advanced touchscreen using HTTPS interfaces controlled by the core engine and dynamically download widgets and updates as needed to be cached on the touchscreen. In other embodiments widgets can be accessed directly over a network such as the Internet without needing to go through the iControl Content Manager Referring to FIG. 28, the touchscreen system is built on a tiered architecture, with defined interfaces between the Application/Presentation Layer (the Application Engine) on the top, the Core Engine in the middle, and the security panel and gateway APIs at the lower level. The architecture is configured to provide maximum flexibility and ease of maintenance.

Figure 29:
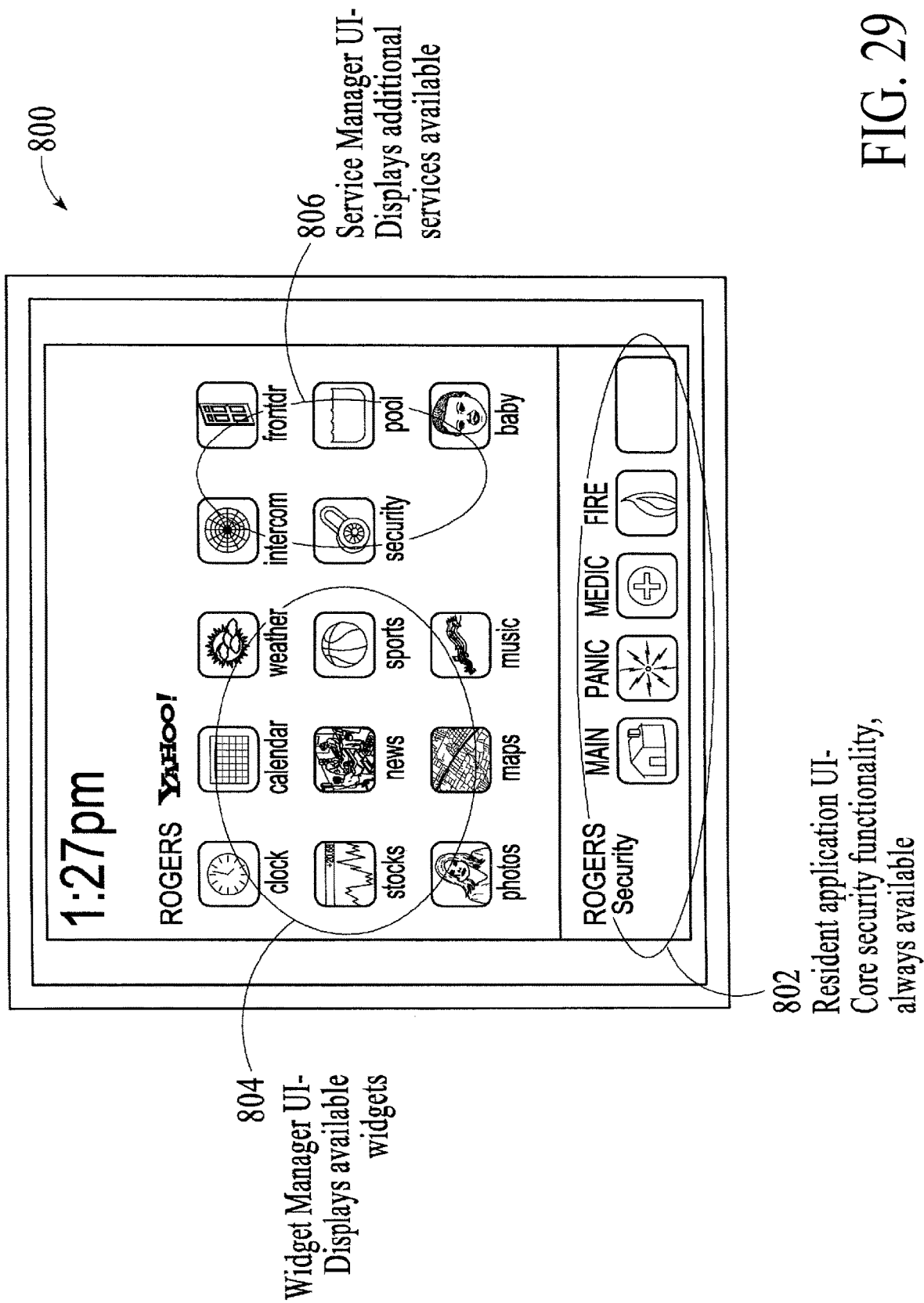
FIG. 29 is an example screenshot of a networked security touchscreen, under an embodiment.

The application engine of the touchscreen provides the presentation and interactivity capabilities for all applications (widgets) that run on the touchscreen, including both core security function widgets and third party content widgets. FIG. 29 is an example screenshot 800 of a networked security touchscreen, under an embodiment. This example screenshot 800 includes three interfaces or user interface (UI) components 802-806, but is not so limited. A first UI 802 of the touchscreen includes icons by which a user controls or accesses functions and/or components of the security system (e.g., "Main", "Panic", "Medic", "Fire", state of the premise alarm system (e.g., disarmed, armed, etc.), etc.); the first UI 802, which is also referred to herein as a security interface, is always presented on the touchscreen. A second UI 804 of the touchscreen includes icons by which a user selects or interacts with services and other network content (e.g., clock, calendar, weather, stocks, news, sports, photos, maps, music, etc.) that is accessible via the touchscreen. The second UI 804 is also referred to herein as a network interface or content interface. A third UI 806 of the touchscreen includes icons by which a user selects or interacts with additional services or components (e.g., intercom control, security, cameras coupled to the system in particular regions (e.g., front door, baby, etc.) available via the touchscreen.

A component of the application engine is the Presentation Engine, which includes a set of libraries that implement the standards-based widget content (e.g., XML, HTML, JavaScript, Flash) layout and interactivity. This engine provides the widget with interfaces to dynamically load both graphics and application logic from third parties, support high level data description language as well as standard graphic formats. The set of web content-based functionality available to a widget developer is extended by specific touchscreen functions implemented as local web services by the Core Engine.

The resident application of the touchscreen is the master service that controls the interaction of all widgets in the system, and enforces the business and security rules required by the service provider. For example, the resident application determines the priority of widgets, thereby enabling a home security widget to override resource requests from a less critical widget (e.g. a weather widget). The resident application also monitors widget behavior, and responds to client or server requests for cache updates.

The core engine of the touchscreen manages interaction with other components of the integrated security system, and provides an interface through which the resident application and authorized widgets can get information about the home security system, set alarms, install sensors, etc. At the lower level, the Core Engine's main interactions are through the PanelConnect API, which handles all communication with the security panel, and the gateway Interface, which handles communication with the gateway. In an embodiment, both the iHub Interface and PanelConnect API are resident and operating on the touchscreen. In another embodiment, the PanelConnect API runs on the gateway or other device that provides security system interaction and is accessed by the touchscreen through a web services interface.

The Core Engine also handles application and service level persistent and cached memory functions, as well as the dynamic provisioning of content and widgets, including but not limited to: flash memory management, local widget and content caching, widget version management (download, cache flush new/old content versions), as well as the caching and synchronization of user preferences. As a portion of these services the Core engine incorporates the bootloader functionality that is responsible for maintaining a consistent software image on the touchscreen, and acts as the client agent for all software updates. The bootloader is configured to ensure full update redundancy so that unsuccessful downloads cannot corrupt the integrated security system.

Video management is provided as a set of web services by the Core Engine. Video management includes the retrieval and playback of local video feeds as well as remote control and management of cameras (all through iControl CameraConnect technology).

Both the high level application layer and the mid-level core engine of the touchscreen can make calls to the network. Any call to the network made by the application layer is automatically handed off to a local caching proxy, which determines whether the request should be handled locally. Many of the requests from the application layer are web services API requests, although such requests could be satisfied by the iControl servers, they are handled directly by the touchscreen and the gateway. Requests that get through the caching proxy are checked against a white list of acceptable sites, and, if they match, are sent off through the network interface to the gateway. Included in the Network Subsystem is a set of network services including HTTP, HTTPS, and server-level authentication functions to manage the secure client-server interface. Storage and management of certificates is incorporated as a part of the network services layer.

Server components of the integrated security system servers support interactive content services on the touchscreen. These server components include, but are not limited to the content manager, registry manager, network manager, and global registry, each of which is described herein.

The Content Manager oversees aspects of handling widget data and raw content on the touchscreen. Once created and validated by the service provider, widgets are 'ingested' to the Content Manager, and then become available as downloadable services through the integrated security system Content Management APIs. The Content manager maintains versions and timestamp information, and connects to the raw data contained in the backend Content Store database. When a widget is updated (or new content becomes available) all clients registering interest in a widget are systematically updated as needed (a process that can be configured at an account, locale, or system-wide level).

The Registry Manager handles user data, and provisioning accounts, including information about widgets the user has decided to install, and the user preferences for these widgets.

The Network Manager handles getting and setting state for all devices on the integrated security system network (e.g., sensors, panels, cameras, etc.). The Network manager synchronizes with the gateway, the advanced touchscreen, and the subscriber database.

The Global Registry is a primary starting point server for all client services, and is a logical referral service that abstracts specific server locations/addresses from clients (touchscreen, gateway 102, desktop widgets, etc.). This approach enables easy scaling/migration of server farms.

The touchscreen of an embodiment operates wirelessly with a premise security system. The touchscreen of an embodiment incorporates an RF transceiver component that either communicates directly with the sensors and/or security panel over the panel's proprietary RF frequency, or the touchscreen communicates wirelessly to the gateway over 802.11, Ethernet, or other IP-based communications channel, as described in detail herein. In the latter case the gateway implements the PanelConnect interface and communicates directly to the security panel and/or sensors over wireless or wired networks as described in detail above.

The touchscreen of an embodiment is configured to operate with multiple security systems through the use of an abstracted security system interface. In this embodiment, the PanelConnect API can be configured to support a plurality of proprietary security system interfaces, either simultaneously or individually as described herein. In one embodiment of this approach, the touchscreen incorporates multiple physical interfaces to security panels (e.g. GE Security RS-485, Honeywell RF, etc.) in addition to the PanelConnect API implemented to support multiple security interfaces. The change needed to support this in PanelConnect is a configuration parameter specifying the panel type connection that is being utilized.

So for example, the setARMState( ) function is called with an additional parameter (e.g., Armstate=setARMState (type="ARM STAYS ARM AWAY) DISARM", Parameters="ExitDelay=30|Lights=OFF", panelType="GE Concord4 RS485")). The 'panelType' parameter is used by the setARMState function (and in practice by all of the PanelConnect functions) to select an algorithm appropriate to the specific panel out of a plurality of alogorithms.

The touchscreen of an embodiment is self-installable. Consequently, the touchscreen provides a 'wizard' approach similar to that used in traditional computer installations (e.g. InstallShield). The wizard can be resident on the touchscreen, accessible through a web interface, or both. In one embodiment of a touchscreen self-installation process, the service provider can associate devices (sensors, touchscreens, security panels, lighting controls, etc.) remotely using a web-based administrator interface.

The touchscreen of an embodiment includes a battery backup system for a security touchscreen. The touchscreen incorporates a standard Li-ion or other battery and charging circuitry to allow continued operation in the event of a power outage. In an embodiment the battery is physically located and connected within the touchscreen enclosure. In another embodiment the battery is located as a part of the power transformer, or in between the power transformer and the touchscreen.

The example configurations of the integrated security system described above with reference to FIGS. 5 and 6 include a gateway that is a separate device, and the touchscreen couples to the gateway. However, in an alternative embodiment, the gateway device and its functionality can be incorporated into the touchscreen so that the device management module, which is now a component of or included in the touchscreen, is in charge of the discovery, installation and configuration of the IP devices coupled or connected to the system, as described above. The integrated security system with the integrated touchscreen/gateway uses the same "sandbox" network to discover and manage all IP devices coupled or connected as components of the system.

The touchscreen of this alternative embodiment integrates the components of the gateway with the components of the touchscreen as described herein. More specifically, the touchscreen of this alternative embodiment includes software or applications described above with reference to FIG. 3. In this alternative embodiment, the touchscreen includes the gateway application layer 302 as the main program that orchestrates the operations performed by the gateway. A Security Engine 304 of the touchscreen provides robust protection against intentional and unintentional intrusion into the integrated security system network from the outside world (both from inside the premises as well as from the WAN). The Security Engine 304 of an embodiment comprises one or more sub-modules or components that perform functions including, but not limited to, the following:

Encryption including 128-bit SSL encryption for gateway and iConnect server communication to protect user data privacy and provide secure communication.

Bi-directional authentication between the touchscreen and iConnect server in order to prevent unauthorized spoofing and attacks. Data sent from the iConnect server to the gateway application (or vice versa) is digitally signed as an additional layer of security. Digital signing provides both authentication and validation that the data has not been altered in transit.

Camera SSL encapsulation because picture and video traffic offered by off-the-shelf networked IP cameras is not secure when traveling over the Internet. The touchscreen provides for 128-bit SSL encapsulation of the user picture and video data sent over the internet for complete user security and privacy.

802.11b/g/n with WPA-2 security to ensure that wireless camera communications always takes place using the strongest available protection.

A touchscreen-enabled device is assigned a unique activation key for activation with an iConnect server. This ensures that only valid gateway-enabled devices can be activated for use with the specific instance of iConnect server in use. Attempts to activate gateway-enabled devices by brute force are detected by the Security Engine. Partners deploying touchscreen-enabled devices have the knowledge that only a gateway with the correct serial number and activation key can be activated for use with an iConnect server. Stolen devices, devices attempting to masquerade as gateway-enabled devices, and malicious outsiders (or insiders as knowledgeable but nefarious customers) cannot effect other customers' gateway-enabled devices.

As standards evolve, and new encryption and authentication methods are proven to be useful, and older mechanisms proven to be breakable, the security manager can be upgraded "over the air" to provide new and better security for communications between the iConnect server and the gateway application, and locally at the premises to remove any risk of eavesdropping on camera communications.

A Remote Firmware Download module 306 of the touchscreen allows for seamless and secure updates to the gateway firmware through the iControl Maintenance Application on the server 104, providing a transparent, hassle-free mechanism for the service provider to deploy new features and bug fixes to the installed user base. The firmware download mechanism is tolerant of connection loss, power interruption and user interventions (both intentional and unintentional). Such robustness reduces down time and customer support issues. Touchscreen firmware can be remotely download either for one touchscreen at a time, a group of touchscreen, or in batches.

The Automations engine 308 of the touchscreen manages the user-defined rules of interaction between the different devices (e.g. when door opens turn on the light). Though the automation rules are programmed and reside at the portal/server level, they are cached at the gateway level in order to provide short latency between device triggers and actions.

DeviceConnect 310 of the touchscreen includes definitions of all supported devices (e.g., cameras, security panels, sensors, etc.) using a standardized plug-in architecture. The DeviceConnect module 310 offers an interface that can be used to quickly add support for any new device as well as enabling interoperability between devices that use different technologies/protocols. For common device types, pre-defined sub-modules have been defined, making supporting new devices of these types even easier. SensorConnect 312 is provided for adding new sensors, CameraConnect 316 for adding IP cameras, and PanelConnect 314 for adding home security panels.

The Schedules engine 318 of the touchscreen is responsible for executing the user defined schedules (e.g., take a picture every five minutes; every day at 8 am set temperature to 65 degrees Fahrenheit, etc.). Though the schedules are programmed and reside at the iConnect server level they are sent to the scheduler within the gateway application of the touchscreen. The Schedules Engine 318 then interfaces with SensorConnect 312 to ensure that scheduled events occur at precisely the desired time.

The Device Management module 320 of the touchscreen is in charge of all discovery, installation and configuration of both wired and wireless IP devices (e.g., cameras, etc.) coupled or connected to the system. Networked IP devices, such as those used in the integrated security system, require user configuration of many IP and security parameters, and the device management module of an embodiment handles the details of this configuration. The device management module also manages the video routing module described below.

The video routing engine 322 of the touchscreen is responsible for delivering seamless video streams to the user with zero-configuration. Through a multi-step, staged approach the video routing engine uses a combination of UPnP port-forwarding, relay server routing and STUN/TURN peer-to-peer routing. The video routing engine is described in detail in the Related Applications.

Figure 30:
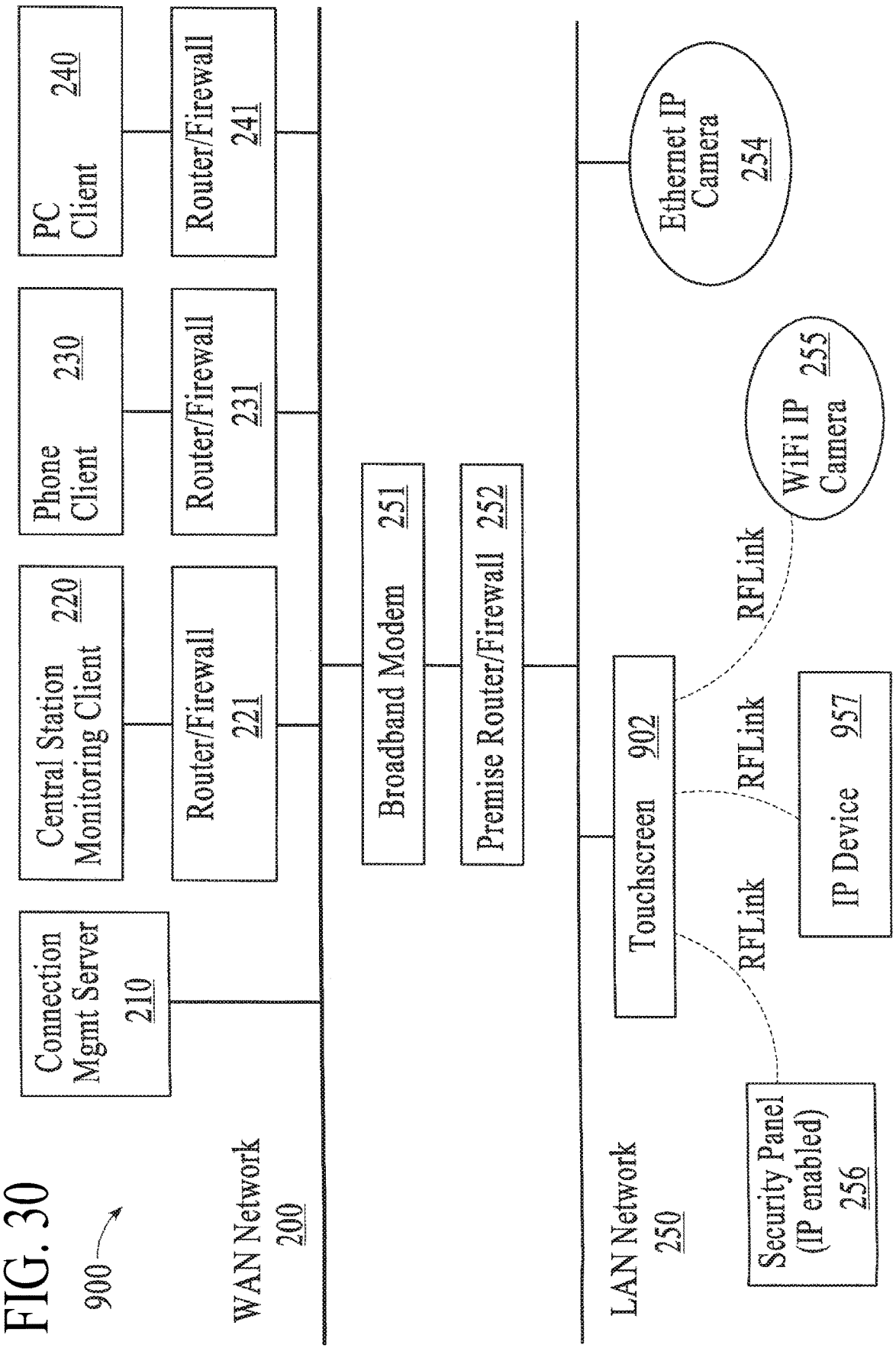
FIG. 30 is a block diagram of network or premise device integration with a premise network, under an embodiment.

FIG. 30 is a block diagram 900 of network or premise device integration with a premise network 250, under an embodiment. In an embodiment, network devices 255, 256, 957 are coupled to the touchscreen 902 using a secure network connection such as SSL over an encrypted 802.11 link (utilizing for example WPA-2 security for the wireless encryption), and the touchscreen 902 coupled to the premise router/firewall 252 via a coupling with a premise LAN 250. The premise router/firewall 252 is coupled to a broadband modem 251, and the broadband modem 251 is coupled to a WAN 200 or other network outside the premise. The touchscreen 902 thus enables or forms a separate wireless network, or sub-network, that includes some number of devices and is coupled or connected to the LAN 250 of the host premises. The touchscreen sub-network can include, but is not limited to, any number of other devices like WiFi IP cameras, security panels (e.g., IP-enabled), and IP devices, to name a few. The touchscreen 902 manages or controls the sub-network separately from the LAN 250 and transfers data and information between components of the sub-network and the LAN 250/WAN 200, but is not so limited. Additionally, other network devices 254 can be coupled to the LAN 250 without being coupled to the touchscreen 902.

Figure 31:
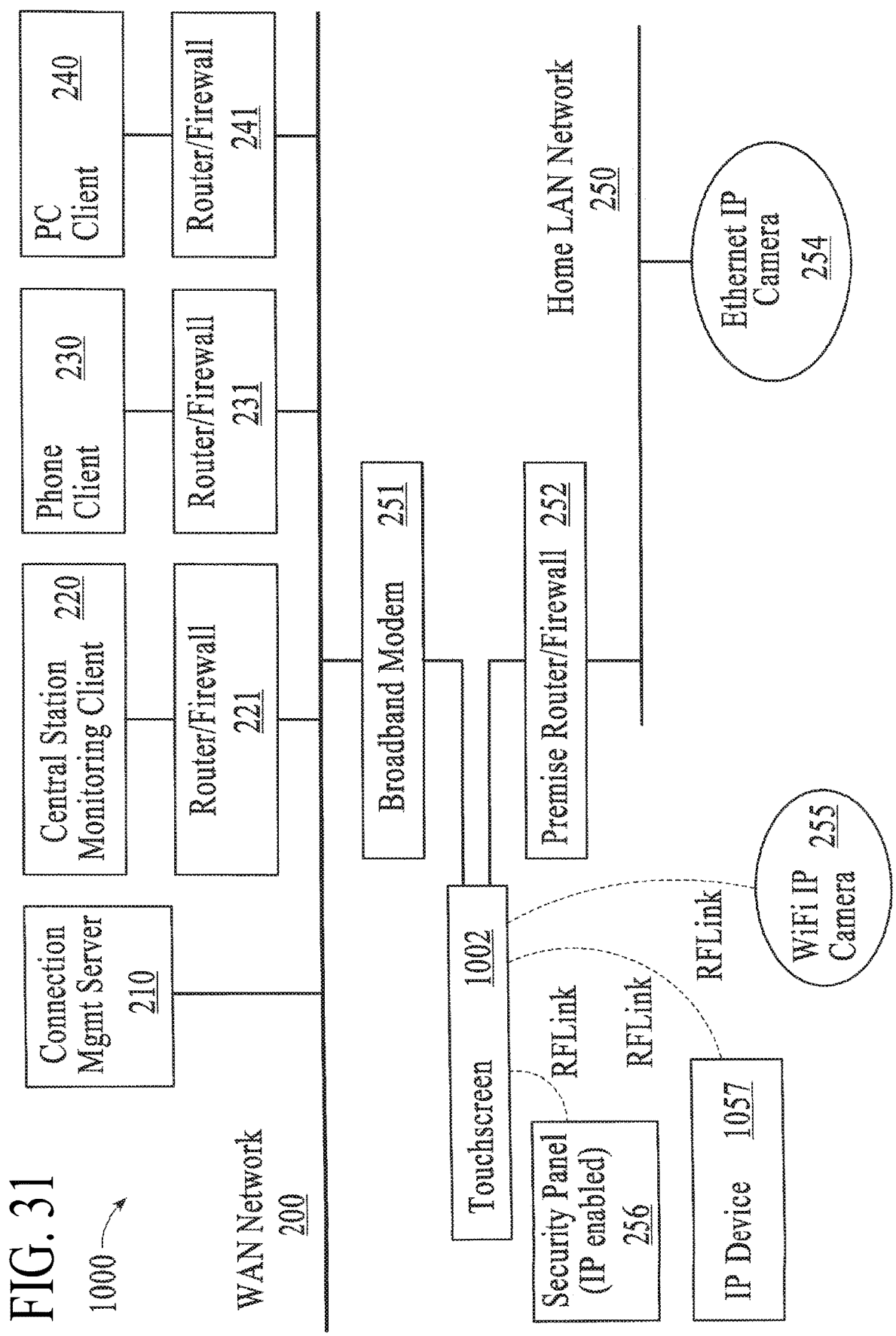
FIG. 31 is a block diagram of network or premise device integration with a premise network, under an alternative embodiment.

FIG. 31 is a block diagram 1000 of network or premise device integration with a premise network 250, under an alternative embodiment. The network or premise devices 255, 256, 1057 are coupled to the touchscreen 1002, and the touchscreen 1002 is coupled or connected between the premise router/firewall 252 and the broadband modem 251. The broadband modem 251 is coupled to a WAN 200 or other network outside the premise, while the premise router/firewall 252 is coupled to a premise LAN 250. As a result of its location between the broadband modem 251 and the premise router/firewall 252, the touchscreen 1002 can be configured or function as the premise router routing specified data between the outside network (e.g., WAN 200) and the premise router/firewall 252 of the LAN 250. As described above, the touchscreen 1002 in this configuration enables or forms a separate wireless network, or sub-network, that includes the network or premise devices 255, 156, 1057 and is coupled or connected between the LAN 250 of the host premises and the WAN 200. The touchscreen sub-network can include, but is not limited to, any number of network or premise devices 255, 256, 1057 like WiFi IP cameras, security panels (e.g., IP-enabled), and security touchscreens, to name a few. The touchscreen 1002 manages or controls the sub-network separately from the LAN 250 and transfers data and information between components of the sub-network and the LAN 250/WAN 200, but is not so limited. Additionally, other network devices 254 can be coupled to the LAN 250 without being coupled to the touchscreen 1002.

The gateway of an embodiment, whether a stand-along component or integrated with a touchscreen, enables couplings or connections and thus the flow or integration of information between various components of the host premises and various types and/or combinations of IP devices, where the components of the host premises include a network (e.g., LAN) and/or a security system or subsystem to name a few. Consequently, the gateway controls the association between and the flow of information or data between the components of the host premises. For example, the gateway of an embodiment forms a sub-network coupled to another network (e.g., WAN, LAN, etc.), with the sub-network including IP devices. The gateway further enables the association of the IP devices of the sub-network with appropriate systems on the premises (e.g., security system, etc.). Therefore, for example, the gateway can form a sub-network of IP devices configured for security functions, and associate the sub-network only with the premises security system, thereby segregating the IP devices dedicated to security from other IP devices that may be coupled to another network on the premises.

The gateway of an embodiment, as described herein, enables couplings or connections and thus the flow of information between various components of the host premises and various types and/or combinations of IP devices, where the components of the host premises include a network, a security system or subsystem to name a few. Consequently, the gateway controls the association between and the flow of information or data between the components of the host premises. For example, the gateway of an embodiment forms a sub-network coupled to another network (e.g., WAN, LAN, etc.), with the sub-network including IP devices. The gateway further enables the association of the IP devices of the sub-network with appropriate systems on the premises (e.g., security system, etc.). Therefore, for example, the gateway can form a sub-network of IP devices configured for security functions, and associate the sub-network only with the premises security system, thereby segregating the IP devices dedicated to security from other IP devices that may be coupled to another network on the premises.

The system of an embodiment including the Cloud Hub and Virtual Gateway as described in detail herein includes one or more components of the "integrated cloud system (ICS)" described in detail herein. The system of an embodiment described herein incorporates one or more components of the "ICS". The system of an embodiment described herein is coupled to one or more components of the "ICS". The system of an embodiment described herein integrates with one or more components of the "ICS".

Figure 32:
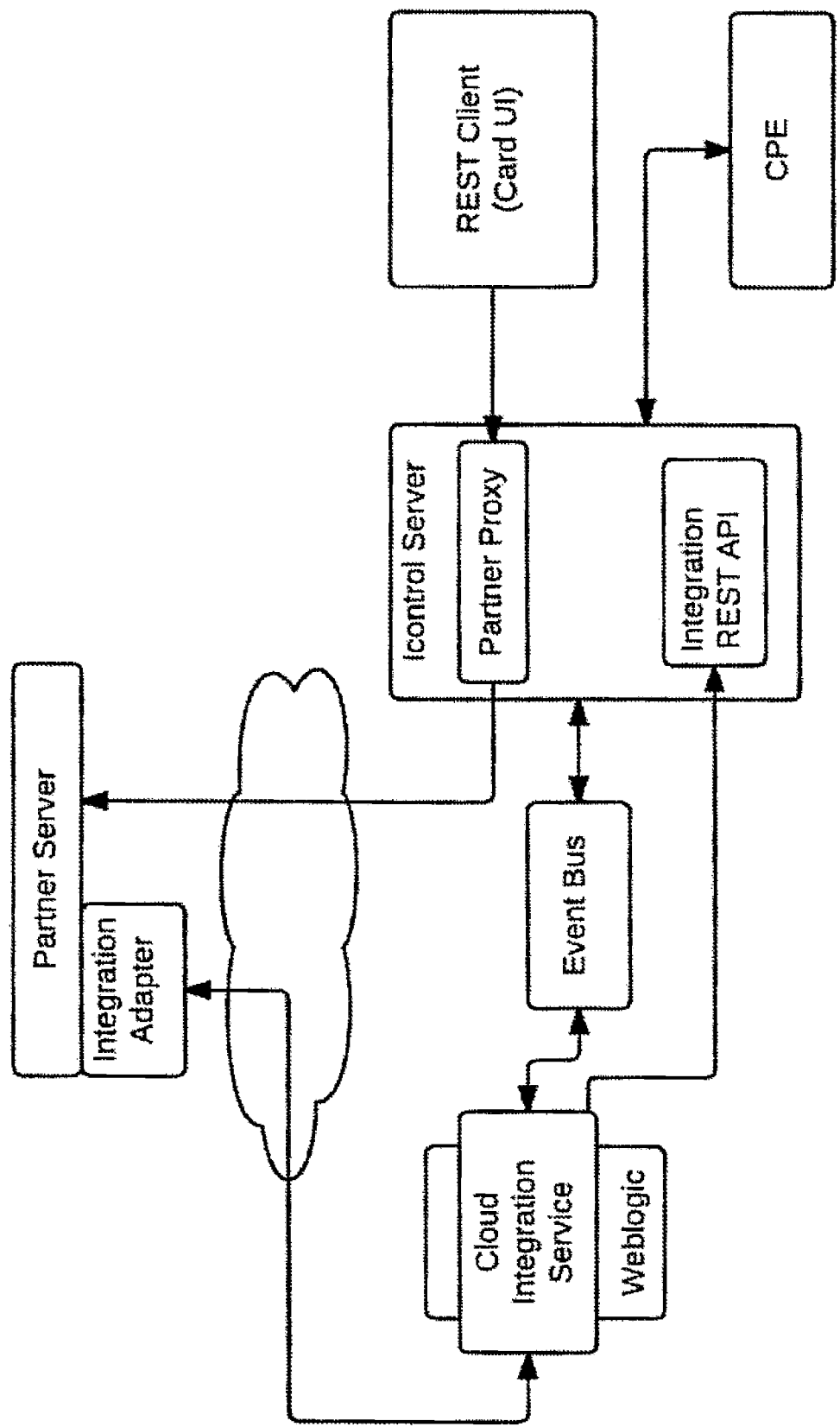
FIG. 32 is a block diagram of the Integrated Cloud System (ICS) or platform, under an embodiment.

FIG. 32 is a block diagram of the integrated cloud system or platform, under an embodiment. The integrated cloud system (ICS) of an embodiment comprises cloud-based components that include a Cloud Integration Service/Server (CIS) coupled to a system server (e.g., "Icontrol Server", also referred to herein as the service provider server) via an internal event bus. The CIS, system server, and event bus are implemented by the service provider in data centers of the service provider's customers, but are not so limited.

The system server is coupled to customer-premises equipment (CPE) at corresponding subscriber premises of numerous subscribers. The CPE includes one or more of security panels, security systems, gateways, hubs, touchscreens, and Wi-Fi access points that operate as a gateway to the system servers and ICS. The CPE is described in detail in the Related Applications incorporated by reference herein.

The CIS is coupled to a partner's production server ("partner server") via a Cloud Integration Adapter (CIA). The partner server interacts with their products/services that their users wish to integrate into their ICS platform. The Cloud Integration Adapter provides the system server and CIS with REST endpoints to call for checking the health of the adapter, associating with adapter cloud devices, and processing events coming from the CIS. Furthermore, the Cloud Integration Adapter is responsible for sending events to the CIS as acknowledgement of incoming system events, and as an endpoint for Adapter managed cloud device events to be reported into the system servers.

The ICS of an embodiment effects integration of cloud services and internet-connected devices with the user interface, Rules Engine and other components and functions of the service provider system. This integration enables third party and/or other connected devices (e.g., smart door bells (e.g, Doorbot, etc.), door locks, garage door operators (e.g., Chamberlain, etc.), cameras (e.g., Dropcam, etc.), thermostats (e.g., Nest, etc.), lighting systems (e.g., Philips Hue, etc.), lighting devices, lawn irrigation systems (e.g., Rachio, etc.), plant sensors, pet feeders, weather stations, rain sensors, pool controls, air quality sensors, music systems, remote controllers, Internet user interfaces, connected systems, connected vehicles, etc.), and third party services (e.g., weather forecasting services and applications (e.g., Accuweather, etc.), family networking services and applications, partner or third party services, Accuweather, MSO digital assets such as voicemail, etc.), to control or trigger automations in the service provider system using the user interface, Rules Engine and other components and functions of the service provider system. This enables end-users to integrate and use their previously-standalone internet-connected devices with each other as well as with their service provider-based service.

The ICS of an embodiment as described in detail herein includes one or more components of the "integrated security system" described in detail in the Related Applications, which are incorporated by reference herein. An example of the "integrated security system" is available as one or more of the numerous systems or platforms available from iControl Networks, Inc., Redwood City, Calif. The ICS of an embodiment incorporates one or more components of the "integrated security system". The ICS of an embodiment is coupled to one or more components of the "integrated security system". The ICS of an embodiment integrates with one or more components of the "integrated security system".

The system server includes or hosts a partner proxy and an integration REST application programming interface (API). The integration REST API is coupled to the CIS. The partner proxy is coupled to a corresponding partner server, and is also coupled to a Card UI ("REST Client"). The partner proxy is configured to proxy API calls from the Partner's Card UI (REST client) to the Partner Server and appends the appropriate OAuth Token for a given user. This enables all client UIs to be enabled after a single OAuth pairing is completed (i.e., if one user authorizes Partner's product, all users and clients on the same account will have it auto-enabled and populated). This also improves security by not storing the user's credentials on the Partner's server in the client UI. The Card UI of an example embodiment is an HTML5-based user interface card developed by the Partner, or service provider, that is embedded into the service provider user interface (e.g., mobile app, web portal).

The ICS of an embodiment includes Cloud Actions and Triggers (CAT), which enable third party connected devices and services to trigger automations in the service provider system, thereby enabling end-users to integrate and use their previously-standalone internet connected devices with their service provider-based service.

Devices and services that are hosted outside of the automation platform or network are referred to as 'cloud objects' and provide numerous use cases when integrated with the system of an embodiment. The description that follows includes details of aspects of the system including but not limited to server infrastructure required to support external cloud objects, data format definitions for actions and triggers across the event bus, the process of onboarding external cloud objects, integration of cloud objects with the CPE rules engine, common OAuth2 Support for Cloud Services, and card UI/SDK Support for Cloud Objects.

The CAT of an embodiment integrates partner services into the ICS platform including support for rules on the CPE and partner-specific user interfaces based on the Card UI. The system of an embodiment includes a web API for the CIS for which partners develop Integration Adapters (also referred to as "adapters") responsible for the translation of service provider events and operations into partner proprietary calls. Partners also develop Cards with the Card SDK in order to get branded partner specific user interfaces. The partners of an embodiment host their Integration Adapters in their environments, however in an alternative embodiment the adapters are hosed by the ICS described herein.

While the rules engine of an embodiment is included and running on CPE, the embodiments herein are not so limited. In an alternative embodiment the rules engine is included and running on a system server or other component of the ICS platform.

In another alternative embodiment the rules engine is distributed between the CPE and ICS platform so that a set of rules is included and running on the CPE while another set of rules is included and running on the ICS platform. For example, rules controlling actions and triggers limited to local devices in the premises, and not using any data or information from a device or service outside the premises, are included and running on the CPE. Likewise, rules controlling actions and triggers involving device(s) in the premises, and also involving device(s) or service(s) outside the premises, are included and running on the CPE.

The CAT includes but is not limited to use cases comprising Service Association, Cloud Object Creation, Service Disassociation, Cloud Object Synchronization, Card UI Interactions, Rule Authoring, and Rule Execution. Each of the use cases is described in detail herein.

Upon startup, the Partner's Cloud Integration Adapter uses username, password and partnerKey to authenticate with the CIS. The username, password and partnerKey are provided by the service provider. The Partner's Event Callback URL and Health Check URL are defined initially as part of the partner onboarding process. The CIS provides two URLs for the partner to optionally update the two URLs at runtime.

The Register Event callback URI allows partner to update the Event Callback URL at runtime.

| | |
|---|---|
| Endpoint | /cloudIntegration/[partnerName]/eventCallback/registerEventCallback?partner Url=[partnerUrl] |
| Description | Update the eventCallback URL for a partner |
| Method | POST |
| Header | x-login - username of the integration user<br>x-password - password of the integration user<br>x-partnerKey - unique key issued by Service provider to the partner |
| URL parameters | partnerName: The unique name of the partner provided by Service provider<br>partnerUrl: The updated Event Callback URL |
| Result | HTTP response 200 if successful |

An example payload includes but is not limited to the following:
curl -k -L -v -H "X-login: <username>"-H "X-password: test"-H "x-partnerKey: key" -X POST "https://<server>/cloudIntegration/icontrol/cloudIntegrations/rachio/eventCallback/registerEventCallback?partnerUrl=https://rachio-Adapter/updatedEventCallbackUrl"

The Register Health Check Callback URI allows partner to update the Health Check URL at runtime.

| | |
|---|---|
| Endpoint | /cloudIntegration/[partnerName]/healthCheckCallback/<br>registerHealthCheckCallback?partnerHealthCheckUrl=<br>[partnerHealthCheckUrl] |
| Description | Update healthCheckCallback URL for partner |
| Method | POST |
| Header | x-login - username of the integration userx-password -<br>password of the integration userx-partnerKey - A unique<br>key issued by Service provider to the partner |
| URL parameters | partnerName: The unique name of the partnerpartner<br>HealthCheckUrl: The updated health check URL |
| Result | HTTP response 200 if successful |

An example payload includes but is not limited to the following:
curl -k -L -v -H "Content-Type: text/xml"-H "X-login: <username>"-H "X-password: test"-H "x-partnerKey: key" -X POST https://<server>/cloudIntegration/icontrol/cloudIntegrations/rachio/healthCheckCallback/registerHealthCheckCallback?partnerHealthCheckUrl=https://rachioAdapter/updatedHealthcheckcallback.

For both the Event Callback Registration and Health Check Callback Registration, the CIS responds with a HTTP 200 if the POST is accepted. Appropriate HTTP error code will be returned for error conditions.

The Health Check Callback service implemented by the Partner supports HTTP GET operations, and responds with HTTP 200 to indicate all systems are functioning properly. Any other response will be considered an indication that the adapter is not available. The CIS of an embodiment periodically checks availability of the Integration Adapter, and the periodicity is configurable.

The cloud integration user lifecycle of an embodiment embodies the core user experiences from a technical viewpoint (i.e., technical use cases). The following user lifecycle use cases are described in detail herein: Service Association (User Onboarding); Updating new user product(s)/service(s) on the Partner's server; Product/Service status updates; Controlling user's product(s)/service(s) from the service provider platform; User Offboarding of one or more product(s)/service(s).

Figure 33:
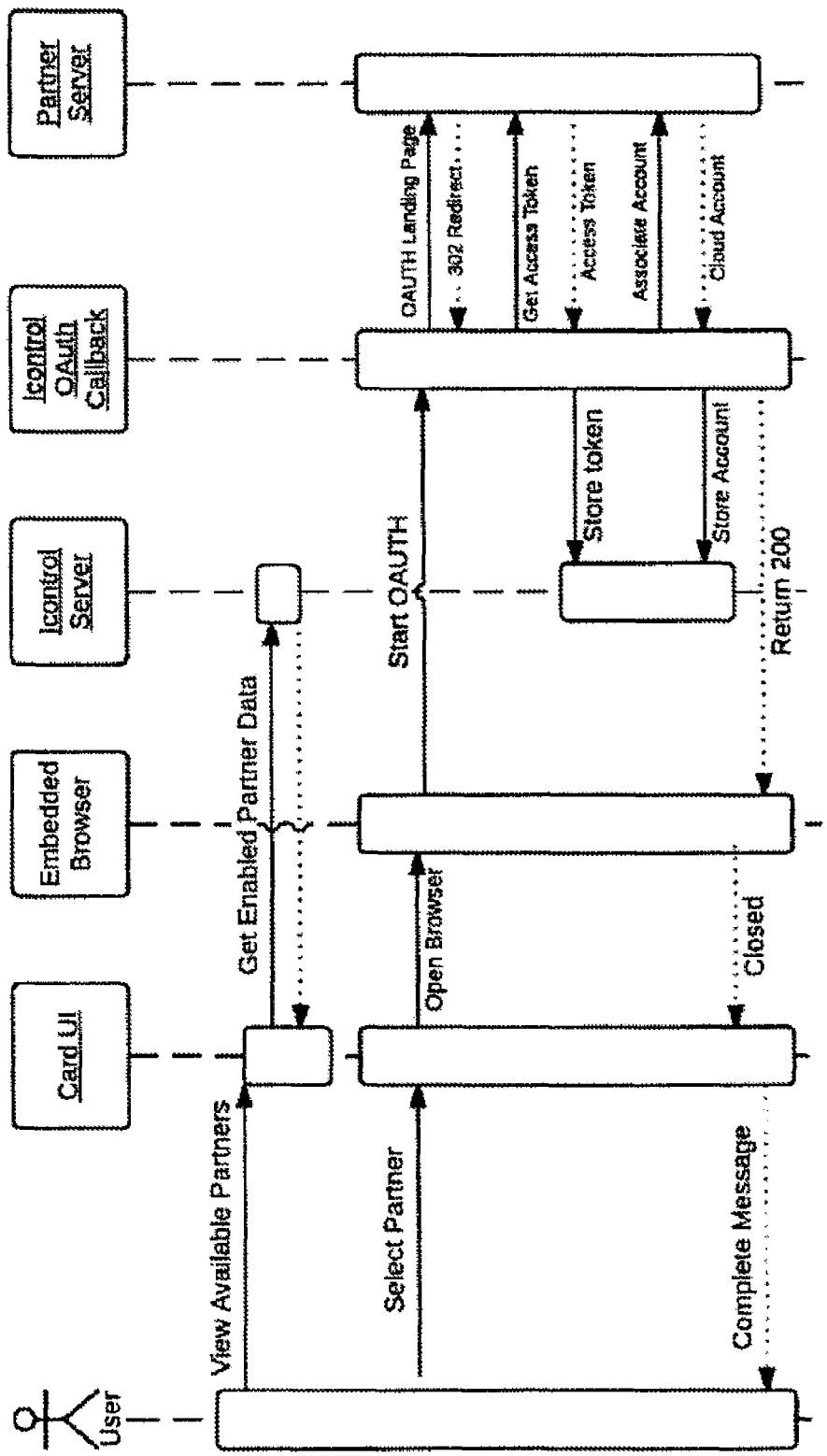
FIG. 33 is a flow diagram for Service Association, under an embodiment.

Service Association (User Onboarding) is initiated by the user via a service provider user interface when the user selects a Partner device type from the list of devices available to pair to the user's Service provider system. FIG. 33 is a flow diagram for Service Association, under an embodiment. Service Association (Partner Onboarding) is initiated by a Card UI of an embodiment when the user selects a partner from a partner list. The list of all possible partners and their custom (partner specific) cards are built into each release of the Card UI (they are not dynamically downloaded from a server). However the list of enabled partners (and related metadata) is dynamically retrieved from Service provider server via an API.

Once the user selects a partner service for association, three-legged OAuth2 begins. A browser control is created, has its context populated with information identifying the user, and calls Service provider OAUTH Redirect servlet, which in turn opens the OAuth2 landing page URL with the required parameters (response_type, client id and token). This page, served by the partner's web server, collects the user's ID and password and successfully authenticates.

After the user is authenticated, the partner server issues an HTTP 302 redirect to the Service provider OAuth Callback servlet located in the portal server and includes an authorization code as well as the rest of the original browser context. The OAuth Callback servlet contacts the partner's service to exchange the authorization code for an access token which it stores in the database.

Then, the OAuth Callback servlet will call the 'Associate Account URL' provided by the partner. The access token for the user account is attached to the request as the Authorization header to identify the user. The response to the call will include the user's account id in the partner system and a list of cloud devices owned by the user. After successful account association, HTTP 200 is returned to the browser indicating the completion of the service association process.

The service provider OAUTH callback URL has the following format, but is not so limited: https://<servername>/oauth/oauthPartner/<partnerName>. It is recommended that a service provider deployment registers this URL in the partner's system. As an alternate (less secure) option, this URL can be passed to the partner system as a parameter in the first leg of the OAUTH process.

The system of an embodiment includes Cloud Object Synchronization as described herein. After a service has been associated for a user/account, the system server has the list of cloud devices owned by the user. If the user adds/removes a device in the partner's system, partner server calls the Service provider Cloud Integration Service API to inform Service provider regarding the change. Conversely, if user removes a cloud device association in Service provider Card UI, an event will be sent to the partner's system via the 'Event Callback URL'.

After completing user authentication, the OAuth token for the user account is attached to a request to associate the account (Associate Account in FIG. 2). The Partner Server's response to the call will include the user's Account ID in the Partner's system and a list of cloud-enabled devices owned by the user in that account. After successful account association, HTTP 200 is returned to the browser indicating the completion of the service association process. After a service has been associated for a user/account, the Service provider server will have the list of cloud devices owned by the user.

Account association with the CIS is the process by which the system server creates the relationship between the Service provider user and partner cloud devices. The Cloud Integration Service sends, via HTTP POST, a JSON Object containing the OAuth Access Token.

An example Associate Account Request follows but the embodiment is not so limited:

| | |
|---|---|
| URL | The 'Associate Account URL' provided by the partner in the Cloud Integration Submission Form. |
| Description | Get the user's account/device info from the partner. |
| Method | POST |
| Header | Authorization - 'Bearer xxxxx' where xxxxx is the user's access token. |
| URL parameters | customerName: The name of the Service provider server. |

When an account association request is received by the Cloud Integration Adapter, it responds with a JSON message in the following format:

Associate Account Response
{
  "virtualDevice.siteId":"acc_1234",
  "virtualDevice.instanceIds":[
    {
      "id":"device-inst001",
      "name":"Front Sprinkler"
    },
    {

-continued

```
    "id":"device-inst002",
    "name":"Backyard Sprinkler"
      }
    }
  ]
}
```

| Where:<br>Field Name | Description |
| --- | --- |
| virtualDevice.siteId | The user ID in the Partner's system. This will be the global identifier used by Service provider to refer to the Partner's primary user. |
| virtualDevice.instanceIds | A list (JSON Array) of devices the Partner or user wishes Service provider to interact with. |
| id | The Device ID in the Partner's system. |
| name | A friendly display name for this device. |

A HTTP 200 is expected along with this data. Error codes should include an HTTP 500 for errors, and an HTTP 401 for improper OAuth token.

Updating status of partner product (events) involves user's interacting with the Partner's product/service through a Partner client (e.g., Partner mobile app) or the user may interact with the device locally and change its state, mode, or otherwise affect the product/service's status. Events received from the Partner's Cloud Integration Adapter can be treated as a trigger for a rule in the Service provider system (e.g., when the backyard sprinkler system is running, lock the pet door).

An example payload description follows but the embodiment is not so limited:

| Endpoint | /cloudIntegration/[partnerName]/events/submitCloudEvent |
| --- | --- |
| Description | Submit partner events to Service provider server. |
| Method | POST |
| Header | x-login - username of the integration user.x-password - password of the integration user.x-partnerKey - A unique key issued by Service provider to the partner |
| URL parameters | partnerName: The unique name of the partner.externalAccountId: The user's account ID in the partner system. |

Events Originated from the Partner System in IcEvent(s) JSON
format.Example:{"icEvent":[{"metaData":[{"name":
  "virtualDevice.siteId","value":"acc_1234"},{"name":
  "virtualDevice.instanceId","value":"rachio-inst001"},
  {"name":"virtualDevice.providerId","value":
  "rachio"}],"mediaType":"sprinkler/on","ts":
  1409675025053,"value":"true"}]}
Fields:
mediaType: The event mediaTypes defined as part of the cloud object
Body definition and approved by Service provider.
ts: The time when the event happened (in milliseconds).
Event Metadata:
virtualDevice.providerId: The name of the partner. Also referred to as Integration_ID in the Card SDK.
virtualDevice.siteId: The user's account ID in the partner system.
virtualDevice.instanceId: The device ID in the partner system.
Result HTTP response 200 if successful.

In controlling a partner product via the rules engine (actions) of an embodiment, the CIS uses the partner's Event Callback URL to submit action events to partner's system. Typically, an action event asks to the partner's system to perform a specific function. The partner submits the result of the action back to Service provider in the form of an event.
Payload Description

| URL | The Event Callback URL for the partner |
| --- | --- |
| Description | Submit action events to partner server. |
| Method | POST |
| Header | Authorization - The value is 'Bearer xxxxxx' with xxxxxx being the user's OAUTH access token.externalAccountId: The user's account ID in the partner system (to be added on Padre release). |
| URL parameters | None. |

Action events originated from the Service provider system in IcEvent JSON format.
Example Event Sent to Rachio:
{"icEvent":[{"ts":1409675025053,"instanceId":
  "181964.0","mediaType":"virtualDevice/pending",
  "id":"1430834677258","instanceName":"Bedroom",
  "value":null,"context":[    ],"metaData":"name":
  "virtualDevice.instanceId","value":"rachio-inst001"},
  {"name":"virtualDevice.siteId","value":"acc_1234"},
  {"name":"virtualDevice.providerId","value":
  "rachio"},{"name":"functionMediaType","value":
  "sprinkler/schedulePause"},{"requestMessageId",
  "value":"1430489036"}]}]}
Fields:

| Body | id: The event ID generated by Service provider server.<br>mediaType: All action events have 'virtualDevice/pending' as the event media type.<br>The actual action is represented as 'sprinkler/schedulePause' in metadata.<br>ts: The time when the event happened (in milliseconds).<br>instanceId: The ID of the device in Service provider system. |
| --- | --- |

Event metadata:
virtualDevice.providerId: The name of the partner. Also referred to as Integration_ID in the Card SDK.
virtualDevice.siteId: The user's account ID in the partner system.
virtualDevice.instanceId: The device ID in the partner system.
functionMediaType: Identifies the action called by Service provider. The of all possible function media types are defined at the lime of partner onboarding.
requestMessageId: The ID of the action request. Partner should used the this ID when sending success/failure response.

Upon receiving the action event, partner should send success/failure response as event to Service provider server.
Successful response:

| Action Event | {"icEvent":[{"metaData":[{"name":<br>"virtualDevice.siteId","value":"acc_1234"},<br>{"name":"virtualDevice.instanceId",<br>"value":"rachio-inst001"},<br>{"name":"virtualDevice.providerId",<br>"value":"rachio"},,{"name": |
| --- | --- |

| | |
|---|---|
| | "requestMessageId",<br>"value":"1430489036"}],"mediaType":<br>"virtualDevice/success","ts":1409675025053,<br>"value":"true"}]} |
| Response | Failure Response:<br>{"icEvent":[{"metaData":[{"name":<br>"virtualDevice.siteId","value":"acc_1234"},<br>{"name":"virtualDevice.instanceId","value":<br>"rachio-inst001"},{"name":"virtualDevice.providerId",<br>"value":"rachio"},,{"name":"requestMessageId",<br>"value":"1430489036"}],"mediaType":<br>"virtualDevice/failed","ts":1409675025053,<br>"errorCode":"500","value":"true"}]} |

Event disposition is determined by the functionMediaType in the metaData array. In the above example, the functionMediaType has the value of device/schedulePause, but depending on the function, there may be a parameter or value in order to effect the desired control.

Figure 34:
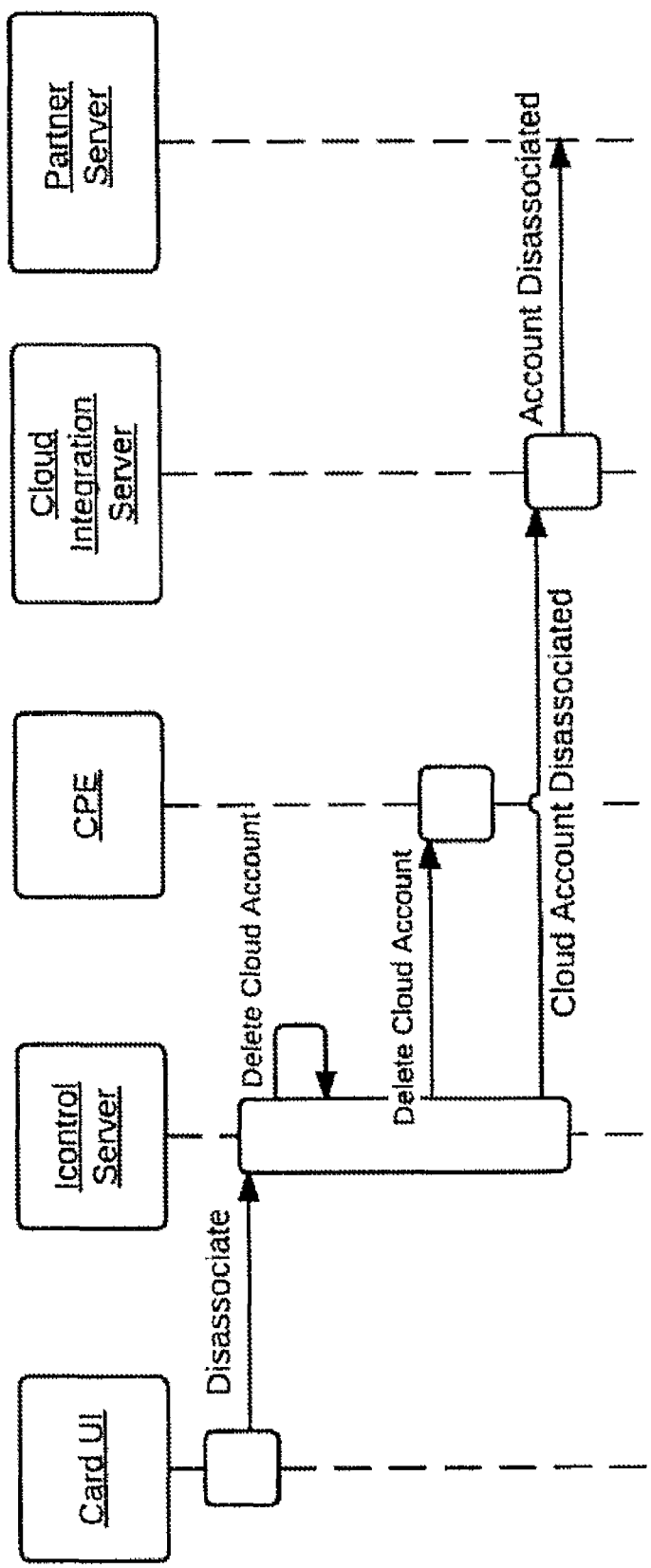
FIG. 34 is a flow diagram for Service Disassociation, under an embodiment.

FIG. 34 is a flow diagram for Service Disassociation, under an embodiment. If the user adds/removes a device in the Partner's system, the Partner Server calls the CIS API to inform Service provider about the change. A Cloud Service can be disassociated from an Service provider user through an API invocation on the Service provider server. This removes the cloud account and its associated Cloud devices from the Service provider server. A SMAP message is sent to the CPE to update its Cloud Object inventory, and the CIS calls the partner's 'Event Callback URL' to inform the Partner that the user has disassociated.

Payload Description

| | |
|---|---|
| URL | The Event Callback URL for the partner |
| Description | Notify Partner Server that a user has "deleted" or removed one of their partner products from being controlled by the Service provider system. |
| Method | POST |
| URL Parameters | None |
| Body | ```<br>{<br>  "icEvent":[<br>    {<br>      "metaData":[<br>        {<br>          "name":"virtualDevice.siteId",<br>          "value":"rachio-account-id-0001",<br>        },<br>        {<br>          "name":"virtualDevice.instanceId",<br>          "value":"rachio-userinst-0001",<br>        },<br>        {<br>          "name":"virtualDevice.providerId",<br>          "value":"rachio",<br>        },<br>      ],<br>      "id":"1409865500000",<br>      "mediaType":"virtualDevice/remove",<br>      "ts":1409865500000,<br>      "href":"sites/1/network/instances/181002.0",<br>      "siteId":"1",<br>      "deviceId":"1002",<br>      "instanceId":"181002.0",<br>    }<br>  ]<br>}<br>``` |

Event metadata includes but is not limited to: virtualDevice.providerId (e.g., name of the partner, also referred to as Integration_ID in the Card SDK); virtualDevice.siteId (e.g., user's account ID in the partner system); virtualDevice.instanceId (e.g., device ID in the partner system). Fields include but are not limited to: mediaType (e.g., all remove events will have a mediaType of 'virtualDevice/remove'); ts (e.g., time when the event happened (in milliseconds)); instanceId (e.g., ID of the device in Service provider system); id (e.g., event ID generated by Service provider server).

Figure 35:
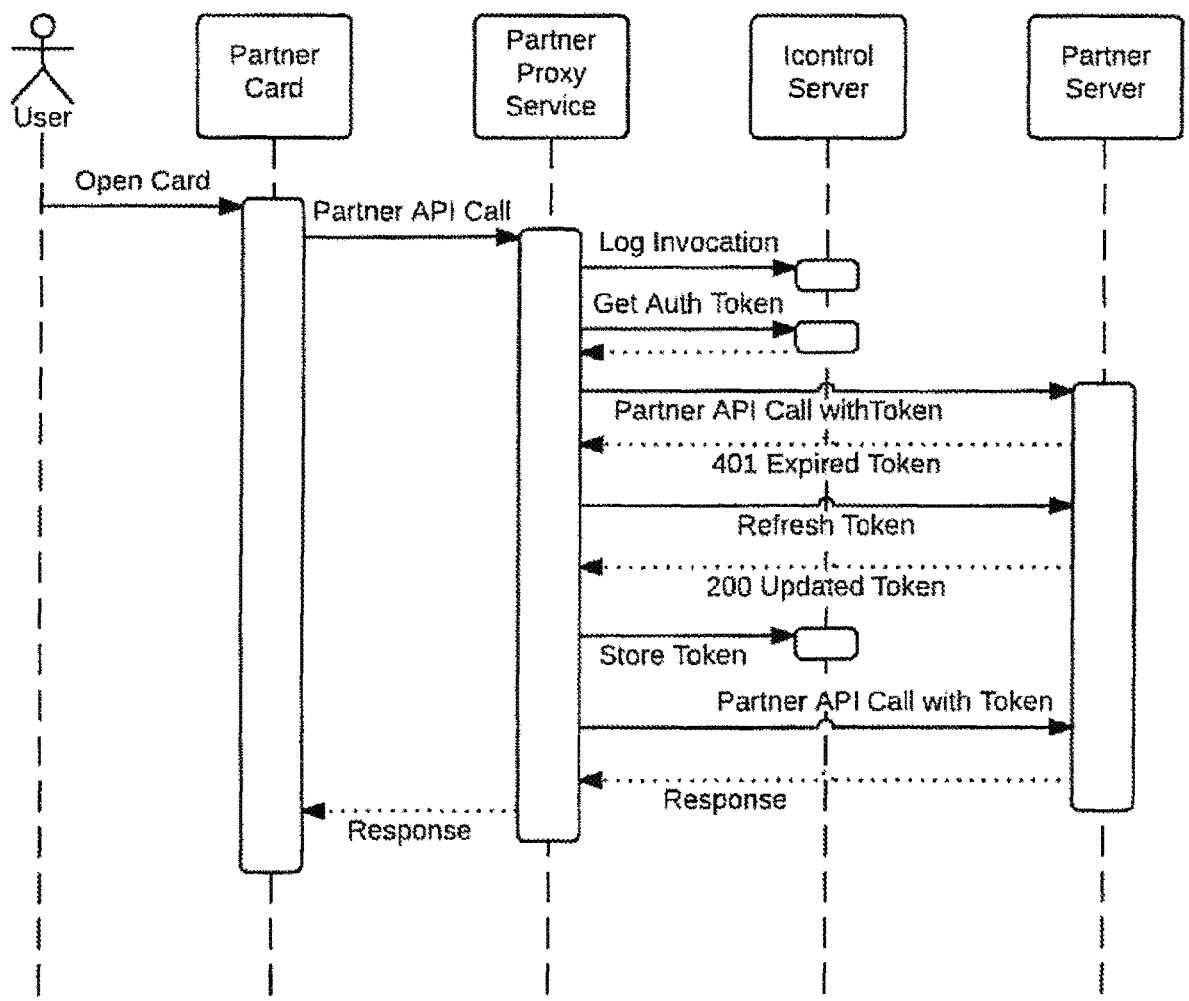
FIG. 35 is a flow diagram for Card UI Interactions, under an embodiment.

FIG. 35 is a flow diagram for Card UI Interactions, under an embodiment. The Card UIs that interact with the Cloud Objects will not depend on data stored in Service provider servers. Instead the cards will interact through the Partner Proxy Service, which handles authentication and logging, to make calls to the partner server. For example, a Nest card that needs to show a list of thermostats will get the list of thermostats and their metadata indirectly from Nest (through the Partner Proxy Service) instead of leveraging the Cloud Object data stored in our database. This is done primarily due to the desire to have the Card UI authors, which are expected to be the partners themselves, use their own APIs for easier development. Note that it does provide the possibility for the two data sets (the Cloud Objects in our database and the list of devices provided by the partner's server) to get out of sync if bugs exist in the integrations. Normally changes should be synchronized as described above in Cloud Object Synchronization and the two data sets should be equivalent.

Cards will be oblivious to authentication with the Partner Server (except for service association where the authentication data is stored in our server). Invocations to the Partner Proxy Service cause it to attempt a 'pass-through' invocation on the Partner Server using the authentication credentials stored in the database. If the Partner Server responds with a 401 authentication failure, the Partner Proxy Service will attempt to refresh the token and re-attempt the invocation to the Partner Server with the updated token as shown in the diagram above. Authentication credentials are not made available to the Cards, so they perform authenticated requests through the Partner Proxy Service.

The system of an embodiment includes files that form the Cloud Integration Metadata. As an example, an embodiment includes Cloud Integration Descriptor (CID) and Rules Template files that make up the Cloud Integration Metadata that defines a cloud integration.

The CID describes the capabilities of the devices and/or services provided by the Partner Provider Plugin including attributes, actions, events, and their associated parameters. This descriptor is used by the server to provide REST API access to the capabilities provided by the cloud service, but is not so limited.

An example CID XSD of an embodiment is as follows, but the embodiment is not so limited.

| CID XSD |
|---|
| ```<br><xs:complexType name="cloudObject"><br>  <xs:complexContent><br>    <xs:sequence><br>      <xs:element name="name" type="xs:token"/><br>      <xs:element name="metaData" type="metaData" minOccurs="0" maxOccurs="64"/><br>      <xs:element name="point" type="point" minOccurs="0" maxOccurs="64"/><br>      <xs:element name="function" type="function" minOccurs="0" maxOccurs="64"/><br>    </xs:sequence><br>    <xs:attribute name="id" type="xs:string" use="required"/><br>    <xs:attribute name="mediaType" type="xs:token" use="optional"/><br>``` |

CID XSD

```
            <xs:attribute name="href" type="xs:anyURI"/>
            <xs:attribute name="tags" type="xs:token"/>
            <xs:attribute name="status" type="cloudObjectStatus"/>
        </xs:complexContent>
    </xs:complexType>
    <xs:complexType name="metaData">
        <xs:attribute name="name" type="xs:string"/>
        <xs:attribute name="value" type="xs:string"/>
        <xs:attribute name="mediaType" type="xs:token"/>
    </xs:complexType>
    <xs:complexType name="point">
        <xs:attribute name="mediaType" type="xs:token" use="required"/>
        <xs:attribute name="name" type="xs:string"/>
        <xs:attribute name="href" type="xs:anyURI"/>
        <xs:attribute name="value" type="xs:string"/>
        <xs:attribute name="ts" type="xs:long"/>
        <xs:attribute name="readOnly" type="xs:boolean" use="required"/>
    </xs:complexType>
    <xs:complexType name="function">
        <xs:sequence>
            <xs:element name="input" type="input" minOccurs="0" maxOccurs="unbounded"/>
        </xs:sequence>
        <xs:attribute name="mediaType" type="xs:token" use="required"/>
        <xs:attribute name="name" type="xs:token"/>
        <xs:attribute name="href" type="xs:anyURI"/>
        <xs:attribute name="description" type="xs:string"/>
    </xs:complexType>
    <xs:simpleType name="cloudObjectStatus">
        <xs:restriction base="xs:token">
            <xs:enumeration value="ok"/>
            <xs:enumeration value="offline"/>
            <xs:enumeration value="unknown"/>
            <xs:enumeration value="missing"/>
            <xs:enumeration value="searching"/>
            <xs:enumeration value="configuration_failure"/>
            <xs:enumeration value="upgrading"/>
            <xs:enumeration value="configuring"/>
        </xs:restriction>
    </xs:simpleType>
```

An example CID of an embodiment is as follows, but the embodiment is not so limited.

Example CID

```
<Nest id="Nest343234345" mediaType="cloud/nest"
tags="thermostat" status="ok">
    <name>My Nest</name>
    <metadata name="manufacturer" mediaType="cloud/nest/manufacturer"
value="Nest"/>
    <metadata name="model" mediaType="cloud/nest/model"
value="M1"/>
    <point name="temperature" mediaType="cloud/nest/temperature"
value="2800" ts="23434535464557" readOnly="false"/>
    <point name="coolSetpoint" mediaType="cloud/nest/coolSetpoint"
value="2400" ts="23434535464557" readOnly="false"/>
    <point name="heatSetpoint" mediaType="cloud/nest/heatSetpoint"
value="2000" ts="23434535464557" readOnly="false"/>
    <function name="resetSetpoints" mediaType="cloud/nest/reset"
description="reset heat/cool setpoint to factory default"/>
</Nest>
```

An example Rules XSD Changes of an embodiment is as follows, but the embodiment is not so limited.

Rules XSD Changes

```
<!--
 - Subclass of trigger for Cloud commands.
-->
<xsd:complexType name="cloudTrigger">
    <xsd:complexContent>
        <xsd:extension base="trigger">
            <xsd:sequence>
                <!-- - The specific cloud object ID. -->
                <xsd:element name="cloudObjectID" type="xsd:string"
minOccurs="1" maxOccurs="1"/>
                <!-- the evaluation mechanism to apply to this trigger -->
                <xsd:choice>
                    <xsd:element name="simpleEval"
type="cloudSimpleTriggerEvaluation"/>
                    <xsd:element name="comparisonEval"
type="cloudComparisonTriggerEvaluation"/>
                </xsd:choice>
            </xsd:sequence>
        </xsd:extension>
    </xsd:complexContent>
</xsd:complexType>
<xsd:element name="cloudTrigger" type="cloudTrigger"
substitutionGroup="trigger"/>
<!-- simple cloud trigger evaluation (just an event, no args) -->
<xsd:complexType name="cloudSimpleTriggerEvaluation">
    <xsd:sequence>
        <xsd:element name="eventName" type="xsd:string"/>
    </xsd:sequence>
</xsd:complexType>
<!-- cloud trigger evaluation that compares a value -->
<xsd:complexType name="cloudComparisonTriggerEvaluation">
    <xsd:sequence>
        <xsd:element name="attributeName" type="xsd:string"/>
        <xsd:element name="comparisonMethod"
type="comparisonMethodEnum"/>
        <xsd:element name="comparisonValue" type="xsd:double"/>
    </xsd:sequence>
</xsd:complexType>
<!-- comparison methods -->
<xsd:simpleType name="comparisonMethodEnum">
    <xsd:restriction base="xsd:string">
        <!-- equality -->
        <xsd:enumeration value="eq"/>
        <!-- less than -->
        <xsd:enumeration value="lt"/>
        <!-- less than or equal -->
        <xsd:enumeration value="le"/>
        <!-- greater than -->
        <xsd:enumeration value="gt"/>
        <!-- greater than or equal -->
        <xsd:enumeration value="ge"/>
    </xsd:restriction>
</xsd:simpleType>
```

An example Master Action List Changes of an embodiment is as follows, but the embodiment is not so limited.

Master Action List Changes

```
<a:action actionID="137">
    <a:description>Invoke a Cloud Action</a:description>
    <a:parameterDef>
        <a:key>cloudObjectID</a:key>
        <a:type>string</a:type>
    </a:parameterDef>
    <a:parameterDef>
        <a:key>cloudActionID</a:key>
        <a:type>string</a:type>
    </a:parameterDef>
    <a:parameterDef>
        <a:key>parameters</a:key>
        <a:type>string</a:type> <!-- a JSONArray of JSONObjects that
contain name/value/type triplets (type is optional) -->
    </a:parameterDef>
    <!-- does this type make sense? -->
    <a:type>workflow</a:type>
    <a:target>ruleAction_invokeCloud</a:target>
</a:action>
```

An example Rule XML Examples of an embodiment is as follows, but the embodiment is not so limited.

Rule XML Examples

```xml
<rule ruleID="1002351">
    <triggerList>
        <cloudTrigger>
            <description>Cloud Trigger</description>
            <category>cloud</category>
            <!-- just points to the global service, not to any particular instance -->
            <cloudObjectID>AccuWeather</cloudObjectID>
            <!-- it is assumed here that when the AccuWeather account
                is connected that it is already filtering based on the
                user's location / zipcode -->
            <simpleEval>
                <eventName>tornadoWarning</eventName>
            </simpleEval>
        </cloudTrigger>
    </triggerList>
    <action>
        <actionID>70</actionID>
        <parameter>
            <key>lightID</key>
            <value>3781220513309696</value>
        </parameter>
        <parameter>
            <key>level</key>
            <value>100</value>
        </parameter>
    </action>
    <description>Turn on kitchen light when Tornado Warning</description>
</rule>
<rule ruleID="1008603">
    <triggerList>
        <zoneTrigger>
            <description>Zone Trigger</description>
```

Rule XML Examples

```xml
            <category>sensor</category>
            <zoneState>open</zoneState>
            <zoneID>18</zoneID>
        </zoneTrigger>
    </triggerList>
    <action>
        <actionID>137</actionID>
        <parameter>
            <key>cloudObjectID</key>
            <value>nest.1</value> <!-- device 1 under the nest service associated with this account -->
        </parameter>
        <parameter>
            <key>cloudActionID</key>
            <value>configureThermostat</value>
        </parameter>
        <parameter>
            <key>parameters</key>
            <value>[ { "name": "heatSetPoint", "value": "2200", "type": "nest/temperature" }, { "name": "coolSetPoint", "value": "2700" } ] </value>
        </parameter>
    </action>
    <description>Zone 1 Open Configure Nest Thermostat</description>
</rule>
```

In order to provide a dynamic list of available actions and triggers during rule authoring, templates describing the available functionality must be provided with the Cloud Integration Metadata. Some examples of trigger and action templates (e.g., Rachio Smart Sprinkler Controller trigger and action template, AccuWeather weather service trigger template, etc.) of an embodiment are as follows, but the embodiment is not so limited.

Example Rule Templates

```xml
<rules-core:triggerTemplates
    xmlns:rules-core="rules-core"
    xmlns:xsi="http://www.w3.org/2001/XMLSchema-instance"
    xsi:schemaLocation="rules-core ../../../../rules-core/src/main/resources/rules-core.xsd">
    <rules-core:triggerTemplate id="203"
        description="{STR.RULES.TEMPLATES.TRIGGER.DESC.INSTANCE.RACHIO}"
        cvTriggerType="cloudTrigger" cvCategory="cloud"
        excludeActionIds="10:11:15:16:17:18:100:101:103:120:121:122:135:136:137:138:139">
        <rules-core:inputs>
            <rules-core:input hidden="false"
                description="{STR.RULES.TEMPLATES.TRIGGER.TARGETVALUES.DESC.RACHIO}"
                name="targetValues" pattern="eq">
                <option
                    description="{STR.RULES.TEMPLATES.TRIGGER.TARGETVALUES.OPTION.DESC.RACHIO.ON}"
                    value="1" />
                <option
                    description="{STR.RULES.TEMPLATES.TRIGGER.TARGETVALUES.OPTION.DESC.RACHIO.OFF}"
                    value="0" />
            </rules-core:input>
            <rules-core:input hidden="true" name="type" value="event"
/>
            <rules-core:input hidden="false" name="instanceIds" />
            <rules-core:input hidden="true" name="tags" value="rachio"
/>
            <rules-core:input hidden="true" name="mediaTypes"
                value="sprinkler/on" />
        </rules-core:inputs>
    </rules-core:triggerTemplate>
</rules-core:triggerTemplates>
<rules-core:triggerTemplates
    xmlns:rules-core="rules-core"
    xmlns:xsi="http://www.w3.org/2001/XMLSchema-instance"
    xsi:schemaLocation="rules-core ../../../../rules-core/src/main/resources/rules-
```

-continued

```
core.xsd">
    <rules-core:triggerTemplate id="200"
    description="{STR.RULES.TEMPLATES.TRIGGER.DESC.INSTANCE.ACCU
WEATHER}"
        cvTriggerType="cloudTrigger" cvCategory="cloud"
excludeActionIds="10:11:15:16:17:18:135:136">
        <rules-core:inputs>
            <rules-core:input hidden="false"
    description="{STR.RULES.TEMPLATES.TRIGGER.TARGETVALUES.DESC.
ACCUWEATHER}"
                name="targetValues" pattern="gt">
                <option
    description="{STR.RULES.TEMPLATES.TRIGGER.TARGETVALUES.OPTION.
DESC.ACCUWEATHER.TEMPERATURE.GT}"
                    value="temperatureGt" />
            </rules-core:input>
            <rules-core:input hidden="true" name="type" value="event"
/>
            <rules-core:input hidden="false" name="instanceIds" />
            <rules-core:input hidden="true" name="tags"
value="accuWeather" />
            <rules-core:input hidden="true" name="mediaTypes"
                value="weather/temperature" />
        </rules-core:inputs>
    </rules-core:triggerTemplate>
</rules-core:triggerTemplates>
<rules-core:actionTemplates xmlns:rules-core="rules-core"
    xmlns:xsi="http://www.w3.org/2001/XMLSchema-instance"
    xsi:schemaLocation="rules-core ../../../../rules-core/src/main/resources/rules-
core.xsd">
    <rules-core:actionTemplate id="137"
    description="{STR.RULES.TEMPLATES.ACTION.DESC.RACHIO.OFF}"
cvActionId="137"
        cvType="workflow">
        <rules-core:inputs>
            <rules-core:input hidden="false" description="Which Rachio
Object"
                name="instanceIds" cvKey="cloudObjectID"
cvType="cloudObjectID"
                cvRequired="true" />
            <rules-core:input name="mediaType"
value="sprinkler/scheduleStop" />
        </rules-core:inputs>
    </rules-core:actionTemplate>
</rules-core:actionTemplates>
```

Sample curl commands of Rachio cloud rule follows. curl -k -v -L -H "Content-Type:application/json"-H "X-login:insight"-H "X-password:test"-H "X-AppKey: defaultKey" -X PUT "https://10.0.12.102/rest/icontrol/sites/420/rules"-d '{"description":"Rachio turns ON, Turn on Light","executionSource":"client","enabled":true,"valid": true,"default":false,"conditional s":{"conditional":[{"triggers":{"trigger":[{"description":"Rachio is ON","id":"0", "templateId":"203","targetValues":"1","type":"event", "mediaTypes":"sprinkler/systemOn","instances": "181002.0","targetComparisonTypes":"eq"}]},"actions": {"action":[{"id":"0","templateId":"70","inputs": "level=0&","instanceIds":"13000d6f00020a5d9a.1.0"}]}}]}}'

User should pass targetComparisonTypes whenever there is a pattern present in cloudTrigger. In above case targetComparisonTypes is "eq" and targetValues is "1". Both these values should be fetched from the triggerTemplate.

Sample curl commands of AccuWeather cloud rule follows. curl -k -v -L -H "Content-Type:application/json"-H "X-login:insight"-H "X-password:test"-H "X-AppKey: defaultKey" -X PUT "https://10.0.12.102/rest/icontrol/sites/420/rules"-d '{"description":"Outside temperature is less than 100, Turn on light","executionSource":"client", "enabled":true, "valid":true, "default":false, "conditionals":{"conditional": [{"triggers":{"trigger":[{"description":"Outside temperature is greater than 60 degrees, turn on light","id":"0", "templateId":"200","targetValues":"70","type":"event", "mediaTypes":"weather/temperature","instances": "181001.0","targetComparisonTypes":"gt"}]},"actions": {"action":[{"id":"0","templateId":"70","inputs": "level=0&","instanceIds":"13000d6f00020a5d9a.1.0"}]}}]}}'

In above case targetComparisonTypes is "gt" and targetValues is "70". Here targetComparisonTypes should be fetched from triggerTemplate and user should pass user defined value in targetValues.

SMAP Protocol Changes

SMAP is updated to allow server to send external events to CPE and CPE send external action event to server.

```
<xsd:complexType name="cloudEvent">
    <xsd:complexContent>
        <xsd:extension base="smap:baseMessage">
            <xsd:sequence>
                <xsd:element name="metaData" type="smap:eventMetaData"
maxOccurs="32" minOccurs="0">
                    <xsd:annotation>
                        <xsd:documentation>Additional information about
the event itself</xsd:documentation>
```

```
            </xsd:annotation>
        </xsd:element>
        <xsd:element name="context" type="smap:eventContext"
maxOccurs="32" minOccurs="0">
            <xsd:annotation>
                <xsd:documentation>Information about other aspects
of the system at the time of the event</xsd:documentation>
            </xsd:annotation>
        </xsd:element>
    </xsd:sequence>
    <xsd:attribute name="id" type="xsd:token"/>
    <xsd:attribute name="cloudObjectId" type="xsd:token"/>
    <xsd:attribute name="mediaType" type="xsd:token"
use="required"/>
    <xsd:attribute name="ts" type="xsd:long" use="required"/>
    <xsd:attribute name="href" type="xsd:anyURI"/>
    <xsd:attribute name="errorCode" type="xsd:token"/>
    <xsd:attribute name="value" type="xsd:string"/>
            </xsd:extension>
        </xsd:complexContent>
    </xsd:complexType>
    <xsd:complexType name="eventContext">
        <xsd:attribute name="mediaType" type="xsd:token"
use="required"/>
        <xsd:attribute name="value" type="xsd:string" use="required"/>
        <xsd:attribute name="href" type="xsd:anyURI"/>
    </xsd:complexType>
    <xsd:complexType name="eventMetaData">
        <xsd:attribute name="name" type="xsd:token"
use="required"/>
        <xsd:attribute name="value" type="xsd:string" use="required"/>
    </xsd:complexType>
    <xsd:complexType name="cloudActionEvent">
        <xsd:complexContent>
            <xsd:extension base="smap:baseMessage">
                <xsd:sequence>
                    <xsd:element name="ruleId" type="xsd:long" minOccurs="0"
maxOccurs="1">
                        <xsd:annotation>
                            <xsd:documentation>Id of the rule that triggered this
action, if applicable.</xsd:documentation>
                        </xsd:annotation>
                    </xsd:element>
                    <xsd:element name="eventId" type="xsd:string"
minOccurs="0" maxOccurs="1">
                        <xsd:annotation>
                            <xsd:documentation>The id of the event that
triggered the rule.</xsd:documentation>
                        </xsd:annotation>
                    </xsd:element>
                    <xsd:element name="cloudObjectId" type="xsd:token"
minOccurs="1" maxOccurs="1"/>
                    <xsd:element name="actionMediaType" type="xsd:token"
minOccurs="1" maxOccurs="1"/>
                    <xsd:element name="actionHref" type="xsd:anyURI"
minOccurs="0" maxOccurs="1"/>
                    <xsd:element name="actionInput" type="smap:input"
minOccurs="0" maxOccurs="32"/>
                </xsd:sequence>
            </xsd:extension>
        </xsd:complexContent>
    </xsd:complexType>
    <xsd:complexType name="input">
        <xsd:attribute name="name" type="xsd:token" use="required"/>
        <xsd:attribute name="mediaType" type="xsd:token"
use="optional"/>
        <xsd:attribute name="value" type="xsd:string" use="required"/>
    </xsd:complexType>
```

The ICS of an embodiment effects ICS platform integration with third party system and device functionality (e.g., Philips Hue lights, Chamberlain garage door openers, Nest thermostats, Dropcam cameras, Doorbot doorbell cameras, etc.), as described in detail herein. Using the same processes, other server-to-server (cloud) services (e.g., Accuweather, MSO digital assets such as voicemail, etc.) are also integrated into the ICS platform.

Cloud Actions and Triggers of an embodiment enable cloud services and internet-connected devices to leverage the user interface, Rules Engine and other functions of the service provider system. This allows third party devices (e.g., smart door bells, door locks, garage door operators, cameras, thermostats, lighting systems, lighting devices, lawn irrigation systems, plant sensors, pet feeders, weather stations, rain sensors, pool controls, air quality sensors, music systems, remote controllers, internet user interfaces, connected systems, connected vehicles, etc.), third party services (e.g., weather forecasting services and applications, family networking services and applications, etc.), and others to trigger automations in the service provider system using the Rules Engine. This enables end-users to integrate and use their previously-standalone internet connected devices with their service provider-based service.

Figure 36:
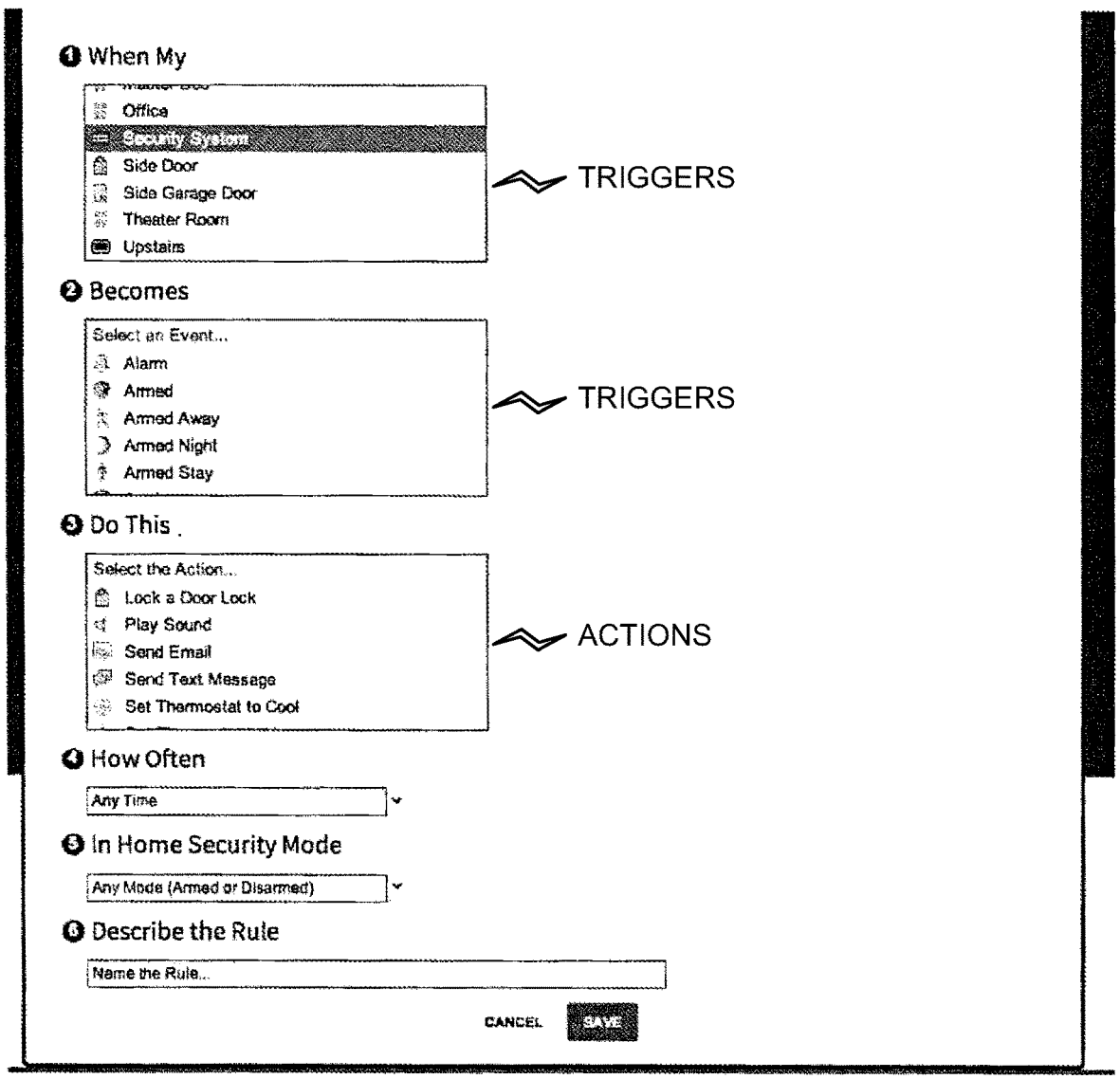
FIG. 36 is an example rules interface for controlling triggers and actions involving third party devices integrated in the ICS, under an embodiment.
Figure 37:
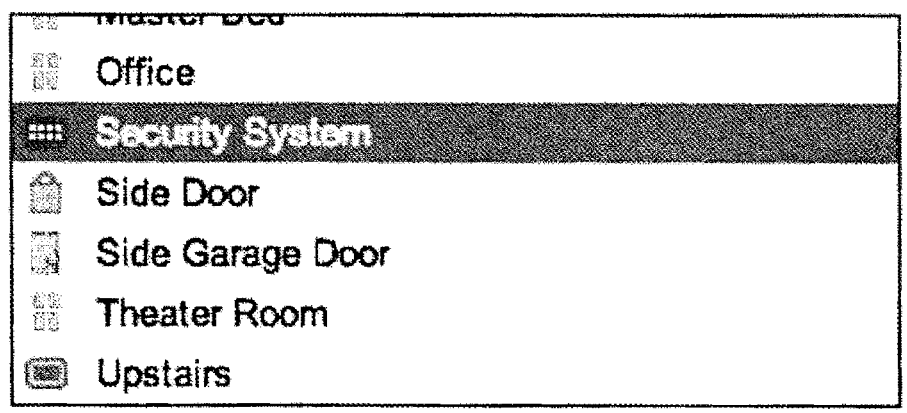
FIG. 37 is an example of a triggers portion of a rules interface for third party services integrated with the ICS, under an embodiment.
Figure 37:
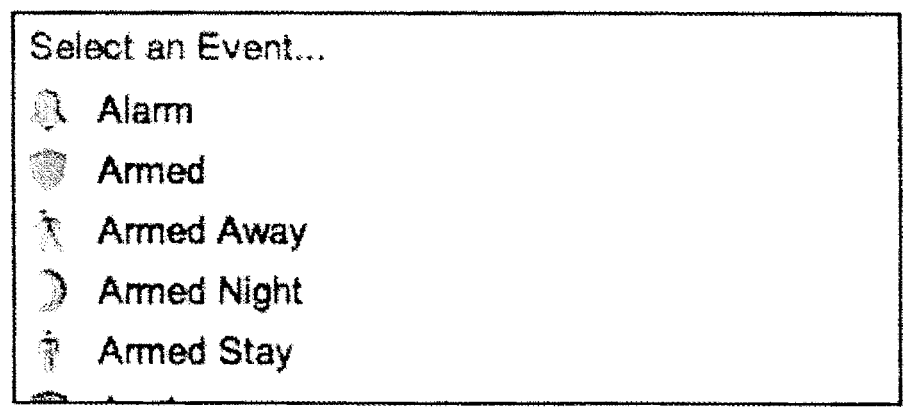
Figure 38:
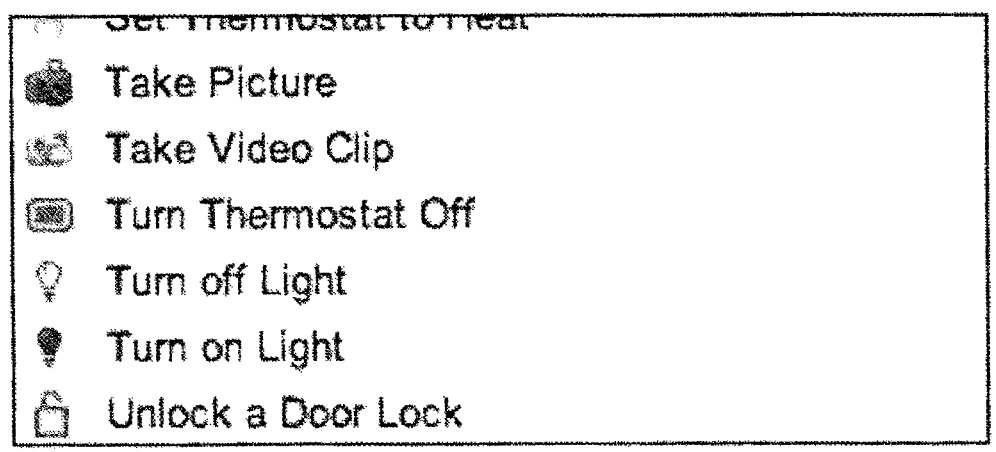
FIG. 38 is another example of an actions portion of a rules interface for integrated third party devices, under an embodiment.

FIG. 36 is an example rules interface for controlling triggers and actions involving third party devices integrated in the CAT, under an embodiment. FIG. 37 is an example of a triggers portion of a rules interface for third party services integrated with the CAT, under an embodiment. FIG. 38 is another example of an actions portion of a rules interface for integrated third party devices, under an embodiment. The rules automation actions and triggers of an embodiment include monitor/control functionality enabled via proprietary UIs, and with cards in the Card UI as described herein.

Embodiments include a system comprising a cloud hub located in a premises. The cloud hub comprises a plurality of adapters coupled to a plurality of premises devices. The cloud hub is configured as a gateway for the premises devices. The system includes a virtual gateway located in a cloud server environment and coupled to the cloud hub. The virtual gateway is configured as a server-side abstraction of the cloud hub. The cloud hub and the virtual gateway are configured as an automation platform that maintains state data of the plurality of premises devices, controls interaction among the plurality of premises devices, and monitors and manages the plurality of premises devices.

Embodiments include a system comprising: a cloud hub located in a premises, wherein the cloud hub comprises a plurality of adapters coupled to a plurality of premises devices, wherein the cloud hub is configured as a gateway for the premises devices; a virtual gateway located in a cloud server environment and coupled to the cloud hub, wherein the virtual gateway is configured as a server-side abstraction of the cloud hub, wherein the cloud hub and the virtual gateway are configured as an automation platform that maintains state data of the plurality of premises devices, controls interaction among the plurality of premises devices, and monitors and manages the plurality of premises devices.

The plurality of adapters includes an internet protocol (IP) adapter.

The IP adapter is coupled to a premises device including at least one IP device.

The plurality of adapters includes a radio adapter.

The radio adapter is configured to use a communication protocol of a premises device coupled to the radio adapter.

The radio adapter includes a wireless radio adapter.

The radio adapter is coupled to a premises device including at least one Zigbee device.

The plurality of adapters includes a camera adapter.

The camera adapter is coupled to a premises device including at least one camera device.

The at least one camera device includes a tunnel camera.

The plurality of adapters include a Wi-Fi adapter.

The cloud hub is coupled to a radio frequency (RF) bridge in the premises.

The RF bridge is coupled to at least one additional premises device.

The at least one additional premises device includes at least one Z-Wave device.

The cloud server environment includes a session server, wherein the virtual gateway is an instance of a plurality of virtual gateways running on the session server.

The cloud server environment includes at least one of a registry gateway and a session gateway, wherein the at least one the registry gateway and a session gateway are coupled to the session server.

The registry gateway is configured to identify the virtual gateway from the plurality of virtual gateways and route incoming data from the cloud hub to the virtual gateway.

The routing of incoming data includes a mapping of premises device identification (ID) and device type to site ID corresponding to the premises.

The premises device ID corresponds to at least one of the plurality of premises devices.

The site ID is assigned to the cloud hub.

The cloud hub is configured to communicate with the registry gateway and receive the site ID.

The cloud hub is configured to communicate with the registry gateway and receive a network address of the credential gateway.

The cloud server environment includes a credential gateway, wherein the cloud hub is configured to communicate with the credential gateway and, using the site ID, receive a key.

The cloud hub is configured to receive session server data from the credential gateway, wherein the session server data includes a session server address.

The virtual gateway comprises a first gateway state machine running on the session server.

The cloud hub comprises a processor running a second gateway state machine.

At least one of the first gateway state machine and the second gateway state machine maintains track of a state of the plurality of premises devices.

At least one of the first gateway state machine and the second gateway state machine monitors and manages the plurality of premises devices.

The first gateway state machine and the second gateway state machine maintain track of a state of the plurality of premises devices.

The first gateway state machine and the second gateway state machine monitor and manage the plurality of premises devices.

The system includes at least one premises device of the plurality of premises devices configured to communicate with the virtual gateway over a cellular coupling.

Inbound communications to the virtual gateway comprise packet communications.

Outbound communications from the virtual gateway comprise short message service (SMS) messages.

The cloud hub is configured to maintain a persistent connection with the cloud server environment.

The cloud hub is coupled to the cloud server environment using a broadband coupling.

The cloud hub is coupled to the cloud server environment using a cellular coupling.

The system includes a remote device coupled to the cloud server environment, wherein the remote device receives state data of the plurality of premises devices and provides control data to the plurality of premises devices.

The remote device is coupled to the cloud server via at least one of a mobile portal and a web portal.

The plurality of premises devices includes at least one of a sensor, a detector, a camera, an input/output (I/O) device, a touchscreen controller, a video camera, an input/output (I/O) device, an actuator, and a device controller that controls an attached device.

Embodiments include a method comprising configuring a cloud hub to include a plurality of adapters. The plurality of adapters is coupled to a plurality of premises devices. The cloud hub is located in a premises and configured as a gateway for the premises devices. The method includes configuring a cloud server environment to include a virtual gateway. The virtual gateway is coupled to the cloud hub and configured as a server-side abstraction of the cloud hub. The method includes configuring the cloud hub and the virtual gateway as an automation platform that maintains state data of the plurality of premises devices, controls interaction among the plurality of premises devices, and monitors and manages the plurality of premises devices.

Embodiments include a method comprising: configuring a cloud hub to include a plurality of adapters, wherein the plurality of adapters is coupled to a plurality of premises devices, wherein the cloud hub is located in a premises and configured as a gateway for the premises devices; configuring a cloud server environment to include a virtual gateway, wherein the virtual gateway is coupled to the cloud hub and configured as a server-side abstraction of the cloud hub; configuring the cloud hub and the virtual gateway as an automation platform that maintains state data of the plurality of premises devices, controls interaction among the plurality of premises devices, and monitors and manages the plurality of premises devices.

The plurality of adapters includes an internet protocol (IP) adapter.

The IP adapter is coupled to a premises device including at least one IP device.

The plurality of adapters includes a radio adapter.

The method includes configuring the radio adapter to use a communication protocol of a premises device coupled to the radio adapter.

The radio adapter includes a wireless radio adapter.

The radio adapter is coupled to a premises device including at least one Zigbee device.

The plurality of adapters includes a camera adapter.

The camera adapter is coupled to a premises device including at least one camera device.

The at least one camera device includes a tunnel camera.

The plurality of adapters include a Wi-Fi adapter.

The cloud hub is coupled to a radio frequency (RF) bridge in the premises.

The RF bridge is coupled to at least one additional premises device.

The at least one additional premises device includes at least one Z-Wave device.

The method includes configuring the cloud server environment to include a session server, wherein the virtual gateway is an instance of a plurality of virtual gateways running on the session server.

The method includes configuring the cloud server environment to include at least one of a registry gateway and a session gateway, wherein the at least one of the registry gateway and the session gateway are coupled to the session server.

The method includes configuring the registry gateway to identify the virtual gateway from the plurality of virtual gateways and route incoming data from the cloud hub to the virtual gateway.

The method includes configuring the routing of incoming data to include a mapping of premises device identification (ID) and device type to site ID corresponding to the premises.

The premises device ID corresponds to at least one of the plurality of premises devices.

The site ID is assigned to the cloud hub.

The method includes configuring the cloud hub to communicate with the registry gateway and receive the site ID.

The method includes configuring the cloud hub to communicate with the registry gateway and receive a network address of the credential gateway.

The method includes configuring the cloud server environment to include a credential gateway, and configuring the cloud hub to communicate with the credential gateway and, using the site ID, receive a key.

The method includes configuring the cloud hub to receive session server data from the credential gateway, wherein the session server data includes a session server address.

The method includes configuring the virtual gateway to include a first gateway state machine running on the session server.

The method includes configuring the cloud hub to include a processor running a second gateway state machine.

The method includes configuring at least one of the first gateway state machine and the second gateway state machine to maintain track of a state of the plurality of premises devices.

The method includes configuring at least one of the first gateway state machine and the second gateway state machine to monitor and manage the plurality of premises devices.

The method includes configuring the first gateway state machine and the second gateway state machine to maintain track of a state of the plurality of premises devices.

The method includes configuring the first gateway state machine and the second gateway state machine to monitor and manage the plurality of premises devices.

The method includes configuring at least one premises device of the plurality of premises devices to communicate with the virtual gateway over a cellular coupling.

The method includes configuring inbound communications to the virtual gateway to include packet communications.

The method includes configuring outbound communications from the virtual gateway to include short message service (SMS) messages.

The method includes configuring the cloud hub to maintain a persistent connection with the cloud server environment.

The cloud hub is coupled to the cloud server environment using a broadband coupling.

The cloud hub is coupled to the cloud server environment using a cellular coupling.

The method includes a remote device coupled to the cloud server environment, wherein the remote device receives state data of the plurality of premises devices and provides control data to the plurality of premises devices.

The remote device is coupled to the cloud server via at least one of a mobile portal and a web portal.

The plurality of premises devices includes at least one of a sensor, a detector, a camera, an input/output (I/O) device, a touchscreen controller, a video camera, an input/output (I/O) device, an actuator, and a device controller that controls an attached device.

Embodiments include a system comprising a cloud hub located in a premises. The cloud hub comprises a plurality of adapters coupled to a plurality of premises devices. The cloud hub is configured as a gateway for the premises devices. The system includes a virtual gateway located in a cloud server environment and coupled to the cloud hub. The virtual gateway is configured as a server-side abstraction of the cloud hub. The cloud hub and the virtual gateway are configured as an automation platform that maintains state data of the plurality of premises devices, controls interaction among the plurality of premises devices, and monitors and manages the plurality of premises devices. The system includes a security system coupled to the virtual gateway. The security system includes a plurality of security system components.

Embodiments include a system comprising: a cloud hub located in a premises, wherein the cloud hub comprises a plurality of adapters coupled to a plurality of premises devices, wherein the cloud hub is configured as a gateway for the premises devices; a virtual gateway located in a cloud server environment and coupled to the cloud hub, wherein the virtual gateway is configured as a server-side abstraction of the cloud hub, wherein the cloud hub and the virtual gateway are configured as an automation platform that maintains state data of the plurality of premises devices, controls interaction among the plurality of premises devices, and monitors and manages the plurality of premises devices; a security system coupled to the virtual gateway, wherein the security system includes a plurality of security system components.

The plurality of adapters includes an internet protocol (IP) adapter.

The IP adapter is coupled to a premises device including at least one IP device.

The plurality of adapters includes a radio adapter.

The radio adapter is configured to use a communication protocol of a premises device coupled to the radio adapter.

The radio adapter includes a wireless radio adapter.

The radio adapter is coupled to a premises device including at least one Zigbee device.

The plurality of adapters includes a camera adapter.

The camera adapter is coupled to a premises device including at least one camera device.

The at least one camera device includes a tunnel camera.

The plurality of adapters include a Wi-Fi adapter.

The cloud hub is coupled to a radio frequency (RF) bridge in the premises.

The RF bridge is coupled to at least one additional premises device.

The at least one additional premises device includes at least one Z-Wave device.

The cloud server environment includes a session server, wherein the virtual gateway is an instance of a plurality of virtual gateways running on the session server.

The cloud server environment includes at least one of a registry gateway and a session gateway, wherein the at least one the registry gateway and a session gateway are coupled to the session server.

The registry gateway is configured to identify the virtual gateway from the plurality of virtual gateways and route incoming data from the cloud hub to the virtual gateway.

The routing of incoming data includes a mapping of premises device identification (ID) and device type to site ID corresponding to the premises.

The premises device ID corresponds to at least one of the plurality of premises devices.

The site ID is assigned to the cloud hub.

The cloud hub is configured to communicate with the registry gateway and receive the site ID.

The cloud hub is configured to communicate with the registry gateway and receive a network address of the credential gateway.

The cloud server environment includes a credential gateway, wherein the cloud hub is configured to communicate with the credential gateway and, using the site ID, receive a key.

The cloud hub is configured to receive session server data from the credential gateway, wherein the session server data includes a session server address.

The virtual gateway comprises a first gateway state machine running on the session server.

The cloud hub comprises a processor running a second gateway state machine.

At least one of the first gateway state machine and the second gateway state machine maintains track of a state of the plurality of premises devices.

A least one of the first gateway state machine and the second gateway state machine monitors and manages the plurality of premises devices.

The first gateway state machine and the second gateway state machine maintain track of a state of the plurality of premises devices.

The first gateway state machine and the second gateway state machine monitor and manage the plurality of premises devices.

The system includes at least one premises device of the plurality of premises devices configured to communicate with the virtual gateway over a cellular coupling.

Inbound communications to the virtual gateway comprise packet communications.

Outbound communications from the virtual gateway comprise short message service (SMS) messages.

The cloud hub is configured to maintain a persistent connection with the cloud server environment.

The cloud hub is coupled to the cloud server environment using a broadband coupling.

The cloud hub is coupled to the cloud server environment using a cellular coupling.

The system includes a remote device coupled to the cloud server environment, wherein the remote device receives state data of the plurality of premises devices and provides control data to the plurality of premises devices.

The remote device is coupled to the cloud server via at least one of a mobile portal and a web portal.

The plurality of premises devices includes at least one of a sensor, a detector, a camera, an input/output (I/O) device, a touchscreen controller, a video camera, an input/output (I/O) device, an actuator, and a device controller that controls an attached device.

At least one of the cloud hub and the virtual gateway is configured to maintain state data of the security system, and control interaction among the plurality of premises devices and the security system.

The security system is coupled to the virtual gateway using at least one of a broadband coupling and a cellular coupling.

The security system is coupled to the virtual gateway using a broadband coupling.

The cloud hub is coupled to the gateway using a cellular coupling.

The cloud server environment includes a security server.

The plurality of security system components includes at least one of a sensor, a detector, a camera, an input/output (I/O) device, and a touchscreen.

The plurality of security system components includes at least one of an Internet Protocol (IP) device, a video camera, an input/output (I/O) device, an actuator, and a device controller that controls an attached device.

Embodiments include a method comprising configuring a cloud hub to include a plurality of adapters. The plurality of adapters is coupled to a plurality of premises devices. The cloud hub is located in a premises and configured as a gateway, for the premises devices. The method includes configuring a cloud server environment to include a virtual gateway. The virtual gateway is coupled to the cloud hub and configured as a server-side abstraction of the cloud hub. The method includes configuring the cloud hub and the virtual gateway as an automation platform that maintains state data of the plurality of premises devices, controls interaction among the plurality of premises devices, and monitors and manages the plurality of premises devices. The method includes configuring a coupling between the virtual gateway and a security system in the premises, wherein the security system includes a plurality of security system components.

Embodiments include a method comprising: configuring a cloud hub to include a plurality of adapters, wherein the plurality of adapters is coupled to a plurality of premises devices, wherein the cloud hub is located in a premises and configured as a gateway for the premises devices; configuring a cloud server environment to include a virtual gateway, wherein the virtual gateway is coupled to the cloud hub and configured as a server-side abstraction of the cloud hub; configuring the cloud hub and the virtual gateway as an automation platform that maintains state data of the plurality of premises devices, controls interaction among the plurality of premises devices, and monitors and manages the plurality of premises devices; configuring a coupling between the virtual gateway and a security system in the premises, wherein the security system includes a plurality of security system components.

The plurality of adapters includes an internet protocol (IP) adapter.

The IP adapter is coupled to a premises device including at least one IP device.

The plurality of adapters includes a radio adapter.

The method includes configuring the radio adapter to use a communication protocol of a premises device coupled to the radio adapter.

The radio adapter includes a wireless radio adapter.

The radio adapter is coupled to a premises device including at least one Zigbee device.

The plurality of adapters includes a camera adapter.

The camera adapter is coupled to a premises device including at least one camera device.

The at least one camera device includes a tunnel camera.

The plurality of adapters include a Wi-Fi adapter.

The cloud hub is coupled to a radio frequency (RF) bridge in the premises.

The RF bridge is coupled to at least one additional premises device.

The at least one additional premises device includes at least one Z-Wave device.

The method includes configuring the cloud server environment to include a session server, wherein the virtual gateway is an instance of a plurality of virtual gateways running on the session server.

The method includes configuring the cloud server environment to include at least one of a registry gateway and a session gateway, wherein the at least one the registry gateway and a session gateway are coupled to the session server.

The method includes configuring the registry gateway to identify the virtual gateway from the plurality of virtual gateways and route incoming data from the cloud hub to the virtual gateway.

The method includes configuring the routing of incoming data to include a mapping of premises device identification (ID) and device type to site ID corresponding to the premises.

The premises device ID corresponds to at least one of the plurality of premises devices.

The site ID is assigned to the cloud hub.

The method includes configuring the cloud hub to communicate with the registry gateway and receive the site ID.

The method includes configuring the cloud hub to communicate with the registry gateway and receive a network address of the credential gateway.

The method includes configuring the cloud server environment to include a credential gateway, and configuring the cloud hub to communicate with the credential gateway and, using the site ID, receive a key.

The method includes configuring the cloud hub to receive session server data from the credential gateway, wherein the session server data includes a session server address.

The method includes configuring the virtual gateway to comprise a first gateway state machine running on the session server.

The method includes configuring the cloud hub to include a processor running a second gateway state machine.

The method includes configuring at least one of the first gateway state machine and the second gateway state machine to maintain track of a state of the plurality of premises devices.

The method includes configuring at least one of the first gateway state machine and the second gateway state machine to monitor and manage the plurality of premises devices.

The method includes configuring the first gateway state machine and the second gateway state machine to maintain track of a state of the plurality of premises devices.

The method includes configuring the first gateway state machine and the second gateway state machine to monitor and manage the plurality of premises devices.

The method includes configuring at least one premises device of the plurality of premises devices to communicate with the virtual gateway over a cellular coupling.

The method includes configuring inbound communications to the virtual gateway to include packet communications.

The method includes configuring outbound communications from the virtual gateway to include short message service (SMS) messages.

The method includes configuring the cloud hub to maintain a persistent connection with the cloud server environment.

The method includes configuring the cloud hub to couple to the cloud server environment using a broadband coupling.

The method includes configuring the cloud hub to couple to the cloud server environment using a cellular coupling.

The method includes configuring the cloud server environment to couple to a remote device, wherein the remote device receives state data of the plurality of premises devices and provides control data to the plurality of premises devices.

The remote device is coupled to the cloud server via at least one of a mobile portal and a web portal.

The plurality of premises devices includes at least one of a sensor, a detector, a camera, an input/output (I/O) device, a touchscreen controller, a video camera, an input/output (I/O) device, an actuator, and a device controller that controls an attached device.

The method includes configuring at least one of the cloud hub and the virtual gateway to maintain state data of the security system, and control interaction among the plurality of premises devices and the security system.

The security system is coupled to the virtual gateway using at least one of a broadband coupling and a cellular coupling.

The security system is coupled to the virtual gateway using a broadband coupling.

The method includes configuring the cloud hub to couple to the gateway using a cellular coupling.

The method includes configuring the cloud server environment to include a security server.

The plurality of security system components includes at least one of a sensor, a detector, a camera, an input/output (I/O) device, and a touchscreen.

The plurality of security system components includes at least one of an Internet Protocol (IP) device, a video camera, an input/output (I/O) device, an actuator, and a device controller that controls an attached device.

As described above, computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The system can be a component of a single system, multiple systems, and/or geographically separate systems. The system can also be a subcomponent or subsystem of a single system, multiple systems, and/or geographically separate systems. The system can be coupled to one or more other components (not shown) of a host system or a system coupled to the host system.

One or more components of the system and/or a corresponding system or application to which the system is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the system herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANS), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods is not intended to be exhaustive or to limit the systems and methods to the precise forms disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

The elements and acts of the various embodiments described above can be combined to provide further embodiments. These and other changes can be made to the systems and methods in light of the above detailed description.

What is claimed is:

1. A system comprising:
a premises gateway located at a premises and in communication with a plurality of premises devices; and
one or more servers located external to the premises and comprising a virtual gateway, wherein the virtual gateway is configured based on the premises gateway and in communication with the premises gateway, and wherein the virtual gateway is configured to receive, from one or more of the premises gateway and the plurality of premises devices, state data of the plurality of premises devices and determine, based on the state data, control data for the plurality of premises devices.

2. The system of claim 1, wherein the premises gateway comprises a plurality of adapters.

3. The system of claim 2, wherein the plurality of adapters comprises an internet protocol (IP) adapter and the premises gateway is in communication with, via the IP adapter, one or more premises devices of the plurality of premises devices.

4. The system of claim 2, wherein the plurality of adapters comprises a radio adapter.

5. The system of claim 4, wherein the premises gateway is in communication with, via the radio adapter and a communication protocol of a premises device of the plurality of premises devices, the premises device of the plurality of premises devices.

6. The system of claim 4, wherein the radio adapter comprises a wireless radio adapter.

7. The system of claim 4, wherein the plurality of premises devices comprises a Zigbee device and the premises gateway is in communication with, via the radio adapter, the Zigbee device.

8. The system of claim 2, wherein the plurality of adapters comprises a camera adapter.

9. The system of claim 8, wherein the plurality of premises devices comprises a camera device and the premises gateway is in communication with, via the camera adapter, the camera device.

10. The system of claim 9, wherein the camera device comprises a tunnel camera.

11. The system of claim 2, wherein the plurality of adapters comprises a Wi-Fi adapter.

12. The system of claim 1, wherein the premises gateway is in communication with a radio frequency (RF) bridge located at the premises.

13. The system of claim 12, wherein the RF bridge is in communication with at least one premises device of the plurality of premises devices.

14. The system of claim 13, wherein the at least one premises device in communication with the RF bridge comprises at least one Z-Wave device.

15. The system of claim 1, wherein the one or more servers comprise a session server, wherein the virtual gateway is an instance of a plurality of virtual gateways running on the session server.

16. The system of claim 15, wherein the one or more servers comprises at least one of a registry gateway and a session gateway, wherein the at least one of a registry gateway and a session gateway are in communication with the session server.

17. The system of claim 16, wherein the registry gateway is configured to determine the virtual gateway from the plurality of virtual gateways and route incoming data from the premises gateway to the virtual gateway.

18. The system of claim 17, wherein the registry gateway is configured to map a premises device identification (ID) and premises device type ID to a site ID corresponding to the premises.

19. The system of claim 18, wherein the premises device ID corresponds to at least one premises device of the plurality of premises devices.

20. The system of claim 18, wherein the site ID is associated with the premises gateway.

21. The system of claim 18, wherein the premises gateway is configured to communicate with the registry gateway and receive the site ID.

22. The system of claim 21, wherein the one or more servers comprises a credential gateway, wherein the premises gateway is configured to communicate with the credential gateway and, based on the site ID, receive a key.

23. The system of claim 22, wherein the premises gateway is configured to receive, from the credential gateway, session server data, wherein the session server data comprises a session server address.

24. The system of claim 1, wherein the virtual gateway comprises a first gateway state machine and the premises gateway comprises a processor running a second gateway state machine.

25. The system of claim 24, wherein at least one of the first gateway state machine and the second gateway state machine stores state data of the plurality of premises devices and manages the plurality of premises devices.

26. The system of claim 25, wherein the first gateway state machine and the second gateway state machine store state data of the plurality of premises devices and manage the plurality of premises devices.

27. The system of claim 1, wherein at least one premises device of the plurality of premises devices is configured to communicate, via a cellular connection, with the virtual gateway.

28. The system of claim 1, wherein the virtual gateway is configured to receive inbound communication comprising packet communications and send outbound communications comprising short message service (SMS) messages.

29. The system of claim 1, wherein the premises gateway is in communication with the virtual gateway via one or more of a broadband connection and a cellular connection.

30. The system of claim 1, wherein the one or more servers are in communication with a remote device, the one or more servers are configured to send, to the remote device, state data of the plurality of premises devices, and receive, from the remote device, control data for the plurality of premises devices.

31. The system of claim 30, wherein the one or more servers are in communication with the remote device via at least one of a mobile portal and a web portal.

32. The system of claim 1, wherein the plurality of premises devices comprises at least one of a sensor, a detector, a camera, an input/output (I/O) device, a touchscreen controller, a video camera, an input/output (I/O) device, an actuator, and a device controller that controls an attached device.

33. A method comprising:
receiving, by a virtual gateway located external to a premises and from one or more of a premises gateway located at the premises and a plurality of premises devices, state data of the plurality of premises devices, wherein the virtual gateway is configured based on the premises gateway and the premises gateway is in communication with the plurality of premises devices; and
determining, by the virtual gateway, and based on the state data, control data for the plurality of premises devices.

34. The method of claim 33, wherein the premises gateway comprises a plurality of adapters.

35. The method of claim 34, wherein the plurality of adapters comprises an internet protocol (IP) adapter and the premises gateway is in communication with, via the IP adapter, one or more premises device of the plurality of premises devices.

36. The method of claim 34, wherein the plurality of adapters comprises a radio adapter.

37. The method of claim 36, wherein the premises gateway is in communication with, via the radio adapter and a communication protocol of a premises device of the plurality of premises devices, a premises device of the plurality of premises devices.

38. The method of claim 36, wherein the radio adapter comprises a wireless radio adapter.

39. The method of claim 36, wherein the plurality of premises devices comprises a Zigbee device and the premises gateway is in communication with, via the radio adapter, the Zigbee device.

40. The method of claim 34, wherein the plurality of adapters comprises a camera adapter.

41. The method of claim 40, wherein the plurality of premises devices comprises a camera device and the premises gateway is in communication with, via the camera adapter, the camera device.

42. The method of claim 41, wherein the camera device comprises a tunnel camera.

43. The method of claim 34, wherein the plurality of adapters comprises a Wi-Fi adapter.

44. The method of claim 33, wherein the premises gateway is in communication with a radio frequency (RF) bridge located at the premises.

45. The method of claim 44, wherein the RF bridge is in communication with at least one premises device of the plurality of premises devices.

46. The method of claim 45, wherein the at least one premises device in communication with the RF bridge comprises at least one Z-Wave device.

47. The method of claim 33, wherein one or more servers, located external to the premises, comprise the virtual gateway, the one or more servers comprise a session server, and the virtual gateway is an instance of a plurality of virtual gateways running on the session server.

48. The method of claim 47, wherein the one or more servers comprise at least one of a registry gateway and a session gateway, wherein the at least one of a registry gateway and a session gateway are in communication with the session server.

49. The method of claim 48, further comprising:
determining, by the registry gateway, the virtual gateway from the plurality of virtual gateways; and
routing, by the registry gateway, incoming data from the premises gateway to the virtual gateway.

50. The method of claim 49, wherein routing incoming data to the virtual gateway comprises:
mapping a premises device identification (ID) and device type ID to a site ID corresponding to the premises.

51. The method of claim 50, wherein the premises device ID corresponds to at least one premises device of the plurality of premises devices.

52. The method of claim 50, wherein the site ID is associated with the premises gateway.

53. The method of claim 50, further comprising:
receiving, by the virtual gateway and from the registry gateway, the site ID.

54. The method of claim 53, wherein the one or more servers comprises a credential gateway, the method further comprising:
receiving, by the premises gateway, from the credential gateway, and based on the site ID, a key.

55. The method of claim 54, further comprising:
receiving, by the premises gateway and from the session server, session server data, wherein the session server data comprises a session server address.

56. The method of claim 33, further comprising:
running, on the virtual gateway, a first gateway state machine: and
running, on the premises gateway, a second gateway state machine.

57. The method of claim 56, further comprising:
storing, by at least one of the first gateway state machine and the second gateway state machine, state data of the plurality of premises devices; and
managing, by the at least one of the first gateway state machine and the second gateway state machine, the plurality of premises devices.

58. The method of claim 57, further comprising:
storing, by the first gateway state machine and the second gateway state machine, state data of the plurality of premises devices; and
managing, by the first gateway state machine and the second gateway state machine, the plurality of premises devices.

59. The method of claim 33, wherein at least one premises device of the plurality of premises devices is configured to communicate, via a cellular connection with the virtual gateway.

60. The method of claim 33, further comprising:
receiving, by the virtual gateway, inbound communications comprising packet communications; and
sending, by the virtual gateway, outbound communications comprising short message server (SMS) messages.

61. The method of claim 33, wherein the premises gateway is in communication with the virtual gateway via one or more of a broadband connection and a cellular connection.

62. The method of claim 33, further comprising:
causing to send, by the virtual gateway and to a remote device, state data of the plurality of premises devices; and
receiving, by the virtual gateway and from the remote device, control data for the plurality of premises devices.

63. The method of claim 62, wherein the virtual gateway is in communication with the remote device via at least one of a mobile portal and a web portal.

64. The method of claim 33, wherein the plurality of premises devices comprises at least one of a sensor, a detector, a camera, an input/output (I/O) device, a touchscreen controller, a video camera, an input/output (I/O) device, an actuator, and a device controller that controls an attached device.

65. A system comprising:
a plurality of premises gateways each located at corresponding premises of a plurality of premises, wherein each premises gateway of the plurality of premises gateways is in communication with a corresponding plurality of premises devices; and
one or more servers located external to the plurality of premises and comprising a plurality of virtual gateways, wherein each virtual gateway of the plurality of virtual gateways is configured based on a corresponding premises gateway of the plurality of premises gateways and each virtual gateway of the plurality of virtual gateways is configured to:
receive, from one or more of the corresponding premises gateway of the plurality of premises gateways and the corresponding plurality of premises devices, state data of the corresponding plurality of premises devices, and
determine, based on the state data of the corresponding plurality of premises devices, control data for the corresponding plurality of premises devices.

66. The system of claim 65, wherein each premises of the plurality of premises is associated with a corresponding site ID and the one or more servers are configured to determine, based on a site ID, a virtual gateway of the plurality of virtual gateways corresponding to the premises associated with the site ID.

67. The system of claim 66, wherein each premises gateway of the plurality of premises gateways is associated with a device ID and the one or more servers are configured to determine, further based on a device ID associated with the site ID, the virtual gateway of the plurality of virtual gateways corresponding to the premises associated with the site ID.

68. The system of claim 67, wherein the one or more servers are configured to route, to the virtual gateway of the plurality of virtual gateways corresponding to the premises associated with the site ID, the state data of the plurality of premises devices corresponding to the premises associated with the site ID.

69. The system of claim 65, wherein each premises gateway of the plurality of premises gateways is associated with a device ID and a device type ID and the one or more servers are configured to determine, based on a device ID and a device type ID, a virtual gateway of the plurality of virtual gateways corresponding to the premises gateway associated with the device ID and the device type ID.

70. The system of claim 69, wherein the one or more servers are configured to route, to the virtual gateway of the plurality of virtual gateways corresponding to the premises gateway associated with the device ID and the device type ID, the state data of the plurality of premises devices corresponding to the premises gateway associated with the device ID and the device type ID.

71. The system of claim 65, wherein the one or more servers are configured to receive configuration data and modify, based on the configuration data, one or more virtual gateways of the plurality of virtual gateways.

72. The system of claim 71, wherein the one or more servers are configured to cause to modify, based on the configuration data, one or more premises gateways of the plurality of premises gateways corresponding to the one or more modified virtual gateways of the plurality of virtual gateways.

73. The system of claim 72, wherein the configuration data comprises firmware configuration data.

74. The system of claim 1, wherein the virtual gateway is configured to:
 receive instructions to takeover functionality of the premises gateway,
 receive, based on the instructions and from the plurality of premises devices, state data of the plurality of premises devices, and
 send, based on the instructions and to the plurality of premises devices, control data for the plurality of premises devices.

75. The system of claim 30, wherein one or more of the virtual gateway and the premises gateway are configured to send, to the remote device, the state data of the plurality of premises devices.

76. The method of claim 33, further comprising:
 receiving, by the virtual gateway, instructions to takeover functionality of the premises gateway;
 receiving, by the virtual gateway, based on the instructions, and from the plurality of premises devices, state data of the plurality of premises devices; and
 sending, by the virtual gateway, based on the instructions, and to the plurality of premises devices, control data for the plurality of premises devices.

77. The method of claim 62, further comprising:
 sending, by one or more of the virtual gateway and the plurality of premises devices and to the remote device, the state data of the plurality of premises devices.

* * * * *